(12) United States Patent
Kleeman et al.

(10) Patent No.: US 10,782,746 B2
(45) Date of Patent: Sep. 22, 2020

(54) OVERLAY FOR AN ELECTRONIC DEVICE

(71) Applicant: Belkin International, Inc., Playa Vista, CA (US)

(72) Inventors: David A. Kleeman, Marina del Rey, CA (US); Vijendra Nalwad, Newbury Park, CA (US); Kazuyoshi Raijin Otani, Los Angeles, CA (US); John F. Wadsworth, Burbank, CA (US)

(73) Assignee: BELKIN INTERNATIONAL, INC., Playa Vista, CA (US)

( * ) Notice: Subject to any disclaimer, the term of this patent is extended or adjusted under 35 U.S.C. 154(b) by 213 days.

(21) Appl. No.: 15/601,816

(22) Filed: May 22, 2017

(65) Prior Publication Data
US 2017/0253014 A1    Sep. 7, 2017

Related U.S. Application Data

(63) Continuation-in-part of application No. 15/266,845, filed on Sep. 15, 2016, which is a continuation-in-part
(Continued)

(51) Int. Cl.
*G06F 1/18*      (2006.01)
*B32B 7/12*      (2006.01)
(Continued)

(52) U.S. Cl.
CPC .......... *G06F 1/181* (2013.01); *B29C 63/0004* (2013.01); *B29C 63/02* (2013.01);
(Continued)

(58) Field of Classification Search
CPC ..... B32B 37/02; B32B 37/12; B32B 37/0046; B32B 37/003; B32B 2457/20;
(Continued)

(56) References Cited

U.S. PATENT DOCUMENTS

| | | | |
|---|---|---|---|
| 4,082,873 A | * | 4/1978 | Williams .............. G09F 3/0292 |
| | | | 428/42.1 |
| 4,285,559 A | | 8/1981 | Koch |

(Continued)

FOREIGN PATENT DOCUMENTS

| | | |
|---|---|---|
| CN | 201456516 | 5/2010 |
| CN | 201538078 | 8/2010 |

(Continued)

OTHER PUBLICATIONS

Machine Translation of DE102013021563, published Jun. 18, 2015.
(Continued)

*Primary Examiner* — Patricia L. Nordmeyer
(74) *Attorney, Agent, or Firm* — Brian Cave Leighton Paisner LLP

(57) ABSTRACT

An apparatus including an overlay with a top side and a bottom side. The apparatus also can include an adhesive component with a top side and a bottom side. The top side of the adhesive component can be adhered to the bottom side of the overlay. The adhesive component can be configured to adhere the bottom side of the overlay to a screen of an electronic device in a single-use application of the overlay by adhering the bottom side of the adhesive component to the screen of the electronic device. The apparatus can be configured such that, when the overlay is removed from being adhered to the screen of the electronic device after the single-use application of the overlay, at least a portion of the adhesive component is detached from at least a portion of the overlay. Other embodiments are provided.

20 Claims, 79 Drawing Sheets

Related U.S. Application Data of application No. 29/566,348, filed on May 27, 2016, now Pat. No. Des. 811,406, and a continuation-in-part of application No. 29/566,345, filed on May 27, 2016, now Pat. No. Des. 812,061, and a continuation-in-part of application No. 14/579,488, filed on Dec. 22, 2014, now Pat. No. 9,902,111, which is a continuation of application No. PCT/US2014/071767, filed on Dec. 20, 2014, and a continuation-in-part of application No. 14/513,043, filed on Oct. 13, 2014, now Pat. No. 10,155,370, and a continuation-in-part of application No. 14/455,700, filed on Aug. 8, 2014, now Pat. No. 9,757,934, said application No. 14/513,043 is a continuation-in-part of application No. 14/455,700, filed on Aug. 8, 2014, now Pat. No. 9,757,934.

(60) Provisional application No. 62/414,768, filed on Oct. 30, 2016, provisional application No. 62/343,679, filed on May 31, 2016, provisional application No. 62/339,692, filed on May 20, 2016, provisional application No. 61/919,433, filed on Dec. 20, 2013, provisional application No. 61/890,271, filed on Oct. 13, 2013, provisional application No. 61/871,864, filed on Aug. 29, 2013, provisional application No. 61/863,895, filed on Aug. 8, 2013.

(51) Int. Cl.

| | | |
|---|---|---|
| *B32B 37/12* | (2006.01) | |
| *B32B 38/10* | (2006.01) | |
| *B32B 27/08* | (2006.01) | |
| *B32B 3/26* | (2006.01) | |
| *B32B 27/06* | (2006.01) | |
| *B32B 17/00* | (2006.01) | |
| *B32B 37/00* | (2006.01) | |
| *B29C 63/02* | (2006.01) | |
| *B29C 63/00* | (2006.01) | |
| *B32B 7/06* | (2019.01) | |
| *B32B 38/18* | (2006.01) | |
| *B32B 3/02* | (2006.01) | |
| *B32B 27/36* | (2006.01) | |
| *B29K 67/00* | (2006.01) | |
| *B29L 31/34* | (2006.01) | |

(52) U.S. Cl.
CPC ............ *B32B 3/02* (2013.01); *B32B 3/266* (2013.01); *B32B 7/06* (2013.01); *B32B 7/12* (2013.01); *B32B 17/00* (2013.01); *B32B 27/06* (2013.01); *B32B 27/08* (2013.01); *B32B 27/36* (2013.01); *B32B 37/003* (2013.01); *B32B 37/0046* (2013.01); *B32B 37/12* (2013.01); *B32B 38/10* (2013.01); *B32B 38/1841* (2013.01); *B29C 63/0047* (2013.01); *B29C 2063/0008* (2013.01); *B29K 2067/003* (2013.01); *B29K 2995/0026* (2013.01); *B29L 2031/3437* (2013.01); *B29L 2031/3475* (2013.01); *B32B 2250/02* (2013.01); *B32B 2307/412* (2013.01); *B32B 2307/50* (2013.01); *B32B 2307/546* (2013.01); *B32B 2307/582* (2013.01); *B32B 2307/732* (2013.01); *B32B 2307/748* (2013.01); *B32B 2405/00* (2013.01); *B32B 2457/20* (2013.01); *B32B 2457/208* (2013.01); *B32B 2571/00* (2013.01); *G06F 2200/1634* (2013.01); *Y10T 156/17* (2015.01); *Y10T 156/1702* (2015.01)

(58) Field of Classification Search
CPC .......... B32B 2457/208; B32B 2250/02; B32B 2307/412; B32B 2307/50; B32B 2307/546; B32B 2307/582; B32B 2307/732; B32B 2307/748; B32B 2405/00; B32B 38/10; B32B 38/1841; B32B 17/00; B32B 27/06; B32B 27/08; B32B 27/36; B32B 3/02; B32B 3/266; B32B 7/06; B32B 2571/00; G06F 2200/1634; G06F 1/181; G06F 2031/3475; G06F 2995/0026; G06F 2457/208; B29C 63/0004; B29C 63/02; B29C 63/0047; B29C 2063/0008; B29L 2031/3475; B29L 2031/3437; B29K 2995/0026; B29K 2067/003; Y10T 156/17; Y10T 156/1702

See application file for complete search history.

(56) References Cited

U.S. PATENT DOCUMENTS

| | | |
|---|---|---|
| D305,648 S | 1/1990 | Edington |
| 4,895,231 A | 1/1990 | Yamaguchi et al. |
| 5,069,732 A | 12/1991 | Levine |
| 5,609,938 A * | 3/1997 | Shields ............... B44C 1/1733 359/594 |
| 5,680,709 A | 10/1997 | Stone |
| 5,805,251 A | 9/1998 | Ozawa |
| 6,406,758 B1 | 6/2002 | Bottari et al. |
| 7,084,859 B1 | 8/2006 | Pryor |
| D578,164 S | 10/2008 | Ingle |
| D598,024 S | 8/2009 | Scott et al. |
| D601,959 S | 10/2009 | Lee |
| D601,960 S | 10/2009 | Dai |
| 7,697,827 B2 | 4/2010 | Konicek |
| D627,826 S | 11/2010 | Halimi |
| 7,957,524 B2 | 6/2011 | Chipping |
| 7,966,861 B2 | 6/2011 | Yee et al. |
| D641,210 S | 7/2011 | Hamilton |
| 8,044,942 B1 | 10/2011 | Leonhard et al. |
| 8,047,365 B1 | 11/2011 | Lin |
| D651,214 S | 12/2011 | Yoo et al. |
| D651,791 S | 1/2012 | Cataldo et al. |
| D658,164 S | 4/2012 | Chan |
| D665,809 S | 8/2012 | Wang et al. |
| 8,369,072 B1 | 2/2013 | Alonzo et al. |
| 8,388,243 B1 | 3/2013 | Smith |
| 8,393,377 B2 | 3/2013 | Patel et al. |
| D679,753 S | 4/2013 | Sato et al. |
| D680,166 S | 4/2013 | Sato et al. |
| 8,517,367 B1 | 8/2013 | Napier |
| D690,704 S | 10/2013 | Padilla et al. |
| 8,564,538 B2 | 10/2013 | Wadsworth |
| D694,240 S | 11/2013 | Cho |
| 8,640,759 B2 | 2/2014 | Chen |
| 8,675,353 B1 | 3/2014 | Alonzo et al. |
| D707,217 S | 6/2014 | Toulotte |
| D710,843 S | 8/2014 | Akana |
| D713,397 S | 9/2014 | Du et al. |
| D714,053 S | 9/2014 | Yoo |
| 8,821,659 B2 | 9/2014 | Ng et al. |
| D715,301 S | 10/2014 | Ashcraft et al. |
| D715,784 S | 10/2014 | Lin et al. |
| D720,353 S | 12/2014 | Nakamura |
| D721,359 S | 1/2015 | Kim |
| 8,931,770 B1 | 1/2015 | Kaminski |
| 9,001,502 B1 | 4/2015 | Cowan |
| 9,010,396 B2 | 4/2015 | Patel et al. |
| D729,235 S | 5/2015 | Nagao et al. |
| D734,311 S | 7/2015 | Takamoto et al. |
| 9,089,085 B2 | 7/2015 | Patel |
| 9,159,260 B2 | 10/2015 | Oh |
| D743,402 S | 11/2015 | Ehara et al. |
| D746,265 S | 12/2015 | Colby et al. |
| D747,320 S | 1/2016 | Snyder et al. |
| D751,556 S | 3/2016 | Conley et al. |
| D751,557 S | 3/2016 | Lane |

(56) References Cited

U.S. PATENT DOCUMENTS

| | | | |
|---|---|---|---|
| D759,640 S | 6/2016 | Wadsworth |
| D767,550 S | 9/2016 | Beaupre et al. |
| D769,857 S | 10/2016 | Shin et al. |
| D772,199 S | 11/2016 | Igarashi |
| D773,927 S | 12/2016 | Cernokus et al. |
| D776,123 S | 1/2017 | Akana et al. |
| D777,714 S | 1/2017 | Akana et al. |
| D778,869 S | 2/2017 | Kim et al. |
| D781,861 S | 3/2017 | Lane et al. |
| D783,024 S | 4/2017 | Conley et al. |
| 9,662,860 B2 | 5/2017 | Wadsworth |
| 9,688,016 B2 | 6/2017 | Rostami |
| 9,701,062 B2 | 7/2017 | Wadsworth et al. |
| 9,701,096 B2 | 7/2017 | Beaupre |
| D800,126 S | 10/2017 | Wadsworth et al. |
| D800,127 S | 10/2017 | Beaupre et al. |
| D800,128 S | 10/2017 | Beaupre et al. |
| D800,129 S | 10/2017 | Wadsworth et al. |
| D800,130 S | 10/2017 | Beaupre et al. |
| D800,131 S | 10/2017 | Wadsworth et al. |
| D800,714 S | 10/2017 | Lee et al. |
| D802,594 S | 11/2017 | Beaupre et al. |
| D811,404 S | 2/2018 | Wadsworth |
| D811,405 S | 2/2018 | Wadsworth et al. |
| D811,407 S | 2/2018 | Wadsworth et al. |
| D811,408 S | 2/2018 | Wadsworth et al. |
| D812,062 S | 3/2018 | MacDonald et al. |
| D812,063 S | 3/2018 | Lane et al. |
| 2002/0054030 A1 | 5/2002 | Murphy |
| 2004/0109096 A1 | 6/2004 | Anderson et al. |
| 2004/0246386 A1 | 12/2004 | Thomas et al. |
| 2005/0030296 A1 | 2/2005 | Stohrer et al. |
| 2005/0164148 A1 | 7/2005 | Sinclair |
| 2007/0013662 A1 | 1/2007 | Fauth |
| 2007/0021068 A1 | 1/2007 | Dewhurst |
| 2007/0058990 A1 | 3/2007 | Weaver et al. |
| 2007/0115621 A1 | 5/2007 | Guillen |
| 2007/0229962 A1 | 10/2007 | Mason, Jr. |
| 2007/0247793 A1 | 10/2007 | Carnevali |
| 2007/0293282 A1 | 12/2007 | Lewis et al. |
| 2009/0015509 A1 | 1/2009 | Gottwald et al. |
| 2009/0133219 A1 | 5/2009 | Lowry et al. |
| 2009/0186181 A1 | 7/2009 | Mase |
| 2009/0245565 A1 | 10/2009 | Mittleman et al. |
| 2009/0314400 A1 | 12/2009 | Liu |
| 2010/0053926 A1 | 3/2010 | Shi et al. |
| 2010/0079972 A1 | 4/2010 | Chen et al. |
| 2010/0097757 A1 | 4/2010 | Wang |
| 2010/0309152 A1 | 12/2010 | Kusuda et al. |
| 2011/0188179 A1 | 8/2011 | Myers et al. |
| 2011/0206887 A1 | 8/2011 | Kim |
| 2011/0267793 A1 | 11/2011 | Cohen |
| 2011/0279383 A1 | 11/2011 | Wilson et al. |
| 2011/0309608 A1 | 12/2011 | Flynn et al. |
| 2012/0043015 A1 | 2/2012 | Feller |
| 2012/0063077 A1 | 3/2012 | Tomobe et al. |
| 2012/0076967 A1 | 3/2012 | Muramatsu |
| 2012/0087072 A1 | 4/2012 | McGuire et al. |
| 2012/0110868 A1 | 5/2012 | Abbondanzio |
| 2012/0183712 A1 | 7/2012 | Leonhard et al. |
| 2012/0211168 A1 | 8/2012 | Patel et al. |
| 2012/0211170 A1 | 8/2012 | Patel et al. |
| 2012/0261930 A1 | 10/2012 | Bethea |
| 2012/0268394 A1 | 10/2012 | Hsu et al. |
| 2012/0276318 A1 | 11/2012 | Franke |
| 2013/0020005 A1 | 1/2013 | Koblick et al. |
| 2013/0020020 A1 | 1/2013 | Liu |
| 2013/0040088 A1 | 2/2013 | Hirayama et al. |
| 2013/0048203 A1 | 2/2013 | Yau et al. |
| 2013/0113348 A1 | 5/2013 | Holben et al. |
| 2013/0156999 A1 | 6/2013 | Braesch et al. |
| 2013/0184845 A1 | 7/2013 | Hales |
| 2013/0237296 A1 | 9/2013 | Chen |
| 2013/0264235 A1 | 10/2013 | Lin |
| 2014/0047708 A1 | 2/2014 | Chae |
| 2014/0055927 A1 | 2/2014 | Wang |
| 2014/0124146 A1 | 5/2014 | Patel et al. |
| 2014/0130971 A1 | 5/2014 | Wu et al. |
| 2014/0250964 A1 | 9/2014 | Dai et al. |
| 2014/0332417 A1 | 11/2014 | Wicks et al. |
| 2014/0338829 A1 | 11/2014 | Peng et al. |
| 2015/0000831 A1 | 1/2015 | Wang |
| 2015/0041069 A1 | 2/2015 | Wadsworth et al. |
| 2015/0047773 A1 | 2/2015 | Wadsworth et al. |
| 2015/0107767 A1 | 4/2015 | Wadsworth et al. |
| 2015/0121691 A1 | 5/2015 | Wang |
| 2015/0136314 A1 | 5/2015 | Napier |
| 2015/0227226 A1 | 8/2015 | Wierenga et al. |
| 2015/0314523 A1 | 11/2015 | Mason et al. |
| 2015/0362736 A1 | 12/2015 | Kowasic |
| 2016/0009024 A1 | 1/2016 | Mason |
| 2016/0253039 A1 | 9/2016 | Heo et al. |
| 2017/0001364 A1 | 1/2017 | MacDonald et al. |
| 2017/0094039 A1* | 3/2017 | Lu .................. H04M 1/0266 |

FOREIGN PATENT DOCUMENTS

| | | |
|---|---|---|
| CN | 102632674 | 8/2012 |
| CN | 202623469 | 12/2012 |
| CN | 202896928 | 4/2013 |
| CN | 202923909 | 5/2013 |
| CN | 202967060 | 6/2013 |
| CN | 203077741 | 7/2013 |
| DE | 102013021563 | 6/2015 |
| EM | 0024866540001 | 6/2014 |
| EM | 0024866540002 | 6/2014 |
| EM | 0024866540003 | 6/2014 |
| EM | 0024866540004 | 6/2014 |
| EM | 0024866540005 | 6/2014 |
| EM | 0024866540006 | 6/2014 |
| EM | 0024866540007 | 6/2014 |
| EM | 0024866540008 | 6/2014 |
| EM | 0024866960001 | 6/2014 |
| EM | 0024866960002 | 6/2014 |
| EM | 0024866960003 | 6/2014 |
| EM | 0024866960004 | 6/2014 |
| EM | 0024866960005 | 6/2014 |
| EM | 0024866960006 | 6/2014 |
| EM | 0024866960007 | 6/2014 |
| EM | 0024866960008 | 6/2014 |
| EM | 0024866960009 | 6/2014 |
| EM | 0024866960010 | 6/2014 |
| EM | 0024866960011 | 6/2014 |
| EM | 0024866960012 | 6/2014 |
| EM | 0024866960013 | 6/2014 |
| EM | 0024866960014 | 6/2014 |
| EM | 0024866960015 | 6/2014 |
| EM | 0024866960016 | 6/2014 |
| EM | 0024867120001 | 6/2014 |
| EM | 0024867120002 | 6/2014 |
| EM | 0024867120003 | 6/2014 |
| EM | 0024867120004 | 6/2014 |
| EM | 0024867120005 | 6/2014 |
| EM | 0024867120007 | 6/2014 |
| EM | 0024867120008 | 6/2014 |
| EM | 0024867120009 | 6/2014 |
| EM | 0024867120010 | 6/2014 |
| EM | 0024867120011 | 6/2014 |
| EM | 0024867120012 | 6/2014 |
| EM | 0024867120013 | 6/2014 |
| EM | 0024867120014 | 6/2014 |
| EM | 0024867120015 | 6/2014 |
| EM | 0024867120016 | 6/2014 |
| JP | 10199422 | 7/1998 |
| JP | 2002049327 | 2/2002 |
| JP | 2002057764 | 2/2002 |
| JP | 2003066419 | 3/2003 |
| JP | 2006145918 | 6/2006 |
| JP | 2006155452 | 6/2006 |
| JP | 3124275 | 8/2006 |
| JP | 3180690 | 12/2012 |
| KR | 200454225 | 6/2011 |
| KR | 101080018 | 11/2011 |
| KR | 101135144 | 4/2012 |

(56) References Cited

FOREIGN PATENT DOCUMENTS

| | | |
|---|---|---|
| KR | 101176316 | 8/2012 |
| KR | 1020130043720 | 5/2013 |
| KR | 300704457 | 8/2013 |
| KR | 300704458 | 8/2013 |
| KR | 300704459 | 8/2013 |
| KR | 300704460 | 8/2013 |
| KR | 1020130092713 | 8/2013 |
| KR | 1020130092804 | 8/2013 |
| KR | 300720375 | 12/2013 |
| KR | 300720376 | 12/2013 |
| KR | 101408663 | 6/2014 |
| KR | 1020140070046 | 6/2014 |
| KR | 1020140076245 | 6/2014 |
| KR | 101468710 | 12/2014 |
| KR | 200475419 | 12/2014 |
| KR | 200475420 | 12/2014 |
| KR | 1020140136596 | 12/2014 |
| KR | 1020140142904 | 12/2014 |
| KR | 1020140143262 | 12/2014 |
| KR | 1020150006910 | 1/2015 |
| KR | 200476916 | 4/2015 |
| KR | 1020150039292 | 4/2015 |
| KR | 2020150001663 | 5/2015 |
| KR | 300804459 | 7/2015 |
| KR | 1020160022665 | 3/2016 |
| KR | 1020160022755 | 3/2016 |
| KR | 1020160061078 | 5/2016 |
| KR | 1020160088067 | 7/2016 |
| KR | 1020160091491 | 8/2016 |
| KR | 2020170000128 | 1/2017 |
| TW | I401223 | 7/2013 |
| WO | 2003093879 | 11/2003 |
| WO | 2004005141 | 1/2004 |
| WO | 2005058705 | 6/2005 |
| WO | WO2011065796 | 6/2011 |
| WO | 2011163151 | 12/2011 |
| WO | 2012074802 | 6/2012 |
| WO | 2012141505 | 10/2012 |

OTHER PUBLICATIONS

International Search Report and Written Opinion for PCT/US2017/051882, dated Nov. 29, 2017.
International Search Report and Written Opinion for PCT/US2014/071767 dated Apr. 24, 2015.
International Search Report and Written Opinion for PCT/US2014/060300 dated Jan. 27, 2015.
International Search Report and Written Opinion for PCT/US2014/050420 dated Nov. 19, 2014.
Translation of KR-10-1135144, retrieved from the Internet on Jun. 9, 2017.
Systech Displays, Inc.; Home page; http://www.systechdisplays.com/; Oct. 21, 2008.
AMZER—Kristal Screen Protectors—http://www.amzer.com/kristal/, Mar. 21, 2014.
MyScreenPROTECTOR—https://www.myscreenprotector.com/?Ing=3&view=cms&txt=about-my-screen-protector, Mar. 21, 2014.
PureGear—PureTek Roll-On Kit—http://www.pure-gear.com/shop-by-category/screen/puretek-roll-on-kit-antibacterial-antiglare-anti-fingerprint.html, Mar. 21, 2014.
TYLT ALIN Perfect Alignment Screen Protection—http://www.tylt.com/alin/, Mar. 21, 2014.
ZAGG Introduces invisibleSHIELD on Demand and invisible Shield Glass at CES 2—http://investors.zagg.com/releasedetail.cfm?ReleaseID=817526, Mar. 21, 2014.
International Search Report and Written Opinion for PCT/US 09161553, dated Dec. 17, 2009.
Protrusion on "F" key of computer keyboard; 1 page; picture taken Oct. 20, 2008.
Protrusion on "5" key of telephone; 1 page; picture taken Oct. 20, 2008.
Belkin Ez Frame Iris Anti-glare Film, posted at ebay.com, posting date Jul. 26, 2017, Copyright (C) 1995-2017 eBay Inc., [online], [site vistited Mar. 20, 2017]. Available from Internet, <URL: http://www.ebay.com/itm/BelkinEzFrameIrisAntiglareFilmwithEasyInstallFrameforIphone55S/171728155795>.
Belkin InvisiGlass Ultra Screen Protection for iPhone 7, posted at apple.com, posting date not given, Copyright (C) 2017 Apple Inc., [online], [site visited Mar. 20, 2017]. Available from Internet, <URL: http://www.apple.com/shop/product/HKF2ZM/B/belkininvisiglassultrascreenprotectionforiphone7>.
Belkin ScreenForce Transparent Screen Protector, posted at belkin.com, (C) 2017 Belkin International, Inc., [online], [site visited Mar. 20, 2017]. Available from Internet, <URL: http://www.belkin.com/us/F8W526-3/p/P-F8W526-3/>.

* cited by examiner

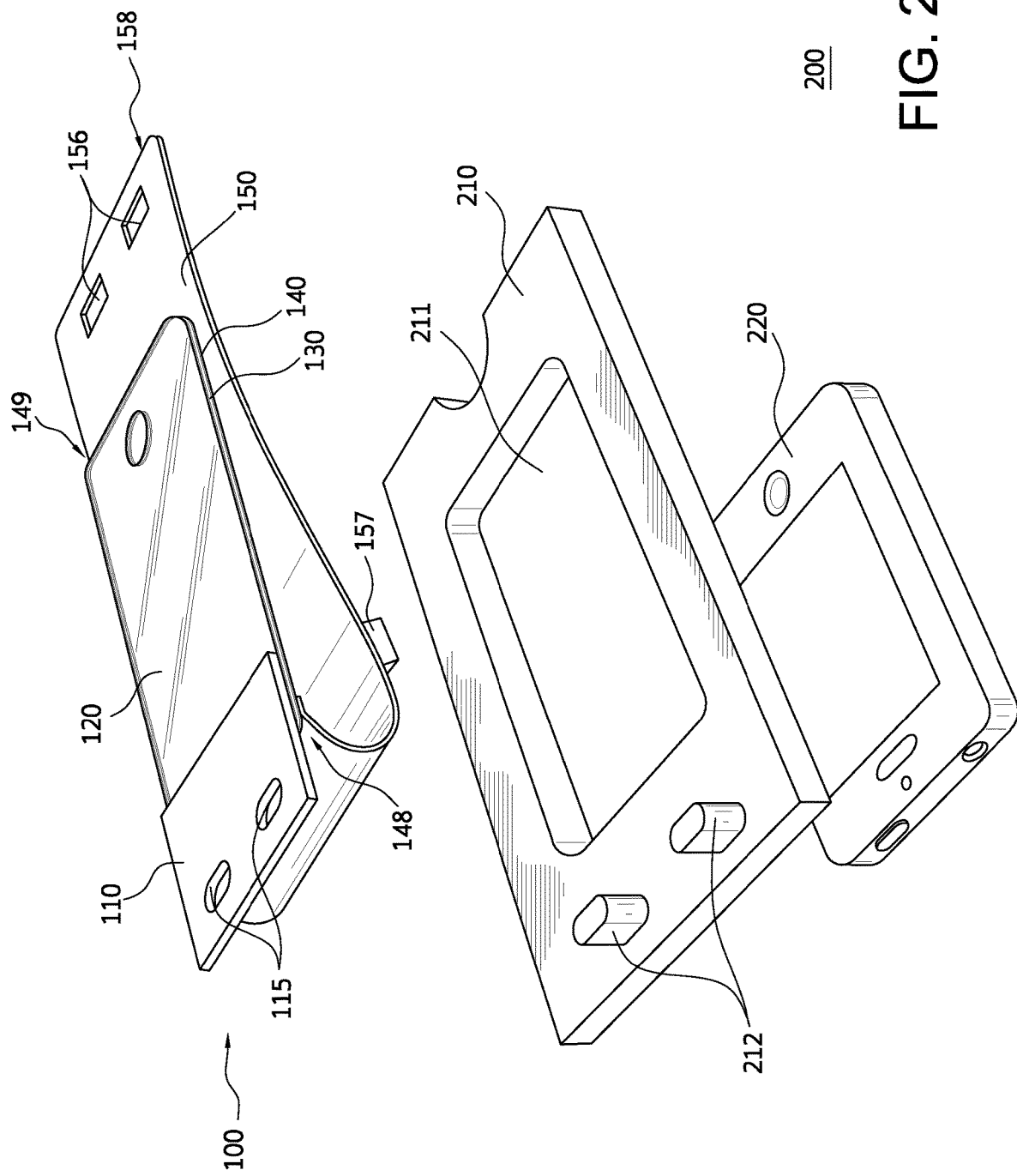

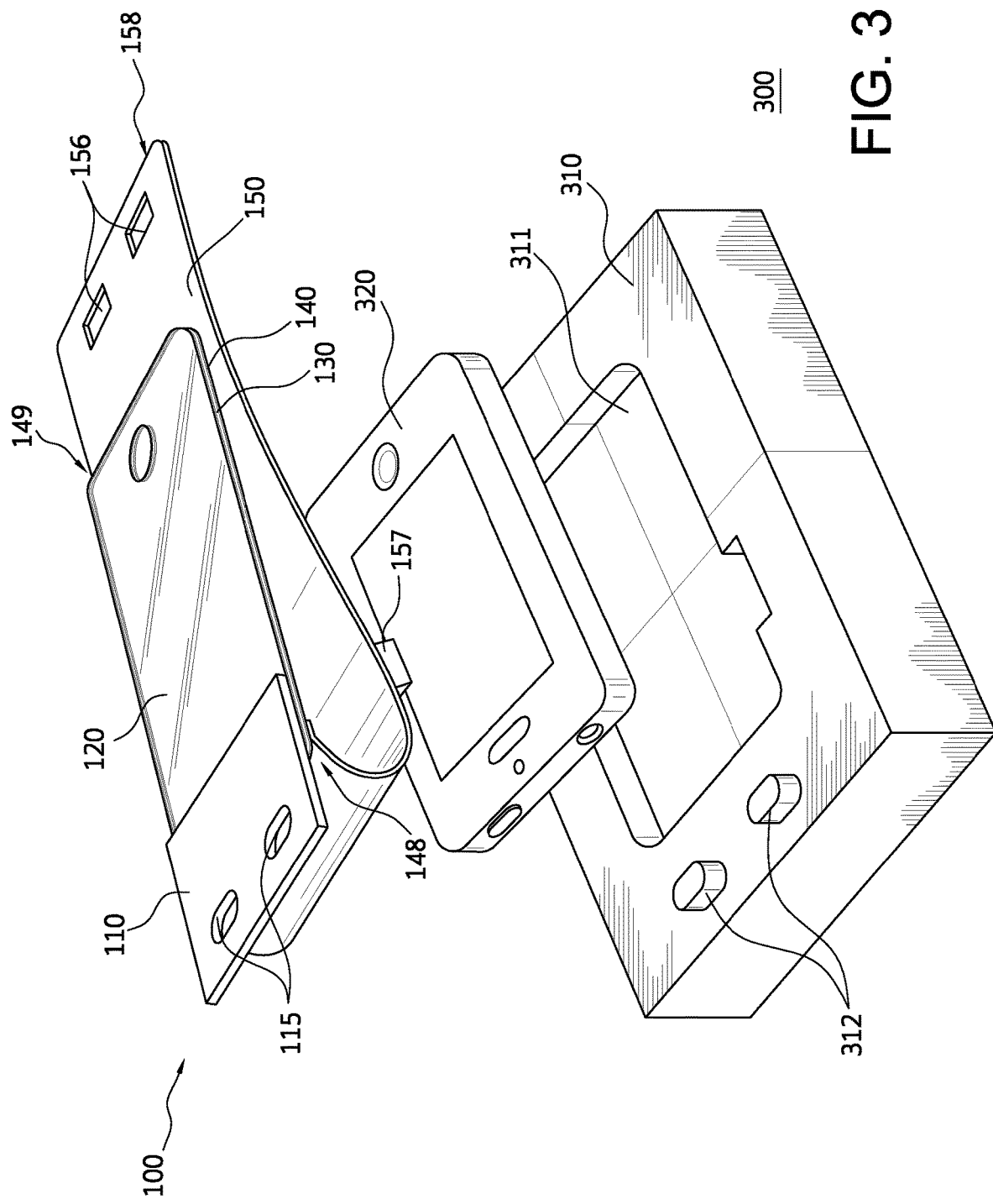

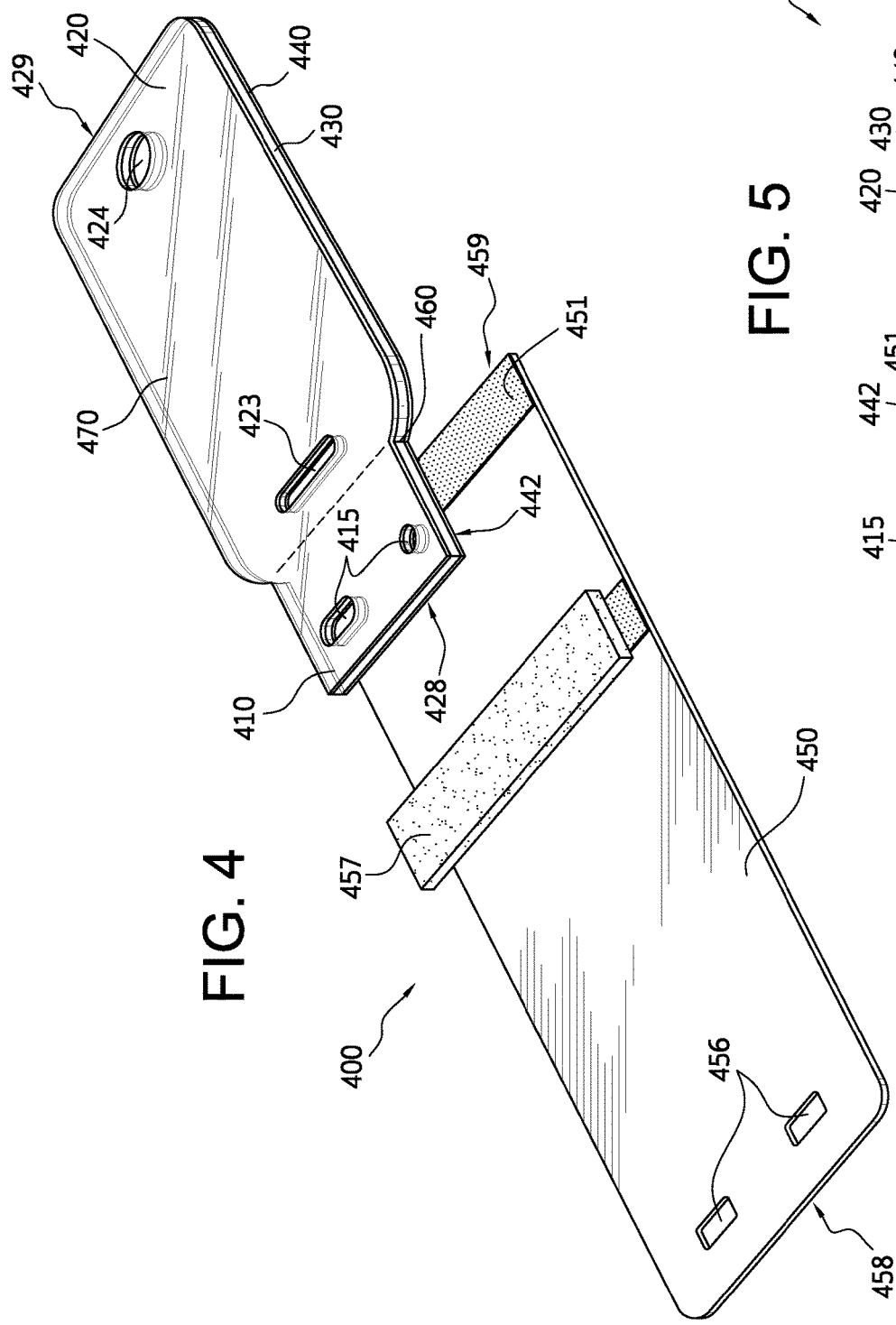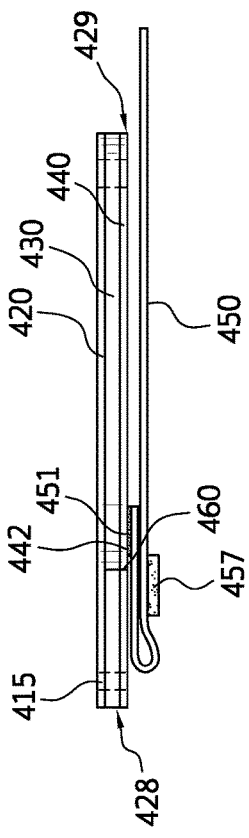

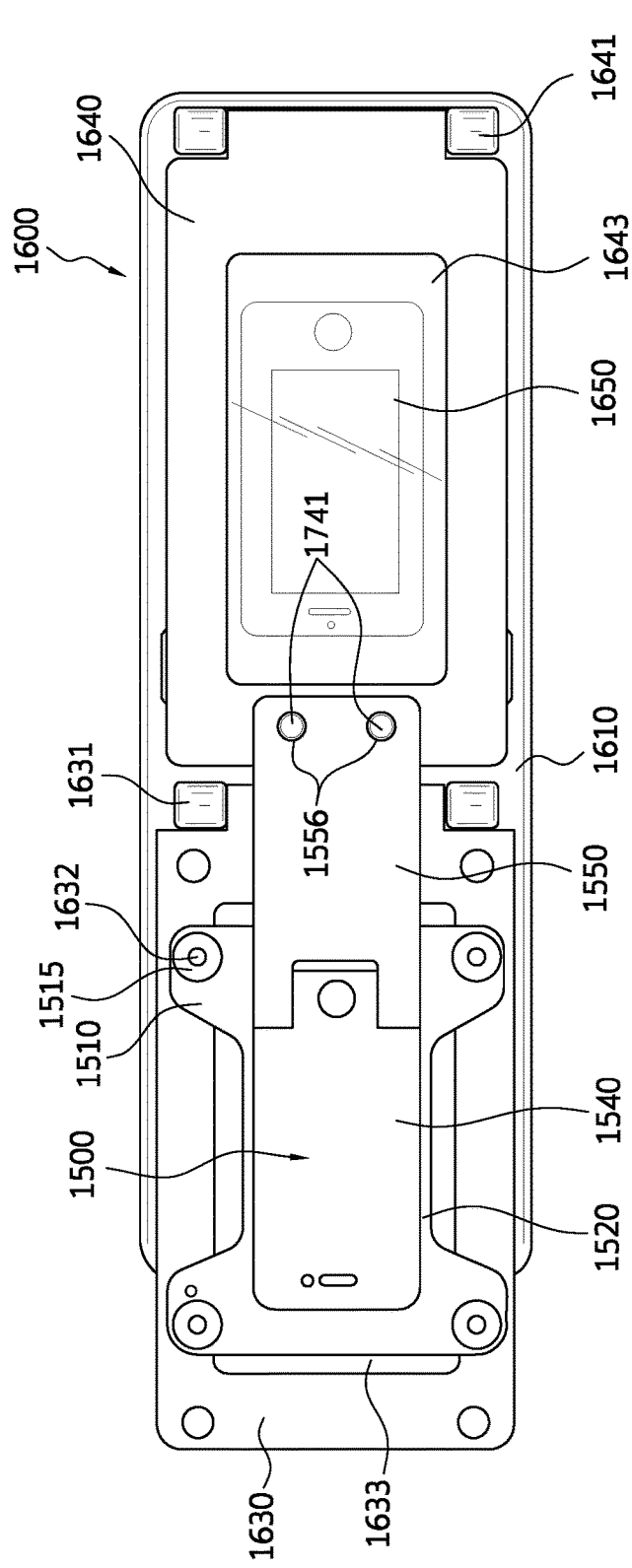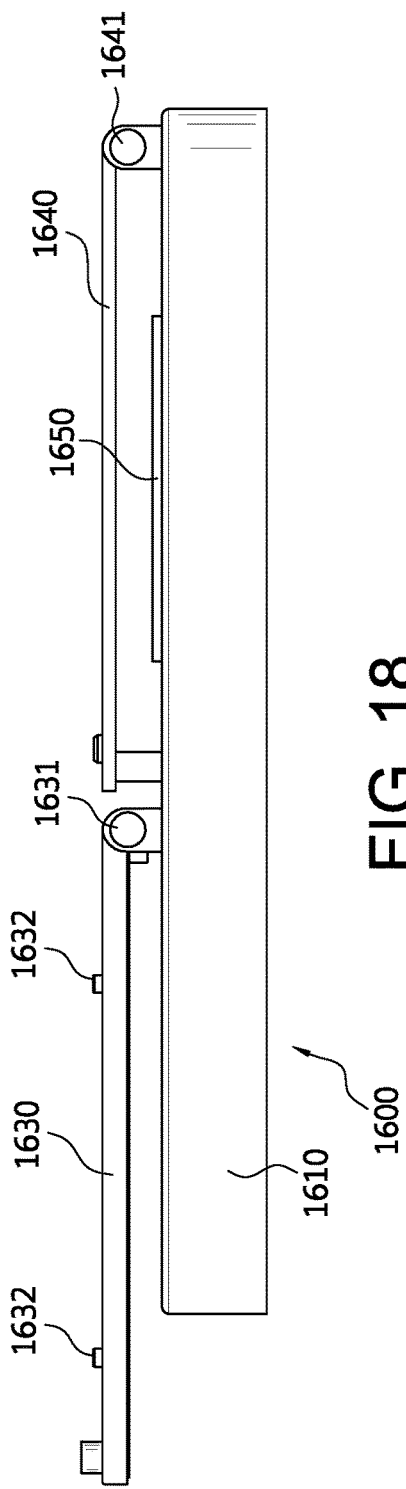
FIG. 17
FIG. 18

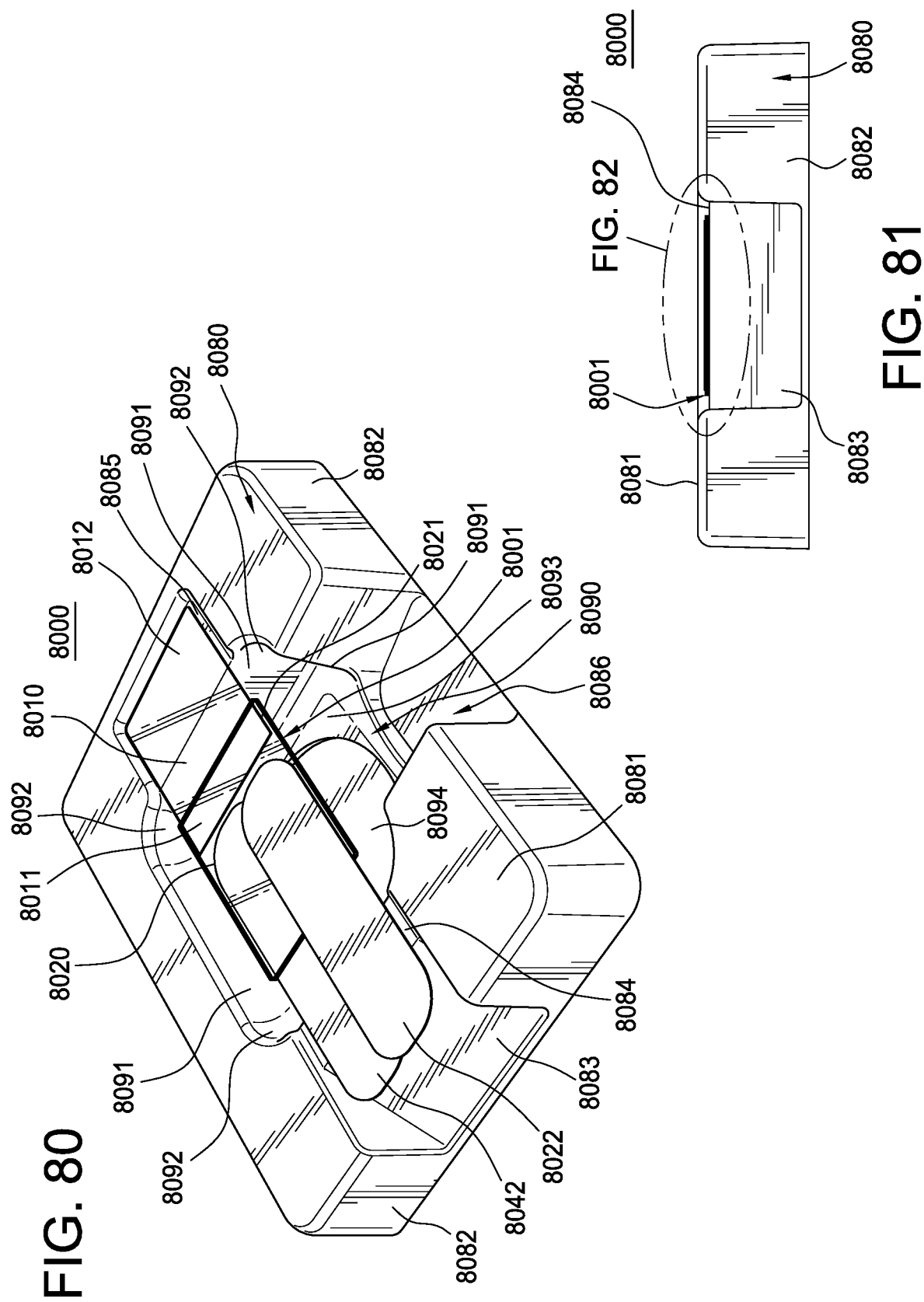

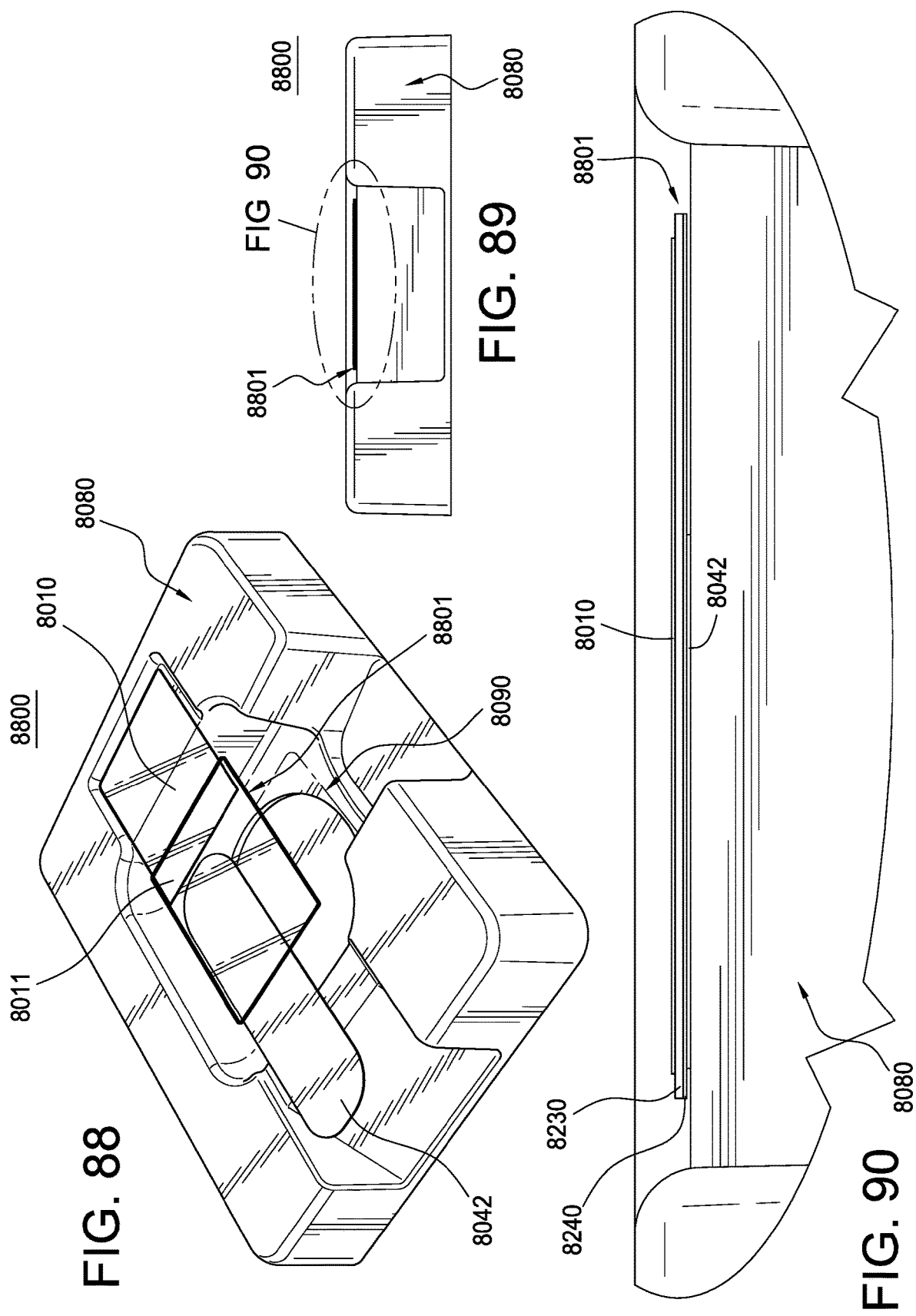

OVERLAY FOR AN ELECTRONIC DEVICE

CROSS-REFERENCE TO RELATED APPLICATIONS

This application is a continuation-in-part of U.S. patent application Ser. No. 15/266,845, filed Sep. 15, 2016, which is a continuation-in-part of U.S. patent application Ser. No. 14/579,488, filed Dec. 22, 2014, which is a continuation-in-part of U.S. patent application Ser. No. 14/513,043, filed Oct. 13, 2014, and U.S. patent application Ser. No. 14/455,700, filed Aug. 8, 2014. U.S. patent application Ser. No. 14/513,043 also is a continuation-in-part of U.S. patent application Ser. No. 14/455,700, filed Aug. 8, 2014. U.S. patent application Ser. No. 14/455,700 claims the benefit of U.S. Provisional Application No. 61/863,895, filed Aug. 8, 2013; U.S. Provisional Application No. 61/871,864, filed Aug. 29, 2013; and U.S. Provisional Application No. 61/890,271, filed Oct. 13, 2013. U.S. patent application Ser. No. 14/513,043 claims the benefit of U.S. Provisional Application No. 61/890,271, filed Oct. 13, 2013, and U.S. Provisional Application No. 61/919,433, filed Dec. 20, 2013. U.S. patent application Ser. No. 14/579,488 also claims the benefit of U.S. Provisional Application No. 61/919,433, filed Dec. 20, 2013. U.S. patent application Ser. No. 14/579,488 also is a continuation of International Application No. PCT/US2014/71767, filed Dec. 20, 2014, which claims the benefit of U.S. Provisional Application No. 61/919,433, filed Dec. 20, 2013. U.S. patent application Ser. No. 15/266,845 also is a continuation-in-part of U.S. Design patent application Ser. No. 29,566,345, filed May 27, 2016, and U.S. Design patent application Ser. No. 29/566,348, filed May 27, 2016. This application also claims the benefit of U.S. Provisional Application No. 62/414,768, filed Oct. 30, 2016; U.S. Provisional Application No. 62/343,679, filed May 31, 2016; and U.S. Provisional Application No. 62/339,692, filed May 20, 2016.

U.S. patent application Ser. Nos. 14/455,700, 14/513,043, 14/579,488, and 15/266,845; U.S. Design patent application Ser. Nos. 29,566,345 and 29/566,348; International Application No. PCT/US2014/71767; and U.S. Provisional Application Nos. 61/863,895, 61/871,864, 61/890,271, 61/919,433, 62/339,692, 62/343,679, and 62/414,768 are incorporated herein by reference in their entirety.

TECHNICAL FIELD

This disclosure relates generally to overlays, and relates more particularly to single- and/or multi-use overlays that are flat and/or rounded, and overlay applicators and related machines and cradles for applying such overlays to electronic devices.

BACKGROUND

Electronic devices, such as smartphones, tablet computing devices, media players, etc., have gained widespread popularity. These devices generally have screens, and many of these devices have touchscreens, such as capacitive touchscreens. To protect these screens, many manufacturers now produce clear film overlays, which can be applied to the screens to keep the screens clear and protect against damage, such as accidental scratching. Many of these films include a self-wetting adhesive to adhere to the screens of the electronic devices. Oftentimes, application of an overlay to the screen of a device results in misalignment of the overlay on the device, air bubbles between the overlay and the screen of the device, and/or dirt (such as dust, fingerprints, oil, and/or other particulates) between the overlay and the screen of the device.

BRIEF DESCRIPTION OF THE DRAWINGS

To facilitate further description of the embodiments, the following drawings are provided in which:

FIG. 2 illustrates an isometric view of a system for using the overlay applicator of FIG. 1 to apply an overlay to a device with a frame, according to another embodiment;

FIG. 3 illustrates an isometric view of a system for using the overlay applicator of FIG. 1 to apply an overlay to a device with a cradle, according to another embodiment;

FIG. 4 illustrates an exploded isometric view of an overlay applicator, according to another embodiment;

FIG. 5 illustrates a side view of the overlay applicator of FIG. 4;

FIG. 17 illustrates a top view of the machine of FIG. 16 in a second configuration;

FIG. 18 illustrates a side view of the machine of FIG. 16 in a second configuration;

FIG. 80 illustrates a top, front, right side perspective view of an overlay applicator tray, according to another embodiment;

FIG. 81 illustrates a front side elevational view of the overlay applicator tray of FIG. 80;

FIG. 88 illustrates a top, front, right side perspective view of an overlay applicator tray, according to another embodiment;

FIG. 89 illustrates a front side elevational view of the overlay applicator tray of FIG. 88;

FIG. 90 illustrates an enlarged front side elevational view of a portion of the overlay applicator tray of FIG. 88, as identified in FIG. 89;

FIG. 96 illustrates an enlarged top, right side view of a portion of the overlay applicator of FIG. 91, as identified in FIG. 92;

Figure 1:
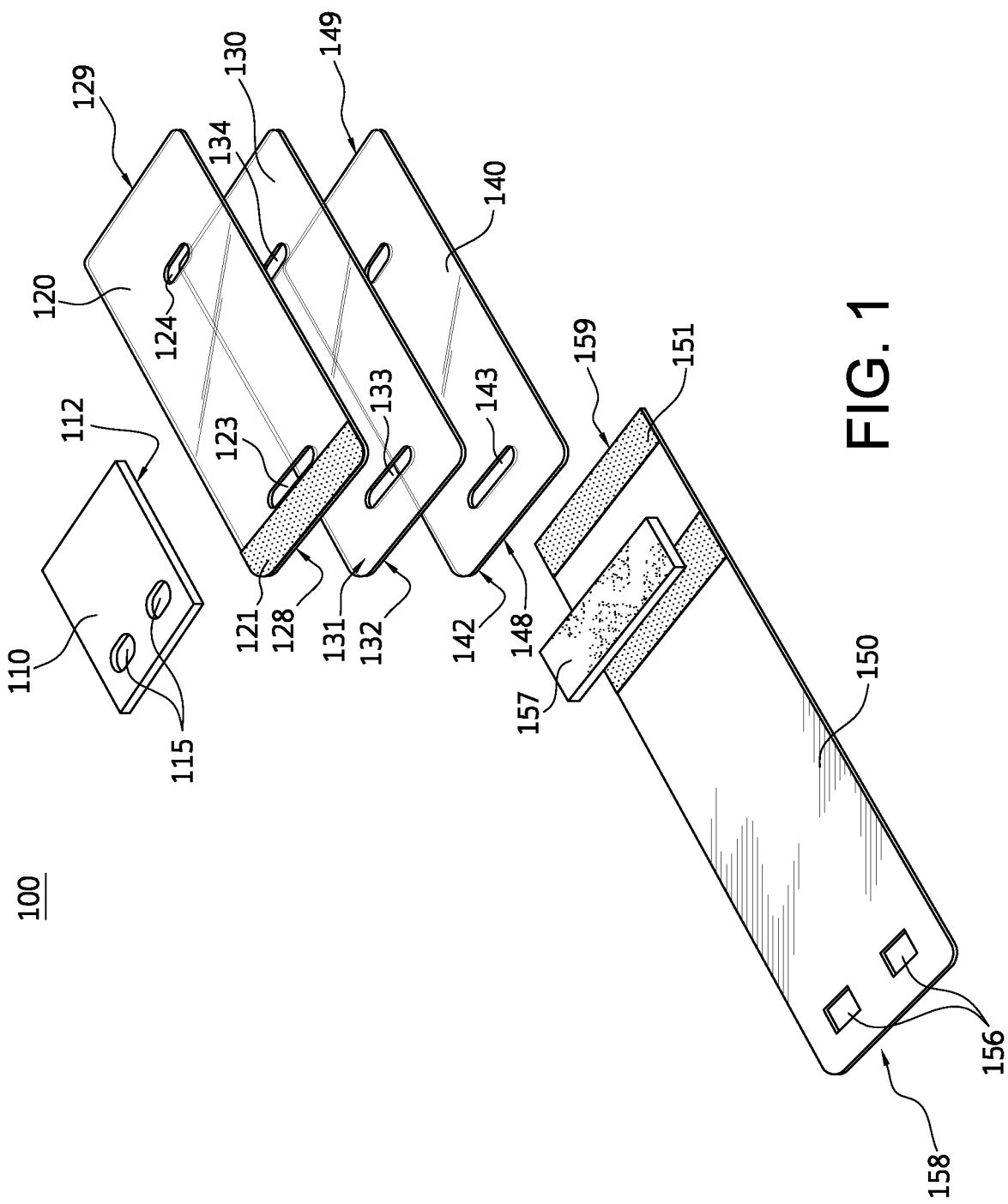
FIG. 1 illustrates an exploded isometric view of an overlay applicator, according to an embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable. "Mechanical coupling" and the like should be broadly understood and include mechanical coupling of all types.

The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include an overlay applicator. The overlay applicator can include an overlay. The overlay can include a top side and a bottom side. The bottom side can include an adhesive agent configured to adhere to a screen of an electronic device. The overlay applicator also can include an adhesive release liner. The adhesive release liner can include a top side and a bottom side. The top side of the adhesive release liner can be removably attached to the bottom side of the overlay. The adhesive release liner can be configured to protect the adhesive agent at the bottom side of the overlay from contaminants. The overlay applicator further can include a protective film removably attached to the top side of the overlay. The overlay applicator also can include an alignment tab. The alignment tab can include an alignment mechanism. The overlay applicator further can include a pull tab. The pull can include a wiper. The pull tab, including the wiper, and the adhesive release liner can be configured such that the pull tab can be folded across the bottom side of the adhesive release liner and can be pulled to remove the adhesive release liner from the bottom side of the overlay to expose the adhesive agent. The pull tab, including the wiper, and the adhesive release liner can be configured such that, when the pull tab is pulled, the wiper can be configured to wipe across and clean the screen of the electronic device.

A number of embodiments can include a method of providing an overlay applicator. The method can include providing an overlay. The overlay can include a top side and a bottom side. The bottom side can include an adhesive agent configured to adhere to a screen of an electronic device. The method also can include providing an adhesive release liner. The adhesive release liner can include a top side and a bottom side. The top side of the adhesive release liner can be removably attached to the bottom side of the overlay. The adhesive release liner can be configured to protect the adhesive agent at the bottom side of the overlay from contaminants. The method further can include providing a protective film removably attached to the top side of the overlay. The method also can include providing an alignment tab. The alignment tab can include an alignment mechanism. The method further can include providing a pull tab. The pull tab can include a wiper. The pull tab, including the wiper, and the adhesive release liner can be configured such that the pull tab can be folded across the bottom side of the adhesive release liner and can be pulled to remove the adhesive release liner from the bottom side of the overlay to expose the adhesive agent. The pull tab, including the wiper, and the adhesive release liner can be configured such that, when the pull tab is pulled, the wiper can be configured to wipe across and clean the screen of the electronic device.

Some embodiments include a machine. The machine can include a base. The machine also can include a carriage. The carriage can include a first cradle configured to securely hold a first electronic device. The carriage also can include an alignment base configured to engage with an alignment mechanism of an overlay applicator. The machine further can include a handle assembly. The handle assemble can include a handle and a pulling mechanism configured to engage with a pull tab of the overlay applicator. The machine can be configured such that the handle assembly can be pulled in a first direction relative to the base from a first handle position to a second handle position. The machine can be configured such that when the handle assembly is moved from the first handle position to the second handle position, the carriage can move in a second direction relative to the base from a first carriage position to a second carriage position. The second direction can be opposite the first direction. The machine can be configured such that when (a) the alignment base is engaged with the alignment mechanism of the overlay applicator, (b) the pulling mechanism is engaged with the pull tab of the overlay applicator, (c) the first cradle is holding the first electronic device, and (d) the handle assembly is pulled in the first direction relative to the base from the first handle position to the second handle position, an adhesive release liner of the overlay applicator can be removed from an overlay of the overlay applicator starting at a leading edge of the overlay and continuing to a trailing edge of the overlay to expose an adhesive agent of the overlay to a screen of the first electronic device.

Many embodiments include a method of providing a machine. The method can include providing a base. The method also can include providing a carriage. The carriage can include a first cradle configured to securely hold a first electronic device. The carriage also can include an alignment base configured to engage with an alignment mechanism of an overlay applicator. The method further can include providing a handle assembly. The handle assembly can include a handle and a pulling mechanism configured to engage with a pull tab of the overlay applicator. The machine can be configured such that the handle assembly can be pulled in a first direction relative to the base from a first handle position to a second handle position. The machine can be configured such that when the handle assembly is moved from the first handle position to the second handle position, the carriage can move in a second direction relative to the base from a first carriage position to a second carriage position. The second direction can be opposite the first direction. The machine can be configured such that when (a) the alignment base is engaged with the alignment mechanism of the overlay applicator, (b) the pulling mechanism is engaged with the pull tab of the overlay applicator, (c) the first cradle is holding the first electronic device, and (d) the handle assembly is pulled in the first direction relative to the base from the first handle position to the second handle position, an adhesive release liner of the overlay applicator can be removed from an overlay of the overlay applicator starting at a leading edge of the overlay and continuing to a trailing edge of the overlay to expose an adhesive agent of the overlay of the overlay applicator to a screen of the first electronic device.

Several embodiments include a machine. The machine can include a base. The machine also can include a cradle configured to securely hold a first electronic device. The machine further can include an alignment piece hingedly attached to the base. The alignment piece can include an alignment base configured to engage with an alignment mechanism of an overlay applicator. The machine also can include a pulling piece hingedly attached to the base. The pulling piece can include a pulling mechanism configured to engage with a pull tab of the overlay applicator. The machine can be configured such that the pulling piece can be rotated relative to the base in a first direction from a first pulling piece position to a second pulling piece position. The first pulling piece position can be proximate to the cradle. The machine can be configured such that the alignment piece can be rotated relative to the base in the first direction from a first alignment piece position to a second alignment piece position. The second alignment piece position can be proximate to the cradle. The machine can be configured such that when (a) the alignment base is engaged with the alignment mechanism of the overlay applicator, (b) the pulling mechanism is engaged with the pull tab of the overlay applicator, (c) the cradle is holding the first electronic device, and (d) the pulling piece is rotated relative to the base in the first direction from the first pulling piece position to the second pulling piece position, the alignment piece can be rotated relative to the base in the first direction from the first alignment piece position to the second alignment piece position, and an adhesive release liner of the overlay applicator can be removed from an overlay of the overlay applicator to expose an adhesive agent of an overlay to a screen of the first electronic device.

Further embodiments include a method of providing a machine. The method can include providing a base. The method also can include providing a cradle configured to securely hold a first electronic device. The method further can include providing an alignment piece hingedly attached to the base. The alignment piece can include an alignment base configured to engage with an alignment mechanism of an overlay applicator. The method also can include providing a pulling piece hingedly attached to the base. The pulling piece can include a pulling mechanism configured to engage with a pull tab of the overlay applicator. The machine can be configured such that the pulling piece can be rotated relative to the base in a first direction from a first pulling piece position to a second pulling piece position. The first pulling piece position can be proximate to the cradle. The machine can be configured such that the alignment piece can be rotated relative to the base in the first direction from a first alignment piece position to a second alignment piece position. The second alignment piece position can be proximate to the cradle. The machine can be configured such that when (a) the alignment base is engaged with the alignment mechanism of the overlay applicator, (b) the pulling mechanism is engaged with the pull tab of the overlay applicator, (c) the cradle is holding the first electronic device, and (d) the pulling piece is rotated relative to the base in the first direction from the first pulling piece position to the second pulling piece position, the alignment piece can be rotated relative to the base in the first direction from the first alignment piece position to the second alignment piece position to pull the pull tab of the overlay applicator, and an adhesive release liner of the overlay applicator can be removed from an overlay of the overlay applicator to expose an adhesive agent of an overlay to a screen of the first electronic device.

Yet further embodiments include a method of using an overlay applicator to apply an overlay to a screen of an electronic device. The method can include attaching the overlay applicator to a first apparatus securely holding the electronic device. The overlay applicator can include an overlay. The overlay can include a top side and a bottom side. The bottom side can include an adhesive agent configured to adhere to the screen of the electronic device. The overlay applicator also can include an adhesive release liner. The adhesive release liner can include a top side and a bottom side. The top side of the adhesive release liner can be removably attached to the bottom side of the overlay. The adhesive release liner can be configured to protect the adhesive agent at the bottom side of the overlay from contaminants. The overlay applicator further can include protective film removably attached to the top side of the overlay. The overlay applicator also can include an alignment tab. The alignment tab can include an alignment mechanism configured to engage with an alignment base of the first apparatus. The overlay applicator further can include a pull tab. The pull can include a wiper. The method also can include pulling the pull tab across the bottom side of the adhesive release liner to remove the adhesive release liner from the bottom side of the overlay to expose the adhesive agent to the screen of the electronic device.

Still further embodiments include a method of providing an overlay applicator. The method can include providing an adhesive release liner including a top side and a bottom side. The method also can include providing a pull tab including a top side and a bottom side. The method further can include attaching a wiper to the top side of the pull tab. The method additionally can include providing an overlay layer including a top side and a bottom side. The bottom side can include an adhesive agent configured to adhere to a screen of an electronic device. The method further can include attaching the bottom side of the overlay layer to the top side of the adhesive release liner. The method additionally can include providing a protective film layer including a top side and a bottom side. The method further can include attaching the bottom side of the protective film layer to the top side of the overlay layer. The method additionally can include cutting the protective film layer and the overlay layer to create an interface slit between an alignment tab and a device portion, and to create a tail slit between a tail portion and the device portion. The method further can include attaching a sticker to the top side of the protective film. The sticker can span the interface slit between the device portion and the alignment tab. The device portion of the overlay layer can be configured to adhere to a screen of an electronic device. The device portion can have dimensions approximately the same as dimensions of the screen of the electronic device.

Additional embodiments include a cradle. The cradle can include a base. The cradle also can include an alignment base configured to engage with an alignment mechanism of an overlay applicator. The cradle further can include one or more frame pieces configured to securely hold an electronic device in a device slot in a fixed position with respect to the alignment base. The base, the alignment base, and the one or more frame pieces can be configured to hold the overlay applicator between the base and a screen of the electronic device when the screen of the electronic device is facing toward the base; and facilitate applying an overlay of the overlay applicator to the screen of the electronic device.

Further embodiments include a method of providing a cradle. The method can include providing a base. The method also can include providing an alignment base configured to engage with an alignment mechanism of an overlay applicator. The method further can include providing one or more frame pieces configured to securely hold an electronic device in a device slot in a fixed position with respect to the alignment base. The base, the alignment base, and the one or more frame pieces can be configured to hold the overlay applicator between the base and a screen of the electronic device when the screen of the electronic device is facing toward the base; and facilitate applying an overlay of the overlay applicator to the screen of the electronic device.

Still further embodiments include a machine. The machine can include a base. The base can include a first end and a second end. The base also can include an alignment base configured to engage with an alignment mechanism of an overlay applicator. The overlay applicator can include a first alignment tab and a second alignment tab. The first alignment tab can include a first portion of the alignment mechanism. The second alignment tab can include a second portion of the alignment mechanism. The alignment base can include a first side proximate the first end of the base. The first side can be configured to engage with the first portion of the alignment mechanism of the overlay applicator. The alignment base also can include a second side proximate the second end of the base. The second side can be configured to engage with the second portion of the alignment mechanism of the overlay applicator. The base further can include a pull slot. The machine further can include a cradle located between the first side of the alignment base and the second side of the alignment base. The cradle can be configured to securely hold an electronic device. The machine additionally can include a slider configured to move between the first and second ends of the base. The slider can include a bar. The bar can be configured to press an overlay of the overlay applicator toward a screen of the electronic device when the slider is moved between the first and second ends of the base.

Yet further embodiments can include a method of providing a machine. The method can include providing a base. The base can include a first end and a second end. The base also can include an alignment base configured to engage with an alignment mechanism of an overlay applicator. The overlay applicator can include a first alignment tab and a second alignment tab. The first alignment tab can include a first portion of the alignment mechanism. The second alignment tab can include a second portion of the alignment mechanism. The alignment base can include a first side proximate the first end of the base. The first side can be configured to engage with the first portion of the alignment mechanism of the overlay applicator. The alignment base also can include a second side proximate the second end of the base. The second side can be configured to engage with the second portion of the alignment mechanism of the overlay applicator. The base further can include a pull slot. The method further can include providing a cradle located between the first side of the alignment base and the second side of the alignment base. The cradle can be configured to securely hold an electronic device. The method additionally can include providing a slider configured to move between the first and second ends of the base. The slider can include a bar. The bar can be configured to press an overlay of the overlay applicator toward a screen of the electronic device when the slider is moved between the first and second ends of the base.

Additional embodiments can include a machine. The machine can include a base. The machine also can include a cradle configured to securely hold an electronic device. The cradle can include an alignment base configured to engage with an alignment mechanism of an overlay applicator. The machine further can include an arm. The arm can include an expandable bladder and a pumping mechanism configured to inflate the expandable bladder. The arm can be configured to be hingedly rotated between an open configuration and a closed configuration. The machine can be configured such that when the arm is in the closed configuration and the expandable bladder is inflated, the expandable bladder can press an overlay of the overlay applicator toward a screen of the electronic device to adhere an adhesive side of the overlay to the screen of the electronic device.

Further embodiments can include a method of providing a machine. The method can include providing a base. The method also can include providing a cradle configured to securely hold an electronic device. The cradle can include an alignment base configured to engage with an alignment mechanism of an overlay applicator. The method further can include providing an arm. The arm can include an expandable bladder and a pumping mechanism configured to inflate the expandable bladder. The arm can be configured to be hingedly rotated between an open configuration and a closed configuration. The machine can be configured such that when the arm is in the closed configuration and the expandable bladder is inflated, the expandable bladder can press an overlay of the overlay applicator toward a screen of the electronic device to adhere an adhesive side of the overlay to the screen of the electronic device.

Additional embodiments can include a machine. The machine can include a support base. The machine also can include a first cradle configured to hold a first electronic device. The machine further can include an alignment base configured to engage with an alignment mechanism of an overlay applicator. The overlay applicator can include an overlay configured to be applied to a screen of the first electronic device. The machine also can include a lid hingedly attached to the support base. The machine can be configured such that the lid can be rotated with respect to the support base between an open configuration and a closed configuration. The machine can be configured in the closed configuration to facilitate applying the overlay of the overlay applicator to the screen of the first electronic device.

Further embodiments can include a method of providing a machine. The method can include providing a support base. The method also can include providing a first cradle configured to hold a first electronic device. The method further can include providing an alignment base configured to engage with an alignment mechanism of an overlay applicator. The overlay applicator can include an overlay configured to be applied to a screen of the first electronic device. The method also can include providing a lid hingedly attached to the support base. The machine can be configured such that the lid can be rotated with respect to the support base between an open configuration and a closed configuration. The machine can be configured in the closed configuration to facilitate applying the overlay of the overlay applicator to the screen of the first electronic device.

Still further embodiments can include a cradle. The cradle can include a device slot configured to securely hold an electronic device. The cradle also can include an alignment base configured to engage with an alignment mechanism of an overlay applicator. The overlay applicator can include a first alignment tab and a second alignment tab. The first alignment tab can include a first portion of the alignment mechanism. The second alignment tab can include a second portion of the alignment mechanism. The alignment base can include a first side configured to engage with the first portion of the alignment mechanism of the overlay applicator. The alignment base also can include a second side configured to engage with the second portion of the alignment mechanism of the overlay applicator. The cradle further can include a pull slot disposed between the device slot and the second side of the alignment base.

Yet further embodiments can include a method of providing a cradle. The method can include providing a device slot configured to securely hold an electronic device. The method also can include providing an alignment base configured to engage with an alignment mechanism of an overlay applicator. The overlay applicator can include a first alignment tab and a second alignment tab. The first alignment tab can include a first portion of the alignment mechanism. The second alignment tab can include a second portion of the alignment mechanism. The alignment base can include a first side configured to engage with the first portion of the alignment mechanism of the overlay applicator. The alignment base also can include a second side configured to engage with the second portion of the alignment mechanism of the overlay applicator. The method further can include providing a pull slot disposed between the device slot and the second side of the alignment base.

Additional embodiments can include a set of cradles. The set of cradles can include a first cradle. The first cradle can include a first device slot including first dimensions and configured to securely hold a first electronic device. The first cradle also can include a first alignment base configured to engage with an alignment mechanism of a first overlay applicator. The first overlay applicator can include an overlay configured to be applied to a screen of the first electronic device. The set of cradles also can include a second cradle. The second cradle can include a second device slot including second dimensions and configured to securely hold a second electronic device. The second cradle also can include a second alignment base configured to engage with an alignment mechanism of a second overlay applicator. The second overlay applicator can include an overlay configured to be applied to a screen of the second electronic device. The first dimensions of the first device slot of the first cradle can be different from the second dimensions of the second device slot of the second cradle. The first cradle and the second cradle can be configured to be stacked in a first coterminous configuration.

Further embodiments can include a method of providing a set of cradles. The method can include providing a first cradle. The first cradle can include a first device slot including first dimensions and configured to securely hold a first electronic device. The first cradle also can include a first alignment base configured to engage with an alignment mechanism of a first overlay applicator. The first overlay applicator can include an overlay configured to be applied to a screen of the first electronic device. The method also can include providing a second cradle. The second cradle can include a second device slot including second dimensions and configured to securely hold a second electronic device. The second cradle also can include a second alignment base configured to engage with an alignment mechanism of a second overlay applicator. The second overlay applicator can include an overlay configured to be applied to a screen of the second electronic device. The first dimensions of the first device slot of the first cradle can be different from the second dimensions of the second device slot of the second cradle. The first cradle and the second cradle can be configured to be stacked in a first coterminous configuration.

Still further embodiments can include an overlay applicator. The overlay applicator can include an overlay including a top side and a bottom side. The bottom side can include an adhesive agent configured to adhere to a screen of an electronic device. The overlay applicator also can include an adhesive release liner including a top side and a bottom side. The top side of the adhesive release liner can be removably attached to the bottom side of the overlay. The adhesive release liner can be configured to protect the adhesive agent at the bottom side of the overlay from contaminants. The overlay applicator further can include an alignment tab including an alignment mechanism. The overlay applicator also can include a pull tab. The overlay applicator further can include a wiper. The wiper can include a surface and a first slot extending at least partially through the surface of the wiper. The wiper can be attached to the pull tab. The pull tab, the wiper, and the adhesive release liner can be configured such that the pull tab can be folded across the bottom side of the adhesive release liner and can be pulled to remove the adhesive release liner from the bottom side of the overlay to expose the adhesive agent. The pull tab, the wiper, and the adhesive release liner can be configured such that, when the pull tab is pulled, the wiper can wipe across and clean the screen of the electronic device.

Yet further embodiments can include a method of providing an overlay applicator. The method can include providing an overlay comprising a top side and a bottom side. The bottom side can include an adhesive agent configured to adhere to a screen of an electronic device. The method also can include providing an adhesive release liner comprising a top side and a bottom side. The top side of the adhesive release liner can be removably attached to the bottom side of the overlay. The adhesive release liner can be configured to protect the adhesive agent at the bottom side of the overlay from contaminants. The method further can include providing an alignment tab including an alignment mechanism. The method also can include providing a pull tab. The method further can include providing a wiper. The wiper can include a surface and a first slot extending at least partially through the surface of the wiper. The method also can include attaching the wiper to the pull tab. The pull tab, the wiper, and the adhesive release liner can be configured such that the pull tab can be folded across the bottom side of the adhesive release liner and can be pulled to remove the adhesive release liner from the bottom side of the overlay to expose the adhesive agent. The pull tab, the wiper, and the adhesive release liner can be configured such that, when the pull tab is pulled, the wiper can wipe across and clean the screen of the electronic device.

Additional embodiments can include a system. The system can include an overlay applicator. The overlay applicator can include an overlay including a top side and a bottom side. The bottom side can include a first adhesive agent configured to adhere to a screen of an electronic device. The overlay applicator also can include an adhesive release liner including a top side and a bottom side. The top side of the adhesive release liner can be removably attached to the bottom side of the overlay. The adhesive release liner can be configured to protect the first adhesive agent at the bottom side of the overlay from contaminants. The overlay applicator further can include a protective film removably attached to the top side of the overlay. The overlay applicator also can include an alignment tab including an alignment mechanism. The overlay applicator also can include a pull tab. The system also can include a sticker assembly. The sticker assembly can include a sticker including a top side and a bottom side and an end portion. The bottom side can include a second adhesive agent configured to removably adhere to the screen of the electronic device. The sticker assembly also can include a release liner removably attached to the bottom side of the sticker. The release liner can include a device portion and an end portion. The end portion of the release liner can be removably attached to the end portion of the sticker. The sticker assembly can be configured such that, when the device portion of the release liner is removed to expose the second adhesive agent, the second adhesive agent of the bottom side of the sticker can be adhered to the screen of the electronic device, and the end portion of the sticker can be folded back over the top side of the sticker to expose the end portion of the release liner. The pull tab and the adhesive release liner can be configured such that the pull tab can be folded across the bottom side of the adhesive release liner. The sticker assembly can be configured such that, when the end portion of the sticker is folded back over the top side of the sticker and the end portion of the release liner is removed from the sticker to expose the second adhesive agent, the end portion of the sticker can be adhered to the pull tab while the pull tab is folded across the bottom side of the adhesive release liner. The overlay applicator and sticker assembly can be configured such that, when the end portion of the sticker is adhered to the pull tab, the pull tab can be pulled to remove the sticker from the screen of the electronic device and to remove the adhesive release liner from the bottom side of the overlay to expose the first adhesive agent to the screen of the device. The sticker can be configured to remove dust from the screen of the electronic device when the sticker is removed from the screen of the electronic device.

Further embodiments include a method. The method can include providing an overlay applicator. The overlay applicator can include an overlay including a top side and a bottom side. The bottom side can include a first adhesive agent configured to adhere to a screen of an electronic device. The overlay applicator also can include an adhesive release liner including a top side and a bottom side. The top side of the adhesive release liner can be removably attached to the bottom side of the overlay. The adhesive release liner can be configured to protect the first adhesive agent at the bottom side of the overlay from contaminants. The overlay applicator further can include a protective film removably attached to the top side of the overlay. The overlay applicator also can include an alignment tab including an alignment mechanism. The overlay applicator also can include a pull tab. The method also can include providing a sticker assembly. The sticker assembly can include a sticker including a top side and a bottom side and an end portion. The bottom side can include a second adhesive agent configured to removably adhere to the screen of the electronic device. The sticker assembly also can include a release liner removably attached to the bottom side of the sticker. The release liner can include a device portion and an end portion. The end portion of the release liner can be removably attached to the end portion of the sticker. The sticker assembly can be configured such that, when the device portion of the release liner is removed to expose the second adhesive agent, the second adhesive agent of the bottom side of the sticker can be adhered to the screen of the electronic device, and the end portion of the sticker can be folded back over the top side of the sticker to expose the end portion of the release liner. The pull tab and the adhesive release liner can be configured such that the pull tab can be folded across the bottom side of the adhesive release liner. The sticker assembly can be configured such that, when the end portion of the sticker is folded back over the top side of the sticker and the end portion of the release liner is removed from the sticker to expose the second adhesive agent, the end portion of the sticker can be adhered to the pull tab while the pull tab is folded across the bottom side of the adhesive release liner. The overlay applicator and sticker assembly can be configured such that, when the end portion of the sticker is adhered to the pull tab, the pull tab can be pulled to remove the sticker from the screen of the electronic device and to remove the adhesive release liner from the bottom side of the overlay to expose the first adhesive agent to the screen of the device. The sticker can be configured to remove dust from the screen of the electronic device when the sticker is removed from the screen of the electronic device.

Additional embodiments include an overlay applicator tray. The overlay applicator tray can include a cradle including a device slot. The device slot can be configured to securely hold an electronic device in the device slot. The overlay applicator tray also can include an overlay applicator. The overlay applicator can include an overlay layer. The overlay layer can include a first side and a second side. The second side can be configured to be adhered to a screen of the electronic device. The overlay applicator also can include a release liner. The release liner can be configured to be removed from the second side of the overlay layer to permit the second side of the overlay layer to be adhered to the screen of the electronic device. The overlay applicator tray additionally can include an alignment piece coupling the cradle to the overlay applicator such that the overlay layer is aligned with the screen of the electronic device when the electronic device is securely held in the device slot as the overlay applicator is applied to the screen of the electronic device.

A number of embodiments can include an overlay applicator tray. The overlay applicator tray can include a cradle including a device slot. The device slot can be configured to securely hold an electronic device in the cradle. The overlay applicator tray also can include an overlay applicator. The overlay applicator can include an overlay layer and an adhesive release liner. The overlay layer can include a top side and a bottom side. The bottom side can be configured to be adhered to a screen of the electronic device. The adhesive release liner can be removable from and/or removably attached to the bottom side of the overlay layer. The overlay applicator tray additionally can include an alignment piece coupling the cradle to the overlay applicator. The alignment piece can align the overlay layer of the overlay applicator with the screen as the overlay layer is applied to the screen when the electronic device is securely held in the device slot. In some embodiments, the alignment of the overlay layer with the screen by the alignment piece is automatic or self-aligned.

Embodiments also can include an overlay applicator tray. The overlay applicator tray can include a cradle including a device slot. The device slot can be configured to hold an electronic device in the cradle. The overlay applicator tray also can include an overlay applicator. The overlay applicator can include an overlay layer and an adhesive release liner. The overlay layer can include a first side and a second side. In some embodiments, the first side is a bottom side, and the second side is a top side, and in other embodiments, the first side is a top side, and the second side is a bottom side. The first side can be configured to be adhered to a screen of the electronic device. The adhesive release liner can be removable from and/or removably attached to the first side of the overlay layer. The overlay applicator tray additionally can include an alignment piece coupling the cradle to the overlay applicator. The alignment piece can align the overlay layer of the overlay applicator with the screen as the overlay layer is applied to the screen when the electronic device is held in the device slot. In some embodiments, the device slot can hold the electronic device in the cradle in a secure manner, and in the same or different embodiments, the alignment of the overlay layer with the screen by the alignment piece is automatic or self-aligned.

Further embodiments can include a method. The method can include inserting an electronic device into a device slot of a cradle of an overlay applicator tray. The device slot can be configured to securely hold the electronic device in the cradle. The overlay applicator tray can include an overlay applicator and an alignment piece coupling the cradle to the overlay applicator. The method also can include rotating the overlay applicator with respect to the cradle to apply an overlay layer of the overlay applicator to a screen of the electronic device. The overlay layer can include a top side and a bottom side. The bottom side can be configured to be adhered to the screen. The alignment piece can align the overlay layer with the screen and maintain the coupling of the cradle to the overlay applicator as the overlay layer is applied to the screen. In some embodiments, the alignment of the overlay layer with the screen by the alignment piece is automatic or self-aligned.

Further embodiments can include a method. The method can include inserting an electronic device into a device slot of a cradle of an overlay applicator tray. The device slot can be configured to hold the electronic device in the cradle. The overlay applicator tray can include an overlay applicator and an alignment piece coupling the cradle to the overlay applicator. The method also can include rotating the overlay applicator with respect to the cradle to apply an overlay layer of the overlay applicator to a screen of the electronic device. The overlay layer can include a first side and a second side. In some embodiments, the first side is a bottom side, and the second side is a top side, and in other embodiments, the first side is a top side, and the second side is a bottom side. The first side can be configured to be adhered to the screen. The alignment piece can align the overlay layer with the screen and maintain the coupling of the cradle to the overlay applicator as the overlay layer is applied to the screen. In some embodiments, the device slot can hold the electronic device in the cradle in a secure manner, and in the same or different embodiments, the alignment of the overlay layer with the screen by the alignment piece is automatic or self-aligned.

Additional embodiments can include an apparatus. The apparatus can include an overlay including a top side and a bottom side. The apparatus also can include an adhesive component including a top side and a bottom side. The top side of the adhesive component can be adhered to the bottom side of the overlay. The adhesive component can be configured to adhere the bottom side of the overlay to a screen of an electronic device in a single-use application of the overlay by adhering the bottom side of the adhesive component to the screen of the electronic device. The apparatus can be configured such that, when the overlay is removed from being adhered to the screen of the electronic device after the single-use application of the overlay, at least a portion of the adhesive component is detached from at least a portion of the overlay.

Further embodiments can include a method. The method can include providing an overlay. The overlay can include a top side and a bottom side. The method also can include providing an adhesive component. The adhesive component can include a top side and a bottom side. The top side of the adhesive component can be adhered to the bottom side of the overlay. The adhesive component can be configured to adhere the bottom side of the overlay to a screen of an electronic device in a single-use application of the overlay by adhering the bottom side of the adhesive component to the screen of the electronic device. The overlay and the adhesive component can be configured such that, when the overlay is removed from being adhered to the screen of the electronic device after the single-use application of the overlay, at least a portion of the adhesive component can be detached from at least a portion of the overlay.

Various embodiments of an overlay applicator can be configured to facilitate application of an overlay on the screen of a device. In some embodiments, the overlay applicator can be configured to facilitate removing dust from the screen of the device immediately before application. In certain embodiments, the overlay applicator can facilitate keeping dust and fingerprints from coming into contact with adhesive on the overlay. In various embodiments, the overlay applicator can be configured to facilitate alignment of the overlay with the screen of the device during application.

Turning to the drawings, FIG. 1 illustrates an exploded view showing various elements of an overlay applicator 100. Overlay applicator 100 is merely exemplary and embodiments of the overlay applicator are not limited to embodiments presented herein. The overlay applicator can be employed in many different embodiments or examples not specifically depicted or described herein. In a number of embodiments, overlay applicator 100 can include an alignment tab 110, a protective film 120, an overlay 130, an adhesive release liner 140, and/or a pull tab 150. Overlay 130 can be a protective film for protecting the screen of an electronic device, such as a mobile phone, a tablet computer, or a smart phone, such as an iPhone, developed and sold by Apple, Inc., of Cupertino, Calif., among other devices. Overlay 130 can be made of polyethylene terephthalate (PET) or another suitable material. Overlay 130 can have dimensions such that it partially or fully covers the screen of the electronic device. In some embodiments, overlay 130 can have one or more holes, slots, or apertures. For example, overlay 130 can include a speaker slot 133, which can allow sound from a speaker on the device to pass through overlay 130. Overlay 130 can include a button slot 134, which can allow a user to push a button on the face of the device without touching, stretching, or otherwise affecting overlay 130. Overlay 130 can include a top side 131 and a bottom side 132. In some embodiments, top side 131 can include a hard coating. In certain embodiments, top side 131 can include an optical coating. In many embodiments, bottom side 132 can include an adhesive agent to adhere overlay 130 to the screen of the device.

In a number of embodiments, protective film 120 can be attached to top side 131 of overlay 130. In many embodiments, protective film 120 can have dimensions substantially similar to the dimensions of overlay 130. Protective film 120 can have a first side 129 and a second side 128. Protective film 120 can provide protection for the hard coating or optical coating on overlay 130 during installation of overlay 130 on the device. In some embodiments, protective film 120 can be a thick flexible film and can have a thickness of approximately 0.1 to approximately 0.4 millimeters (mm), for example. In many embodiments, protective film 120 does not stretch or distort, which can advantageously facilitate alignment of overlay 130 on the device. In a number of embodiments, protective film 120 can be made of a suitable plastic or paper, or another suitable material. Protective film 120 can be configured such that it can be peeled away from top side 131 of overlay 130. In certain embodiments, protective film 120 can include one of more holes, slots, or apertures. For example, protective film 120 can include a speaker slot 123 and a button slot 124, which can be aligned with speaker slot 133 and button slot 134 when protective film 120 is attached to overlay 130.

In some embodiments, protective film 120 can include an adhesive region 121, which can be adhered to alignment tab 110 at an adhesive region 112. In many embodiments, protective film 120 can be removably attached to top side 131 of overlay 130. In certain embodiments, adhesive region 121 of protective film 120 can be adhered to adhesive region 112 of alignment tab 110 using an adhesive agent. In some embodiments, protective film 120 can be attached to alignment tab 110 using a suitable fastening mechanism, such as one or more rivets or hook and loop tape, as examples. When alignment tab 110 is attached to protective film 120, alignment tab 110 can extend beyond protective film 120, in some embodiments, such that a portion of alignment tab 110 is not adhered to or touching protective film 120. In some embodiments, alignment tab 110 can include an alignment mechanism 115 at the portion of alignment tab 110 that is not adhered to or touching protective film 120. Alignment mechanism 115 can facilitate aligning alignment tab 110, protective film 120, and overlay 130 with various features of the device during application of overlay 130. Alignment mechanism 115 can be one or more holes, slots, or other suitable alignment aid features. In some embodiments, alignment tab 110 does not stretch or distort, which can help facilitate accurate alignment of overlay 130 on the device. Alignment tab 110 can be made of plastic or cardboard, and can be thicker than protective film 120. In certain embodiments, protective film 120 and at least at portion of alignment tab 110 can be integral, or in other words, made of the same piece of material. In such embodiments, protective film 120 can be made of a thicker material, such as alignment tab 110, so as to provide sufficient structural support for alignment mechanism 115.

In a number of embodiments, adhesive release liner 140 can be attached to bottom side 132 of overlay 130. In many embodiments, adhesive release liner 140 can have dimensions substantially similar to the dimensions of overlay 130. Adhesive release liner 140 can have a first side 149 and a second side 148. By being attached to bottom side 132 of overlay 130, adhesive release liner 140 can keep the adhesive agent on bottom side 132 covered and protected until the overlay 130 is ready to be adhered to the screen of the device. In many embodiments, a top side of adhesive release liner 140 can be removably attached to bottom side 132 of overlay 130, and/or can be configured to protect the adhesive agent on bottom side 132 of overlay 130 from contaminants. In some embodiments, adhesive release liner 140 can be a thin flexible film and can have a thickness of approximately 0.1 mm to approximately 0.25 mm. In certain embodiments, adhesive release liner 140 can be made of a material that can stretch and/or distort. In certain other embodiments, adhesive release liner 140 can be made of a material that does not stretch or distort. In a number of embodiments, adhesive release liner 140 can be made of a suitable thin plastic film or paper, or another suitable material. Adhesive release liner 140 can be configured such that it can be peeled away from bottom side 132 of overlay 130. In certain embodiments, adhesive release liner 140 can include one of more holes, slots, or apertures. For example, adhesive release liner 140 can include a speaker slot 143 and a button slot 144, which can be aligned with speaker slot 133 and button slot 134 when adhesive release liner 140 is attached to overlay 130.

In some embodiments, pull tab 150 can facilitate removal of adhesive release liner 140. Pull tab 150 can include a first side 159 and a second side 158. In some embodiments, adhesive release liner 140 can include an adhesive region 142 at second side 148, which can be adhered to pull tab 150 at an adhesive region 151 at first side 159. In certain embodiments, adhesive region 142 of adhesive release liner 140 can be adhered to adhesive region 151 of pull tab 150 using an adhesive agent. In other embodiments, adhesive release liner 140 can be attached to pull tab 150 using another suitable fastening mechanism, such as rivets or hook and loop tape. When pull tab 150 is attached to adhesive release liner 140, alignment tab 110 can extend beyond adhesive release liner 140, such that a portion of pull tab 150 is not adhered to or touching adhesive release liner 140. In a number of embodiments, pull tab 150 can have a dimension such that a distance from first side 159 to second side 158 of pull tab 150 is longer than a dimension from first side 149 to second side 148 of adhesive release liner 140. In many embodiments, when pull tab 150 is attached to adhesive release liner 140, pull tab 150 can be folded back near first side 159 and can extend across the length of and beyond first side 149 of adhesive release liner 140. In a number of embodiments, pull tab 150 can be folded across the bottom side of adhesive release liner 140 and pulled to remove adhesive release liner 140 from bottom side 132 of overlay 130 to expose the adhesive agent. Pull tab 150 can be made of a flexible plastic or paper, or another suitable material. In certain embodiments, adhesive release liner 140 and pull tab 150 can be integral. In such embodiments, adhesive release liner 140 can be made of a thicker material, pull tab 150, so as to provide sufficient structural support for pulling on adhesive release liner 140.

In some embodiments, pull tab 150 can include a pulling aid 156. Pulling aid 156 can facilitate pulling pull tab 150, and can be or include one or more holes, slots, grooves, ridges, channels, etc. For example, pulling aid 156 can be two holes in which a user can place two fingers to assist in pulling pull tab 150 or in which an applicator machine can insert tabs to engage with pull tab 150. Pulling aid 156 can also assist a user in differentiating the ends of pull tab 150 and in knowing which end to pull when installing overlay 130 on the device.

In many embodiments, overlay applicator 100 and/or pull tab 150 can include a wiper 157. Wiper 157 can remove dust from the screen of the device and can facilitate application of overlay 130 to the screen of the device without dust between overlay 130 and the screen. In a number of embodiments, wiper 157 can be adhered to a top side of pull tab 150. Wiper 157 can be made of microfiber cloth, soft silicone, an extruded rubber profile wiper blade, and/or other suitable materials. In various embodiments, wiper 157 can be a solid block, a row of fins, or of another suitable form for cleaning the screen of the device. In many embodiments, wiper 157 can be configured such that when pull tab 150 is pulled, wiper 157 can wipe across and clean the screen of the device, as described below in further detail. In a number of embodiments, the wiper can be configured to wipe across a length of the screen of the device. In some embodiments, the length of the screen of the device can be greater than a width of the screen of the device.

In many embodiments, overlay applicator 100 can be manufactured such that protective film 120, overlay 130, and adhesive release liner 140 are each attached and are coterminous with each other. For example, protective film 120, overlay 130, and adhesive release liner 140 can be attached and then cut, such that the sides and other features of protective film 120, overlay 130, and adhesive release liner 140 are aligned. Alignment tab 110 can then be adhered to protective film 120, and pull tab 150 can be adhered to adhesive release liner 140. In certain embodiments, as described above, protective film 120 and at least a portion of alignment tab 110 can be integral. For example, adhesive release liner 140 can be adhered to overlay 130 and overlay can be adhered to protective film 120, and overlay 130 and adhesive release liner 140 can be cut to size without cutting protective film 120.

Turning ahead in the drawings, FIG. 2 illustrates a system 200 for using overlay applicator 100 to apply overlay 130 to a device. System 200 is merely exemplary and embodiments of the system are not limited to embodiments presented herein. The system can be employed in many different embodiments or examples not specifically depicted or described herein. System 200 can include overlay applicator 100, a frame 210, and a device 220 (e.g., a smart phone). Frame 210 can include a hole 211 in which device 220 can be placed with the screen of device 220 facing upwards or away from frame 210. In some embodiments, hole 211 is conformal with device 220. In other embodiments, hole 211 can have dimensions large enough that it can fit around a several different electronic devices. Frame 210 can have a height substantially similar to the height of device 220. In many embodiments, frame 210 can include an alignment base 212, which can engage with alignment mechanism 115. In some embodiments, alignment base 212 can be one or more protrusions that can fit inside the one or more slots of alignment mechanism 115. Alignment base 212 and alignment mechanism 115 can be configured and positioned such that when alignment mechanism 115 is engaged with alignment base 212, overlay 130 can be positioned directly above the screen of the device, and aligned such that overlay 130 will be adhered in an accurate position on the screen when adhesive release liner 140 is removed.

In some embodiments, overlay applicator 100 can be used to apply overlay 130 to device 220 in frame 210. Pull tab 150 can be folded such that second side 158 of pull tab 150 is pulled under adhesive release liner 140 from second side 148 to first side 149, as shown in FIG. 2. Overlay applicator 100 can be placed on frame 210 such that alignment mechanism 115 engages with alignment base 212. Frame 210 can be placed over device 220 with the screen of device 220 facing up. In many embodiments, by placing frame 210 over device 200, wiper 157 can come in contact with the screen of device 220. While holding frame 210, a user can pull on pull tab 150, e.g., by using pulling aid 156, such that wiper 157 is pulled across the screen of device 220, which can remove dust or other particles from the screen of device 220. In a number of embodiments, as pull tab 150 is pulled, adhesive release liner 140 is removed from bottom side 132 (FIG. 1) of overlay 130, and overlay 130 adheres to the screen of device 220 in an accurately aligned position. After overlay 130 is adhered to the screen of device 220, the user can smooth overlay 130 on device 220 to remove any bubbles between overlay 130 and the screen of device 220. Protective film 120 can be removed from overlay 130. In some embodiments, protective film can be removed by lifting and/or pulling alignment tab 110. In many embodiments, protective film 120 is removed after smoothing out any bubbles, so that protective film 120 can prevent damage to overlay 130 from forceful pushing or rubbing involved in smoothing the bubbles. For example, optical coated overlays can be damaged by objects, such as credit cards, being used to smooth out bubbles. Device 220 can be removed from frame 210 with overlay 130 installed.

Turning ahead in the drawings, FIG. 3 illustrates a system 300 for using overlay applicator 100 to apply overlay 130 to a device. System 300 is merely exemplary and embodiments of the system are not limited to embodiments presented herein. The system can be employed in many different embodiments or examples not specifically depicted or described herein. System 300 can include overlay applicator 100, a cradle 310, and a device 320 (e.g., a smart phone). Cradle 310 can include a slot 311 in which device 320 can be placed with screen facing upwards or away from cradle 310. In some embodiments, slot 311 is conformal with device 320. In other embodiments, slot 311 can have dimensions large enough that several different electronic devices can fit within it. Slot 311 can have sides and a bottom, and cradle 310 can have a height greater than the height of device 320. In many embodiments, cradle 310 can include an alignment base 312, which can engage with alignment mechanism 115. In some embodiments, alignment base 312 can be one or more protrusions that can fit inside the one or more slots of alignment mechanism 115. Alignment base 312 and alignment mechanism 115 can be configured and positioned such that when alignment mechanism 115 is engaged with alignment base 312, overlay 130 can be positioned directly above the screen of the device, and aligned such that overlay 130 will be adhered in an accurate position on the screen when adhesive release liner 140 is removed.

In some embodiments, overlay applicator 100 can be used to apply overlay 130 to device 320 in cradle 310. Pull tab 150 can be folded such that second side 158 of pull tab 150 is pulled under adhesive release liner 140 from second side 148 to first side 149, as shown in FIG. 3. Device 320 can be placed in cradle 310, with the screen of device 320 facing up. Overlay applicator 100 can be placed on cradle 310 such that alignment mechanism 115 engages with alignment base 312. In many embodiments, by placing overlay applicator 110 on cradle 210, wiper 157 can come in contact with the screen of device 320. While holding cradle 310, a user can pull on pull tab 150, e.g., by using pulling aid 156, such that wiper 157 is pulled across the screen of device 320, which can remove dust or other particles from the screen of device 320. In a number of embodiments, as pull tab 150 is pulled, adhesive release liner 140 is removed from bottom side 132 (FIG. 1) of overlay 130, and overlay 130 adheres to the screen of device 320 in an accurately aligned position. After overlay 130 is adhered to the screen of device 320, the user can smooth overlay 130 on device 320 to remove any bubbles between overlay 130 and the screen of device 320. Protective film 120 can be removed from overlay 130. In some embodiments, protective film 120 can be removed by lifting and/or pulling alignment tab 110. In many embodiments, protective film 120 is removed after smoothing out any bubbles, so that protective film 120 can prevent damage to overlay 130 from forceful pushing or rubbing involved in smoothing the bubbles, as explained above. Device 320 can be removed from cradle 310 with overlay 130 installed.

In yet other embodiments, overlay applicator 100 can be used with a machine, such as the machine shown in FIGS. 8-14 and 16-20, and described below, which can semi-automatically align overlay applicator 100 with a device and engage with pull tab 150 and/or alignment tab 110 to install overlay 130 on the device.

Advantageously, overlay applicator 100 can be used to install overlay 130 without dust or particles between overlay 130 and the screen of the device. Frame 210 (FIG. 2) or frame 310 (FIG. 3) can be used with overlay applicator 100 to accurately position overlay 130 relative to features of the device. Advantageously, by wiping the screen of the device immediately before applying overlay 130, overlay applicator 100 can clean any dust or particles on the screen. Beneficially, by removing adhesive release liner 140 immediately before applying overlay 130 minimizes exposure of the adhesive agent on bottom side 132, which can prevent dust or other particles from coming in contact with the adhesive agent. As another advantage, by using pull tab 150 to remove adhesive release liner 140 and/or by holding overlay 130 in position by using alignment tab 110, a user does not need to hold the sides of overlay 130, which can prevent the user from inadvertent contact with the adhesive agent on bottom side 132 of overlay 130.

Turning ahead in the drawings, FIG. 4 illustrates an isometric view of an overlay applicator 400. FIG. 5 illustrates a side view of overlay applicator 400. Overlay applicator 400 is merely exemplary and embodiments of the overlay applicator are not limited to embodiments presented herein. The overlay applicator can be employed in many different embodiments or examples not specifically depicted or described herein. Overlay applicator 400 can be similar to overlay applicator 100 (FIG. 1), and various components and/or constructions of overlay applicator 400 can be substantially identical or similar to various components of overlay applicator 100 (FIG. 1). Overlay applicator 400 can include a protective film 420, an overlay 430, an adhesive release liner 440, and/or a pull tab 450. Protective film 420 can be similar to protective film 120 (FIG. 1), overlay 430 can be similar to overlay 130 (FIG. 1), adhesive release liner 440 can be similar to adhesive release liner 140 (FIG. 1), and/or pull tab 450 can be similar to pull tab 150 (FIG. 1).

In some embodiments, overlay applicator can include a speaker slot 423 and/or a button slot 424. Speaker slot 423 and/or button slot 424 can extend through protective film 420, overlay 430, and adhesive release liner 440. In a number of embodiments, overlay applicator 400 can include a device portion 470 and an alignment tab 410. Alignment tab 410 can be similar to alignment tab 110 (FIG. 1). In some embodiments, device portion 470 and alignment tab 410 can be made of the layers used for protective film 420, overlay 430, and adhesive release liner 440. Alignment tab 410 can include alignment mechanism 415. Alignment mechanism 415 can be one or more holes, slots, or other suitable alignment aid features, which can facilitate aligning alignment tab 410, protective film 420, overlay 430, and adhesive release liner 440 with various features of the device during application of overlay 430.

In many embodiments, construction of overlay applicator 400 can include adhering and/or attaching layers of material for protective film 420, overlay 430, and adhesive release liner 440. After attaching the layers, protective film 420, overlay 430, and adhesive release liner 440 can be cut to predetermined dimensions of device portion 470 and alignment tab 410. In some embodiments, the cutting of device portion 470 and alignment tab 410 to size can include cutting speaker slot 423, button slot 424, and/or alignment mechanism 415. As a result of the cut, device portion 470 and alignment tab 410 can be adjoined and integral on all three layers of protective film 420, overlay 430, and adhesive release liner 440, and can extend from first side 429 to second side 428. Construction of overlay applicator 400 also can include a die cut between alignment tab 410 and device portion 470 to create an interface slit 460. The die cut can be a kiss cut through adhesive release liner 440 and overlay 430, but not protective film 420. In a number of embodiments, alignment tab 410 can include a top layer that is integral with the protective film, a middle layer attached to the top layer, and/or a bottom layer attached to the middle layer. In some embodiments, overlay applicator 400 can include a cut between the middle layer of alignment tab 410 and overlay 530, and a cut between the bottom layer of alignment tab 410 and adhesive release liner 440. As a result of the kiss cut, the dimensions of device portion 470 at overlay 430 and adhesive release liner 440 can be equal to the dimensions of the screen of the device. The process of cutting the layers (protective film 420, overlay 430, and adhesive release liner 440) to size, cutting alignment mechanism 415, and other feature slots (e.g., speaker slot 423 and button slot 424), and kiss cutting to create interface slit 460 can advantageously provide a simpler method of constructing overlay applicator 400, and/or can provide overlay applicator 400 with a very accurate alignment of alignment mechanism 415 with respect to overlay 430 and its features.

In a number of embodiments, after kiss cutting alignment tab 410 and device portion 470 to size, pull tab 450 can be attached to adhesive release liner 440. Pull tab 450 can be substantially similar or identical to pull tab 150 (FIG. 1), and various components or constructions of pull tab 450 can be the same as various components of pull tab 150 (FIG. 1). Pull tab 450 can facilitate removal of adhesive release liner 440. Construction of overlay applicator 400 can include adhering pull tab 450 to adhesive release liner 440. Pull tab can include a first side 459 and a second side 458. Pull tab 450 can include an adhesive region 451 at or near first side 459. Adhesive release liner 440 can include an adhesive region 442 at device portion 470 next to interface slit 460. Adhesive region 451 can be adhered to adhesive region 442 to attach pull tab 450 to adhesive release liner 440. Pull tab 450 can include a wiper 457, which can remove dust from the screen of the device, and can be similar to wiper 157 (FIG. 1). Pull tab 450 can include a pulling aid 156 at or near second side 458, which can assist a user and/or an applicator machine in engaging with and pulling pull tab 450, as describe above in connection with pull tab 150 (FIG. 1). After pull tab 450 is attached to adhesive release liner 440, a user and/or machine can pull on pull tab 450 to peel back and remove adhesive release liner 440 starting at interface slit 460 and peeling back to first side 429.

Figure 6:
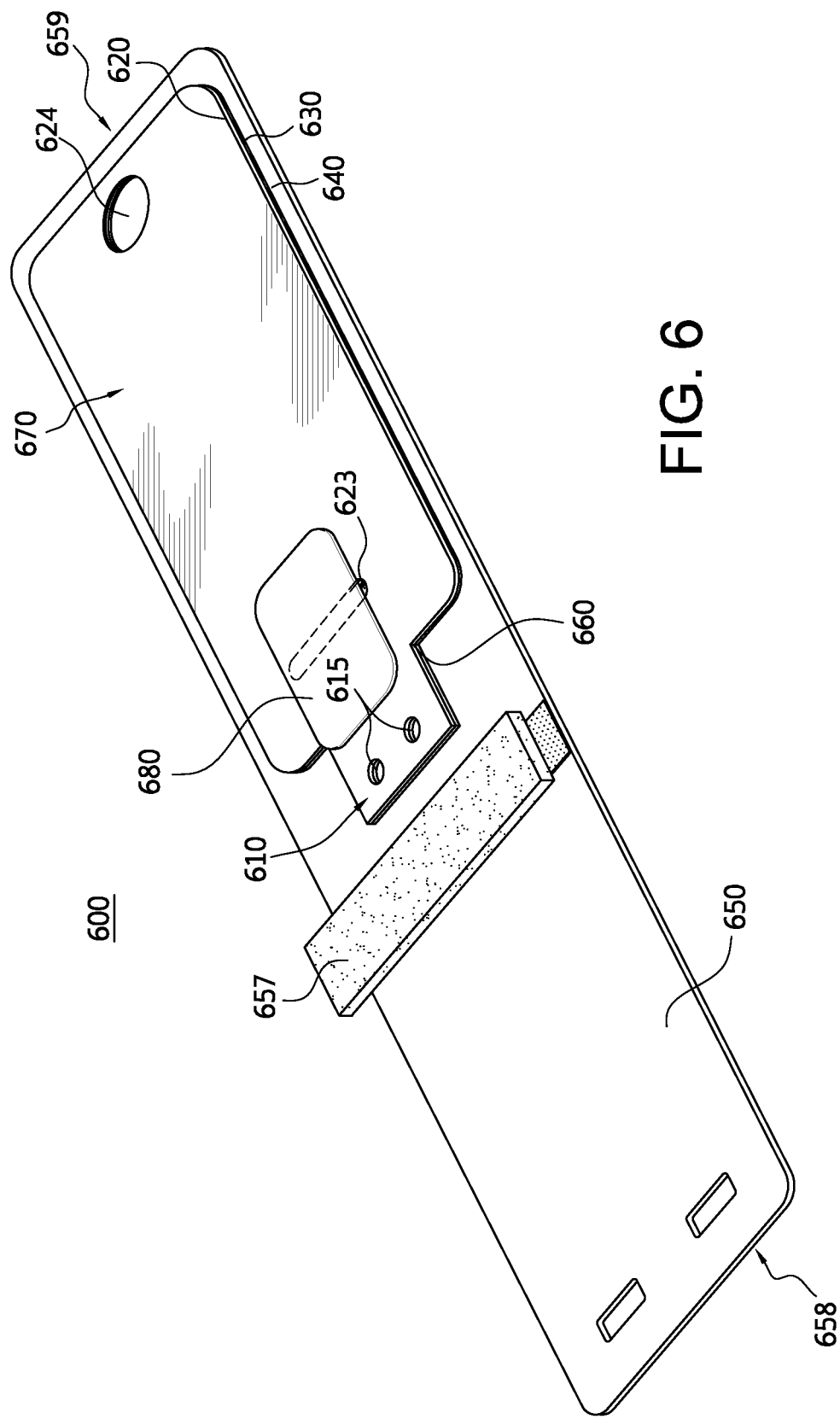
FIG. 6 illustrates an isometric view of an overlay applicator, according to another embodiment.

Turning ahead in the drawings, FIG. 6 illustrates an isometric view of an overlay applicator 600. Overlay applicator 600 is merely exemplary and embodiments of the overlay applicator are not limited to embodiments presented herein. The overlay applicator can be employed in many different embodiments or examples not specifically depicted or described herein. Overlay applicator 600 can be similar to overlay applicator 100 (FIG. 1) and/or overlay applicator 400 (FIGS. 4-5), and various components and/or constructions of overlay applicator 600 can be substantially identical or similar to various components of overlay applicator 100 (FIG. 1) and/or overlay applicator 400 (FIGS. 4-5). Overlay applicator 600 can include a protective film 620, an overlay 630, an adhesive release liner 640, and/or a pull tab 650. Protective film 620 can be similar to protective film 120 (FIG. 1) and/or protective film 420 (FIGS. 4-5), overlay 630 can be similar to overlay 130 (FIG. 1) and/or overlay 430 (FIGS. 4-5), adhesive release liner 640 can be similar to adhesive release liner 140 (FIG. 1) and/or adhesive release liner 440 (FIGS. 4-5), and/or pull tab 650 can be similar to pull tab 150 (FIG. 1) and/or pull tab 450 (FIGS. 4-5).

In a number of embodiments, overlay applicator 600 can include a device portion 670 and an alignment tab 610. Alignment tab 610 can be similar to alignment tab 110 (FIG. 1) and/or alignment tab 410 (FIG. 4). Device portion 670 can be similar to device portion 470 (FIGS. 4-5). In some embodiments, device portion 670 and alignment tab 610 can be made of the layers used for protective film 620, overlay 630, and adhesive release liner 640. Alignment tab 610 can include an alignment mechanism 615, which can be similar to alignment mechanism 115 (FIG. 1) and/or alignment mechanism 415 (FIGS. 4-5), and which can facilitate aligning alignment tab 610, protective film 620, overlay 630, and adhesive release liner 640 with various features of the device during application of overlay 630. Pull tab 650 can be integral with release liner 640 and can be a single layer of material, such as plastic, paper, or another suitable liner film. Pull tab 450 can facilitate removal of adhesive release liner 440.

In many embodiments, construction of overlay applicator 600 can include adhering and/or attaching layers of material for protective film 620, overlay 630, and adhesive release liner 640. After attaching the layers, protective film 620 and overlay 630 can be kiss cut to predetermined dimensions of device portion 670 and alignment tab 610, without cutting adhesive release liner 640 and/or pull tab 650. Excess material from the layers for protective film 620 and overlay 630 can be removed. In some embodiments, the kiss cutting of device portion 670 and alignment tab 610 to size at the layers of protective film 620 and overlay 630 can include cutting a speaker slot 623, a button slot 624, and/or alignment mechanism 615. The kiss cutting can also include cutting an interface slit 660 between alignment tab 610 and device portion 670 through the layers of protective film 620 and overlay 630, but not adhesive release liner 640. As a result of the kiss cut, the dimensions of device portion 670 at overlay 630 and protective film 620 can be equal to the dimensions of the screen of the device. In many embodiments, alignment tab 610 can include a top layer and a bottom layer attached to the top layer, and overlay applicator 600 can include a cut between the top layer of alignment tab 610 and protective film 620, and a cut between the bottom layer of the alignment tab and overlay 630.

In a number of embodiments, after kiss cutting alignment tab 610 and device portion 670 to size at the layers of protective film 620 and overlay 630, and cutting interface slit 660, construction of overlay applicator 600 can include adhering a joining sticker 680 on the top the layer of protective film 620 to span interface slit 660 and join device portion 670 of protective film 620 with the top layer of alignment tab 610. Joining sticker 680 can help maintain alignment between alignment tab 610 and device portion 670. In many embodiments, joining sticker 680 does not stretch or distort, which can advantageously facilitate alignment of alignment mechanism 615 with overlay 630, such that overlay 630 can be accurately positioned on the screen of the device.

In a number of embodiments, after kiss cutting alignment tab 610 and device portion 670 to size, a wiper 657 can be attached to pull tab 650. Wiper 657 can remove dust from the screen of the device, and can be similar to wiper 157 (FIG. 1) and/or wiper 457 (FIGS. 4-5). In certain embodiments, after joining sticker 680 has been attached between alignment tab 610 and device portion 670, pull tab 650 can be folded back, such that a second side 658 is folded beneath release liner 640 to a first side 659. Pull tab 650 and release liner 640 can be peeled back off of a portion of alignment tab 610, such that alignment mechanism 615 is uncovered by release liner 640, allowing alignment mechanism to engage with an alignment base, such as alignment base 212 (FIG. 2) or alignment base 312 (FIG. 3). The process of kiss cutting the layers at protective film 620 and overlay 630 can advantageously provide a simpler method of constructing overlay applicator 600, and/or can provide overlay applicator 600 with a very accurate alignment of alignment mechanism 615 with respect to overlay 630 and its features.

Figure 7:
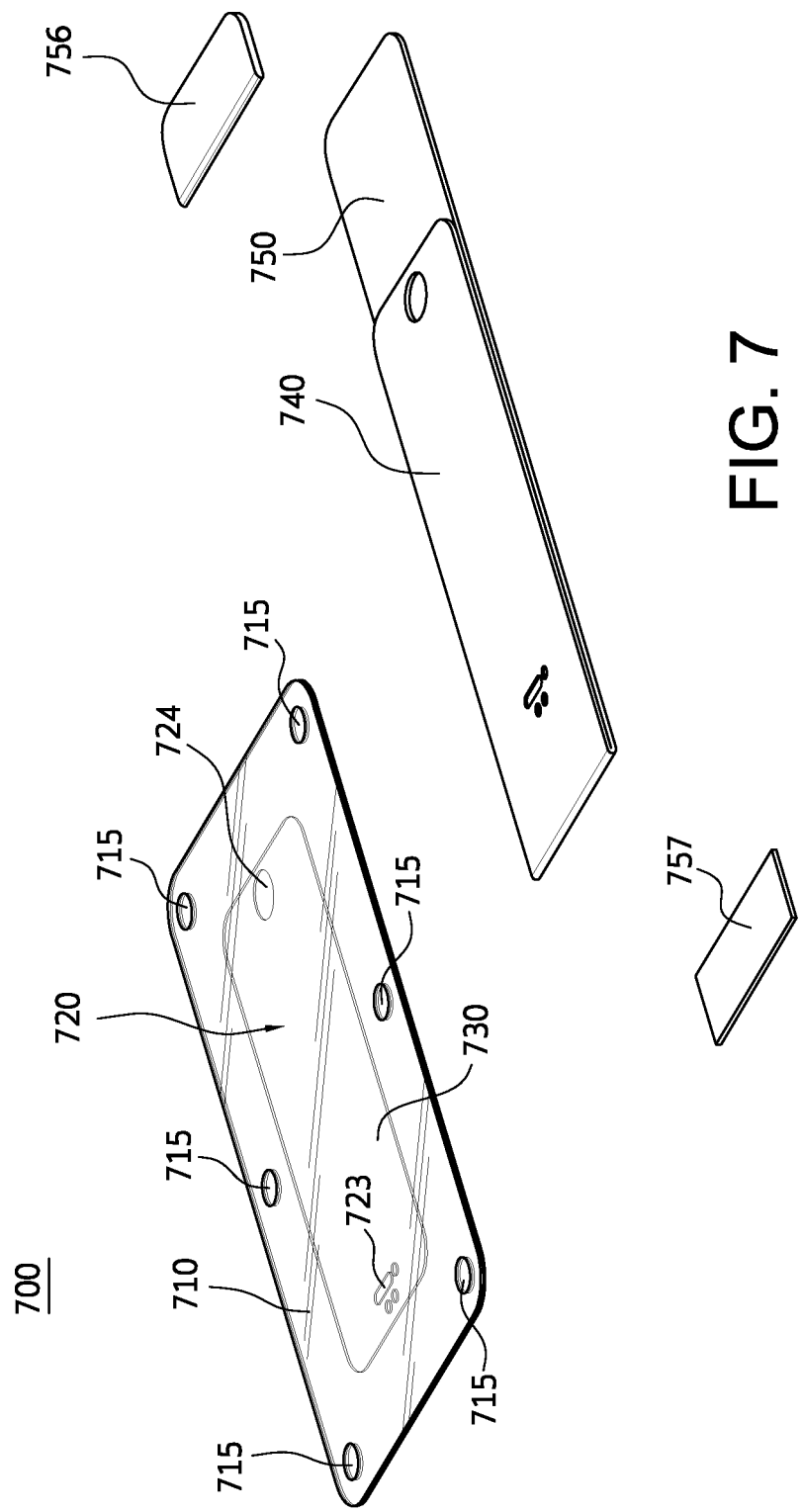
FIG. 7 illustrates an exploded isometric view of an overlay applicator, according to another embodiment.

Turning ahead in the drawings, FIG. 7 illustrates an exploded isometric view of an overlay applicator 700. Overlay applicator 700 is merely exemplary and embodiments of the overlay applicator are not limited to embodiments presented herein. The overlay applicator can be employed in many different embodiments or examples not specifically depicted or described herein. Overlay applicator 700 can be similar to overlay applicator 100 (FIG. 1), overlay applicator 400 (FIGS. 4-5), and/or overlay applicator 600 (FIG. 6), and various components and/or constructions of overlay applicator 700 can be substantially identical or similar to various components of overlay applicator 100 (FIG. 1), overlay applicator 400 (FIGS. 4-5), and/or overlay applicator 600 (FIG. 6). Overlay applicator 700 can include a protective film 720, an overlay 730, an adhesive release liner 740, and/or a pull tab 750. Protective film 720 can be similar to protective film 120 (FIG. 1), protective film 420 (FIGS. 4-5), and/or protective film 620 (FIG. 6); overlay 730 can be similar to overlay 130 (FIG. 1), overlay 430 (FIGS. 4-5), and/or overlay 630 (FIG. 6); adhesive release liner 740 can be similar to adhesive release liner 140 (FIG. 1), adhesive release liner 440 (FIGS. 4-5), and/or adhesive release liner 640 (FIG. 6); and/or pull tab 750 can be similar to pull tab 150 (FIG. 1), pull tab 450 (FIGS. 4-5), and/or pull tab 650 (FIG. 6).

In many embodiments, protective film 720 can include an alignment frame 710 extending around each side of overlay 730. Alignment frame 710 can be similar to alignment tab 110 (FIGS. 1-3), alignment tab 410 (FIGS. 4-5), and/or alignment tab 610 (FIG. 6). In many embodiments, alignment frame 710 can be integral with protective film 720. Alignment frame 710 can include an alignment mechanism 715. In some embodiments, alignment mechanism 715 can include multiple holes surrounding overlay 730. For example, as shown in FIG. 7, alignment mechanism 715 can include six holes spaced relatively evenly around alignment frame 710, surrounding overlay 730. In other embodiments, alignment mechanism 715 can include more or fewer holes than six. Alignment mechanism 715 can engage with an alignment base (e.g., similar to alignment base 212 (FIG. 2), and/or alignment base 312 (FIG. 3)). For example, overlay 700 can be used on a cradle, similar to cradle 310, which has alignment base pins configured to engage with alignment mechanism 715. Alignment frame 710 can provide alignment at multiple points around the overlay and the device, which can advantageously provide accurate alignment and help reduce distortion.

In some embodiments, construction of overlay applicator 700 can include adhering and/or attaching layers of material for protective film 720 and overlay 730. After attaching the layers of material for protective film 720 and overlay 730, constructing overlay applicator 700 can include cutting the layers for protective film 720 and overlay 730 to the appropriate dimensions of protective film 720. Such cutting can include cutting a button hole 724 and/or a speaker hole 723. Construction of overlay applicator 700 also can include kiss cutting through the layer of material for overlay 730 to cut overlay 730 to its appropriate dimension, i.e., to the size of the screen of the device. In many embodiments, the kiss cut through the layer of material for overlay 730 does not extend into protective film 720.

In a number of embodiments, after kiss cutting overlay 730, overlay 700 can be constructed by adhering adhesive release liner 740 and pull tab 750 to overlay 730. Pull tab 750 can be integral with release liner 740 and can be a single layer of material, such as plastic, paper, or another suitable liner film. Pull tab 750 can facilitate removal of adhesive release liner 740. Pull tab 750 can include a pulling aid 756, which can be a tab that allows a user and/or machine to pull on pull tab 750 and peel back adhesive release liner 740 from overlay 730. Pull tab 750 also can include a wiper 757. Wiper 757 can remove dust from the screen of the device, and can be similar to wiper 157 (FIG. 1), wiper 457 (FIGS. 4-5), and/or wiper 657 (FIG. 6).

Figure 8:
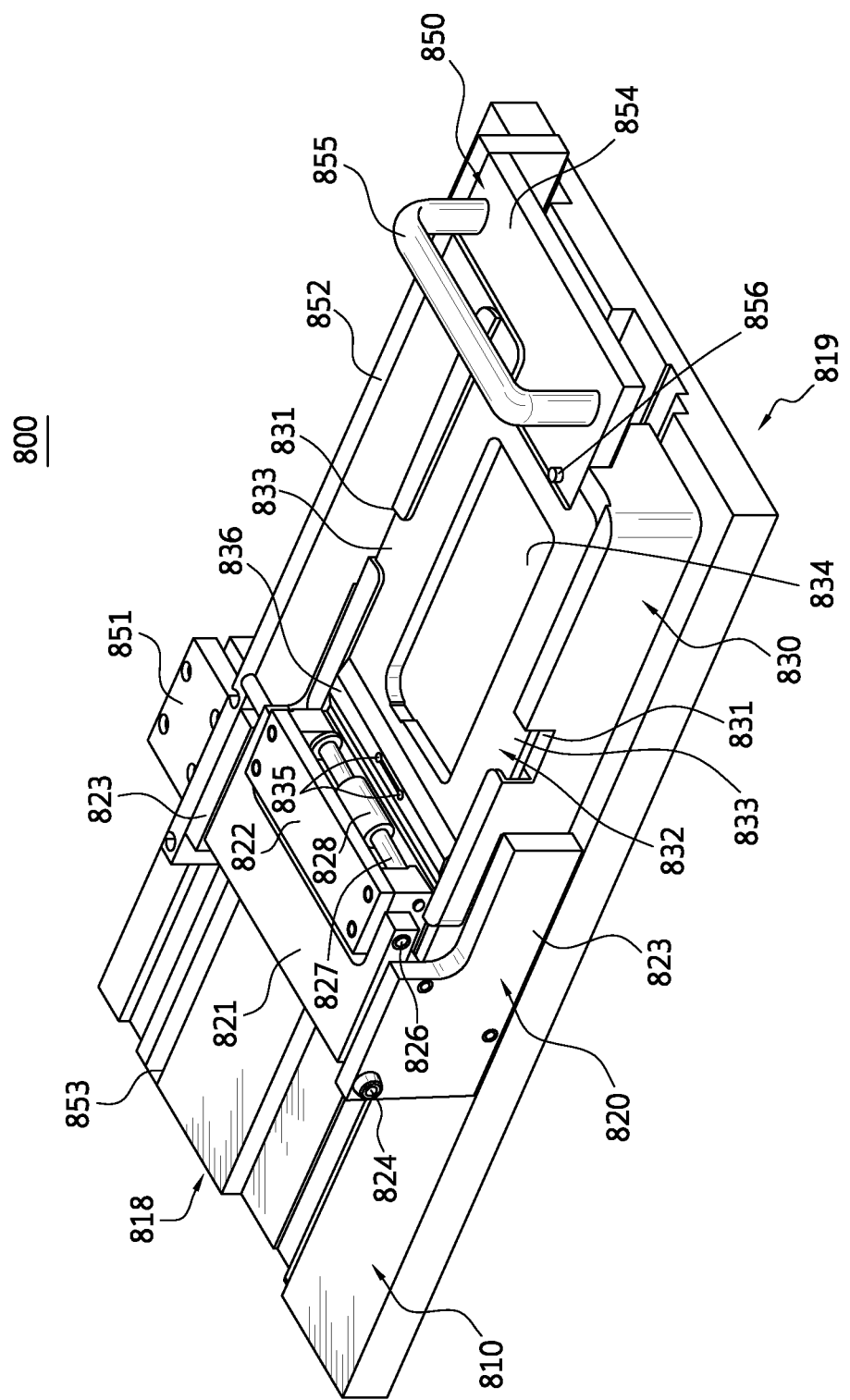
FIG. 8 illustrates an isometric view of a machine for using an overlay applicator to apply an overlay to a device, according to another embodiment.
Figure 9:
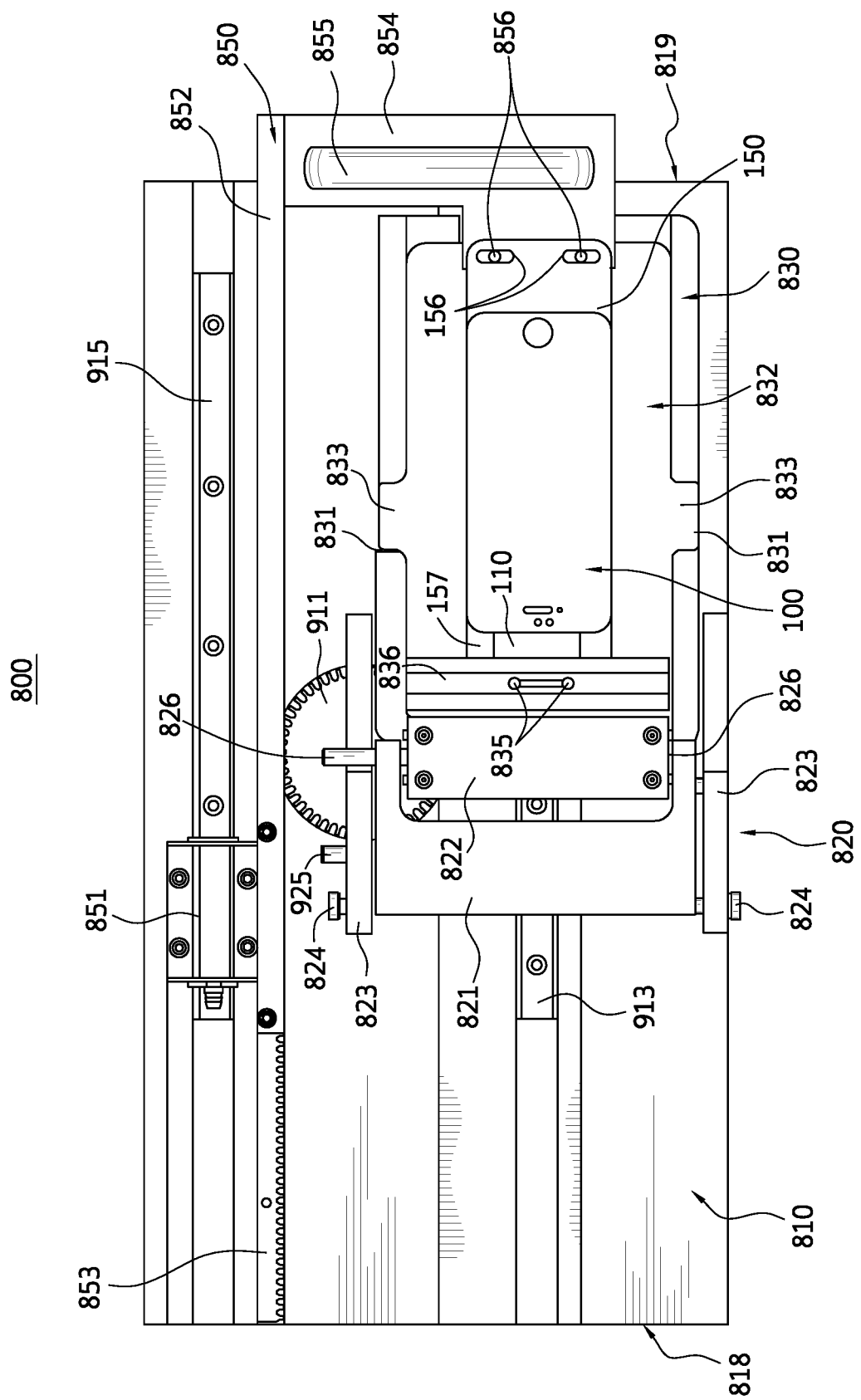
FIG. 9 illustrates a top view of the machine of FIG. 8.
Figure 10:
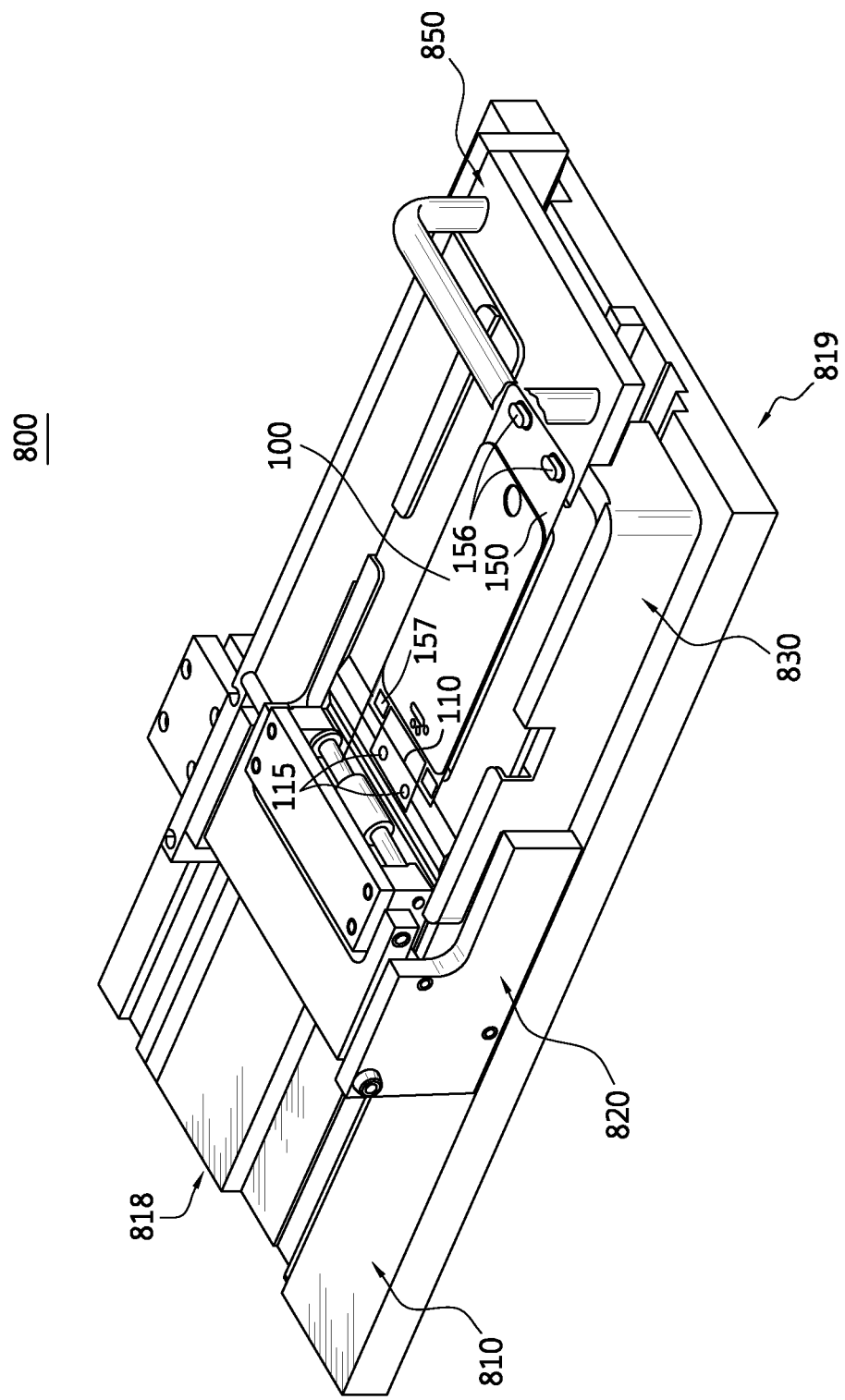
FIG. 10 illustrates an isometric view of the machine of FIG. 8, with a handle assembly not extended, and showing an outline of the overlay applicator of FIG. 1.
Figure 11:
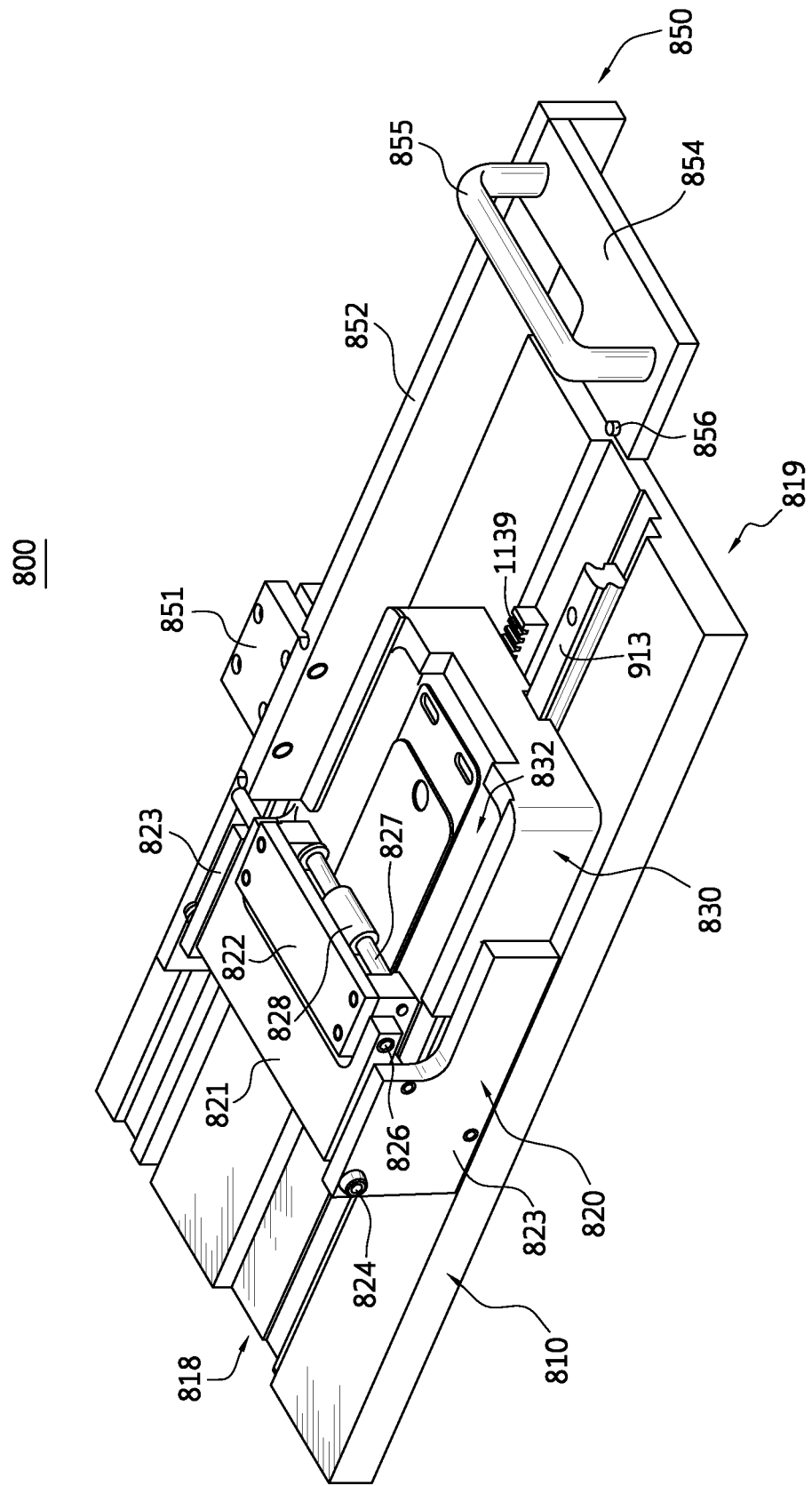
FIG. 11 illustrates an isometric view of the machine of FIG. 8, with the handle assembly partially extended.
Figure 12:
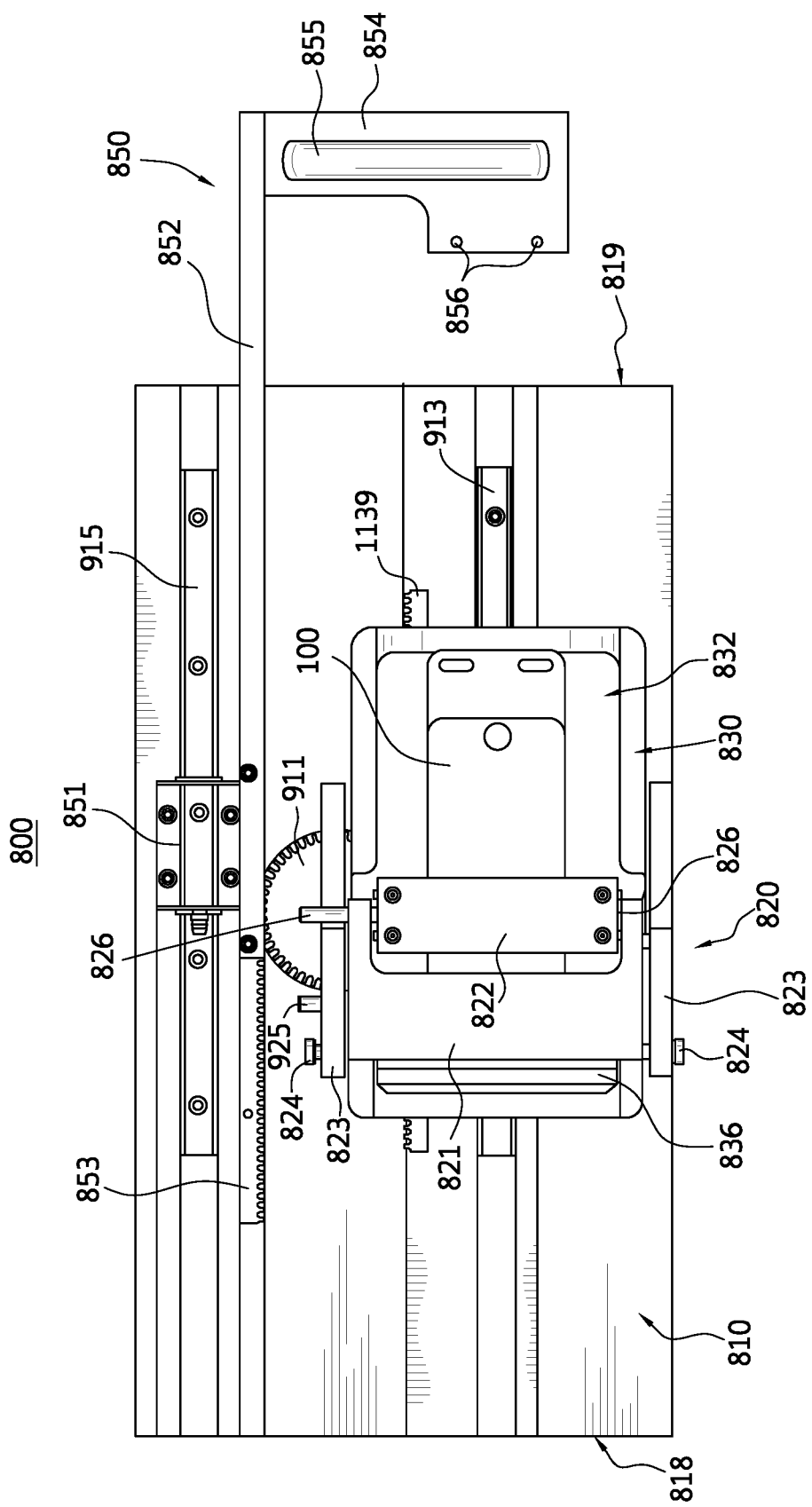
FIG. 12 illustrates a top view of the machine of FIG. 8, with the handle assembly partially extended.
Figure 13:
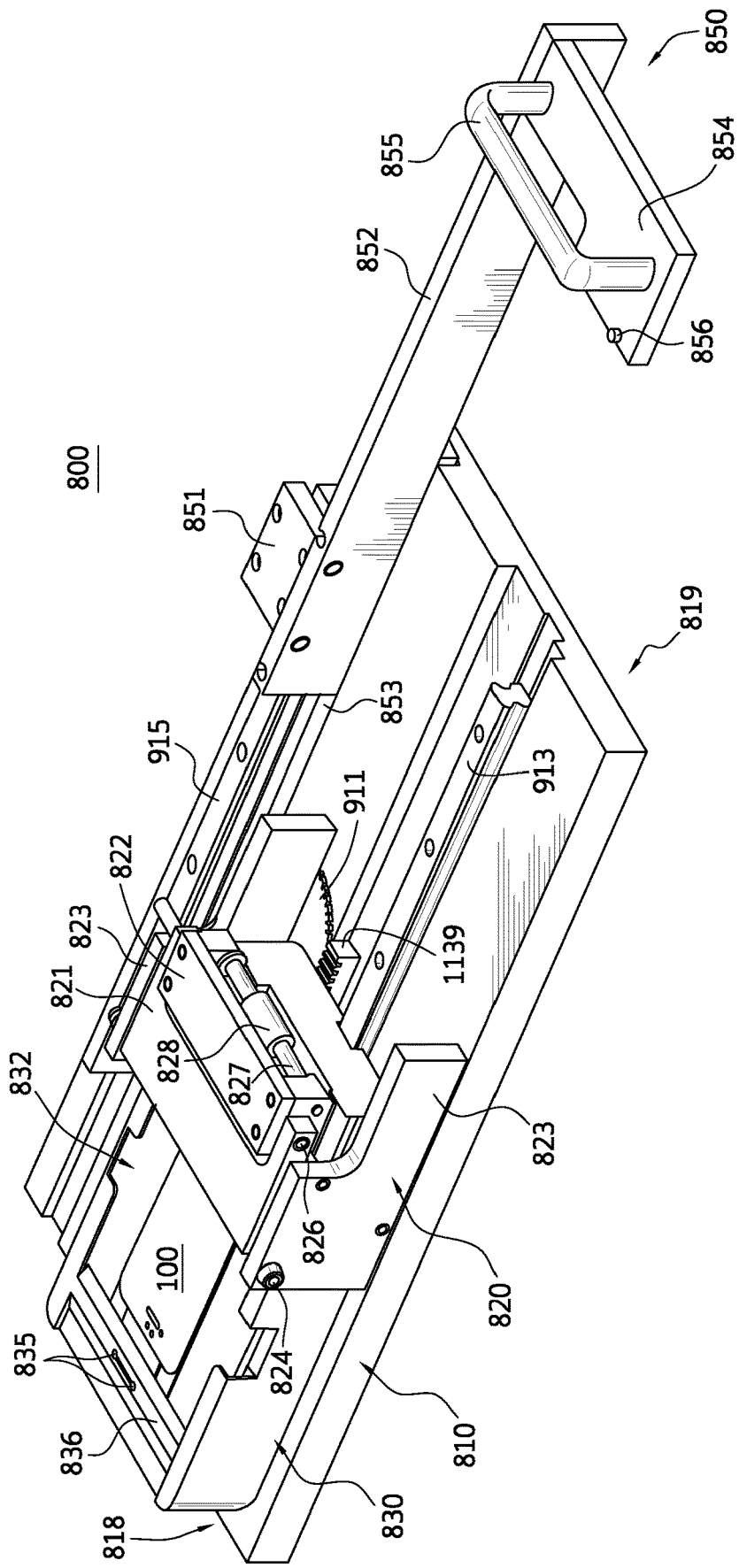
FIG. 13 illustrates an isometric view of the machine of FIG. 8, with the handle assembly fully extended.
Figure 14:
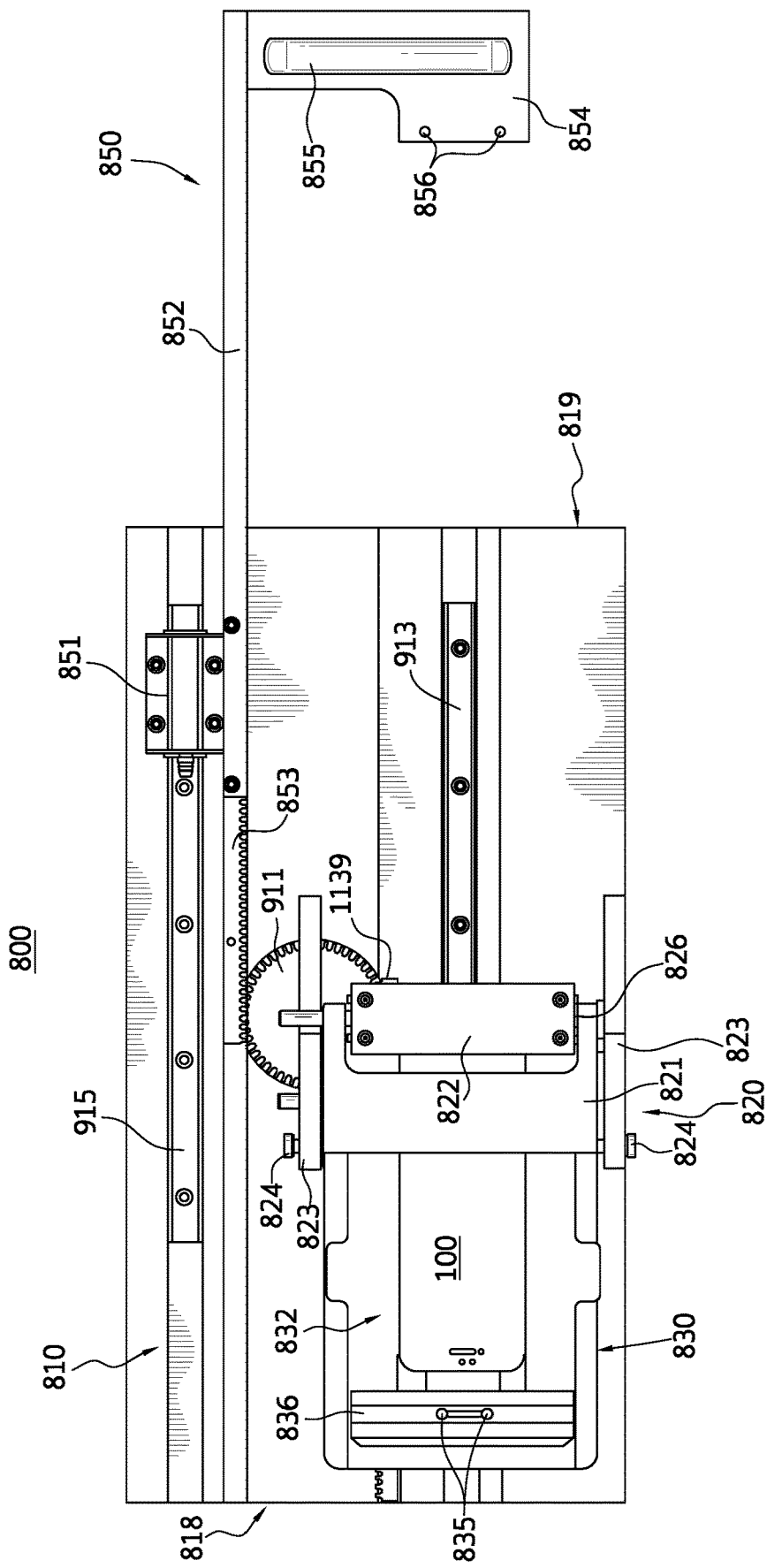
FIG. 14 illustrates a top view of the machine of FIG. 8, with the handle assembly fully extended.

Turning ahead in the drawings, FIG. 8 illustrates an isometric view of a machine 800 for using an overlay applicator to apply an overlay to a device. FIG. 9 illustrates a top view of machine 800. FIG. 10 illustrates an isometric view of machine 800, with a handle assembly not extended, and showing an outline of overlay applicator 100. FIG. 11 illustrates an isometric view of machine 800 with the handle assembly partially extended. FIG. 12 illustrates a top view of machine 800 with the handle assembly partially extended. FIG. 13 illustrates an isometric view of machine 800 with the handle assembly fully extended. FIG. 14 illustrates a top view of machine 800 with the handle assembly fully extended. Machine 800 is merely exemplary and embodiments of the machine are not limited to embodiments presented herein. The machine can be employed in many different embodiments or examples not specifically depicted or described herein. Machine 800 can be used with overlay applicator 100 to apply overlay 130 (not shown) to the device. Machine 800 also can be used with other overlay applicators (e.g., overlay applicator 400 (FIGS. 4-5), or overlay applicator 600 (FIG. 6)). In many embodiments, machine 800 can include a base 810, a carriage 830, and a handle assembly 850. In some embodiments, base 810 can extend from a first side 819 to a second side 818. Base 810 can include a gear 911 (FIGS. 9 and 12-14), a carriage rail 913 (FIGS. 9 and 11-14), and a handle rail 915 (FIGS. 9 and 12-14). Carriage rail 913 and handle rail 915 can extend partially or fully across base 810 in the direction from first side 819 to second side 818.

In certain embodiments, handle assembly 850 can include a handle sliding mechanism 851, which can engage with handle rail 915 to attach handle assembly 850 to base 810 and to allow handle assembly 850 to slide back and forth along base 810 along the direction of handle rail 915. In several embodiments, handle assembly 850 can include a handle extender 852 and a handle base 854. In some embodiments, handle extender 852 can extend parallel to handle rail 915 and handle base 854 can be substantially perpendicular to handle extender 852. Handle extender 852 can include handle gear teeth 853, which can engage with gear 911 of base 810. Handle base 854 can include a handle 855, which a user can use to pull handle assembly 850 and extend handle assembly 850 with respect to base 810. In several embodiments, handle base 854 can include a pulling mechanism 856. In certain embodiments, pulling mechanism 856 can be one or more knobs or pins, which can engage with pulling aid 156 of pull tab 150 on overlay applicator 100, as shown in FIG. 9.

In some embodiments, carriage 830 can include a carriage sliding mechanism (not shown), which can engage with carriage rail 913 to attach carriage 830 to base 810 and to allow carriage 830 to slide back and forth along base 810 along the direction of carriage rail 913. In many embodiments, carriage 830 can include carriage gear teeth 1139 (FIGS. 11-14), which can engage with gear 911 of base 810. In a number of embodiments, carriage 830 can include one or more carriage slots 831 and/or a cradle 832. In some embodiments, cradle 832 can include one or more cradle tabs 833 that can engage in carriage slots 831 to hold cradle 832 in position. In some embodiments, carriage 830 can be used with multiple different sizes of cradles, which can be used for different devices. Carriage slots 831 and cradle tabs 833 can advantageously allow carriage 830 to removably hold cradle 832, which can allow machine 800 to be used to apply overlays to multiple different types of devices. For example, carriage 830 can be configured to hold one or more additional cradles that are different than cradle 832. The one or more additional cradles can be configured to securely hold one or more devices having one or more different dimensions than the device that fits in cradle 832. In some embodiments, cradle 832 can be integral with carriage 830. Cradle 832 can include a recess 834 in which a device can be placed with screen facing upwards or away from cradle 832. Recess 834 can have sides and a bottom, and cradle 832 can have a height greater than the height of the device. In many embodiments, recess 834 is conformal with the device.

In some embodiments, cradle 832 can include an alignment base 835, which can engage with alignment mechanism 115, as shown in FIG. 10. In the same or other embodiments, carriage 830 can include alignment base 835. In some embodiments, alignment base 835 can be one or more protrusions that can fit inside the one or more slots of alignment mechanism 115. Alignment base can be configured to engage with alignment mechanism 115. Alignment base 835 and alignment mechanism 115 can be configured and positioned such that when alignment mechanism 115 is engaged with alignment base 835, overlay 130 (FIG. 1) can be positioned directly above the screen of the device, and aligned such that overlay 130 (FIG. 1) will be adhered in an accurate position on the screen when adhesive release liner 140 (FIG. 1) is removed.

In many embodiments, cradle 832 can include an overlay cover 836. In some embodiments, overlay cover 836 can partially cover overlay applicator 100 and can hold overlay applicator 100 to cradle 832. As shown in FIGS. 8-9, overlay cover 836 can cover alignment mechanism 115 and hold overlay applicator 100 to alignment base 835 when alignment mechanism 115 is engaged with alignment base 835. In various embodiments, overlay cover 836 can be removably attached to carriage 830 and/or cradle 832. In other embodiments, overlay cover 836 can be hingedly attached to carriage 830 and/or cradle 832. In some embodiments, overlay cover 836 can snap onto cradle 832 and/or alignment base 835. In other embodiments, overlay cover 836 can be attached to cradle 832 through a spring hinge, which can allow overlay cover 836 to be removably placed over overlay applicator 100 and to hold overlay applicator 100 close to cradle 832, and/or to retain alignment mechanism 115 on alignment base 835. In some embodiments, overlay cover 836 can have a trapezoidal shape or curved shape, so as to allow one or more rollers (described below) to roll over overlay cover 836.

In many embodiments, the device can be placed in cradle 832, with the screen of the device facing up. Overlay applicator 100 can be placed on cradle 832, as described above, and as shown in FIG. 9, such that alignment mechanism 115 engages with alignment base 835. Overlay cover 836 can be placed over overlay applicator 100.

In many embodiments, when handle assembly 850 is not extended, as shown in FIGS. 8-10, carriage 830 can be located at a first side 819 of base 810. As a user pulls handle assembly 855 and extends handle assembly 855 with respect to base 810, as shown in FIGS. 11-14, handle gear teeth 853 move toward first side 819, which can result in gear 911 rotating clockwise, and can further result in carriage gear teeth 1139 and carriage 830 moving toward second side 818. As handle assembly 850 moves away from carriage 830, pulling mechanism 856 can pull on pull tab 150, which can pull wiper 157 across the screen of the device and remove dust or other particles from the screen of the device, and which can peel away adhesive release liner 140 (FIG. 1) to expose the adhesive agent on bottom side 132 (FIG. 1) to the screen of the device. In many embodiments, handle assembly 850 can be pulled in a direction from second side 818 to first side 819. For example, handle assembly 850 can be pulled from a first handle position, such as shown in FIGS. 8-10, to a second handle position, such as shown in FIGS. 13-14. In several embodiments, when handle assembly 850 is moved from the first handle position, such as shown in FIGS. 8-10, to the second handle position, such as shown in FIGS. 13-14, carriage 830 can move in a second direction from first side 819 to second side 818, which is opposite from the first direction of movement by handle assembly 850. For example, carriage 830 can move from a first carriage position, such as shown in FIGS. 8-10, to a second carriage position, such as shown in FIGS. 13-14. In a number of embodiments, machine 800 can be configured such that when alignment base 835 is engaged with alignment mechanism 115, pulling mechanism 856 is engaged with pull tab 150, cradle 832 is holding the device, and handle assembly 850 is pulled in the first direction from the first handle position to the second handle position, adhesive release liner 140 (FIG. 1) of overlay applicator 100 can be removed from overlay 130 (FIG. 1) starting at a leading edge of overlay 130 (FIG. 1) (e.g., proximate to alignment mechanism 115) and continuing to a trailing edge of overlay 130 (FIG. 1) to expose the adhesive agent of overlay 130 (FIG. 1) to the screen of the device.

In a number of embodiments, base 810 can include a roller assembly 820. In some embodiments, roller assembly 820 can include roller assembly supports 823, a first roller assembly 821, and/or a second roller assembly 822. Roller assembly supports 823 can be attached to base 810 and extend upward or away from base 810 to provide support for first roller assembly 821 and/or second roller assembly 822. Roller assembly supports 823 can be configured such that carriage 830 can slide back and forth between roller assembly supports 823 and under first roller assembly 821 and/or second roller assembly 822. First roller assembly 821 can be attached to roller assembly supports 823 at axle 824. First roller assembly 821 can include a first roller axle 925 (FIGS. 9 and 12), which can have a first roller surface (not shown) with a width at least equal to the width of the device. In some embodiments, axle 824 can be spring-loaded to provide downward pressure for first roller axle 925 as it rolls over overlay applicator 100.

Second roller assembly 822 can be attached to first roller assembly 821 at axle 826. Second roller assembly 822 can include a second roller axle 827, which can have a second roller surface 828. The width of second roller surface 828 can be less than the width of the device. In some embodiments, axle 826 can be spring-loaded to provide downward pressure for second roller axle 827 as it rolls over overlay applicator 100. The width of second roller surface 828 can be less than the width of the first roller surface (not shown). In many embodiments, roller assembly 820 can include one or more rollers, such as first roller axle 925 and/or second roller axle 827. In some embodiments, the width of the second roller surface 828 can be half the width of the device, and second roller surface 828 can be centered over the device as carriage 830 moves through roller assembly 820 from first side 819 to second side 818. As carriage 830 moves from first side 819 to second side 818, and as release liner 140 (FIG. 1) is removed, second roller surface 828 can roll along the middle of the top surface of protective film 120 (FIG. 1) to adhere overlay 130 (FIG. 1) to the screen of the device. Second roller surface 828 can roll along over the top surface of protective film 120 before first roller surface (not shown) rolls over the top surface of protective film 120 (FIG. 1) when carriage 830 moves from a first carriage position, such as shown in FIGS. 8-10, to a second carriage position, such as shown in FIGS. 13-14. In some embodiments, when carriage 830 moves from the first carriage position to the second carriage position, the first roller surface (not shown) and second roller surface 828 can roll over and press downward on overlay applicator 100 to adhere the exposed adhesive agent of overlay 130 (FIG. 1) to the screen of the device. In various embodiments, when carriage 830 moves from the first carriage position to the second carriage position, one or more of the rollers, such as the first roller surface (not shown) and/or second roller surface 828 can roll fully over a length of the screen of the device. By rolling over protective film 120 (FIG. 1) with second roller surface 828 before rolling over protective film 120 (FIG. 1) (having the wider first roller surface (not shown)), roller assembly 820 can advantageously apply overlay 130 (FIG. 1) to the screen of the device with fewer air bubbles, as air bubbles in the middle can be initially pushed outward by second roller surface 828.

In many embodiments, as a user pulls handle 855 and pull tab 150 is pulled, adhesive release liner 140 (FIG. 1) is peeled back from bottom side 132 (FIG. 1) of overlay 130 (FIG. 1) at the same rate as cradle 832 rolls through roller assembly 820, which can advantageously adhere overlay 130 (FIG. 1) to the screen of the device very shortly after it is exposed from the peeling of adhesive release liner 140 (FIG. 1), which can keep dust from adhering to overlay 130 (FIG. 1). In many embodiments, carriage 830 can move away from handle 855 at twice the rate that carriage 830 moves through roller assembly 820, which can advantageously allow pull tab 150 and adhesive release liner 140 (FIG. 1) to be fully peeled from off of overlay 130 (FIG. 1).

After overlay 130 (FIG. 1) is adhered to the screen of the device, the user can smooth overlay 130 (FIG. 1) on the device to remove bubbles, if there are any, between overlay 130 (FIG. 1) and the screen of the device. Protective film 120 (FIG. 1) can be removed from overlay 130 (FIG. 1). In some embodiments, protective film 120 (FIG. 1) can be removed by lifting and/or pulling alignment tab 110. In many embodiments, protective film 120 (FIG. 1) is removed after smoothing out any bubbles, so that protective film 120 (FIG. 1) can prevent damage to overlay 130 (FIG. 1) from forceful pushing or rubbing involved in smoothing the bubbles, as explained above. The device can be removed from cradle 832 with overlay 130 (FIG. 1) installed.

In some embodiments, overlay cover 836 can have a dimension such that it can fully cover protective cover 120 (FIG. 1). Overlay cover 836 can hold overlay applicator 100 close and/or securely to alignment base 835 and/or the device, such that, as handle 855 is extended, as pulling mechanism 856 pulls pulling aid 156, and as wiper 157 is pulled across the device, wiper 157 is held close to the device to remove any dust or other particles from the device. In some embodiments, overlay cover 836 can be a slightly flexible material that is rigid enough to hold overlay applicator 100 close to the device, but is flexible enough to allow second roller surface 828 and/or first roller surface (not shown) to provide local downward pressure through overlay cover 836 to adhere overlay 130 (FIG. 1) to the device and facilitate removing any air bubbles. For example, overlay cover 836 can be a clear plastic material having a thickness of approximately 1 mm to approximately 2 mm. Clear plastic can advantageously allow the user to see through overlay cover 836 to ensure alignment and proper operation of machine 800.

In other embodiments, machine 800 does not include roller assembly 820, overlay cover 836 can have a dimension such that it can fully cover protective cover 120 (FIG. 1). Overlay cover 836 can be rigid, and can be hinged to cradle 832 and/or carriage 830. Overlay cover 836 can include a snap or other attachment mechanism on the side opposite the hinge, which can hold overlay cover 836 at a predetermined distance from the device screen and facilitate wiping of the device screen by wiper 157. In another embodiment, the hinge connecting overlay cover 836 to cradle 832 and/or carriage 830 can be spring-loaded to hold overlay cover 836 close to overlay applicator 100.

Figure 15:
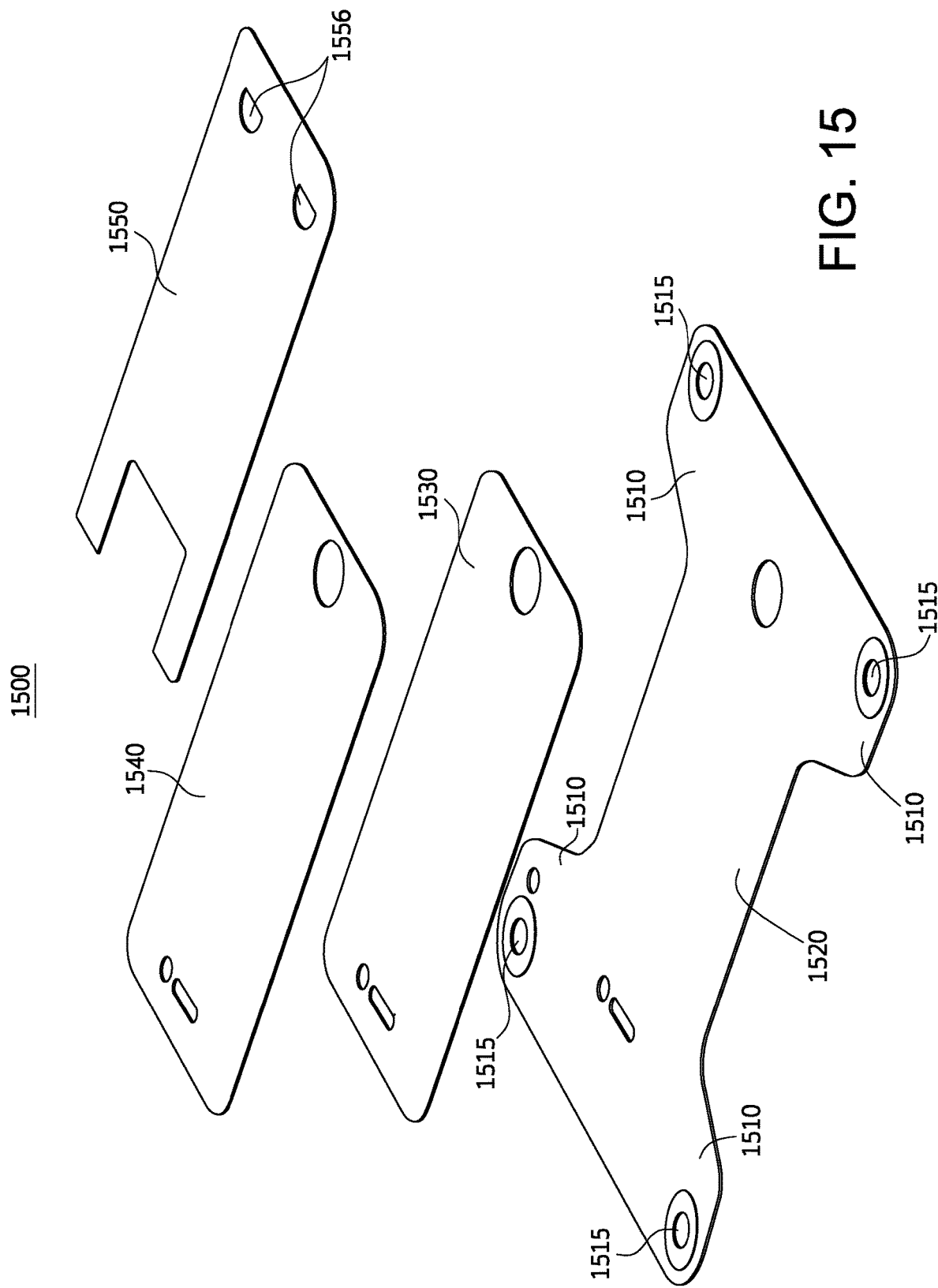
FIG. 15 illustrates an exploded isometric view of an overlay applicator, according to another embodiment.

Turning ahead in the drawings, FIG. 15 illustrates an exploded isometric view of an overlay applicator 1500. Overlay applicator 1500 is merely exemplary and embodiments of the overlay applicator are not limited to embodiments presented herein. The overlay applicator can be employed in many different embodiments or examples not specifically depicted or described herein. Overlay applicator 1500 can be similar to overlay applicator 100 (FIG. 1), overlay applicator 400 (FIGS. 4-5), overlay applicator 600 (FIG. 6), and/or overlay applicator 700 (FIG. 7), and various components and/or constructions of overlay applicator 1500 can be substantially identical or similar to various components of overlay applicator 100 (FIG. 1), overlay applicator 400 (FIGS. 4-5), overlay applicator 600 (FIG. 6), and/or overlay applicator 700 (FIG. 7). Overlay applicator 1500 can include a protective film 1520, an overlay 1530, an adhesive release liner 1540, and/or a pull tab 1550. Protective film 1520 can be similar to protective film 120 (FIG. 1), protective film 420 (FIGS. 4-5), protective film 620 (FIG. 6), and/or protective film 720 (FIG. 7); overlay 1530 can be similar to overlay 130 (FIG. 1), overlay 430 (FIGS. 4-5), overlay 630 (FIG. 6), and/or overlay 730 (FIG. 7); adhesive release liner 1540 can be similar to adhesive release liner 140 (FIG. 1), adhesive release liner 440 (FIGS. 4-5), adhesive release liner 640 (FIG. 6), and/or adhesive release liner 740 (FIG. 7); and/or pull tab 1550 can be similar to pull tab 150 (FIG. 1), pull tab 450 (FIGS. 4-5), pull tab 650 (FIG. 6), and/or pull tab 750 (FIG. 7). In some embodiments, protective film 1520, overlay 1530, and adhesive release liner 1540 can be attached to each other, and pull tab 1550 can be adhered to adhesive release liner 1540, similarly as shown above in FIG. 1, described above.

In many embodiments, protective film 1520 can include an alignment flaps 1510 extending at each corner of overlay 1530. Alignment flaps 1510 can be similar to alignment tab 110 (FIGS. 1-3), alignment tab 410 (FIGS. 4-5), alignment tab 610 (FIG. 6), and/or alignment frame 710 (FIG. 7). In a number of embodiments, alignment flaps 1510 can be integral with protective film 1520. Alignment flaps 1510 can include an alignment mechanism 1515. In some embodiments, alignment mechanism 1515 can include multiple holes surrounding overlay 1530. For example, as shown in FIG. 15, alignment mechanism 1515 can include a hole at each of alignment flaps 1510, at each corner surrounding overlay 1530. Alignment flaps 1510 can provide alignment at multiple points around overlay 1530, which can advantageously provide accurate alignment and help reduce distortion. In some embodiments, pull tab 1550 can include pulling aid 1556, which can be similar to pulling aid 156 (FIG. 1) and/or pulling aid 456 (FIGS. 4-5).

Figure 16:
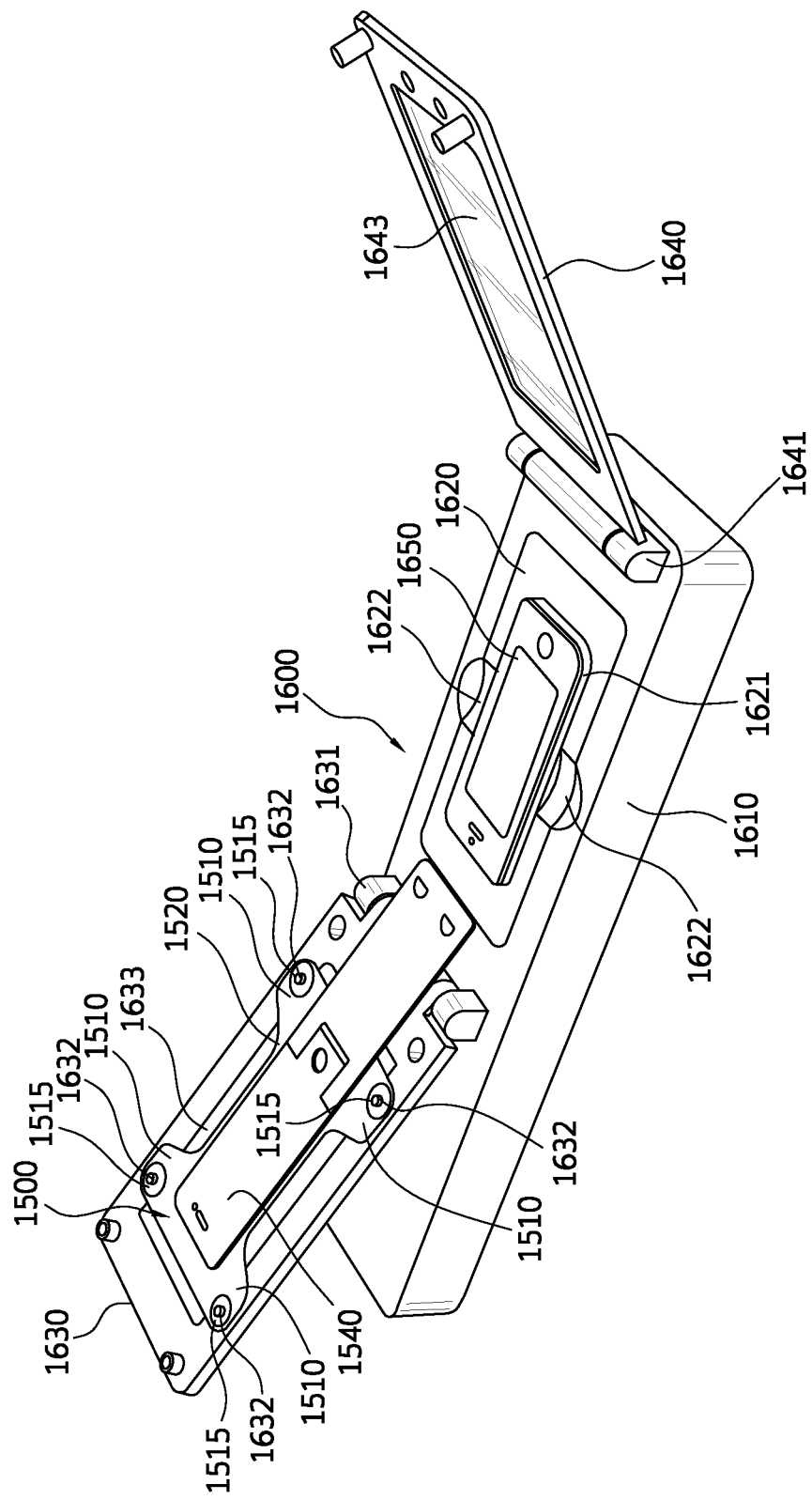
FIG. 16 illustrates an isometric view of an machine in a first configuration, according to another embodiment.
Figure 19:
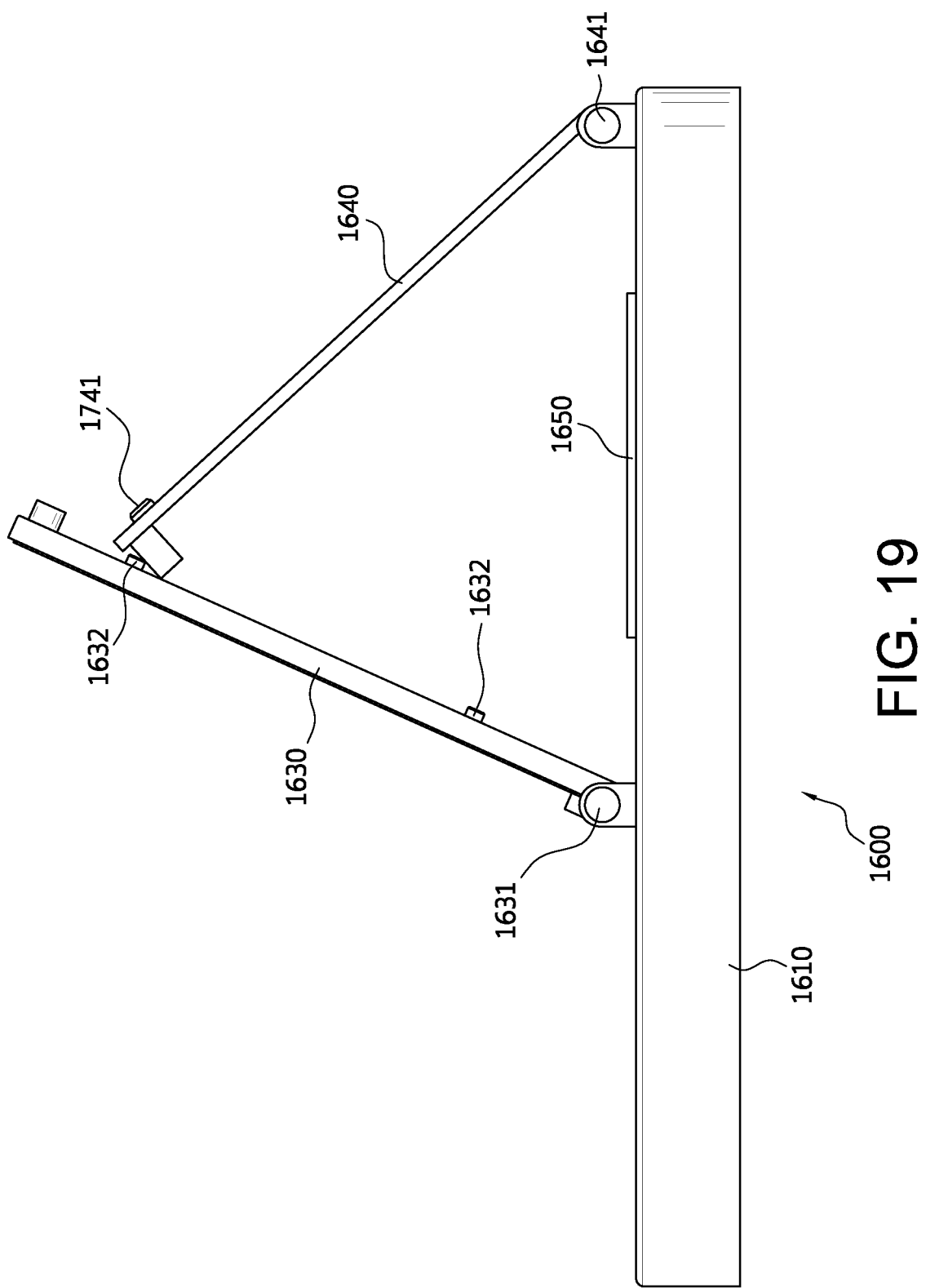
FIG. 19 illustrates a side view of the machine of FIG. 16 in a third configuration.

Turning ahead in the drawings, FIG. 16 illustrates an isometric view of an machine 1600 in a first configuration. FIG. 17 illustrates a top view of machine 1600 in a second configuration. FIG. 18 illustrates a side view of machine 1600 in a second configuration. FIG. 19 illustrates a side view of machine 1600 in a third configuration. Machine 1600 is merely exemplary and embodiments of the machine are not limited to embodiments presented herein. The machine can be employed in many different embodiments or examples not specifically depicted or described herein. In some embodiment, machine 1600 can include a base 1610, a cradle 1620, a first frame 1630, and/or a second frame 1640. In some embodiments first frame 1630 can be an alignment piece hingedly attached to base 1610. In a number of embodiments, second frame 1640 can be a pulling piece hingedly attached to base 1610. Cradle 1620 can include a slot 1621 in which a device 1650 (e.g., a smart phone) can be placed with the screen facing upwards or away from cradle 1620. Cradle 1620 can also include recesses 1622 surrounding slot 1621 to allow a user to remove the device from cradle 1620. In some embodiments, slot 1621 is conformal with device 1650. In some embodiments, cradle 1620 can be integral with base 1610. In other embodiments, cradle 1620 can be removable from base 1610. For example, base 1610 can be configured to hold one or more additional cradles that are different than cradle 1620. The one or more additional cradles can be configured to securely hold one or more devices having one or more different dimensions than the device that fits in cradle 1620.

In several embodiments, first frame 1630 can be attached to base 1610 at first hinge 1631, and can rotate around first hinge 1631. For example, first frame 1630 can be rotated relative to base 1610 in a first direction from a first position, such as shown in FIGS. 16-18, to a second position proximate to cradle 1620, such as shown in FIG. 19. In many embodiments, second frame 1640 can be attached to base 1610 at second hinge 1641, and can rotate around second hinge 1641. For example, second frame 1640 can be rotated relative to base 1610 in the first direction from a first position proximate to cradle 1620, such as shown in FIGS. 17-18, to a second position, such as shown in FIG. 16. First frame 1630 can include an alignment base 1632, which can engage with alignment mechanism 1515 to secure overlay applicator 1500 to first frame 1630. In certain embodiments, when machine 1600 is in a first configuration with cradle 1620 uncovered, as shown in FIG. 16, device 1650 can be placed in slot 1621, and overlay applicator 1500 can be attached to first frame 1630, with overlay applicator 1500 oriented with protective film 1520 facing first frame 1630 and adhesive release liner 1540 facing upward or away from first frame 1630. In some embodiments, first frame 1630 can include an aperture or window 1633, and/or second frame 1640 can include an aperture or window 1643. Aperture or window 1633 and/or aperture or window 1643 can allow a user to reach through and/or see through first frame 1630 and second frame 1640.

When machine 1600 is in a second position with second frame 1640 covering cradle 1620, as shown in FIGS. 17-18, pull tab 1550 can be attached to second frame 1640 at the same time as overlay applicator 1500 is attached to first frame 1630. Second frame 1640 can include a pulling mechanism 1741, which can engage with pulling aid 1556 of pull tab 1550. Pulling mechanism 1741 can be a protrusion or other suitable attachment mechanism. In a number of embodiments, machine 1600 can be configured such that when alignment base 1632 is engaged with alignment mechanism (such as alignment flaps 1510), pulling mechanism 1741 is engaged with pull tab 1550, cradle 1620 is holding the device, and second frame 1640 is rotated relative to base 1610 in the first direction from the first position proximate, such as shown in FIGS. 17-18, to the second position, such as shown in FIG. 16, first frame 1630 can be rotated relative to base 1610 in the first direction from the first position, such as shown in FIGS. 16-18, to the second position, such as shown in FIG. 19, and adhesive release liner 1540 can be removed from overlay 1530 (FIG. 15) to expose the adhesive agent of overlay 1530 (FIG. 15) to the screen of the device.

To illustrate, for example, after pull tab 1550 is attached to second frame 1640, a user can lift second frame 1640, which can pull on pull tab 1550 and begin to peel adhesive release liner 1540 from overlay 1530 (FIG. 15). Raising second frame 1640 from base 1610 and pulling on pull tab 1550, can result in first frame 1630 being raised from base 1610, around first hinge 1631, as shown in FIG. 19. Continuing to rotate second frame 1640 around second hinge 1641 can result in adhesive release liner 1540 being peeling away from overlay 1530 (FIG. 15), exposing the adhesive agent on the bottom of overlay 1530 (FIG. 15). In many embodiments, second frame 1640 can be raised and rotated sufficiently around second hinge 1641 while pulling on pull tab 1550 and removing adhesive release liner 1540 to allow first frame 1630 to be further rotated around first hinge 1631 and lowered toward device 1650. When second frame 1640 has rotated fully around second hinge 1641, adhesive release liner 1540 can be completely removed from overlay 1530 (FIG. 15), and first frame can be lowered completely onto device 1650. After overlay 1530 (FIG. 15) is adhered to the screen of device 1650, the user can reach through aperture 1633 to smooth overlay 1530 (FIG. 15) on device 1650 to remove any bubbles between overlay 1530 (FIG. 15) and the screen of device 1650. First frame 1630 can be lifted and removed from protective film 1520. Protective film 1520 can be removed from overlay 1530 (FIG. 15). In some embodiments, protective film 1520 can be removed by lifting and/or pulling alignment flaps 1510. In many embodiments, protective film 1520 is removed after smoothing out any bubbles, so that protective film 1520 can prevent damage to overlay 1530 (FIG. 15) from forceful pushing or rubbing involved in smoothing the bubbles, as explained above. Device 1650 can be removed from cradle 1620 with overlay 1530 (FIG. 15) installed. In many embodiments, machine 1600 can be lightweight and easily portable, for example, such that it can be carried around by a sales associate.

Figure 20:
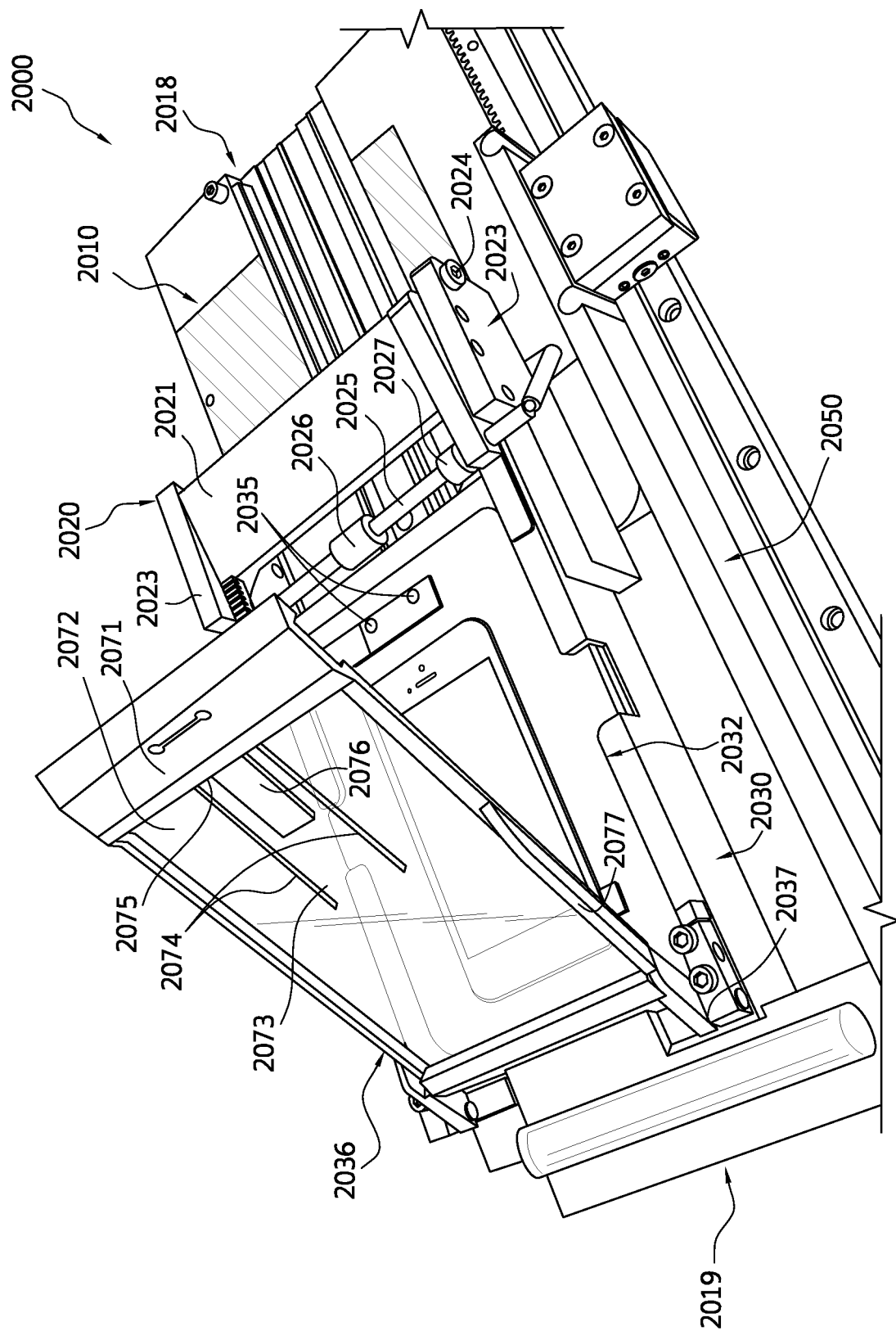
FIG. 20 illustrates an isometric view of a machine for using an overlay applicator to apply an overlay to a device, showing an overlay cover extended, according to another embodiment.
Figure 21:
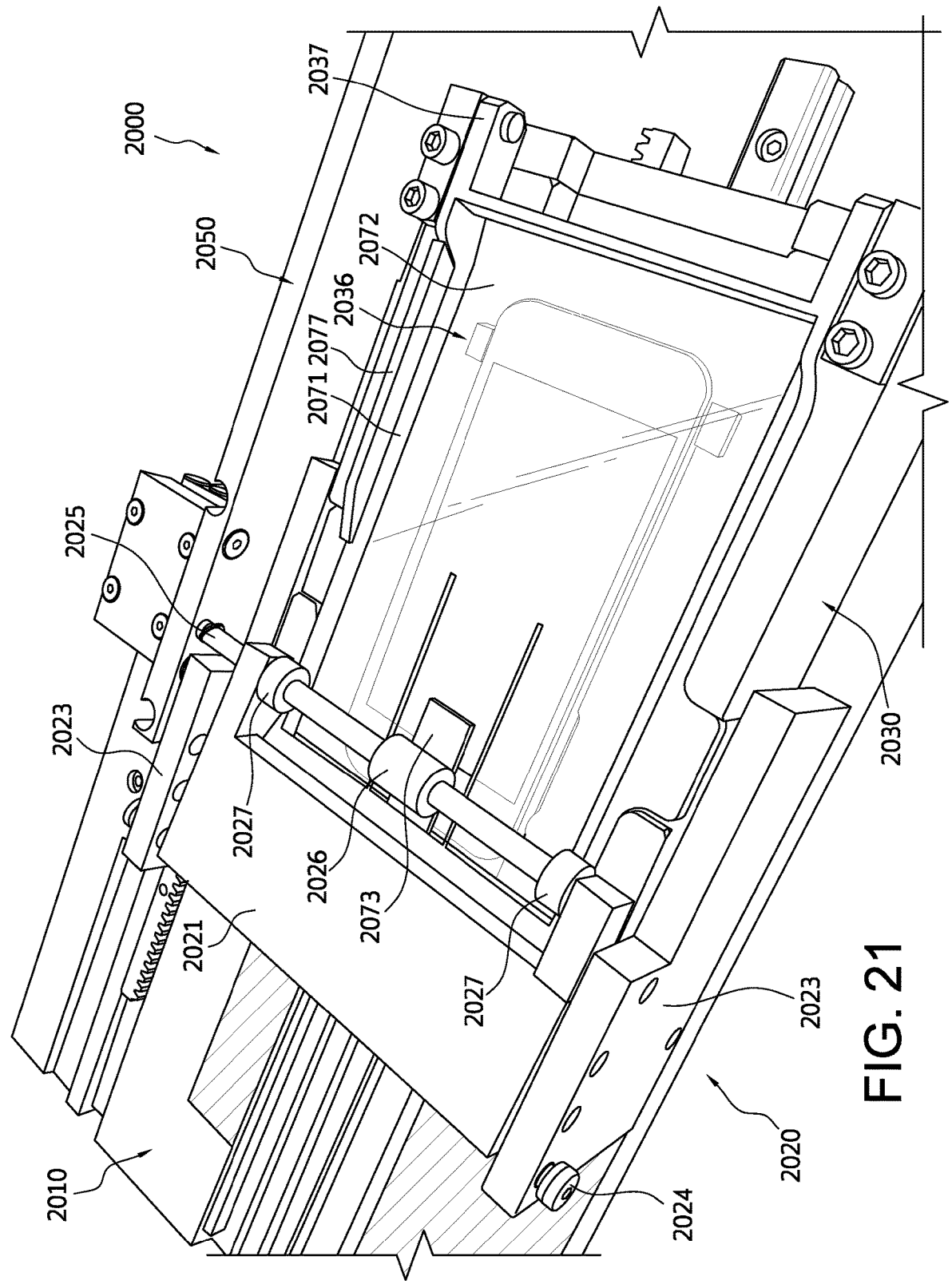
FIG. 21 illustrates an isometric view of the machine of FIG. 20 with the overlay cover engaged and the roller pressing against a tongue of the overlay cover.
Figure 22:
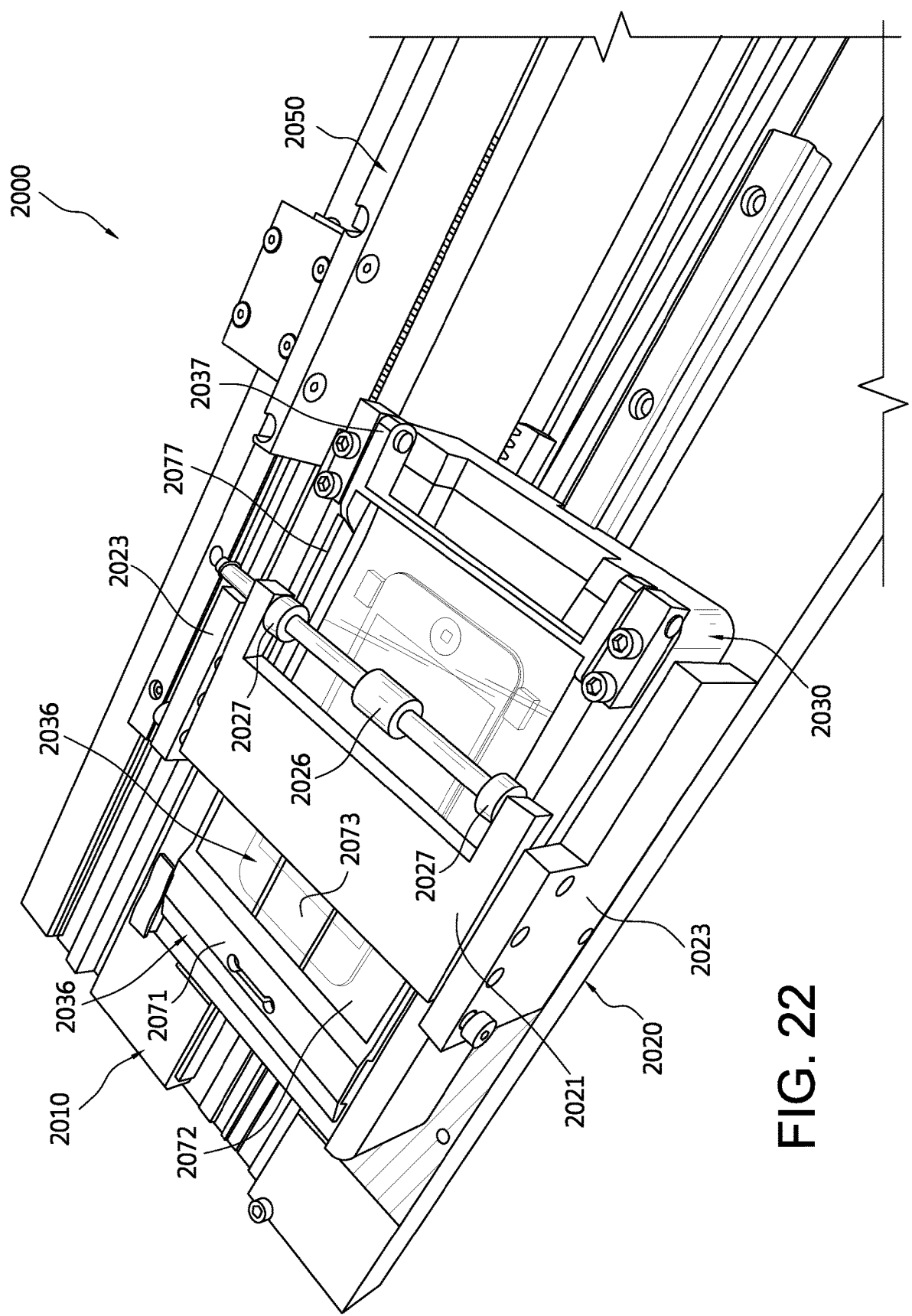
FIG. 22 illustrates an isometric view of the machine of FIG. 20 with the overlay cover engaged and the roller disengaged from the overlay cover.

Turning ahead in the drawings, FIG. 20 illustrates an isometric view of a machine 2000 for using an overlay applicator to apply an overlay to a device, showing the overlay cover extended. FIG. 21 illustrates an isometric view of machine 2000 with the overlay cover engaged and the roller pressing against the tongue of the overlay cover. FIG. 22 illustrates an isometric view of machine 2000 with the overlay cover engaged and the roller disengaged from the overlay cover. Machine 2000 is merely exemplary and embodiments of the machine are not limited to embodiments presented herein. The machine can be employed in many different embodiments or examples not specifically depicted or described herein. Machine 2000 can be used with an overlay applicator, such as overlay applicator 100 (FIG. 1), to apply an overlay, such as overlay 130 (FIG. 1), to the device. Machine 2000 also can be used with other overlay applicators (e.g., overlay applicator 400 (FIGS. 4-5), and/or overlay applicator 600 (FIG. 6). Machine 2000 can be similar to machine 800 (FIGS. 8-14) and various components or constructions of machine 2000 can be substantially identical or similar to various components of machine 800 (FIGS. 8-14), but can include variations in the roller assembly and the overlay cover. The operation of machine 2000 can be similar to the operation of machine 800 (FIGS. 8-14).

In many embodiments, machine 2000 can include a base 2010, a carriage 2030, and a handle assembly 2050, and can operate in a substantially similar manner to the operation of base 810, carriage 830 and handle assembly 850, respectively, of machine 800 (FIGS. 8-14). Base 2010 can extend from a first side 2019 to a second side 2018. Carriage 2030 can be configured to hold a cradle 2032, which can be substantially similar to cradle 832 (FIGS. 8-14). Carriage 2030 can be used with various different cradles, which can be configured for different devices. Cradle 2032 can include an alignment base 2035, which can engage with alignment mechanism 115 (FIG. 1).

Carriage 2030 can include an overlay cover 2036, which can cover overlay applicator 100 (FIG. 1) and can hold overlay applicator 100 (FIG. 1) to cradle 2032. In many embodiments, the device can be placed in cradle 2032, with the screen of the device facing up, as shown in FIGS. 20-22. Overlay applicator 100 (FIG. 1) can be placed on cradle 2032, such that alignment mechanism 115 (FIG. 1) engages with alignment base 2035. Overlay cover 2036 can be placed over overlay applicator 100. Overlay cover 2036 can be attached to carriage 2030 at an end of carriage 2030 closer to first end 2019, and/or can be attached with a hinge 2037. In other embodiments, overlay cover 2036 can be attached instead to cradle 2032. In many embodiments, hinge 2037 can be a spring-loaded hinge, which can bias overlay cover to cover overlay applicator 100 (FIG. 1). In other embodiments, overlay cover 2036 can include a snap or other attachment mechanism on the side opposite hinge 2037. Overlay cover 2036 can hold overlay applicator 100 (FIG. 1) within a predetermined distance from the device screen and can provide sufficient pressure to wiper 157 (FIG. 1) as it is pulled in order to clean the screen of the device.

Overlay cover 2036 can include a frame 2071 extending around a cover sheet 2072. Frame 2071 and/or cover sheet 2072 can be substantially rectangular. In many embodiments, cover sheet 2072 can be a piece of flexible or semi-flexible plastic. Cover sheet 2072 can be configured to press wiper 157 (FIG. 1) downward toward the screen of the device as wiper 157 (FIG. 1) moves across the screen of the device. In a number of embodiments, cover sheet 2072 can to secure overlay 130 (FIG. 1) proximate to the screen of the device. Cover sheet 2072 can be approximately 1.5 mm. In a number of embodiments, cover sheet 2072 can include a tongue 2073, which can be formed by two slits 2074 through the thickness of cover sheet 2072. In some embodiments, cover sheet 2072 can be attached to frame 2071 around the entire perimeter of frame 2071 except at a tongue interface 2075 in which tongue 2073 contacts frame 2071. Tongue 2073 can be centered between the sides of cover sheet 2072 and/or can extend through cover sheet 2072 from the side of opposite hinge 2037 partially toward of hinge 2037. Tongue 2073 can be configured to cover overlay applicator 100 (FIG. 1) proximate to the leading edge of overlay 130 (FIG. 3), near alignment mechanism 115 (FIG. 1). Tongue 2073 can include a central pad 2076. Central pad 2076 can be made of foam or an elastomeric material.

Base 2010 can include a roller assembly 2020. Roller assembly 2020 can be similar to roller assembly 820 (FIGS. 8-14). Roller assembly 2020 can include roller assembly supports 2023 and/or a roller cross support 2021. Roller assembly supports 2023 can be attached to base 2010 and extend upward or away from base 2010 to provide support for roller cross support 2021. Roller assembly supports 2023 can be configured such that carriage 2030 can slide back and forth between roller assembly supports 2023 and under roller cross support 2021. Roller cross support 2021 can be attached to roller assembly supports 2023 at axle 2024. Roller cross support 2021 can include a roller 2025, which can have a central roller surface 2026 with a width less than or equal to the width of tongue 2073 and can roll across the center between the two sides of overlay cover 2036. Roller 2025 can include one or more side rollers surfaces 2027, which can roll along the sides of frame 2071. In some embodiments, axle 2024 can be spring-loaded to provide downward pressure for roller 2025 as central roller surface 2026 rolls over overlay cover 2036.

In some embodiments, as handle assembly 2050 is extended and carriage 2030 moves from first side 2019 to second side 2018, central roller surface 2026 can roll along the central top side of overlay cover 2036. In many embodiments, as handle assembly 2050 is extended and pull tab 150 is pulled, wiper 157 (FIG. 1) is pulled away from the leading edge of overlay cover 2036 opposite hinge 2037, such that wiper 157 (FIG. 1) can be beyond the region near tongue interface 2075 when central roller surface 2026 first contacts tongue 2073 at tongue interface 2075. In many embodiments, as central roller surface 2026 rolls over tongue 2073, as shown in FIG. 21, it can provide sufficient pressure to depress tongue 2073 to adhere the exposed adhesive of overlay 130 (FIG. 1) to the surface of the device and push out air bubbles. Central pad 2076 can distribute the pressure to and provide a controlled pressure at the leading edge of overlay 130 (FIG. 1) near tongue interface 2075. By providing a solid adherence between overlay 130 (FIG. 1) and the screen of the device in the middle, the adhesive of overlay 130 (FIG. 1) can wet out to adhere toward the edges of overlay 130 (FIG. 1).

In many embodiments, one or both sides of frame 2071 can include a cam 2077. In some embodiments, cam 2077 can be configured to raise roller 2025, such as by side rollers 2027 rolling over the ramp and raised portions of cam 2077, so as to prevent central roller surface 2026 from pressing down on overlay cover 2036. In many embodiments, after central roller surface 2026 rolls over the length of tongue 2073, cam 2077 can raise roller 2025, which can disengage roller surface 2026 from overlay cover 2036 and allow machine 2000 to more easily pull away adhesive release liner 140 (FIG. 1) under the portion of overlay cover 2036 near hinge 2037, as shown in FIG. 22. Cam 2077 can be located proximate to the trailing edge of overlay 130 opposite from alignment mechanism 115 (FIG. 1).

Figure 23:
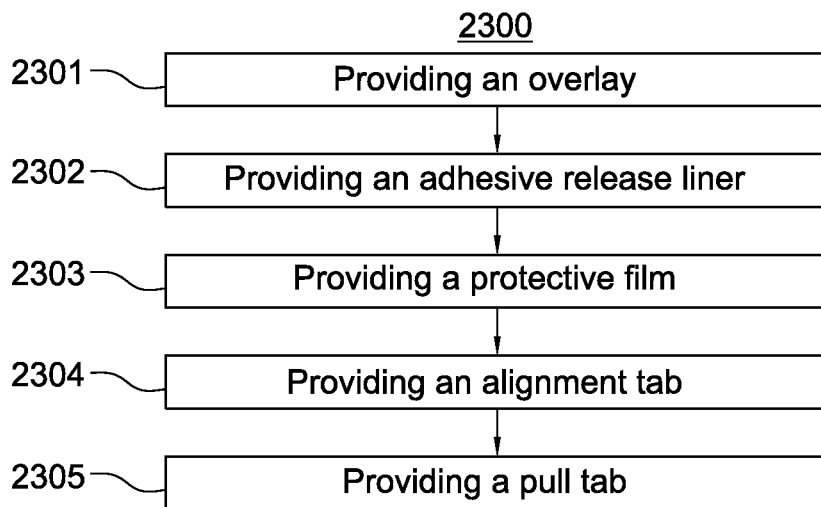
FIG. 23 illustrates a flow chart for a method of providing an overlay applicator, according to another embodiment.

Turning ahead in the drawings, FIG. 23 illustrates a flow chart for an embodiment of a method 2300 of providing an overlay applicator. Method 2300 is merely exemplary and is not limited to the embodiments presented herein. Method 2300 can be employed in many different embodiments or examples not specifically depicted or described herein. In some embodiments, the procedures, the processes, and/or the activities of method 2300 can be performed in the order presented. In other embodiments, the procedures, the processes, and/or the activities of the method 2300 can be performed in any other suitable order. In still other embodiments, one or more of the procedures, the processes, and/or the activities in method 2300 can be combined or skipped. In some embodiments, the overlay applicator can be similar or identical to overlay applicator 100 (FIG. 1), overlay applicator 400 (FIGS. 4-5), overlay applicator 600 (FIG. 6), overlay applicator 700 (FIG. 7), and/or overlay applicator 1500 (FIG. 15).

Referring to FIG. 23, method 2300 can include a block 2301 of providing an overlay. In many embodiments, the overlay can be similar or identical to overlay 130 (FIG. 1), overlay 430 (FIGS. 4-5), overlay 630 (FIG. 6), overlay 730 (FIG. 7), and/or overlay 1530 (FIG. 15). In a number of embodiments, the overlay can have a top side and a bottom side. The top side of the overlay can be similar or identical to top side 131 (FIG. 1) of overlay 130 (FIG. 1). The bottom side of the overlay can be similar or identical to bottom side 132 (FIG. 1) of overlay 130 (FIG. 1). In various embodiments, the bottom side can include an adhesive agent configured to adhere to a screen of an electronic device.

In some embodiments, method 2300 can include a block 2302 of providing an adhesive release liner. The adhesive release liner can be similar or identical to adhesive release liner 140 (FIG. 1), adhesive release liner 440 (FIGS. 4-5), adhesive release liner 640 (FIG. 6), adhesive release liner 740 (FIG. 7); and/or adhesive release liner 1540 (FIG. 15). In a number of embodiments, the adhesive release liner can have a top side and a bottom side. The top side of the adhesive release liner can be removably attached to the bottom side of the overlay. In some embodiments, the adhesive release liner can be configured to protect the adhesive agent at the bottom side of the overlay from contaminants.

In a number of embodiments, method 2300 can include a block 2303 of providing a protective film. In some embodiments, the protective film can be similar or identical to protective film 120 (FIG. 1), protective film 420 (FIGS. 4-5), protective film 620 (FIG. 6), protective film 720 (FIG. 7), and/or protective film 1520 (FIG. 15). In many embodiments, the protective film can be removably attached to the top side of the overlay.

In many embodiments, method 2300 can include a block 2304 of providing an alignment tab. In some embodiments, the alignment tab can be similar or identical to alignment tab 110 (FIG. 1), alignment tab 410 (FIGS. 4-5), alignment tab 610 (FIG. 6), alignment frame 710 (FIG. 7), and/or alignment flaps 1510 (FIG. 15). In many embodiments, the alignment tab can include an alignment mechanism. The alignment mechanism can be similar or identical to alignment mechanism 115 (FIG. 1), alignment mechanism 415 (FIG. 4), alignment mechanism 615 (FIG. 6), alignment mechanism 715 (FIG. 7), and/or alignment mechanism 1515 (FIG. 15). In various embodiments, the alignment mechanism of the alignment tab can be configured to engage with an alignment base, such as alignment base 212 (FIG. 2), alignment base 312 (FIG. 3), alignment base 835 (FIGS. 8-9, 13-14), alignment base 1632 (FIGS. 16-19), and/or alignment base 2035 (FIG. 20), to align the overlay with the screen of the electronic device.

In a number of embodiments, the alignment tab can include a top layer that is integral with the protective film, a middle layer attached to the top layer; and a bottom layer attached to the middle layer. In some embodiments, method 2300 of providing the overlay applicator can include providing a cut between the middle layer of the alignment tab and the overlay, and between the bottom layer of the alignment tab and the adhesive release liner.

In various embodiments, the alignment tab can include a top layer and a bottom layer attached to the top layer. In some embodiments, method 2300 of providing the overlay applicator can include providing a cut between the top layer of the alignment tab and the protective film, and between the bottom layer of the alignment tab and the overlay. In certain embodiments, method 2300 of providing the overlay applicator can include providing a sticker attached to and spanning the cut between the protective film and the top layer of the alignment tab.

In some embodiments, the alignment tab can include an alignment frame extending around each side of the overlay. In several embodiments, the alignment frame can be integral with the protective film. In a number of embodiments, the alignment frame can include the alignment mechanism. In various embodiments, the alignment mechanism can include at least six holes.

In a number of embodiments, the alignment tab can include alignment flaps extending at each corner of the overlay. In certain embodiments, the alignment flaps can be integral with the protective film. In various embodiments, the alignment flaps can include alignment mechanism.

In several embodiments, method 2300 can include a block 2305 of providing a pull tab. In some embodiments, the pull tab can be similar or identical to pull tab 150 (FIG. 1), pull tab 450 (FIGS. 4-5), pull tab 650 (FIG. 6), pull tab 750 (FIG. 7), and/or pull tab 1550 (FIG. 15). In many embodiments, the pull tab can include a wiper. The wiper can be similar or identical to wiper 157 (FIG. 1), wiper 457 (FIG. 4), wiper 657 (FIG. 6), and/or wiper 757 (FIG. 7). In certain embodiments, the pull tab can be integral with the adhesive release liner. In many embodiments, the pull tab, including the wiper, and the adhesive release liner can be configured such that the pull tab can be folded across the bottom side of the adhesive release liner and be pulled to remove the adhesive release liner from the bottom side of the overlay to expose the adhesive agent. In several embodiments, the pull tab, including the wiper, and the adhesive release liner can be configured such that when the pull tab is pulled, the wiper can be configured to wipe across and clean the screen of the electronic device. In several embodiments the pull tab, including the wiper, and the adhesive release liner can be configured such that when the pull tab is pulled, the wiper can be configured to wipe across a length of the screen of the electronic device that is greater than a width of the screen of the electronic device.

Figure 24:
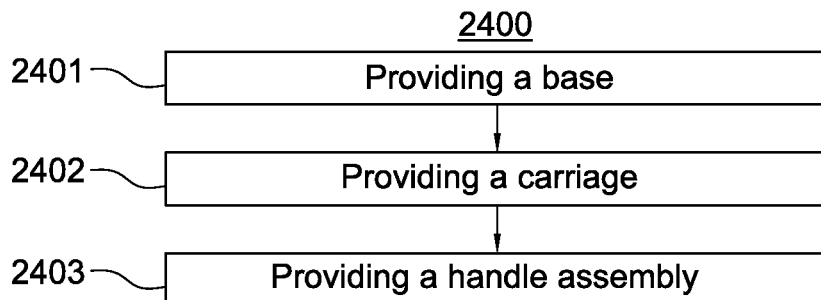
FIG. 24 illustrates a flow chart for a method of providing a machine, according to another embodiment.

Proceeding to the next drawing, FIG. 24 illustrates a flow chart for an embodiment of a method 2400 of providing a machine. Method 2400 is merely exemplary and is not limited to the embodiments presented herein. Method 2400 can be employed in many different embodiments or examples not specifically depicted or described herein. In some embodiments, the procedures, the processes, and/or the activities of method 2400 can be performed in the order presented. In other embodiments, the procedures, the processes, and/or the activities of the method 2400 can be performed in any other suitable order. In still other embodiments, one or more of the procedures, the processes, and/or the activities in method 2400 can be combined or skipped. In some embodiments, the machine can be similar or identical to machine 800 (FIGS. 8-14) and/or machine 2000 (FIGS. 20-22).

Referring to FIG. 24, method 2400 can include a block 2401 of providing a base. In many embodiments, the base can be similar or identical to base 810 (FIGS. 8-14) and/or base 2010 (FIGS. 20-22). In various embodiments, the base can include a roller assembly. The roller assembly can be similar or identical to roller assembly 820 (FIGS. 8-14) and or roller assembly 2020 (FIGS. 20-22). The roller assembly can include one or more rollers, such as the first roller surface or second roller surface 828 (FIGS. 8, 11, 13), central roller surface 2026 (FIGS. 20-22), and/or side roller surfaces 2027 (FIGS. 20-22).

In some embodiments, method 2400 can include a block 2402 of providing a carriage. The carriage can be similar or identical to carriage 830 (FIGS. 8-14) and/or carriage 2030 (FIGS. 20-22). In a number of embodiments, the carriage can include a first cradle. The first cradle can be similar or identical to cradle 832 (FIGS. 8-9, 12-14) and/or cradle 2032 (FIG. 20). The first cradle can be configured to securely hold a first electronic device. In many embodiments, the carriage can include an alignment base. The alignment base can be similar or identical to alignment base 212 (FIG. 2), alignment base 312 (FIG. 3), alignment base 835 (FIGS. 8-9, 13-14), alignment base 1632 (FIGS. 16-19), and/or alignment base 2035 (FIG. 20). The alignment base can be configured to engage with an alignment mechanism, such as alignment mechanism 115 (FIG. 1), alignment mechanism 415 (FIG. 4), alignment mechanism 615 (FIG. 6), alignment mechanism 715 (FIG. 7), and/or alignment mechanism 1515 (FIG. 15), of an overlay applicator, such as overlay applicator 100 (FIG. 1), overlay applicator 400 (FIGS. 4-5), overlay applicator 600 (FIG. 6), overlay applicator 700 (FIG. 7), and/or overlay applicator 1500 (FIG. 15).

In a number of embodiments, method 2400 can include a block 2403 of providing a handle assembly. The handle assembly can be similar or identical to handle assembly 850 (FIGS. 8-14) and/or handle assembly 2050 (FIGS. 20-22). In some embodiments, the handle assembly can include a handle. The handle can be similar or identical to handle 855 (FIGS. 8-9, 11-14). In several embodiments, the handle assembly can include a pulling mechanism. The pulling mechanism can be similar or identical to pulling mechanism 856 (FIGS. 8-9, 11-14) and/or pulling mechanism 1741 (FIGS. 17, 19). In a number of embodiments, the pulling mechanism can be configured to engage with a pull tab, such as pull tab 150 (FIG. 1), pull tab 450 (FIGS. 4-5), pull tab 650 (FIG. 6), pull tab 750 (FIG. 7), and/or pull tab 1550 (FIG. 15), of the overlay applicator.

In many embodiments, the machine can be configured such that the handle assembly can be pulled in a first direction relative to the base from a first handle position to a second handle position. In many embodiments, the machine can be configured such that when the handle assembly is moved from the first handle position to the second handle position, the carriage can move in a second direction relative to the base from a first carriage position to a second carriage position. The second direction can be opposite the first direction. In several embodiments, the machine can be configured such that when the alignment base is engaged with the alignment mechanism of the overlay applicator, the pulling mechanism is engaged with the pull tab of the overlay applicator, the first cradle is holding the first electronic device, and the handle assembly is pulled in the first direction relative to the base from the first handle position to the second handle position, an adhesive release liner of the overlay applicator can be removed from an overlay of the overlay applicator starting at a leading edge of the overlay and continuing to a trailing edge of the overlay to expose an adhesive agent of the overlay of the overlay applicator to a screen of the first electronic device.

In some embodiments, the machine can be configured such that when the carriage moves from the first carriage position to the second carriage position, the one or more rollers can be configured to roll over and press downward on the overlay applicator to adhere the exposed adhesive agent of the overlay to the screen of the first electronic device. In a number of embodiments, method 2400 can include providing an overlay cover. The overlay cover can be similar or identical to overlay cover 836 (FIGS. 8-9, 12-14) and/or overlay cover 2036 (FIGS. 20-22). In various embodiments, the overlay cover can be configured to secure the overlay applicator to the alignment base when the alignment mechanism of the overlay applicator is engaged with the alignment base.

Figure 25:
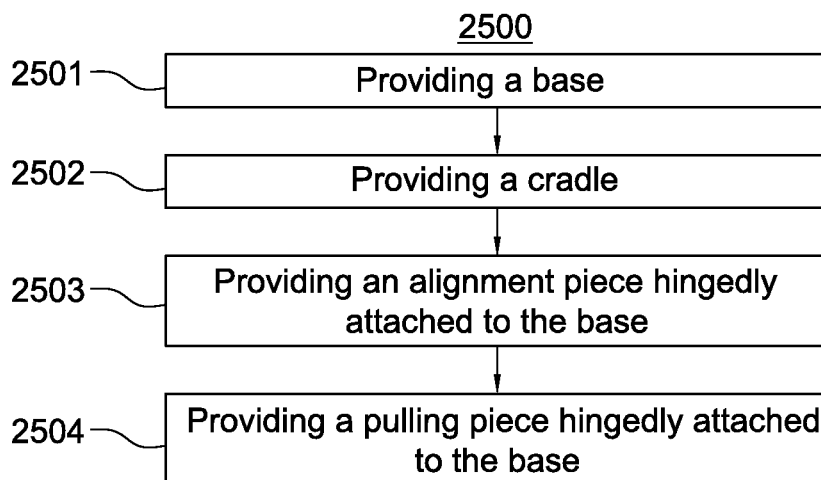
FIG. 25 illustrates a flow chart for a method of providing a machine, according to another embodiment.

Proceeding to the next drawing, FIG. 25 illustrates a flow chart for an embodiment of a method 2500 of providing a machine. Method 2500 is merely exemplary and is not limited to the embodiments presented herein. Method 2500 can be employed in many different embodiments or examples not specifically depicted or described herein. In some embodiments, the procedures, the processes, and/or the activities of method 2500 can be performed in the order presented. In other embodiments, the procedures, the processes, and/or the activities of the method 2500 can be performed in any other suitable order. In still other embodiments, one or more of the procedures, the processes, and/or the activities in method 2500 can be combined or skipped. In some embodiments, the machine can be similar or identical to machine 1600 (FIGS. 16-19).

Referring to FIG. 25, method 2500 can include a block 2501 of providing a base. In many embodiments, the base can be similar or identical to base 1610 (FIGS. 16-19).

In some embodiments, method 2500 can include a block 2502 of providing a cradle. The cradle can be similar or identical to cradle 1620 (FIG. 16). The cradle can be configured to securely hold a first electronic device.

In a number of embodiments, method 2500 can include a block 2503 of providing an alignment piece. The alignment piece can be similar or identical to first frame 1630 (FIGS. 16-19). In many embodiments, the alignment piece can be hingedly attached to the base. In several embodiments, the alignment piece can include an alignment base. The alignment base can be similar or identical to alignment base 212 (FIG. 2), alignment base 312 (FIG. 3), alignment base 835 (FIGS. 8-9, 13-14), alignment base 1632 (FIGS. 16-19), and/or alignment base 2035 (FIG. 20). The alignment base can be configured to engage with an alignment mechanism, such as alignment mechanism 115 (FIG. 1), alignment mechanism 415 (FIG. 4), alignment mechanism 615 (FIG. 6), alignment mechanism 715 (FIG. 7), and/or alignment mechanism 1515 (FIG. 15), of an overlay applicator, such as overlay applicator 100 (FIG. 1), overlay applicator 400 (FIGS. 4-5), overlay applicator 600 (FIG. 6), overlay applicator 700 (FIG. 7), and/or overlay applicator 1500 (FIG. 15).

In a number of embodiments, method 2500 can include a block 2504 of providing a pulling piece. The puling piece can be similar or identical to second frame 1640 (FIGS. 16-19). In many embodiments, the pulling piece can be hingedly attached to the base. In several embodiments, the pulling piece can include a pulling mechanism. The pulling mechanism can be similar or identical to pulling mechanism 856 (FIGS. 8-9, 11-14) and/or pulling mechanism 1741 (FIGS. 17, 19). In a number of embodiments, the pulling mechanism can be configured to engage with a pull tab, such as pull tab 150 (FIG. 1), pull tab 450 (FIGS. 4-5), pull tab 650 (FIG. 6), pull tab 750 (FIG. 7), and/or pull tab 1550 (FIG. 15), of the overlay applicator.

In some embodiments, the machine can be configured such that the pulling piece can be rotated relative to the base in a first direction from a first pulling piece position to a second pulling piece position. The first pulling piece position can be proximate to the cradle. In many embodiments, the machine can be configured such that the alignment piece can be rotated relative to the base in the first direction from a first alignment piece position to a second alignment piece position. The second alignment piece position can be proximate to the cradle. In many embodiments, the machine can be configured such that when the alignment base is engaged with the alignment mechanism of the overlay applicator, the pulling mechanism is engaged with the pull tab of the overlay applicator, the cradle is holding the first electronic device, and the pulling piece is rotated relative to the base in the first direction from the first pulling piece position to the second pulling piece position, the alignment piece can be rotated relative to the base in the first direction from the first alignment piece position to the second alignment piece position to pull the pull tab of the overlay applicator, and an adhesive release liner of the overlay applicator can be removed from an overlay of the overlay applicator to expose an adhesive agent of an overlay to a screen of the first electronic device.

Figure 26:
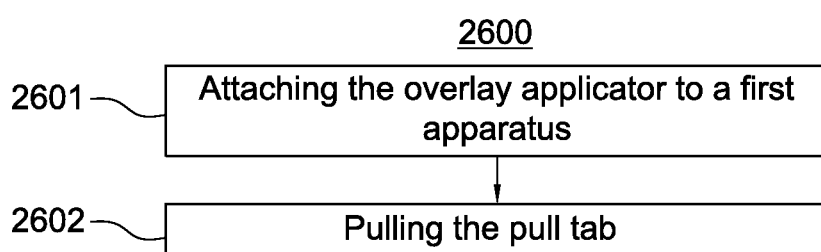
FIG. 26 illustrates a flow chart for a method of using an overlay applicator to apply an overlay to a screen of an electronic device, according to another embodiment.

Proceeding to the next drawing, FIG. 26 illustrates a flow chart for an embodiment of a method 2600 of using an overlay applicator to apply an overlay to a screen of an electronic device. Method 2600 is merely exemplary and is not limited to the embodiments presented herein. Method 2600 can be employed in many different embodiments or examples not specifically depicted or described herein. In some embodiments, the procedures, the processes, and/or the activities of method 2600 can be performed in the order presented. In other embodiments, the procedures, the processes, and/or the activities of the method 2600 can be performed in any other suitable order. In still other embodiments, one or more of the procedures, the processes, and/or the activities in method 2600 can be combined or skipped. In some embodiments, the overlay applicator can be similar or identical to overlay applicator 100 (FIG. 1), overlay applicator 400 (FIGS. 4-5), overlay applicator 600 (FIG. 6), overlay applicator 700 (FIG. 7), and/or overlay applicator 1500 (FIG. 15). In many embodiments, the overlay can be similar or identical to overlay 130 (FIG. 1), overlay 430 (FIGS. 4-5), overlay 630 (FIG. 6), overlay 730 (FIG. 7), and/or overlay 1530 (FIG. 15).

Referring to FIG. 26, method 2600 can include a block 2601 of attaching the overlay applicator to a first apparatus. In some embodiments, the first apparatus can be a frame. The frame can be similar or identical to frame 210 (FIG. 2). In many embodiments, the first apparatus can be a cradle. The cradle can be similar or identical to cradle 310 (FIG. 3), cradle 832 (FIGS. 8-9, 12-14) and/or cradle 2032 (FIG. 20). In several embodiments, the first apparatus can be a machine. The machine can be similar or identical to machine 800 (FIGS. 8-14), machine 1600 (FIGS. 16-19), and/or machine 2000 (FIGS. 20-22). In many embodiments, the first apparatus can securely hold the electronic device.

In many embodiments, the overlay applicator can include an overlay. In many embodiments, the overlay can be similar or identical to overlay 130 (FIG. 1), overlay 430 (FIGS. 4-5), overlay 630 (FIG. 6), overlay 730 (FIG. 7), and/or overlay 1530 (FIG. 15). In a number of embodiments, the overlay can have a top side and a bottom side. The top side of the overlay can be similar or identical to top side 131 (FIG. 1) of overlay 130 (FIG. 1). The bottom side of the overlay can be similar or identical to bottom side 132 (FIG. 1) of overlay 130 (FIG. 1). In various embodiments, the bottom side can include an adhesive agent configured to adhere to the screen of the electronic device.

In a number of embodiments, the overlay applicator can include an adhesive release liner. The adhesive release liner can be similar or identical to adhesive release liner 140 (FIG. 1), adhesive release liner 440 (FIGS. 4-5), adhesive release liner 640 (FIG. 6), adhesive release liner 740 (FIG. 7); and/or adhesive release liner 1540 (FIG. 15). In a number of embodiments, the adhesive release liner can have a top side and a bottom side. The top side of the adhesive release liner can be removably attached to the bottom side of the overlay. In some embodiments, the adhesive release liner can be configured to protect the adhesive agent at the bottom side of the overlay from contaminants.

In several embodiments, the overlay applicator can include a protective film. In some embodiments, the protective film can be similar or identical to protective film 120 (FIG. 1), protective film 420 (FIGS. 4-5), protective film 620 (FIG. 6), protective film 720 (FIG. 7), and/or protective film 1520 (FIG. 15). In many embodiments, the protective film can be removably attached to the top side of the overlay.

In various embodiments, the overlay applicator can include an alignment tab. In some embodiments, the alignment tab can be similar or identical to alignment tab 110 (FIG. 1), alignment tab 410 (FIGS. 4-5), alignment tab 610 (FIG. 6), alignment frame 710 (FIG. 7), and/or alignment flaps 1510 (FIG. 15). In many embodiments, the alignment tab can include an alignment mechanism. The alignment mechanism can be similar or identical to alignment mechanism 115 (FIG. 1), alignment mechanism 415 (FIG. 4), alignment mechanism 615 (FIG. 6), alignment mechanism 715 (FIG. 7), and/or alignment mechanism 1515 (FIG. 15). In various embodiments, the alignment mechanism of the alignment tab can be configured to engage with an alignment base, such as alignment base 212 (FIG. 2), alignment base 312 (FIG. 3), alignment base 835 (FIGS. 8-9, 13-14), alignment base 1632 (FIGS. 16-19), and/or alignment base 2035 (FIG. 20), of the first apparatus.

In several embodiments, the overlay applicator can include a pull tab. In some embodiments, the pull tab can be similar or identical to pull tab 150 (FIG. 1), pull tab 450 (FIGS. 4-5), pull tab 650 (FIG. 6), pull tab 750 (FIG. 7), and/or pull tab 1550 (FIG. 15). In many embodiments, the pull tab can include a wiper. The wiper can be similar or identical to wiper 157 (FIG. 1), wiper 457 (FIG. 4), wiper 657 (FIG. 6), and/or wiper 757 (FIG. 7).

In some embodiments, method 2600 can include a block 2602 of pulling the pull tab across the bottom side of the adhesive release liner to remove the adhesive release liner from the bottom side of the overlay to expose the adhesive agent to the screen of the electronic device.

Figure 28:
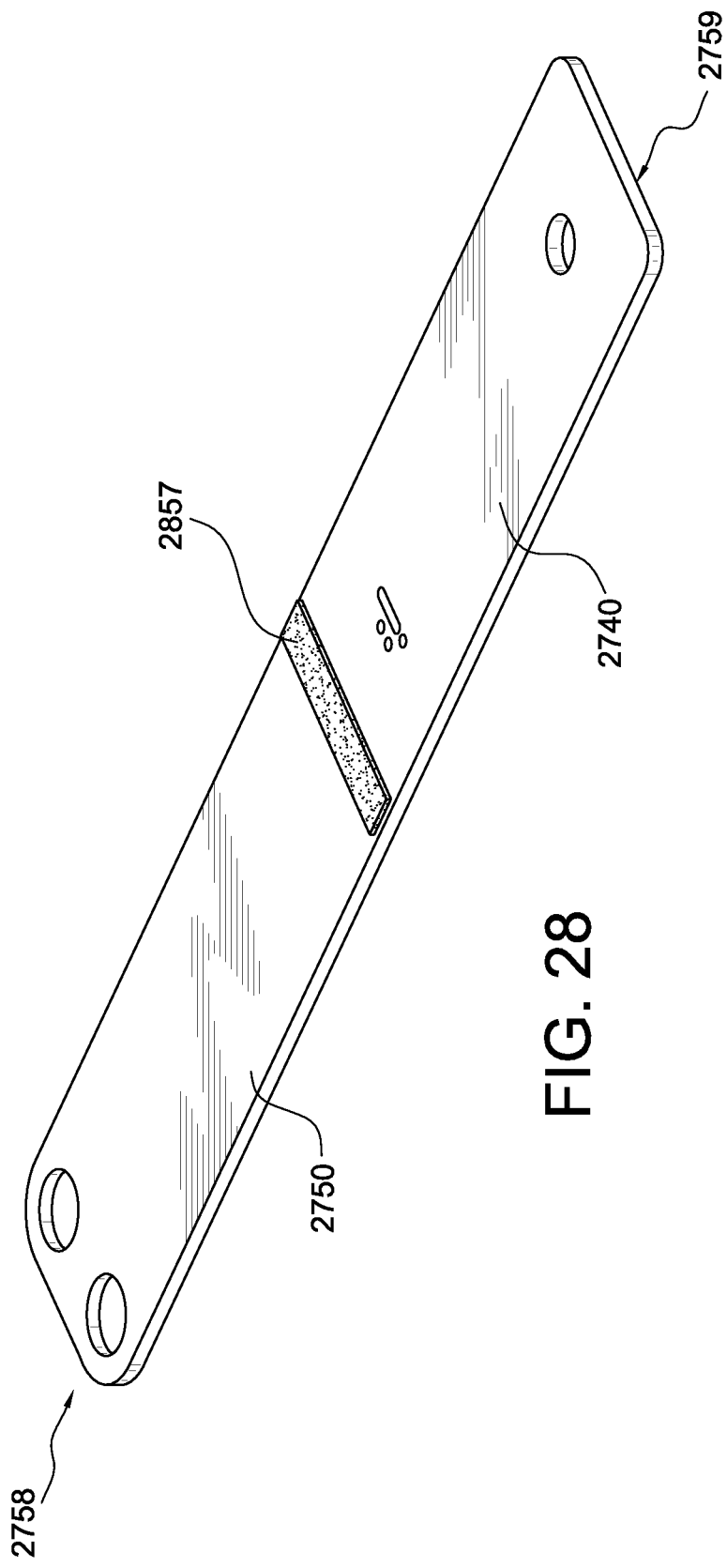
FIG. 28 illustrates a perspective view of components of the overlay applicator of FIG. 30.
Figure 29:
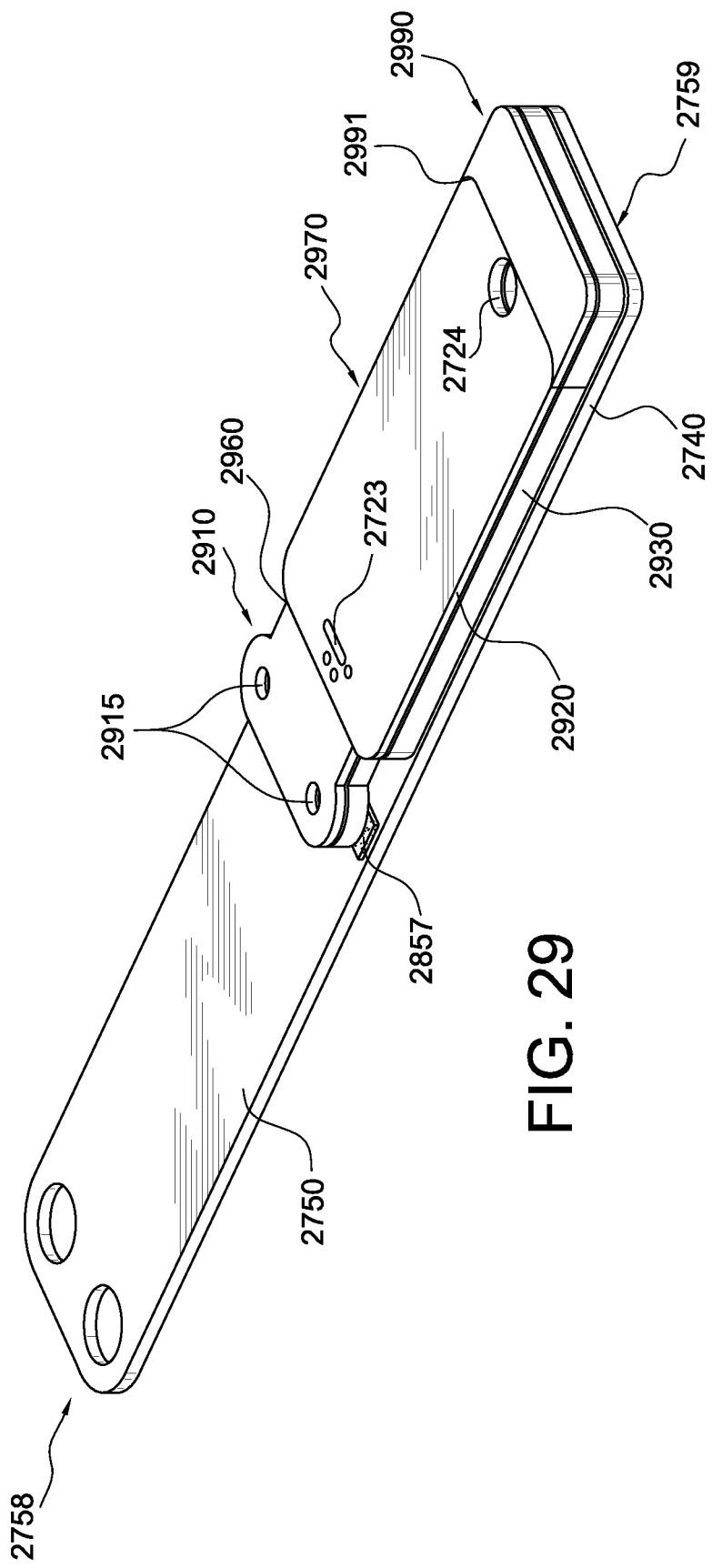
FIG. 29 illustrates a perspective view of components of the overlay applicator of FIG. 30.
Figure 30:
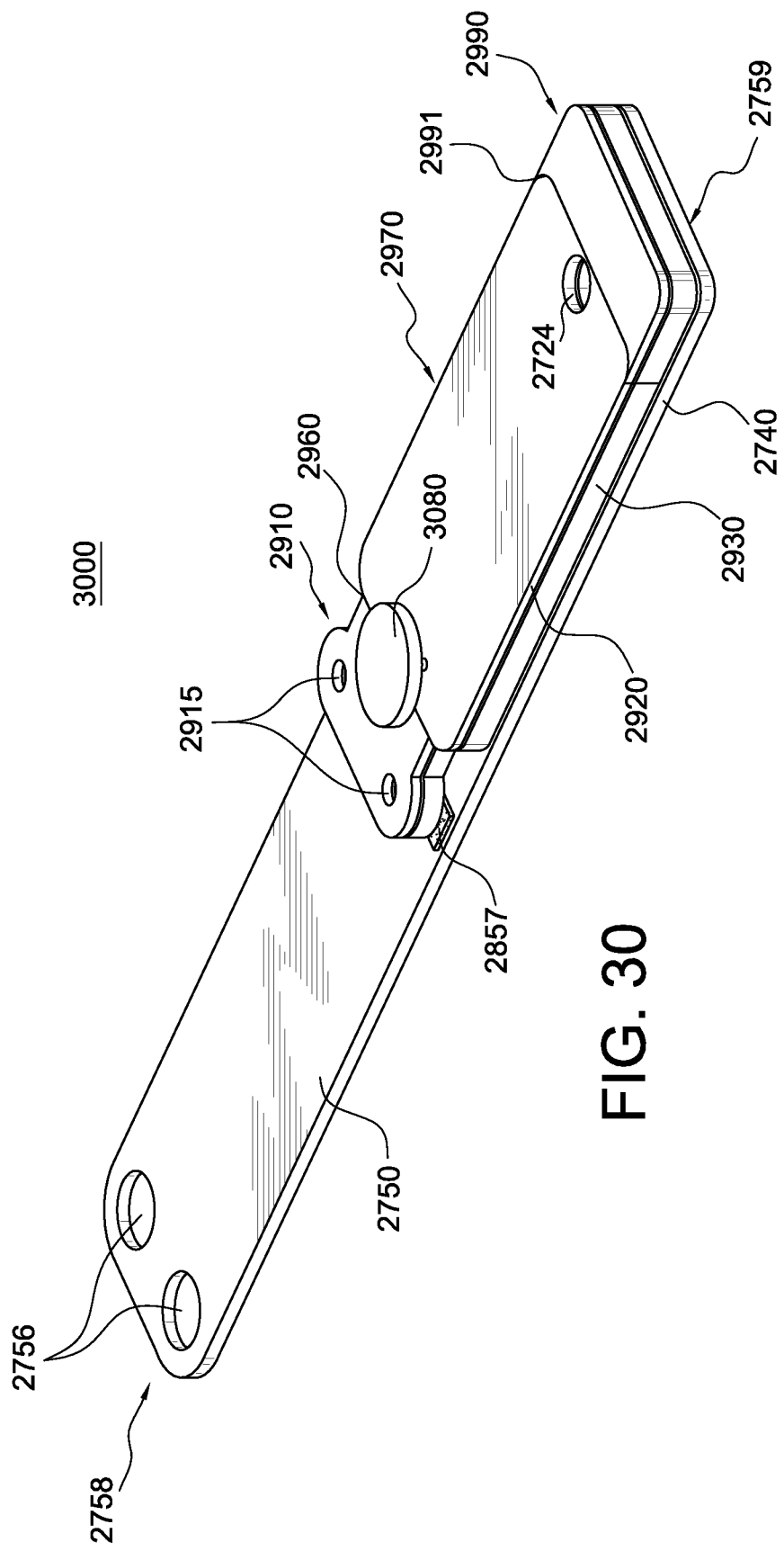
FIG. 30 illustrates a perspective view of an overlay applicator, according to an embodiment.

Turning ahead in the drawings, FIGS. 27-30 illustrate a perspective view of components of an overlay applicator 3000, which is shown in its entirety in FIG. 30, and illustrate a method of constructing overlay applicator 3000. Overlay applicator 3000 is merely exemplary and embodiments of the overlay applicator are not limited to embodiments presented herein. The overlay applicator can be employed in many different embodiments or examples not specifically depicted or described herein. Overlay applicator 3000 can be similar to overlay applicator 100 (FIG. 1), overlay applicator 400 (FIGS. 4-5), overlay applicator 600 (FIG. 6), overlay applicator 700 (FIG. 7), and/or overlay applicator 1500 (FIG. 15), and various components and/or constructions of overlay applicator 3000 can be substantially identical or similar to various components of overlay applicator 100 (FIG. 1), overlay applicator 400 (FIGS. 4-5), overlay applicator 600 (FIG. 6), overlay applicator 700 (FIG. 7), and/or overlay applicator 1500 (FIG. 15).

Figure 27:
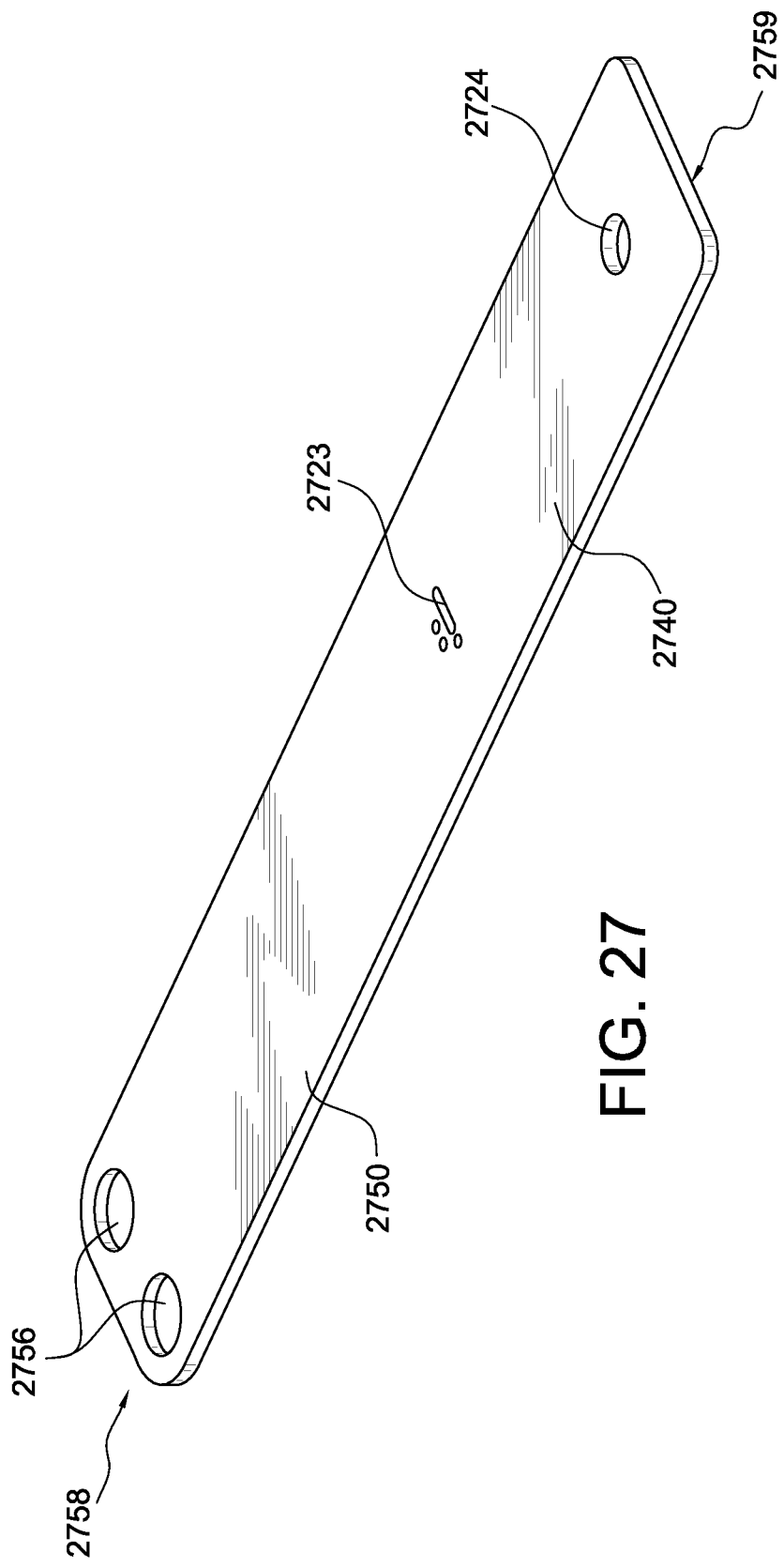
FIG. 27 illustrates a perspective view of components of an overlay applicator, according to the embodiment of FIG. 30.

As shown in FIG. 27, overlay applicator 3000 (FIG. 30) can be constructed to include an adhesive release liner 2740 and a pull tab 2750. In some embodiments, pull tab 2750 can be integral with release liner 2740 and can be a single layer of material, such as plastic, paper, or another suitable liner film. Pull tab 2750 can facilitate removal of adhesive release liner 2740. Pull tab 2750 can be at a second side 2758 of the material and adhesive release liner 2740 can be at a first side 2759. Pull tab 2750 can include a pulling aid 2756, which can be similar to pulling aid 156 (FIG. 1), pulling aid 456 (FIGS. 4-5), and/or pulling aid 1556 (FIG. 15). Release liner 2740 also can include a speaker slot 2723, a button slot 2724, and/or one or more other slots for a front side camera, a camera flash, a status indicator, etc. Pull tab 2750 and adhesive release liner 2740 can be cut as one piece of material, and pulling aid 2756, speaker slot 2723, button slot 2724, etc., can be cut out from pull tab 2750 and adhesive release liner 2740.

In a number of embodiments, after cutting pull tab 2750 and adhesive release liner 2740, such as shown in FIG. 27, a wiper 2857 can be added to pull tab 2750, as shown in FIG. 28. Wiper 2857 can remove dust from the screen of the device, and can be similar to wiper 157 (FIG. 1), wiper 457 (FIGS. 4-5), wiper 657 (FIG. 6), and/or wiper 757 (FIG. 7).

In various embodiments, after adhering or otherwise attaching wiper 2857 to pull tab 2750, construction of overlay applicator 3000 (FIG. 30) can include adhering and/or attaching layers of material for overlay 2930 and protective film 2920, as shown in FIG. 29. Protective film 2920 can be similar to protective film 120 (FIG. 1), protective film 420 (FIGS. 4-5), protective film 620 (FIG. 6), protective film 720 (FIG. 7) and/or protective film 1520 (FIG. 15). Overlay 2930 can be similar to overlay 130 (FIG. 1), overlay 430 (FIGS. 4-5), overlay 630 (FIG. 6), overlay 730 (FIG. 7), and/or overlay 1530 (FIG. 15). In a number of embodiments, overlay applicator 3000 (FIG. 30) can include an alignment tab 2910, a device portion 2970 and/or a tail portion 2990. Alignment tab 2910 can be similar to alignment tab 110 (FIG. 1), alignment tab 410 (FIG. 4), and/or alignment tab 610 (FIG. 6). Device portion 2970 can be similar to device portion 470 (FIGS. 4-5) and/or device portion 670 (FIG. 6). In some embodiments, device portion 2970 and alignment tab 2910 can be made of the layers used for protective film 2920, overlay 2930, and adhesive release liner 2740. Alignment tab 2910 can include an alignment mechanism 2915, which can be similar to alignment mechanism 115 (FIG. 1), alignment mechanism 415 (FIGS. 4-5), and/or alignment mechanism 615 (FIG. 6), and which can facilitate aligning alignment tab 2910, protective film 2920, overlay 2930, and adhesive release liner 2740 with various features of the device during application of overlay 2930.

After attaching the layers, protective film 2920 and overlay 2930 can be kiss cut to predetermined dimensions of alignment tab 2910, device portion 2970, and/or tail portion 2990, without cutting adhesive release liner 2740 and/or pull tab 2750. In some embodiments, excess material from the layers for protective film 2920 and overlay 2930 can be removed. In various embodiments, the kiss cutting of device portion 2970, alignment tab 2910, and tail portion 2990 to size at the layers of protective film 2920 and overlay 2930 can include cutting speaker slot 2723, button slot 2724, and other slots, as described above, and/or cutting alignment mechanism 2915. The kiss cutting can also include cutting an interface slit 2960 between alignment tab 2910 and device portion 2970, and/or cutting a tail slit 2991 between device portion 2970 and tail portion 2990, such that the kiss cutting is through the layers of protective film 2920 and overlay 2930, but not through adhesive release liner 2740. As a result of the kiss cut, the dimensions of device portion 2970 at overlay 2930 and protective film 2920 can be approximately equal or similar to the dimensions of the screen of the device.

As shown in FIG. 30, in a number of embodiments, after kiss cutting alignment tab 2910, device portion 2970, and tail portion 2990 to size at the layers of protective film 2920 and overlay 2930, and cutting interface slit 2960 and tail slit 2991, construction of overlay applicator 3000 can include adhering a joining sticker 3080 on top of the layer of protective film 2920 to span interface slit 2960 and join device portion 2970 of protective film 2920 with the top layer of alignment tab 2910, as shown in FIG. 30. Joining sticker 3080 can help maintain alignment between alignment tab 2910 and device portion 2970, which can advantageously maintain alignment during application of overlay 2930. In many embodiments, joining sticker 3080 does not stretch or distort, which can advantageously facilitate alignment of alignment mechanism 2915 with overlay 2930, such that overlay 2930 can be accurately positioned on the screen of the device.

Figure 31:
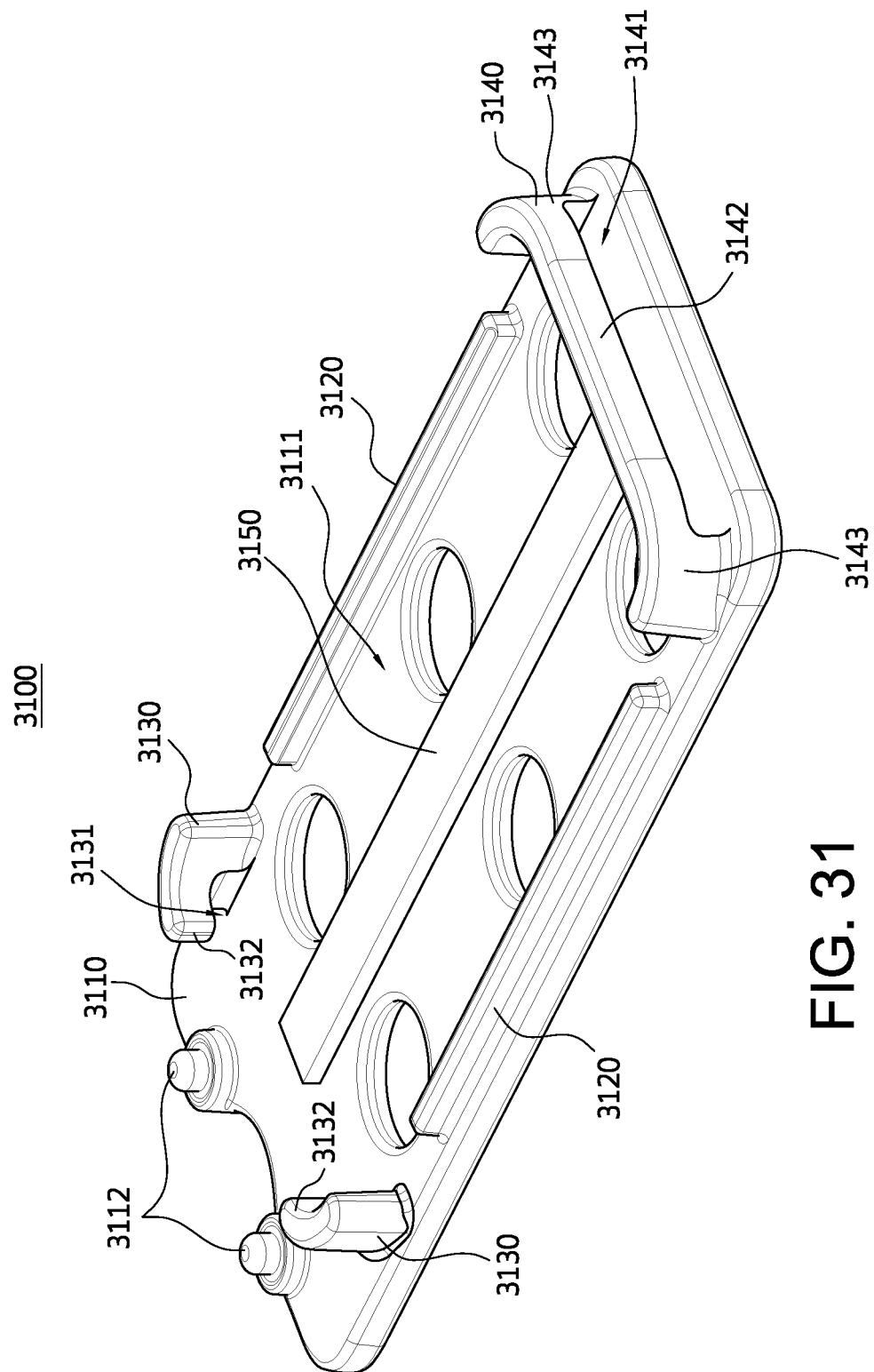
FIG. 31 illustrates a perspective view of a cradle, according to an embodiment.

In certain embodiments, after joining sticker 3080 has been attached between alignment tab 2910 and device portion 2970, pull tab 2750 can be folded back, such that second side 2758 is folded beneath adhesive release liner 2740 to first side 2759. Pull tab 2750 and adhesive release liner 2740 can be peeled back off of at least a portion of alignment tab 2910, such that alignment mechanism 2915 is uncovered by adhesive release liner 2740, allowing alignment mechanism to engage with an alignment base, such as alignment base 212 (FIG. 2) or alignment base 312 (FIG. 3), alignment base 835 (FIGS. 8-9, 13-14), alignment base 1632 (FIGS. 16-19), alignment base 2035 (FIG. 20) and/or alignment base 3112 (FIG. 31, described below). The process of kiss cutting the layers at protective film 2920 and overlay 2930 can advantageously provide a simpler method of constructing overlay applicator 3000, and/or can provide overlay applicator 3000 with a very accurate alignment of alignment mechanism 2915 with respect to overlay 2930 and its features.

Figure 32:
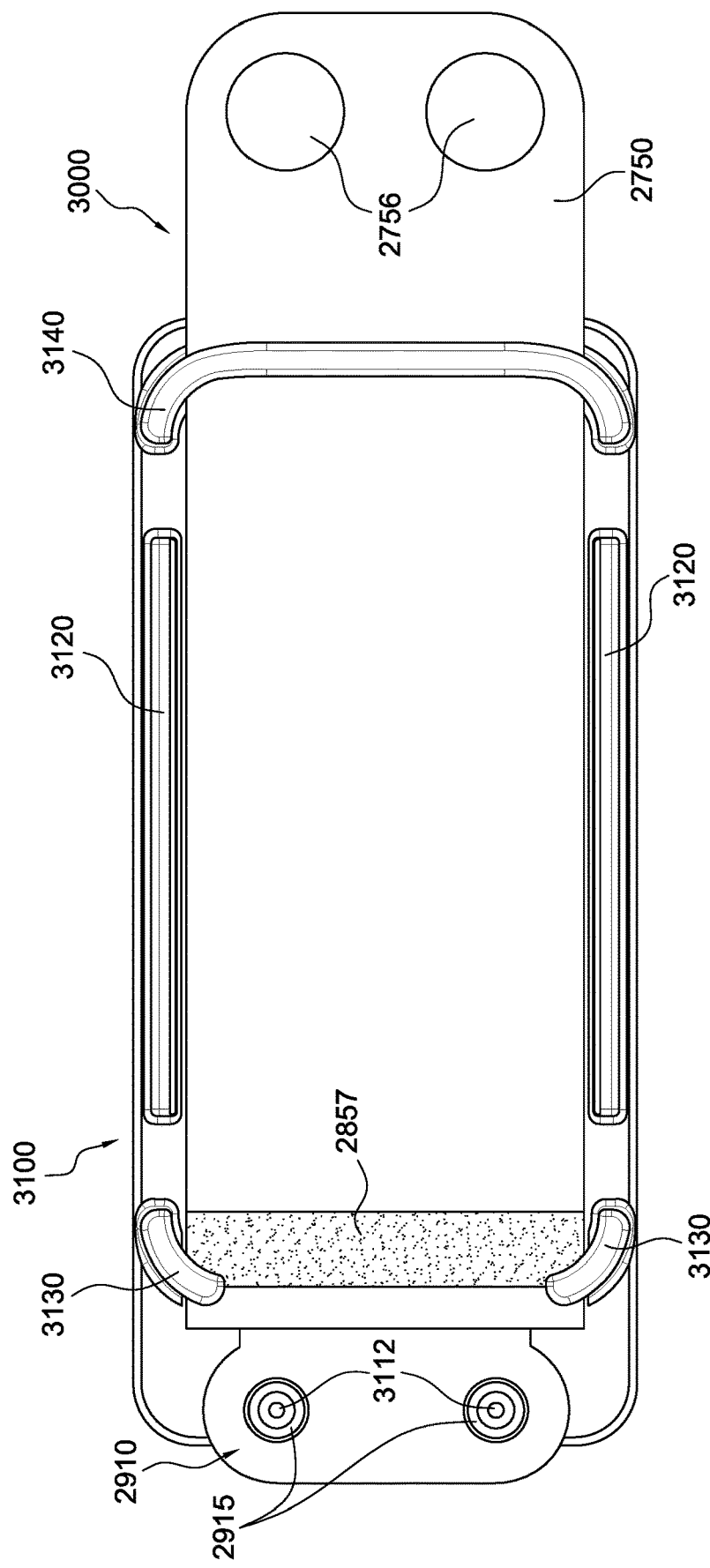
FIG. 32 illustrates a top view of the cradle of FIG. 31 being used with an overlay applicator.
Figure 33:
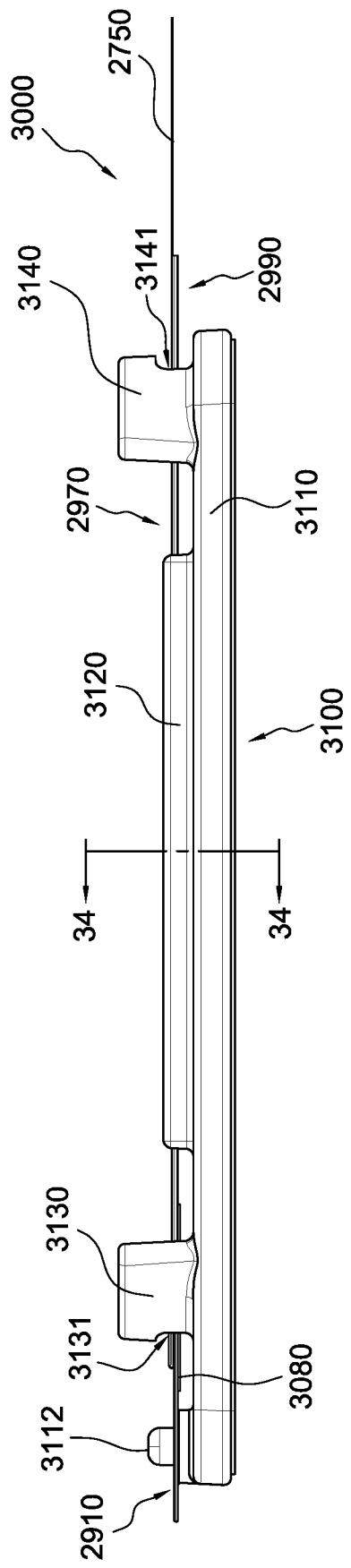
FIG. 33 illustrates a side view of the cradle of FIG. 31 being used with an overlay applicator.
Figure 34:
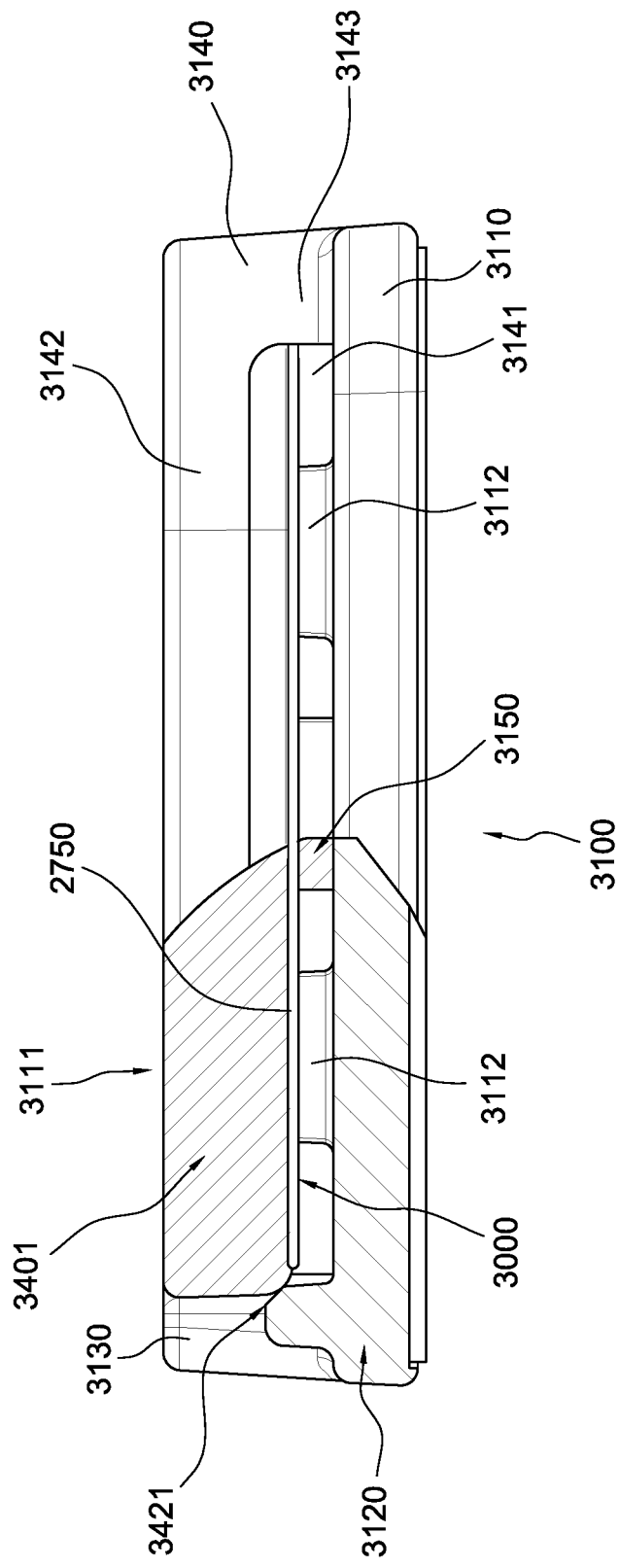
FIG. 34 illustrates a partial cross-sectional view of the cradle of FIG. 31 being use with an overlay applicator.

Turning ahead in the drawings, FIG. 31 illustrates a perspective view of a cradle 3100 that can be used with an overlay applicator, such as overlay applicator 3000 (FIG. 30), to apply an overlay, such as overlay 2930 (FIGS. 29-30), to a device. FIG. 32 illustrates a top view of cradle 3100 being used with overlay applicator 3000. FIG. 33 illustrates a side view of cradle 3100 being used with overlay applicator 3000. FIG. 34 illustrates a partial cross-sectional view of cradle 3100 being used with overlay applicator 3000 and a device. Cradle 3100 is merely exemplary and embodiments of the cradle are not limited to embodiments presented herein. The cradle can be employed in many different embodiments or examples not specifically depicted or described herein. In many embodiments, cradle 3100 can include an alignment base 3112, which can engage with alignment mechanism 2915, as shown in FIG. 32. In some embodiments, alignment base 3112 can be one or more protrusions that can fit inside the one or more slots of alignment mechanism 2915. Alignment base 3112 and alignment mechanism 2915 can be configured and positioned such that when alignment mechanism 2915 is engaged with alignment base 3112, overlay 2930 (FIGS. 29-30) can be positioned directly above the screen of the device held by cradle 3100, and aligned such that overlay 2930 (FIGS. 29-30) will be adhered in an accurate position on the screen when adhesive release liner 2740 is removed, as described below.

In many embodiments, cradle 3100 can include a bottom frame 3110, side frames 3120, corner frames 3130, and/or an end frame 3140. Side frames 3120, corner frames 3130, and/or end frame 3140 can provide a device slot 3111 for a device by partially or fully providing support along the sides and/or ends of the device, and can be positioned so as to provide a snug fit for the device to prevent movement of the device with respect to other portions of cradle 3100.

In certain embodiments, corner frames 3130 can provide a corner support for the device, and can be attached to bottom frame 3110. In many embodiments, each corner frame 3130 can include a corner end 3132 that can be configured to extend around an end of the device, and can provide a corner slot 3131 between corner end 3132 and bottom frame 3110. Corner slots 3131 can allow overlay applicator 3000 to extend under and be secured by corner end 3132, as shown in FIGS. 32-33.

In a number of embodiments, end frame 3140 can provide corner supports for the device, and can be attached to bottom frame 3110 at end frame attachments 3143. In some embodiments, end frame 3140 can include an end bar 3142, which can provide an end slot 3141 between end bar 3142 and bottom frame 3110. End slot 3141 can allow overlay applicator to 3000 to extend under and be secured by end bar 3142, as shown in FIGS. 32-33. In a number of embodiments, end frame attachments 3143 can provide side supports for overlay applicator 3000, which can help to keep overlay applicator 3000 within end slot 3141 and properly aligned with respect to the device held by cradle 3100.

In some embodiments, cradle 3100 can include a central support 3150, which can be positioned between the sides of cradle 3100 and can extend from one end to the other end of the device when the device is held by cradle 3100 in device slot 3111. Central support 3150 can be made of foam or an elastomeric material. Central support 3150 can provide support for overlay applicator 3000 and press overlay 2930 (FIGS. 29-30) against the screen of the device as adhesive release liner 2740 (FIGS. 27-30) is peeled away from overlay 2930 (FIGS. 29-30), as described below.

As shown in FIGS. 32-33, overlay applicator 3000 can be placed on cradle 3100 such that alignment base 3112 can engage with alignment mechanism 2915. Overlay applicator 3000 can extend through corner slots 3131 and end slot 3141. Overlay applicator 3000 can be positioned on cradle 3100 such that protective film 2920 is placed against central support 3150, and adhesive release liner 2740 (FIGS. 27-30) and pull tab 2750 are above protective film 2920. Pull tab 2750 can be folded back across adhesive release liner 2740 (FIGS. 27-30), such that alignment tab 2910 is partially or fully uncovered and wiper 2857 is face up. When overlay applicator 3000 is placed on cradle 3100, central support 3150 (FIG. 31) can support overlay applicator 3000 above bottom frame 3110 of cradle 3100. Joining sticker 3080 can be positioned near the region of corner slots 3131. Device portion 2970 can be positioned between corner frames 3130 and end frame 3140, and tail portion 2990 can extend through, be supported within, and/or be positioned within end slot 3141. In a number of embodiments, pull tab 2750 can extend past the end of tail portion 2990, which can allow a user to pull on pull tab 2750 to remove adhesive release liner 2740 (FIGS. 27-30).

As shown in the cross-section cut-out in FIG. 34, after overlay applicator 3000 is placed on cradle 3100, a device, such as device 3401, can be placed on overlay applicator 3000 within slot 3111 of cradle 3100, with the screen of device 3401 facing downward against pull tab 2750. Device 3401 can be cradled within slot 3111. As shown in FIG. 34, central support 3150 can support overlay applicator 3000 above bottom frame 3110 of cradle 3100. Side frames 3120 can each include a beveled edge 3421, which can support device 3401 above bottom frame 3110. The inner width between each of side frames 3120 be wider than overlay applicator 3000, as shown in FIG. 34, but can be narrower than the width of device 3401.

After device 3401 is secured within slot 3111 above overlay applicator 3000, as shown in FIG. 34, pull tab 2750 can be pulled to pull wiper 2857 (FIG. 28-30) across the screen of device 3401 and to remove adhesive release liner 2740 (FIGS. 27-30). Central support 3150 can provide pressure against protective film 2920 (FIGS. 29-30) to press wiper 2857 against the screen of device 3401 as it is wiped across the screen of device 3401. As adhesive release liner 2740 (FIGS. 27-30) is pulled, it can be folded across itself, can move along the screen of device 3401, and can expose the adhesive on overlay 2930 (FIGS. 29-30) to the screen of device 3401. Central support 3150 can be depressed slightly as the fold in adhesive release liner 2740 (FIGS. 27-30) moves from one end to the other end of device 3401, and can rebound to provide pressure against protective film 2920 (FIGS. 29-30) to press the overlay 2930 (FIGS. 29-30) against the screen of device 3401 as it is exposed. Central support 3150 can advantageously allow the center of overlay 2930 (FIGS. 29-30) to be adhered and can facilitate removing any air bubbles at the center of overlay 2930 (FIGS. 29-30). Beginning the adhesion of overlay 2930 (FIGS. 29-30) to device 3401 at the center can advantageously allow the remainder of overlay 2930 (FIGS. 29-30) to be accurately adhered to the screen of device 3401 without wrinkles and/or with minimal or no bubbles.

Figure 35:
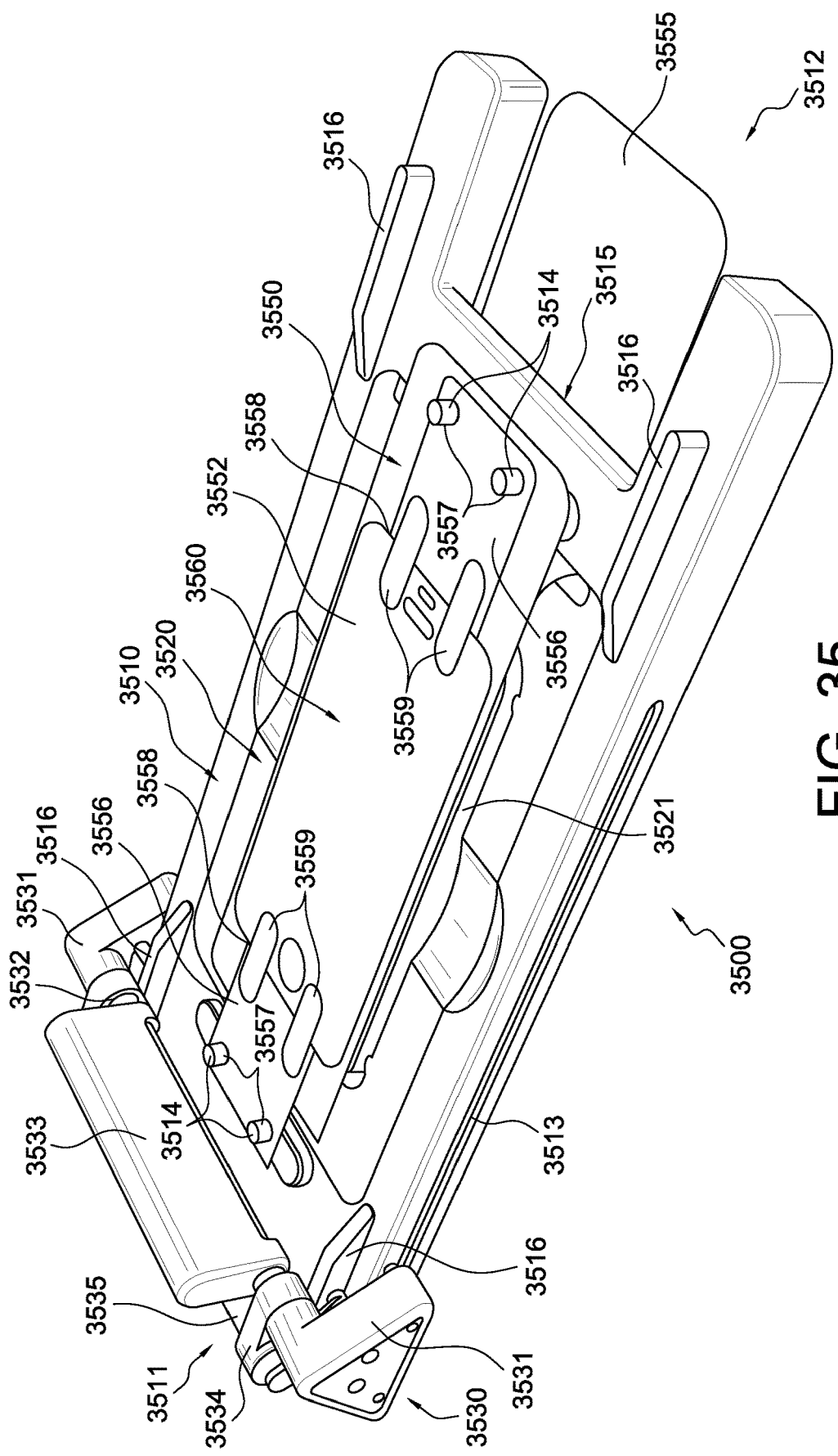
FIG. 35 illustrates a perspective view of a machine and an overlay applicator, according to an embodiment.
Figure 36:
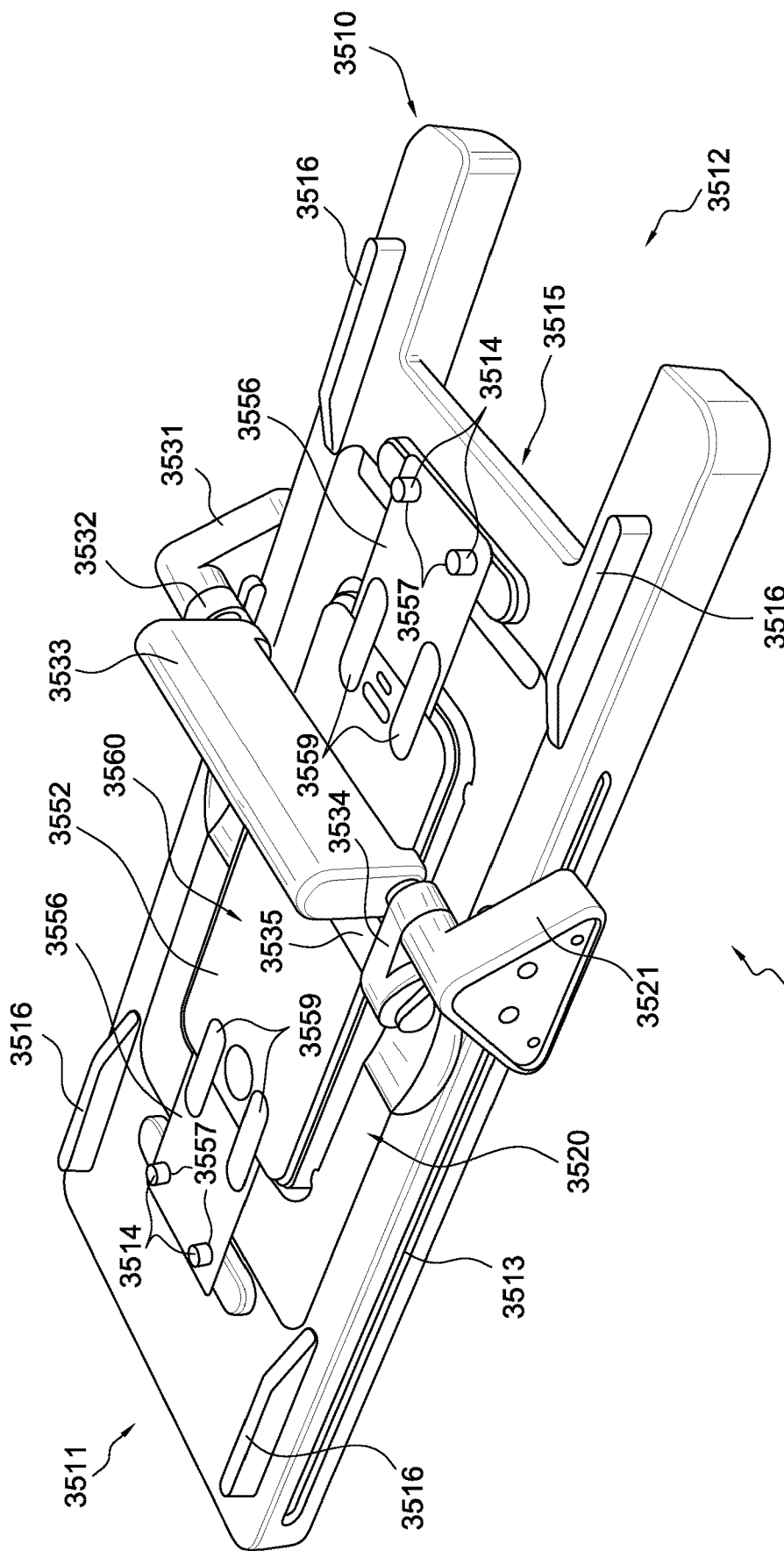
FIG. 36 illustrates a perspective view of the machine of FIG. 36 with a slider being used to apply pressure to an overlay.

Turning ahead in the drawings, FIG. 35 illustrates a perspective view of a machine 3500 that can be used with an overlay applicator 3550 to apply an overlay to a device. FIG. 36 illustrates a perspective view of machine 3500 with the slider being used to apply pressure to the overlay. Machine 3500 is merely exemplary and embodiments of the machine are not limited to embodiments presented herein. The machine can be employed in many different embodiments or examples not specifically depicted or described herein. Overlay applicator 3550 is merely exemplary and embodiments of the overlay applicator are not limited to embodiments presented herein. The overlay applicator can be employed in many different embodiment or examples not specifically depicted or described herein. Overlay applicator 3550 can be similar to overlay applicator 100 (FIG. 1), overlay applicator 400 (FIGS. 4-5), overlay applicator 600 (FIG. 6), overlay applicator 700 (FIG. 7), overlay applicator 1500 (FIG. 15), and/or overlay applicator 3000 (FIG. 30), and various components and/or constructions of overlay applicator 3550 can be substantially identical or similar to various components of overlay applicator 100 (FIG. 1), overlay applicator 400 (FIGS. 4-5), overlay applicator 600 (FIG. 6), overlay applicator 700 (FIG. 7), overlay applicator 1500 (FIG. 15), and/or overlay applicator 3000 (FIG. 30).

In some embodiments, overlay applicator 3550 can include an adhesive release liner (not shown), a pull tab 3555, an overlay (not shown), and/or a protective film 3552. In some embodiments, pull tab 3555 can be integral with the adhesive release liner and can be a single layer of material, such as plastic, paper, or another suitable liner film. Pull tab 3555 can facilitate removal of the adhesive release liner from the overlay. In a number of embodiments, overlay applicator 3550 can include alignment tabs 3556. Alignment tabs 3556 can be located at each end of overlay applicator 3550 and/or can be located at each end of a device portion 3560 of overlay applicator 3550. Device portion 3560 can be similar to device portion 470 (FIGS. 4-5), device portion 670 (FIG. 6), and/or device portion 2970 (FIGS. 29-30). In some embodiments, device portion 3560 and alignment tabs 3556 can be made of the layers used for protective film 3552, the overlay, and/or the adhesive release liner. Each of alignment tabs 3556 can include an alignment mechanism 3557, which can be similar to alignment mechanism 115 (FIG. 1), alignment mechanism 415 (FIGS. 4-5), alignment mechanism 615 (FIG. 6), and/or alignment mechanism 2915 (FIGS. 29-30), and which can facilitate aligning alignment tab 3556, protective film 3552, the overlay, and the adhesive release liner with various features of the device during application of the overlay.

Protective film 3552 and the overlay can be kiss cut to predetermined dimensions of alignment tabs 3556 and device portion 3560, without cutting the adhesive release liner and/or pull tab 3555. In some embodiments, excess material from the layers for protective film 3552 and the overlay can be removed. In some embodiments, the kiss cutting of device portion 3560 and alignment tabs 3556 to size at the layers of protective film 3552 and the overlay can include cutting speaker slots, button slots, and/or other slots, as described above, and/or cutting alignment mechanism 3557. The kiss cutting can also include cutting interface slits 3558 between alignment tabs 3556 and device portion 3560, such that the cutting is through the layers of protective film 3552 and the overlay, but not the adhesive release liner. As a result of the kiss cut, the dimensions of device portion 3560 at the overlay and protective film 3552 can be approximately equal or similar to the dimensions of the screen of the device.

In a number of embodiments, after the kiss cutting, construction of overlay applicator 3550 can include adhering joining stickers 3559 on the top the layer of protective film 3552 to span interface slits 3558 and join device portion 3560 of protective film 3552 with the top layer of alignment tabs 3556, as shown in FIG. 35. Joining stickers 3559 can help maintain alignment between alignment tabs 3556 and device portion 3560, which can advantageously maintain alignment during application of the overlay. In many embodiments, joining stickers 3559 does not stretch or distort, which can advantageously facilitate alignment of alignment mechanisms 3557 with the overlay, such that the overlay can be accurately positioned on the screen of the device. In certain embodiments, after joining stickers 3559 have been attached between alignment tabs 3556 and device portion 3560, pull tab 3555 can be folded back beneath the adhesive release liner, as described above in other embodiments.

In many embodiments, machine 3500 can include a base 3510, a cradle 3520, and a slider 3530. Base 3510 can extend from a first end 3511 to a second end 3512. In some embodiments, base 3510 can be used with multiple different cradles, which can be used for different devices. Cradle 3520 can include a recess 3521 in which a device can be placed with screen facing upwards or away from recess 3521. Recess 3521 can have sides and a bottom, and cradle 3520 can have a thickness greater than the thickness of the device. In many embodiments, recess 3521 is conformal with the device.

In some embodiments, base 3510 can include an alignment base 3514. In many embodiments, alignment base 3514 can be one or more protrusions that can secure overlay applicator to base 3510, such as by engaging with alignment mechanisms 3557. In some embodiments, such as shown in FIGS. 35-36, alignment base 3514 can be located on base 3510 beyond the each end of cradle 3520. In other embodiments, alignment base 3514 can be located on cradle 3520, such as at each end of cradle 3520. In a number of embodiments, the lines of support between each side of alignment base 3514 can be in line with and within overlay applicator 3550. Alignment base 3514 and alignment mechanism 3557 can be configured and positioned such that when alignment mechanism 3557 is engaged with alignment base 3514, the overlay can be positioned directly above the screen of the device. In a number of embodiments, alignment base 3514 can be configured to secure overlay applicator 3550 slightly above the screen of the device.

In a number of embodiments, base 3510 can include a pull slot 3515. In many embodiments, pull slot 3515 is below one side of alignment base 3514. In many embodiments, pull tab 3555 can be inserted through pull slot 3515, which can allow pull tab 3555 to be pulled while overlay applicator 3550 is secured on alignment base 3514.

In some embodiments, overlay applicator 3550 can include a wiper (not shown), which can be similar to wiper 157 (FIG. 1), wiper 457 (FIGS. 4-5), wiper 657 (FIG. 6), wiper 757 (FIG. 7), and/or wiper 2857 (FIG. 28). The wiper can remove dust from the screen of the device. In other embodiments, after inserting the device in cradle 3520, a cloth (not shown), such as a microfiber cloth or another suitable cleaning cloth, which can have dimensions similar to pull tab 3555, can be draped across the screen of the device between the screen of the device and overlay applicator 3550. One end of the cloth can be inserted through pull slot 3515. In some embodiments, pull tab 3555 and the cloth can be inserted together through pull slot 3515, and as pull tab 3555 and the cloth are pulled, the cloth can remove dust from the screen of the device.

In many embodiments, pull tab 3555 can be pulled through pull slot 3515, and, in certain embodiments, along with a wiper, cloth, or sticker to clean the screen of the device, and the adhesive release liner can be removed to expose the adhesive on the overlay. In a number of embodiments, after the adhesive release liner is removed and the adhesive of the overlay is exposed, the overlay can be secured slightly above the screen of the device, such that adhesion between the overlay and the screen of the device does not occur. In other embodiments, the overlay can be secured at the screen of the device, such that adhesion can begin to occur upon removal of the adhesive release liner.

In some embodiments, base can include a track 3513 on each side, which can allow slider 3530 to move between first end 3511 to second end 3512. In many embodiments, slider 3530 can include slider side supports 3531. In a number of embodiments, slider side supports 3531 can include pins (not shown) that can engage in tracks 3513 and allow slider side supports 3531 to slide along tracks 3513. Slider side supports 3531 can be connected and/or held within tracks 3513 by a slider cross support 3532. In some embodiments, slider 3530 can include a handle 3533, which can be used to move slider 3530 back and forth between first end 3511 and second end 3512. Slider 3530 can include a pressure bar support 3534 on each side of a pressure bar 3535. Pressure bar supports 3534 can be spring loaded or elastically attached to slider cross support 3532 and/or slider side supports 3531 such that pressure bar 3535 can provide downward pressure. In various embodiments, base 3510 can include cams 3516 in the regions near alignment base 3514, which can raise pressure bar 3535 such that slider 3530 can move back and forth from first side 3511 to second side 3512 without interference from alignment base 3514.

In many embodiments, after pull tab 3555 is pulled and the adhesive release liner is partially or fully removed from the overlay, slider 3530 can be moved from first side 3511 partially or fully toward second side 3512 such that pressure bar 3535 provides downward pressure on protective film 3552 to adhere the overlay to the screen of the device, as shown in FIG. 36. Pressure bar 3535 can provide sufficient pressure to prevent and/or remove any air bubbles. In a number of embodiments, pressure bar 3535 can be a roller. In other embodiments, pressure bar 3535 can be a fixed bar that slides along the top of overlay applicator 3550. Machine 3500 can thus advantageously be used to accurately align the overlay on the screen of the device without dust or air bubbles.

Figure 37:
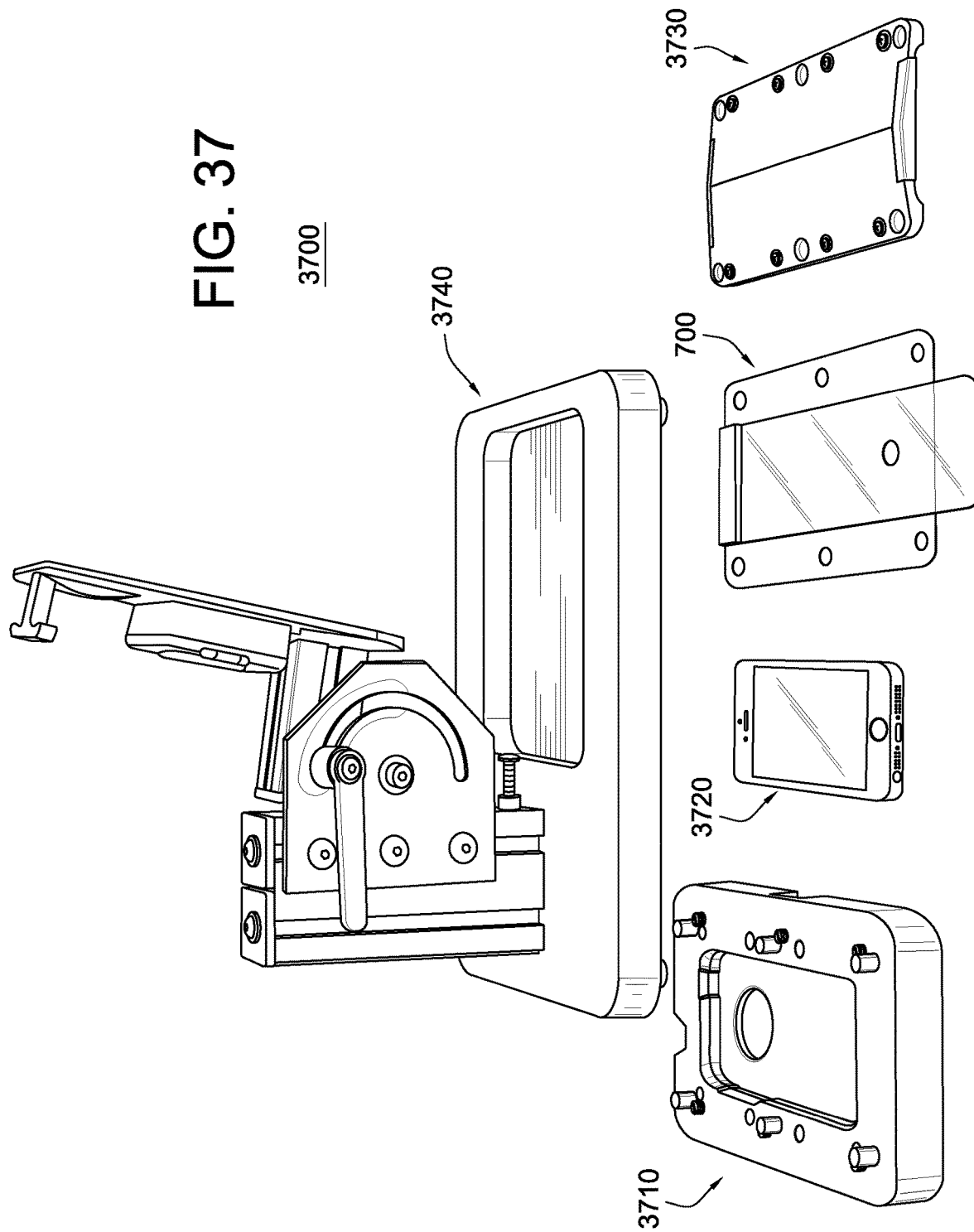
FIG. 37 illustrates a system for using an overlay applicator to apply an overlay to a device, according to an embodiment.

Turning ahead in the drawings, FIG. 37 illustrates a system 3700 for using an overlay applicator, such as overlay applicator 700 (FIG. 7), to apply an overlay, such as overlay 730 (FIG. 7), to a device. System 3700 is merely exemplary and embodiments of the system are not limited to embodiments presented herein. The system can be employed in many different embodiments or examples not specifically depicted or described herein. System 3700 can include overlay applicator 700, a cradle 3710, a device 3720 (e.g., a smart phone), a cradle frame 3730, and a machine 3740. Cradle 3710 can be similar to cradle 310 (FIG. 3), and various components and/or constructions of cradle 3710 can be substantially identical or similar to various components of cradle 300 (FIG. 3).

Figure 38:
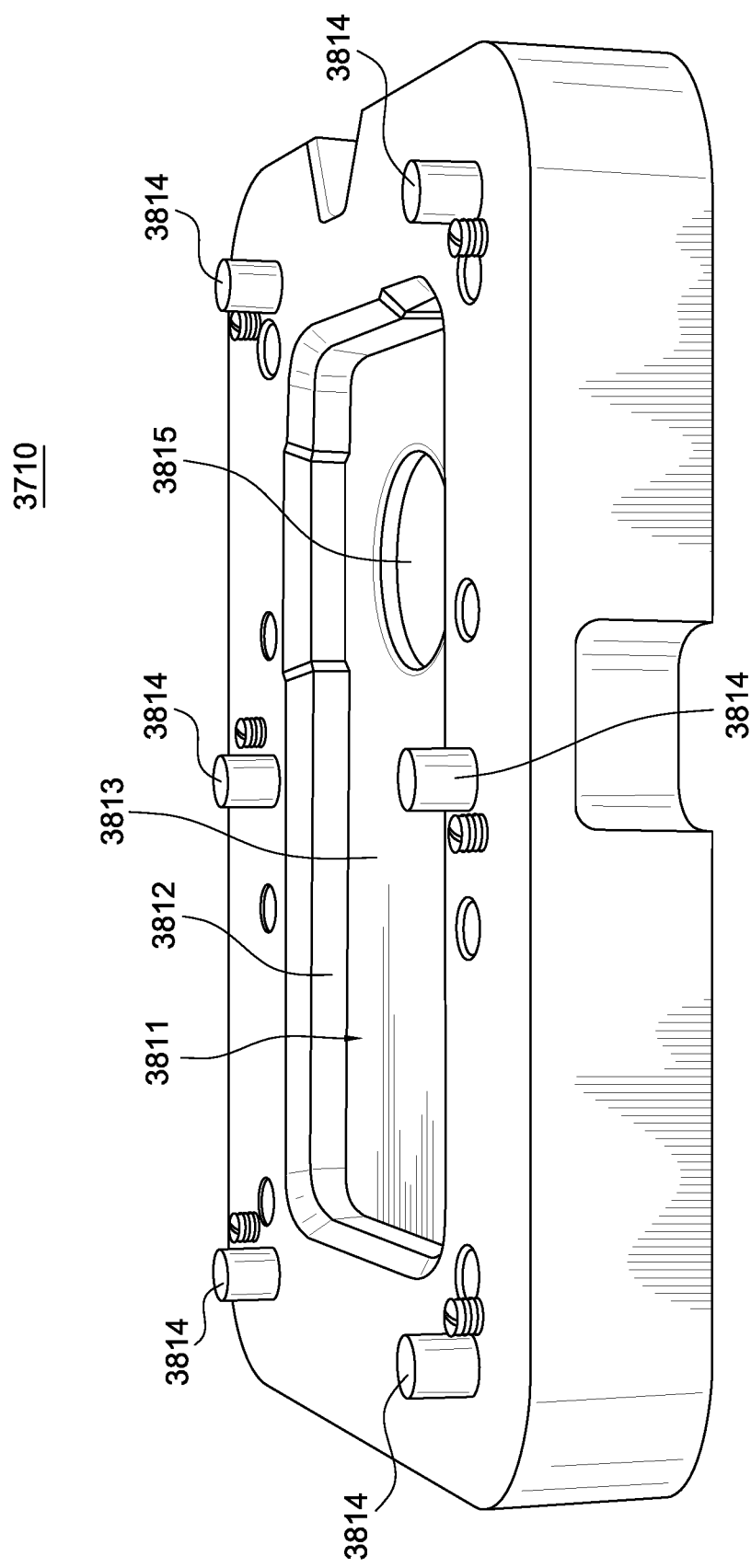
FIG. 38 illustrates a top side view of a cradle, according to the embodiment of FIG. 37.

Turning ahead in the drawings, FIG. 38 illustrates a top side view of cradle 3710. Cradle 3710 is merely exemplary and embodiments of the cradle are not limited to embodiments presented herein. The cradle can be employed in many different embodiments or examples not specifically depicted or described herein. Cradle 3710 can include a slot 3811 in which device 3720 (FIG. 37) can be placed with the screen of device 3720 (FIG. 37) facing upwards or away from slot 3811. In some embodiments, slot 3811 is conformal with device 3720 (FIG. 37). Slot 3811 can have sides 3812 and a bottom 3813. Cradle 3710 can have a thickness greater than the thickness of device 3720 (FIG. 37). In many embodiments, cradle 3710 can include an alignment base 3814, which can engage with alignment mechanism 715 (FIG. 7). In some embodiments, alignment base 3814 can be one or more protrusions that can fit inside the one or more slots of alignment mechanism 715 (FIG. 7). For example, as shown in FIG. 7, alignment mechanism 715 (FIG. 7) can include six holes spaced relatively evenly around alignment frame 710 (FIG. 7). Alignment base 3814 can include six protrusions configured to engage with the six holes of alignment mechanism 715 (FIG. 7). In some embodiments, the protrusions of alignment base 3814 can be spring loaded. Alignment base 3814 and alignment mechanism 715 (FIG. 7) can be configured and positioned such that when alignment mechanism 715 (FIG. 7) is engaged with alignment base 3814, overlay 730 (FIG. 7) can be positioned directly above the screen of device 3720 (FIG. 37) in slot 3811, and aligned such that overlay 730 (FIG. 7) will be adhered in an accurate position on the screen when adhesive release liner 740 (FIG. 7) is removed. In certain embodiments, cradle 3710 can include a bottom aperture 3815, which can facilitate removal of device 3720 (FIG. 37) from cradle 3710.

Figure 39:
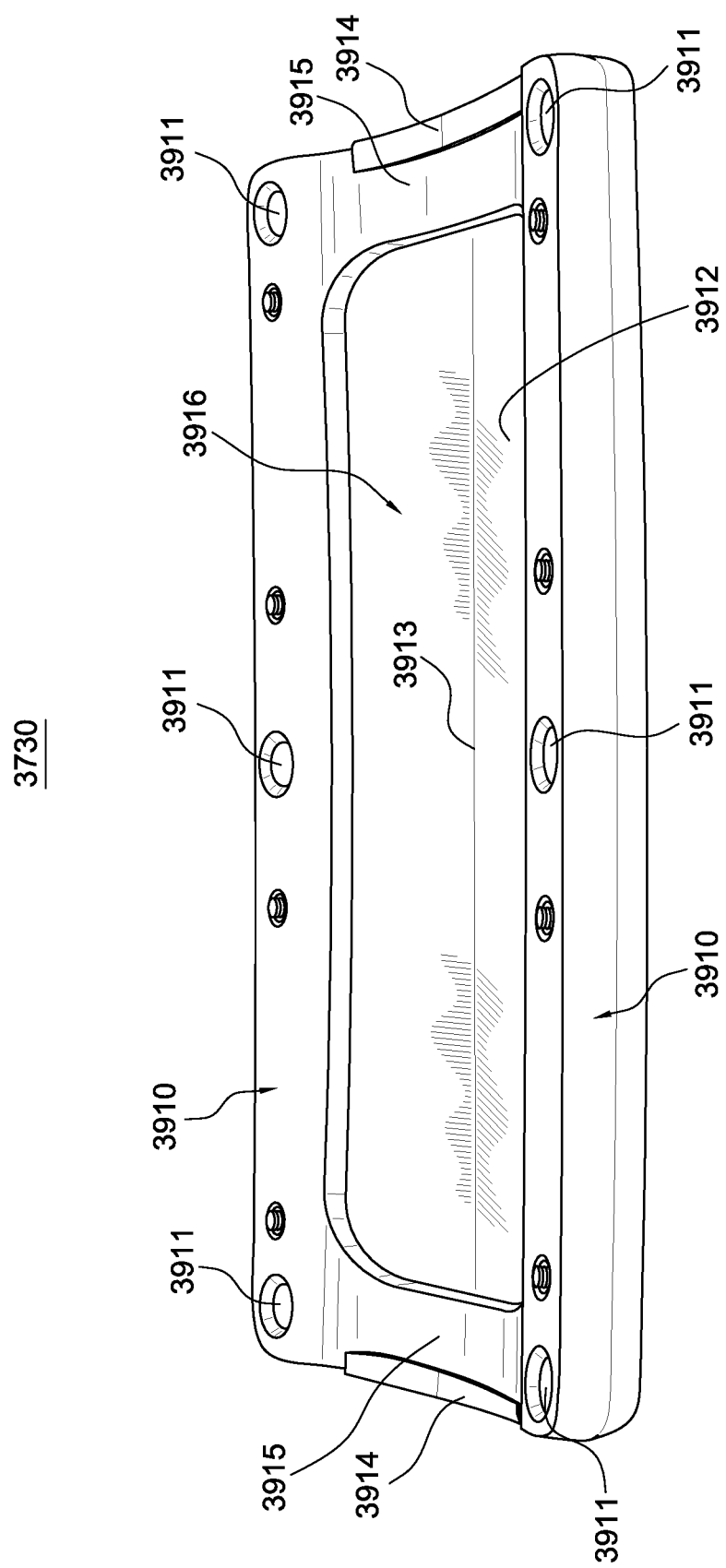
FIG. 39 illustrates a top side view of a cradle frame, according to the embodiment of FIG. 37.
Figure 40:
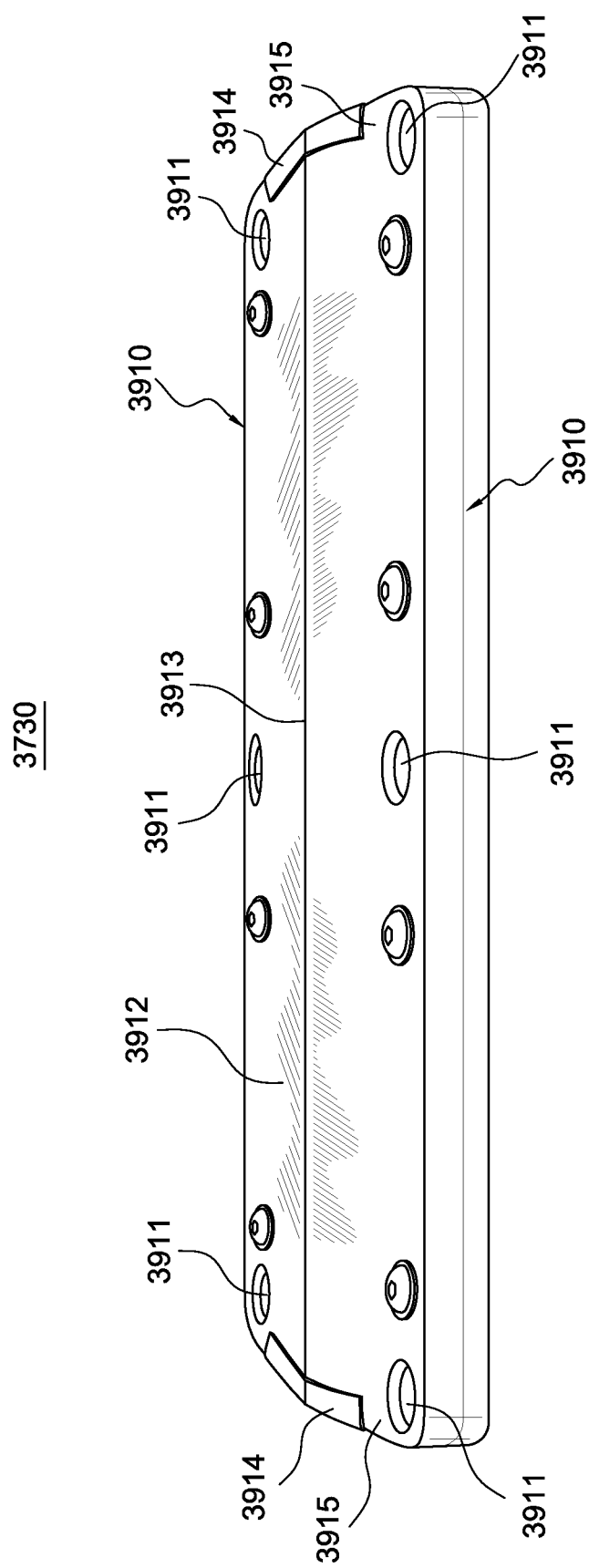
FIG. 40 illustrates a bottom side view of the cradle frame of FIG. 39.

Turning ahead in the drawings, FIG. 39 illustrates a top side view of cradle frame 3730. FIG. 40 illustrates a bottom side view of cradle frame 3730. Cradle frame 3730 is merely exemplary and embodiments of the cradle frame are not limited to embodiments presented herein. The cradle frame can be employed in many different embodiments or examples not specifically depicted or described herein. In some embodiments, cradle frame 3730 can include side frames 3910, which can include alignment holes 3911 that can engage with alignment base 3814 (FIG. 38). Cradle frame 3730 can include a bottom plate 3912, which can be bent at a crease 3913 midway between the two sides and extending partially or fully from one end to the other end of cradle frame 3730. Bottom plate 3912 can be made of a flexible or semi-flexible plastic. In various embodiments, the bend in bottom plate 3912 at crease 3913 can be maintained by end caps 3914, which can be centered at each end of cradle frame 3730. End caps 3914 can be made of a rigid material, such as a rigid metal or polycarbonate (PC). In many embodiments, cradle frame 3730 can include end frames 3915 extending at each end of cradle frame 3730 between side frames 3910. In certain embodiments, end frame 3915 can be less thick than side frames 3710, which can allow flexibility for bottom plate 3912 to be depressed and semi-flexibly bent downward, such as in the region of crease 3913. In a number of embodiments, cradle frame 3730 can include a recess 3916 between side frames 3910 and end frames 3915, and bounded at the bottom by bottom plate 3912. Recess 3916 can have dimensions substantially similar to overlay 730 (FIG. 7) and/or the screen of device 3720 (FIG. 37).

Figure 41:
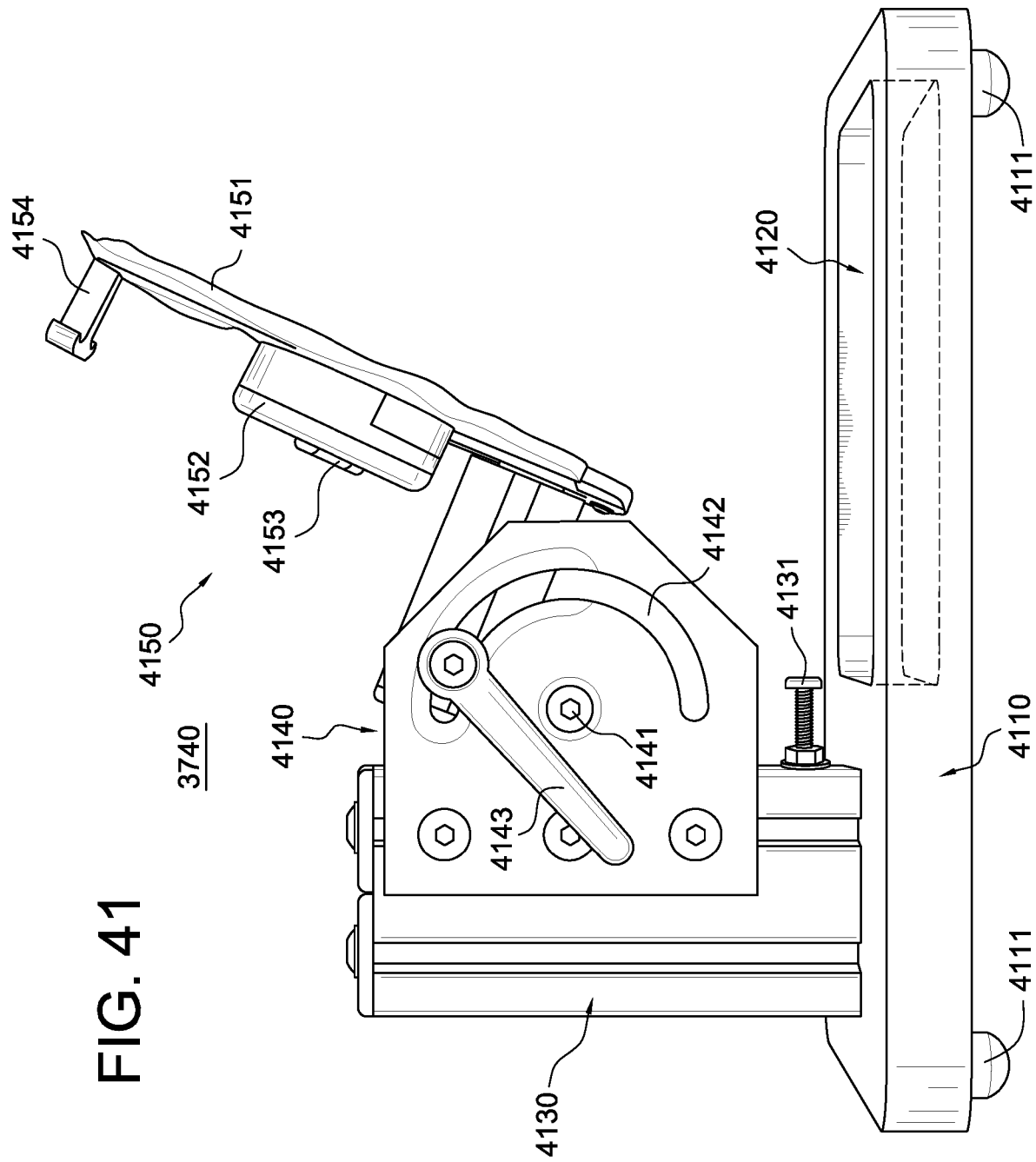
FIG. 41 illustrates a left side view of a machine in an open configuration, according to the embodiment of FIG. 37.

Turning ahead in the drawings, FIG. 41 illustrates a left side view of machine 3740 with the arm in a raised configuration. Machine 3740 is merely exemplary and embodiments of the machine are not limited to embodiments presented herein. The machine can be employed in many different embodiments or examples not specifically depicted or described herein. In many embodiments, machine 3740 can include a base 4110, a cradle support 4120, a stand 4130, a hinge assembly 3740, and an arm 4150. In many embodiments, base 4110 can provide a sturdy support base for machine 3740. In certain embodiments, base 4110 can include feet 4111 made from an elastomeric material for non-slip, cushioned, and/or balanced support. In some embodiments, cradle support 4120 can be a recess in base 4110, as shown in FIG. 41. Cradle support 4120 can be configured to hold a cradle, such as cradle 3710 (FIGS. 37-38). Cradle support 4120 can be used with various different cradles, which can be configured for different devices.

Figure 44:
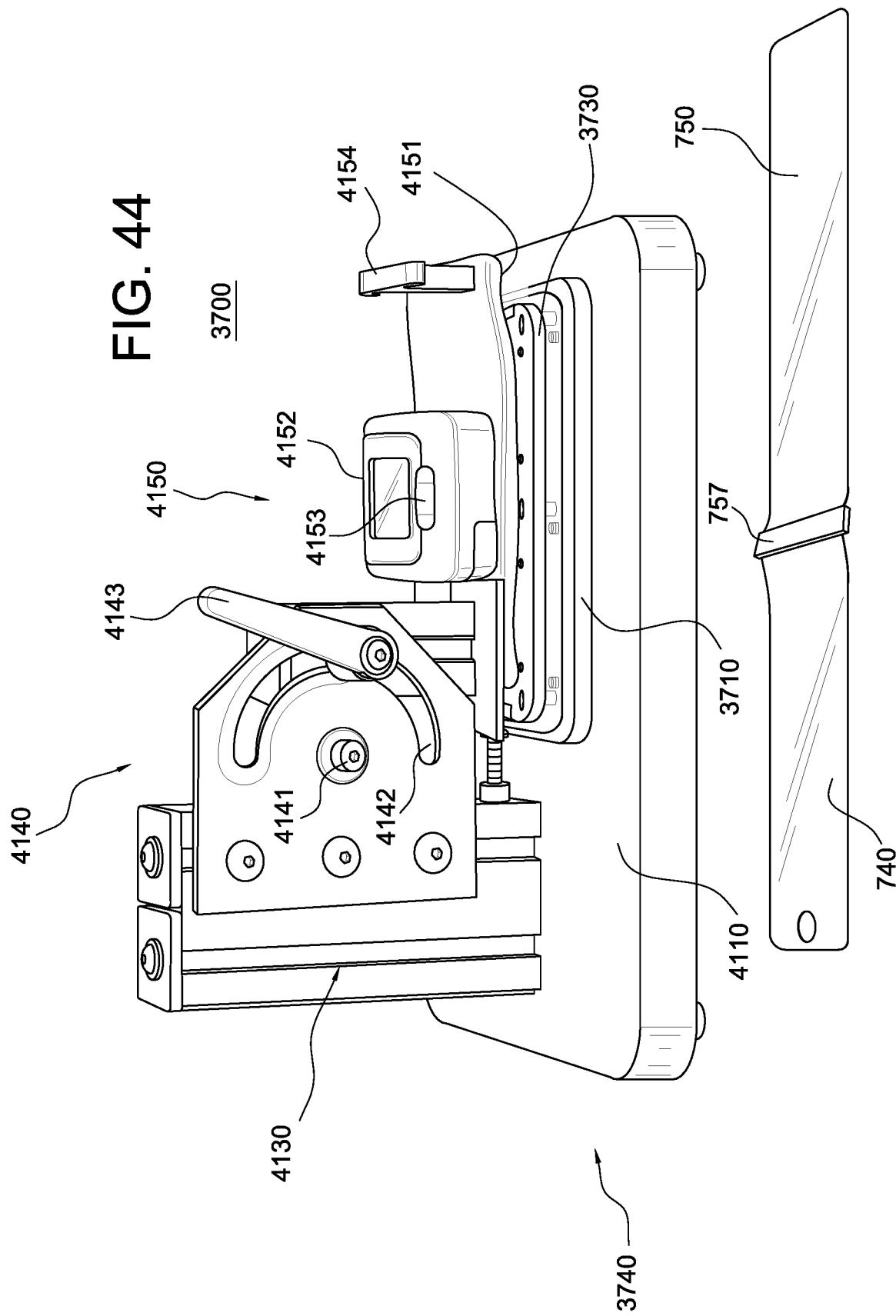
FIG. 44 illustrates the system of FIG. 37 with the machine in a closed configuration.

In many embodiments, stand 4130 can provide support for arm 4150. In certain embodiments, stand 4130 can extend upright from base 4110, and, in some embodiments, can be substantially perpendicular to base 4110. Stand 4130 can be connected to arm 4150 at hinge assembly 4140. In many embodiments, hinge assembly 4140 can include a hinge axis 4141. In some embodiments, hinge assembly 4140 can include a hinge track 4142 to allow arm 4150 to move along a predetermined arc. In a number of embodiments, hinge assembly 4140 can include a hinge clamp 4143, which can allow arm 4150 to be secured at desired and/or predetermined positions. For example, arm 4150 can be raised to a raised configuration, as shown in FIG. 41, or lowered to a lowered position, as shown in FIG. 44, described below. When arm 4150 is raised, cradle 3710 (FIGS. 37-38) can be inserted or removed from cradle support 4120. When arm 4150 is lowered, overlay applicator 700 (FIGS. 7, 37) can be used apply overlay 730 (FIG. 7), as described below. In some embodiments, stand 4130 can include a positioning piece 4131, which can prevent arm 4150 from lowering below a predetermined position.

In certain embodiments, arm 4150 can include a handle 4154, which can be used to assist in raising and/or lowering arm 4150 when hinge assembly 4140 is unclamped. In some embodiments, arm 4150 can include an expandable bladder 4151, such as an air bladder. In many embodiments, expandable bladder 4151 can be connected to a pumping mechanism 4152, which can fill expandable bladder 4151 with air, as shown in FIG. 44, described below. In certain embodiments, expandable bladder 4151 and/or pumping mechanism 4152 can be a part of a portable (e.g., battery powered) blood pressure monitor and cuff, which can include a microprocessor and a start/stop button 4153 to initiate or terminate the inflation and/or deflation of expandable bladder 4151 with air.

Figure 42:
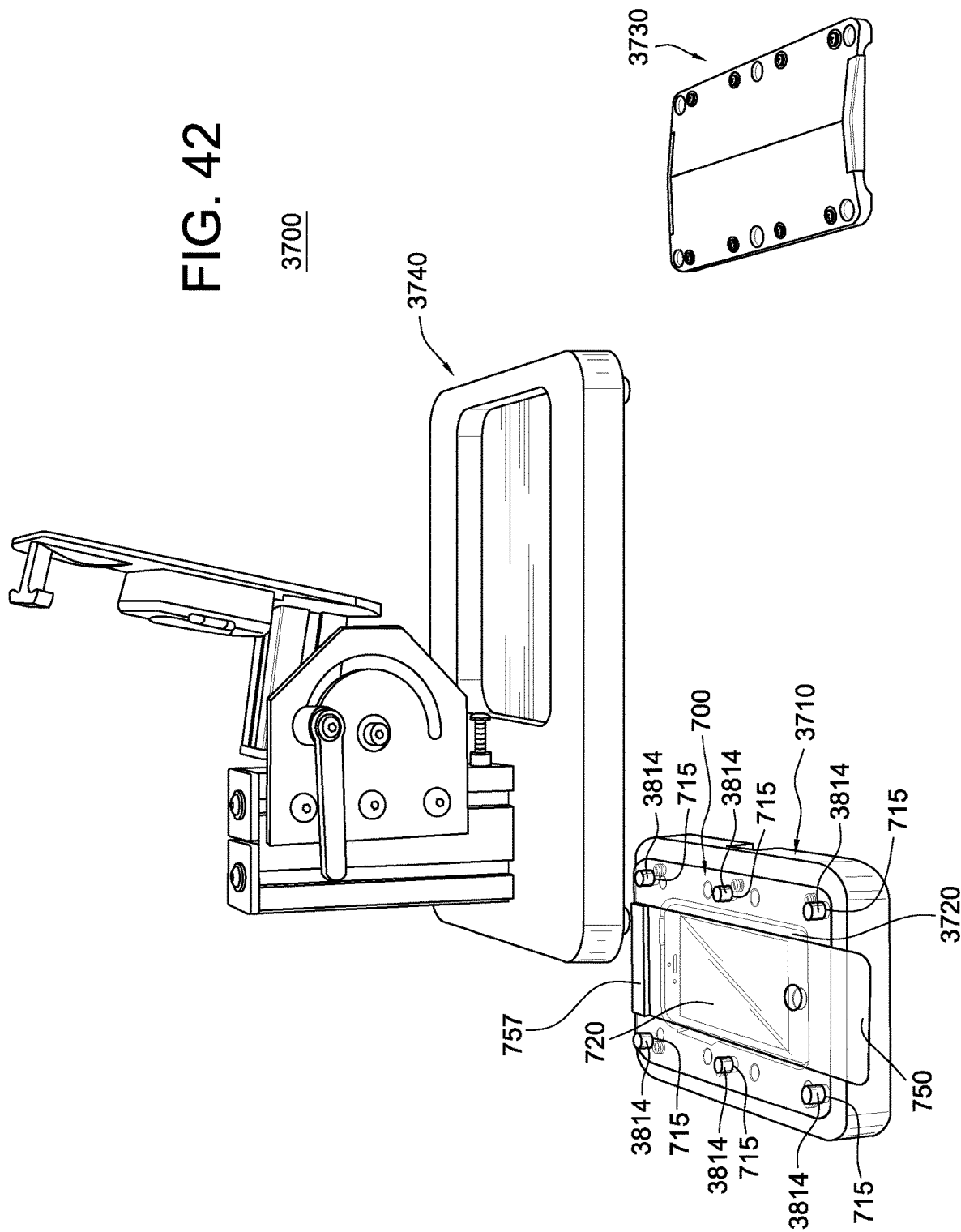
FIG. 42 illustrates the system of FIG. 37 with the device placed in the cradle.

Turning ahead in the drawings, FIGS. 42-45 illustrate using system 3700 with machine 3740, cradle 3710, overlay applicator 700, and cradle frame 3730 to apply overlay 730 (FIG. 7) to device 3720. FIG. 42 illustrates machine 3740, cradle frame 3730, device 3720 located in cradle 3710, and overlay applicator 700 located on cradle 3710 above device 3720. In many embodiments, device 3720 can be placed in slot 3811 in cradle 3710 with the screen facing upwards or away from slot 3811, as shown in FIG. 42. After placing device 3720 in cradle 3710, overlay applicator 700 can be placed on cradle 3710 above device 3720 (FIG. 37), with protective film 720 facing up and above overlay 730 (FIG. 7), adhesive release liner 740 (FIG. 7), and pull tab 750. In many embodiments, pull tab 750 and wiper 757 can be facing downward, and resting upon or proximate to the screen of device 3720 (FIG. 37). In some embodiments, overlay applicator 700 can be secured to cradle 3710 by alignment base 3814 engaging with alignment mechanism 715.

Figure 43:
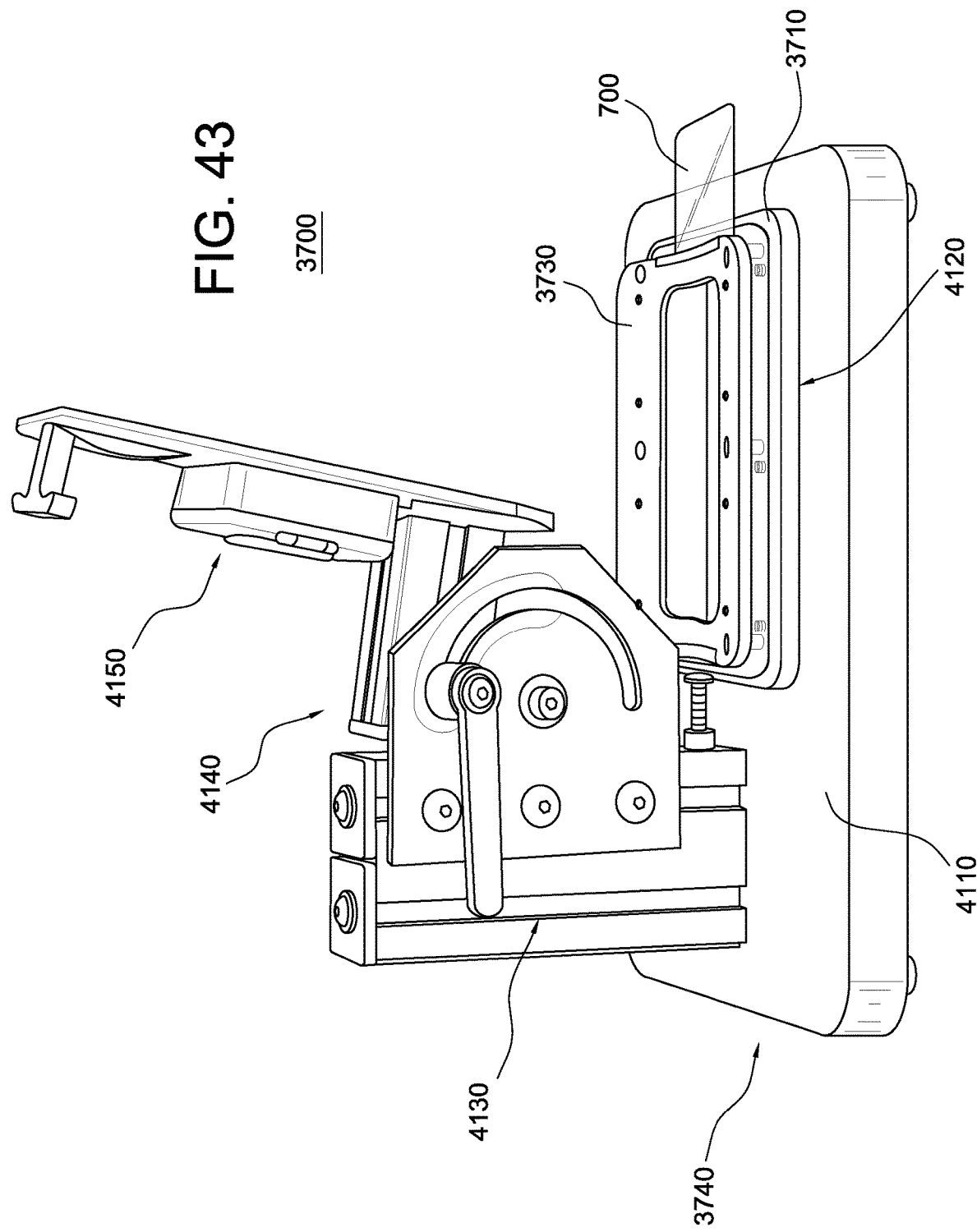
FIG. 43 illustrates the system of FIG. 37 with the cradle placed in the machine.

FIG. 43 illustrates cradle 3710 located in cradle support 4120 of machine 3740, with cradle frame 3730 upon cradle 3710. Cradle frame 3730 can be placed upon cradle 3710 above overlay applicator 700 and device 3720 (FIG. 37). In some embodiments, bottom plate 3912 (FIGS. 39-40) can protrude slightly downward toward overlay applicator 700. In various embodiments, alignment holes 3911 (FIGS. 39-40) can engage with alignment base 3814 (FIG. 38) to secure cradle frame 3730 to cradle 3710. Cradle 3710, along with device 3720 (FIG. 37), overlay applicator 700, and cradle frame 3730, as assembled as described above, can be placed in cradle support 4120 of machine 3740. In many embodiments, arm 4150 of machine 3740 can be in a raised position to facilitate insertion of cradle 3710 in cradle support 4120.

FIG. 44 illustrates machine 3740 with arm 4150 in a lowered position and expandable bladder 4151 filled, and with pull tab 750 and adhesive release liner 740 removed. In many embodiments, arm 3850 can be lowered to a lowered position, as shown in FIG. 44. In many embodiments, hinge clamp 4143 can be disengaged to allow arm 4150 to rotate along hinge track 4142 around hinge axis 4141 to the lowered position, and then reengaged at the lowered position. In several embodiments, handle 4154 can be used to assist lowering arm 4150. In various embodiments when arm 4150 is in a lowered position, expandable bladder 4151 can rest upon cradle frame 3730, and, in some embodiments, can rest within recess 3916 (FIG. 39).

In some embodiments, pull tab 750 can be pulled to remove adhesive release liner 740 from the adhesive side of overlay 730 (FIG. 7). In many embodiments, as pull tab 750 is pulled, wiper 757 can wipe across the screen of device 3720 (FIG. 37) to remove any dust. In some embodiments, bottom plate 3912 (FIG. 39) of cradle frame 3730 can be positioned so as to provide enough pressure on wiper 757 such that wiper 757 can stay in contact with the screen of device 3720 (FIG. 37) and effectively clean off any dust. In many embodiments, after pull tab 750 has been pulled out and adhesive release liner 740 has been removed from covering overlay 730 (FIG. 7), overlay 730 (FIG. 7) can be secured such that it remains above and does not adhere to the screen of device 3720 (FIG. 37).

In many embodiments, pumping mechanism 4152 can be activated to fill expandable bladder 4151. In many embodiments, start/stop button 4153 can be activated to fill expandable bladder 4151 with air. As shown in FIG. 44, expandable bladder 4151 can expand as it fills with air. In some embodiments, the expansion of expandable bladder 4151 can provide downward force on bottom plate 3912 (FIG. 39). Crease 3913 (FIG. 39) can push down on overlay applicator 700 (FIG. 7) such that overlay 730 (FIG. 7) can begin to adhere to the screen of device 3720 (FIG. 37) along the center line between the sides of device 3720 (FIG. 37). As expandable bladder 4151 continues to inflate, other regions of bottom plate 3912 (FIG. 39) can press down on overlay 730 (FIG. 7), extending outward from the center. Beginning the adhesion of overlay 730 (FIG. 7) to device 3720 (FIG. 37) at the center of device 3720 (FIG. 37) can advantageously allow the remainder of overlay 730 (FIG. 7) to be accurately adhered to the screen of device 3720 (FIG. 37) without wrinkles and/or with minimal or no bubbles.

Figure 45:
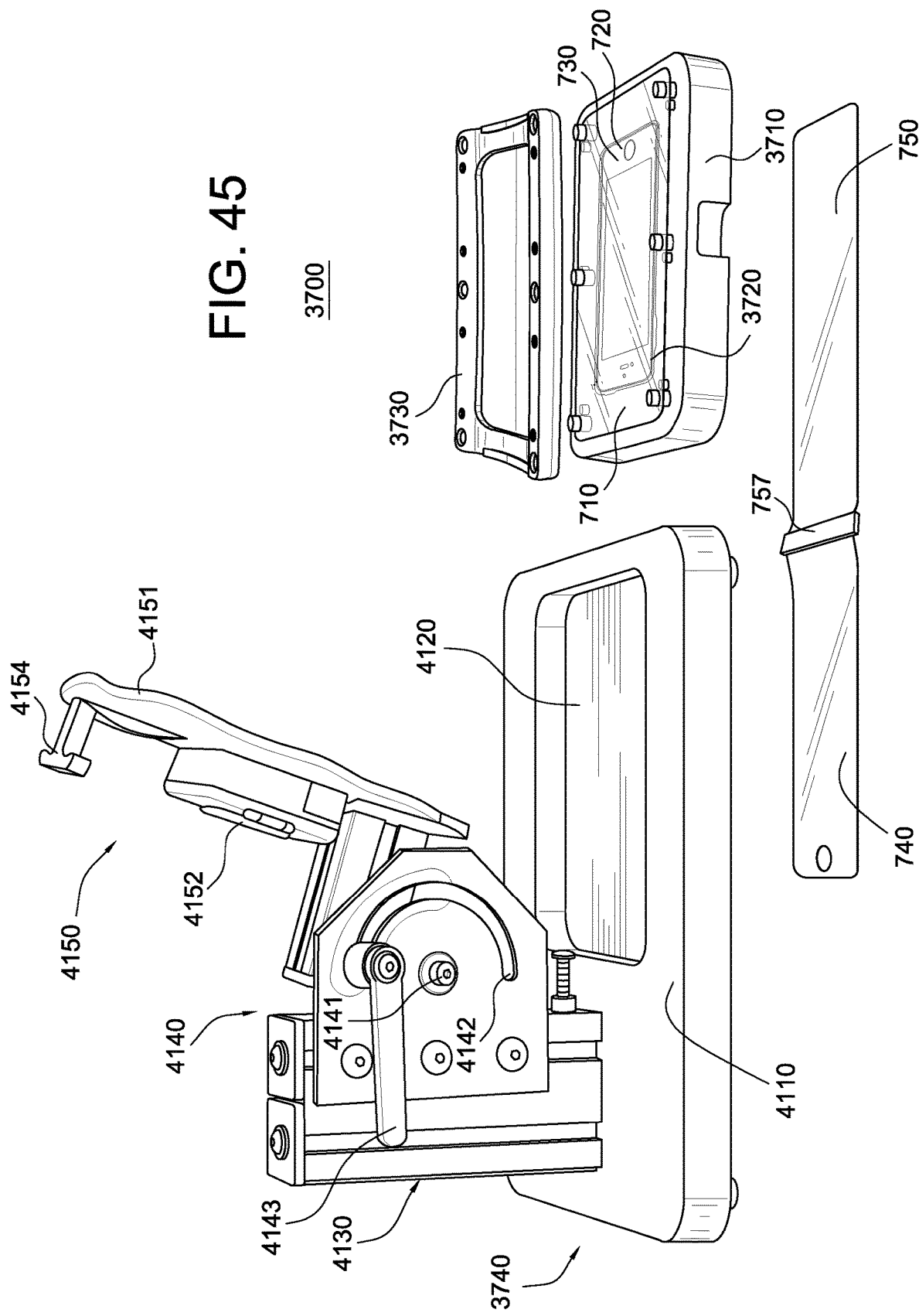
FIG. 45 illustrates the system of FIG. 37 with the machine in an open configuration.

FIG. 45 illustrates machine 3740 with arm 4150 in a raised position, with cradle 3710 removed from cradle support 4120, with cradle frame 3730 removed off of cradle 3710, and with pull tab 750 and adhesive release liner 740 removed. In many embodiments, pumping mechanism 4152 can be deactivated to stop the inflation of expandable bladder 4151 and/or to begin the deflation of expandable bladder 4151. In many embodiments, start/stop button 4153 can be deactivated to deflate expandable bladder 4151. In other embodiments, pumping mechanism 4152 can be pre-programmed to stop the inflation of expandable bladder 4151 and to begin the deflation of expandable bladder 4151 after expandable bladder reaches a predetermined level of inflation.

In several embodiments, arm 4150 can be raised to a raised position. In many embodiments, hinge clamp 4143 can be disengaged to allow arm 4150 to rotate along hinge track 4142 around hinge axis 4141 to the raised position, and then reengaged at the raised position. In many embodiments, handle 4154 can help facilitate moving arm 4150. Arm 4150 of machine 3740 can be in a raised position to facilitate removal of cradle 3710 from cradle support 3720 of machine 3740.

In a number of embodiments, cradle 3710 can be removed, along with device 3720, overlay applicator 700 (FIG. 7), and cradle frame 3730 from cradle support 4120 of machine 3740. In several embodiments, cradle frame 3730 can next be removed from cradle 3710 to uncover protective film 720 and alignment frame 710, which in many embodiments can be integral with protective film 720, as described above. In some embodiments, device 3720, along with the protective film 720, alignment frame 710, and overlay 730, can be removed from cradle 3710. In many embodiments, removal of device 3720 can be accomplished by manually reaching through bottom aperture 3815 (FIG. 38) of cradle 3710 to push upward or away from bottom aperture 3815 on device 3720. In a number of embodiments, alignment frame 710 and protective film 720 can be peeled away from overlay 730, which is adhered to device 3720. After alignment frame 710 and protective film 720 have been peeled away from overlay 730, application of overlay 730 to the screen of device 3720 can be complete.

Figure 46:
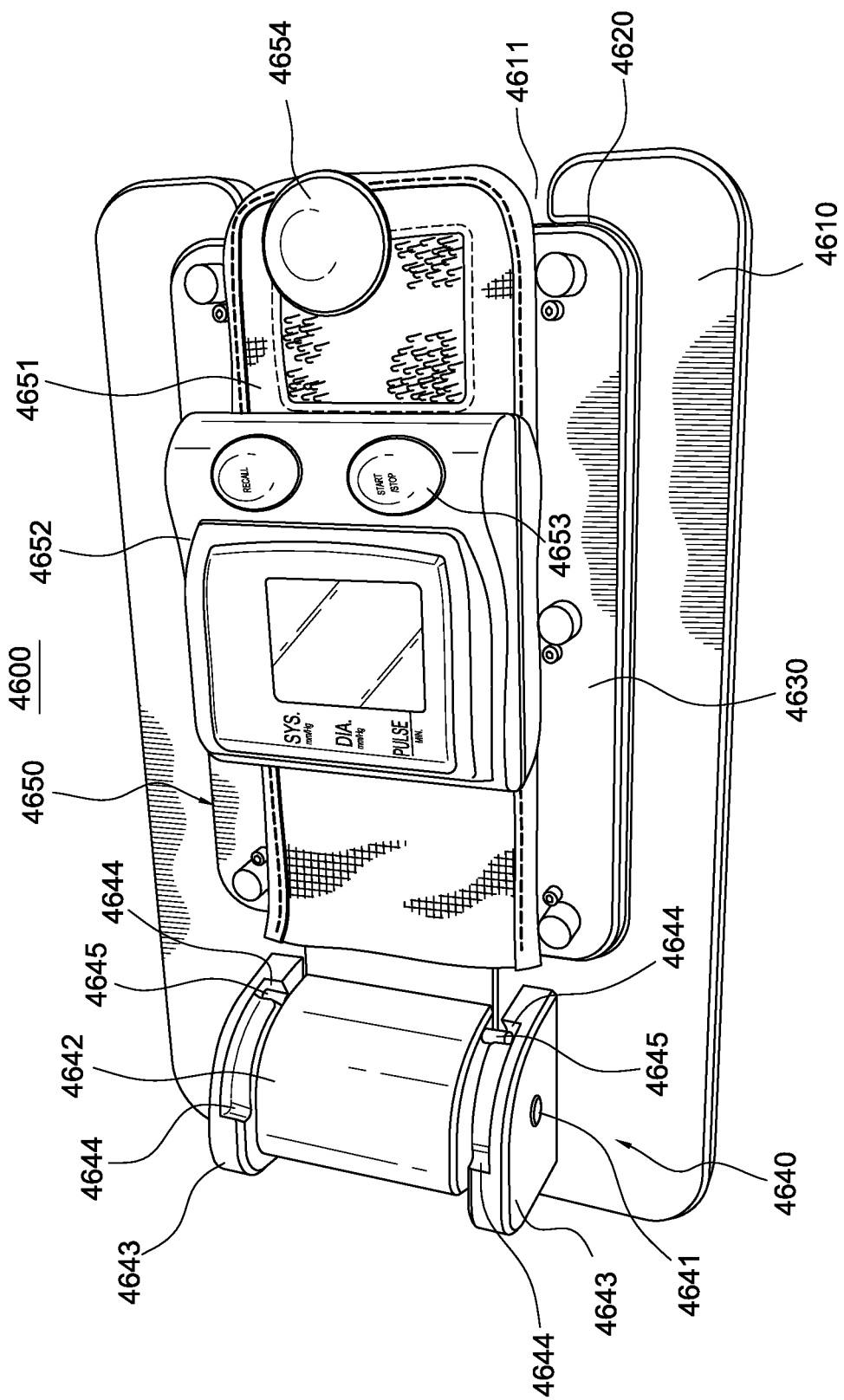
FIG. 46 illustrates a perspective view of a machine in a closed configuration, according to another embodiment.
Figure 47:
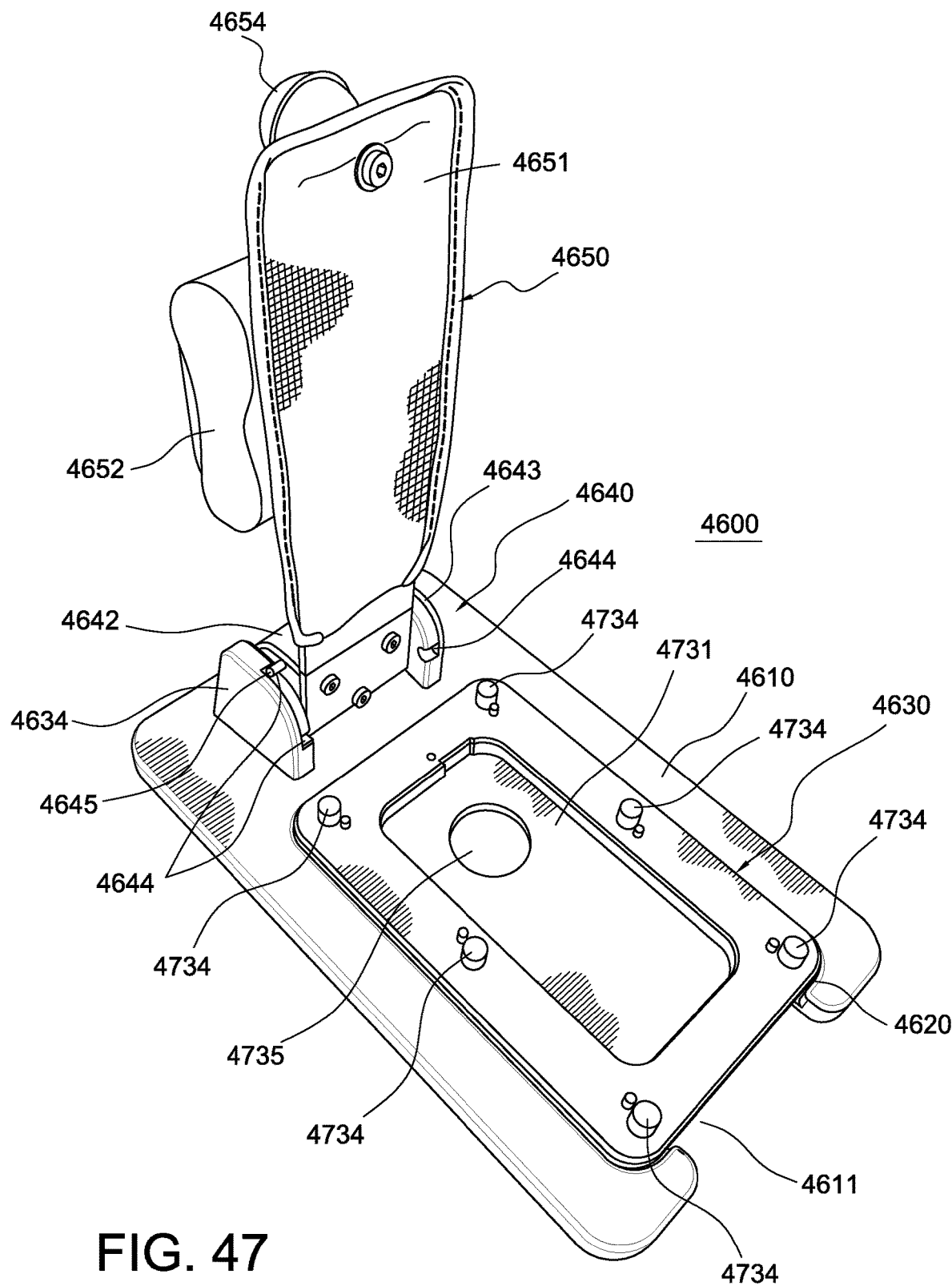
FIG. 47 illustrates a perspective view of the machine of FIG. 46 in an open configuration.

Turning ahead in the drawings, FIG. 46 illustrates a perspective view of a machine 4600 in a closed configuration. FIG. 47 illustrates a perspective view of machine 4600 in an open configuration. Machine 4600 can be used with an overlay applicator to apply an overlay to a device. Machine 4600 is merely exemplary and embodiments of the machine are not limited to the embodiments presented herein. The machine can be employed in many different embodiments or examples not specifically depicted or described herein. In various embodiments, machine 4600 can include a base 4610, a cradle support 4620, a cradle 4630, a hinge assembly 4640, an arm 4650.

In many embodiments, base 4610 can provide a sturdy support base for machine 4600. In some embodiments, cradle support 4620 can be a recess in base 4610. In a number of embodiments, base 4610 can include an indented region 4611, which can extend partially along a side of base 4610 and/or cradle support 4620, and which can facilitate removal of cradle 4630 from cradle support 4620. Cradle support 4620 can be configured to hold a cradle, such as cradle 4630. In various embodiments, cradle support 4620 can be used interchangeably with various different cradles, such as cradles configured for various different devices.

Cradle 4630 can be similar to cradle 3710 (FIGS. 37-38), and various components and/or constructions of cradle 4630 can be substantially identical or similar to various components of cradle 3710 (FIGS. 37-38). Cradle 4630 can be configured to be used with an overlay applicator, such as overlay applicator 700 (FIG. 7). As shown in FIG. 47, cradle 4630 can include a slot 4731 in which a device can be placed with the screen of the device facing upwards or away from slot 4731. In some embodiments, slot 4731 can be conformal with the device. Cradle 4630 can have a thickness greater than the thickness of the device. In many embodiments, cradle 4630 can include an alignment base 4734, which can engage with an alignment mechanism, such as alignment mechanism 715 (FIG. 7), of an overlay applicator, such as overlay applicator 700 (FIG. 7). In some embodiments, alignment base 4734 can be one or more protrusions that can fit inside the one or more slots of alignment mechanism 715 (FIG. 7). For example, as shown in FIG. 7, alignment mechanism 715 (FIG. 7) can include six holes spaced relatively evenly around alignment frame 710 (FIG. 7). Alignment base 4734 can include six protrusions configured to engage with the six holes of alignment mechanism 715 (FIG. 7). In some embodiments, the protrusions of alignment base 4734 can be spring loaded. Alignment base 4734 and alignment mechanism 715 (FIG. 7) can be configured and positioned such that when alignment mechanism 715 (FIG. 7) is engaged with alignment base 4734, overlay 730 (FIG. 7) can be positioned directly above the screen of the device in slot 4731, and aligned such that overlay 730 (FIG. 7) will be adhered in an correct position on the screen when adhesive release liner 740 (FIG. 7) is removed. In certain embodiments, cradle 4630 can include a bottom aperture 4735, which can facilitate removal of the device from cradle 4630.

In many embodiments, base 4610 can be connected to arm 4650 at hinge assembly 4640. In many embodiments, hinge assembly 4640 can allow arm 4650 to rotate relative to base 4610. In some embodiments, hinge assembly 4640 can lock in two positions, which can allow arm to be held at a raised position and at a lowered position. Hinge assembly 4640 can include a hinge axle 4641, which can connect a hinge central member 4642 to side supports 4643 through a hinge axis of rotation. In several embodiments, hinge side supports 4643 can include notches 4644, and hinge central member 4642 can include a locking rod 4645, which can engage in notches 4644 to lock hinge assembly 4640 such that arm 4650 can be held at a raised position and/or at a lowered position. In many embodiments, locking rod 4645 can have a spring-loaded bias to remain in notches 4644. Arm 4650 can be raised to a raised configuration, as shown in FIG. 47, or lowered to a lowered position, as shown in FIG. 46. When arm 4650 is raised, cradle 4630 can be inserted or removed from cradle support 4620. When arm 4650 is lowered, overlay applicator 700 (FIG. 7) can be used apply overlay 730 (FIG. 7), as described below.

In certain embodiments, arm 4650 can include a handle 4654, which can be used to assist in raising and/or lowering arm 4650 with respect to base 4610 about hinge assembly 4640. In some embodiments, arm 4650 can include an expandable bladder 4651, such as an air bladder. In many embodiments, expandable bladder 4651 can be connected to a pumping mechanism 4652, which can fill expandable bladder 4651 with air. Pumping mechanism 4652 can be similar or identical to pumping mechanism 4152 (FIG. 41), and/or expandable bladder 4651 can be similar or identical to expandable bladder 4151 (FIG. 41). In certain embodiments, expandable bladder 4651 and/or pumping mechanism 4652 can be a part of a portable (e.g., battery powered) blood pressure monitor and cuff, which can include a microprocessor and a start/stop button 4653 to initiate or terminate the inflation and/or deflation of expandable bladder 4651 with air.

Figure 48:
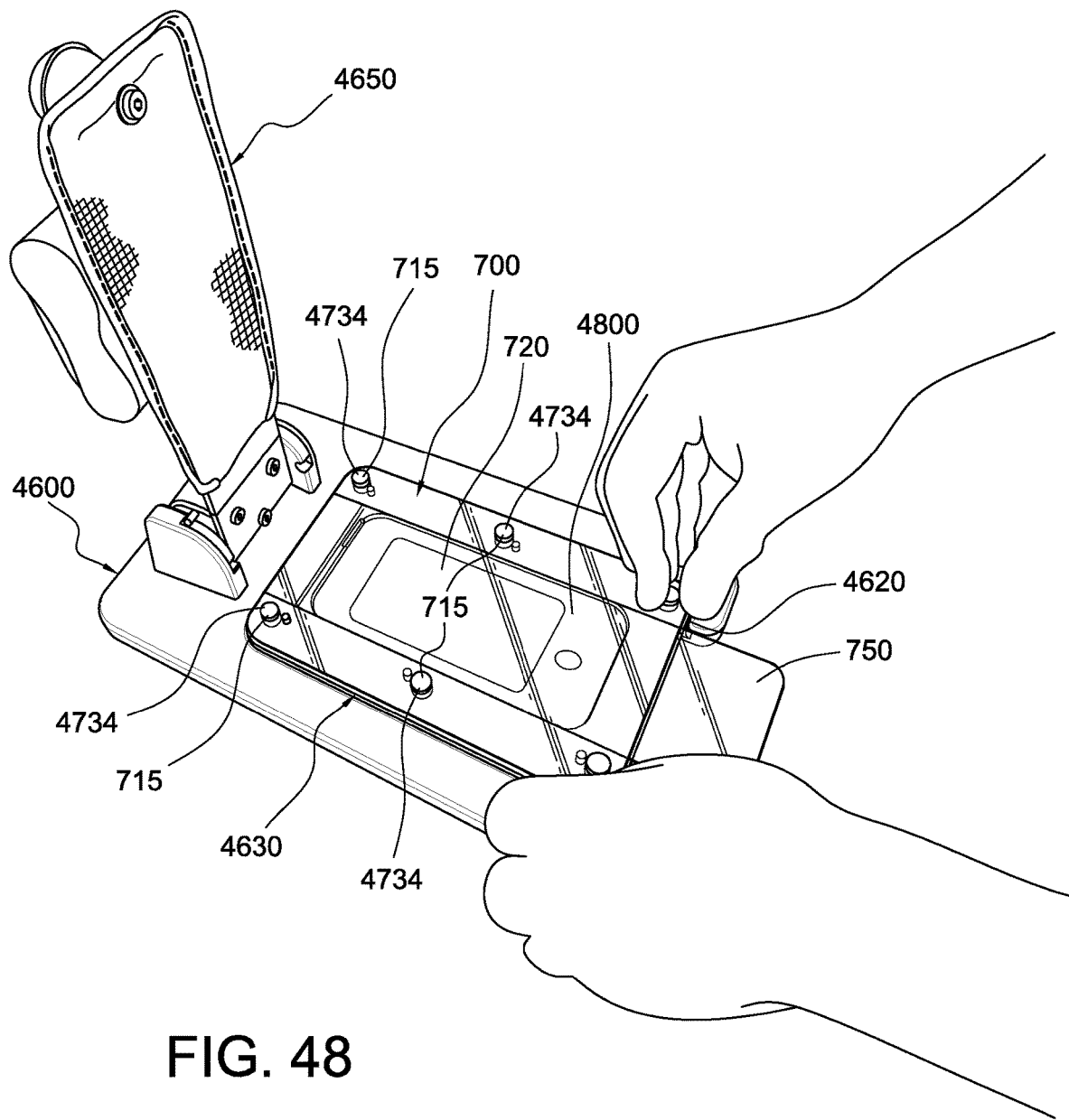
FIG. 48 illustrates a perspective view of the machine of FIG. 46 in an open configuration with a device in the cradle and an overlay applicator above the device on the cradle.
Figure 49:
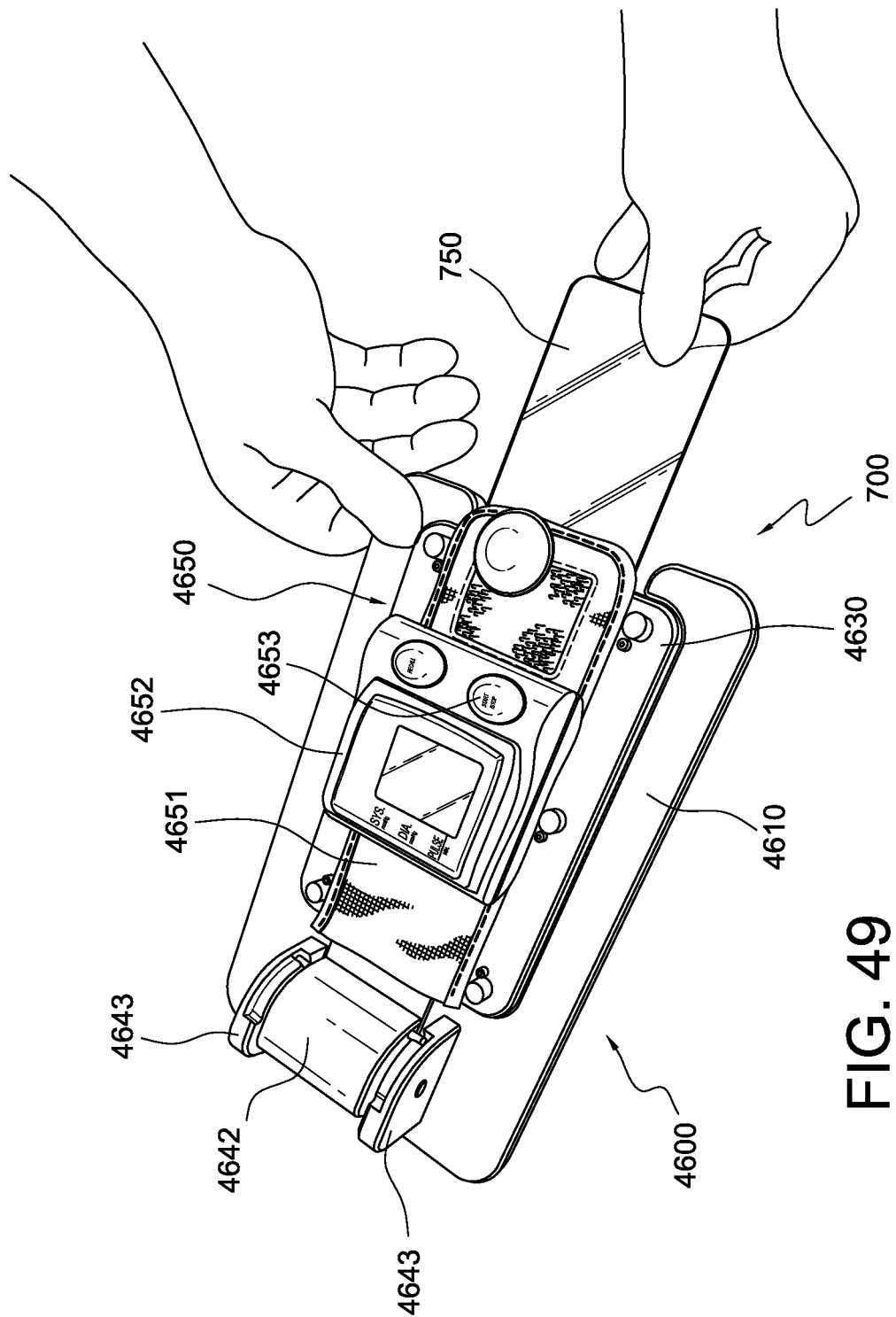
FIG. 49 illustrates a perspective view of the machine of FIG. 46 in a closed configuration with the pull tab of the overlay applicator being pulled.
Figure 50:
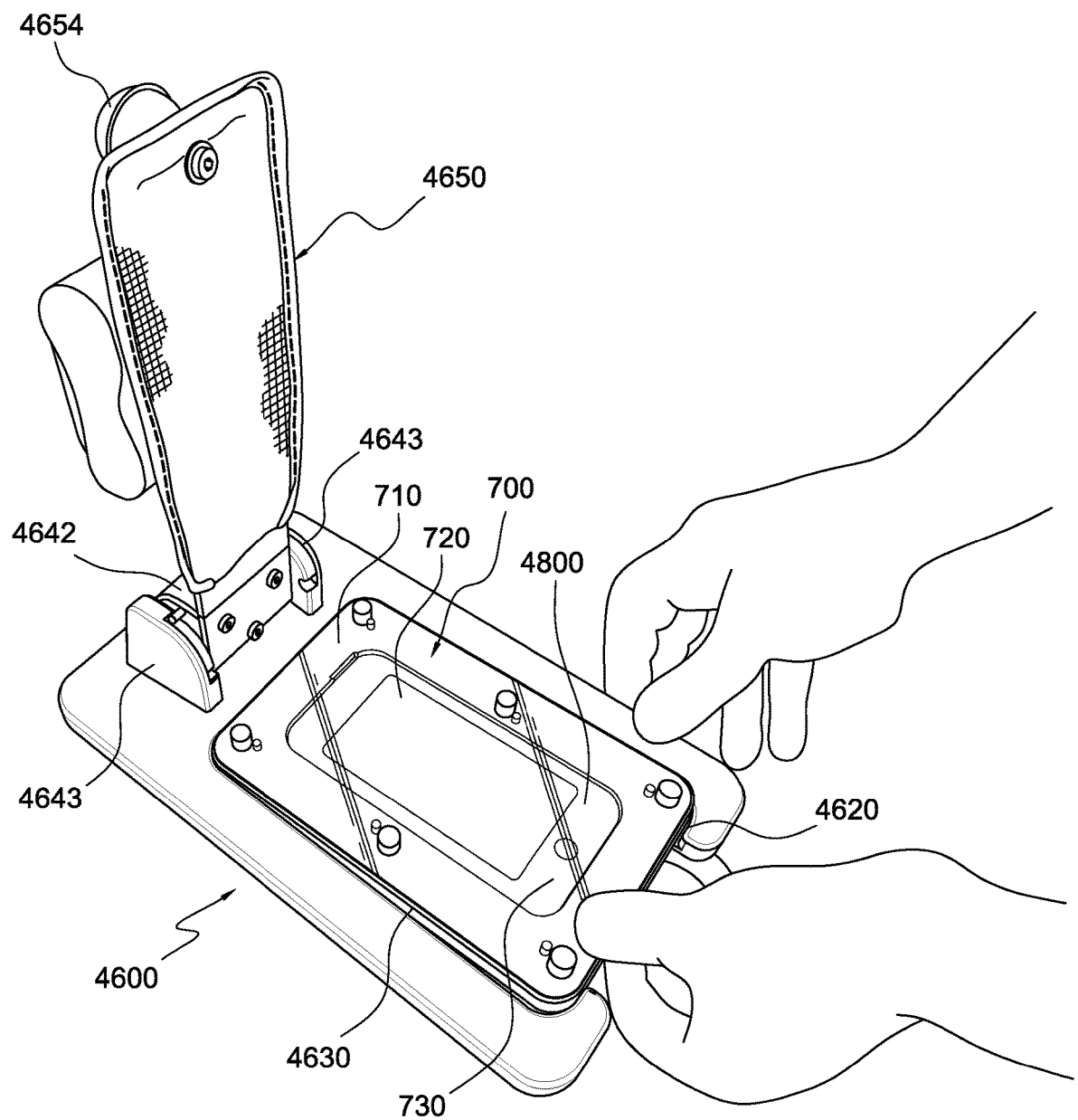
FIG. 50 illustrates a perspective view of the machine of FIG. 46 in an open configuration with portions of the overlay applicator remaining on the device.

Turning ahead in the drawings, FIGS. 48-50 illustrate using machine 4600 to apply overlay 730 (FIG. 7) to the screen of a device. FIG. 48 illustrates a perspective view of a machine 4600 in an open configuration, with a device in cradle 4630, and an overlay applicator 700 above the device on cradle 4630. As shown in FIG. 48, a device 4800 can be placed in slot 4731 (FIG. 47) of cradle 4630 with the screen of device 4800 facing upwards or away from cradle 4630. In some embodiments, cradle 4630 can be placed in cradle support 4620 (FIGS. 46-47) prior to inserting device 4800 in cradle 4630. In other embodiments, cradle 4630 can be placed in cradle support 4620 (FIGS. 46-47) after inserting device 4800 in cradle 4630. In many embodiments, arm 4650 of machine 4600 can be in a raised position to facilitate insertion of cradle 4630 in cradle support 4620 (FIGS. 46-47) and/or insertion of device 4800 in cradle 4630.

In a number of embodiments, overlay applicator 700 can be placed on cradle 4630 above device 4800, with protective film 720 facing up and above overlay 730 (FIG. 7), adhesive release liner 740 (FIG. 7), and pull tab 750. In many embodiments, pull tab 750 and wiper 757 (FIG. 7) can be facing downward, and resting upon or proximate to the screen of device 4800. In some embodiments, overlay applicator 700 can be secured to cradle 4630 by alignment base 4734 engaging with alignment mechanism 715.

FIG. 49 illustrates a perspective view of a machine 4600 in a closed configuration, with pull tab 750 of overlay applicator 700 being pulled. In several embodiments, arm 4650 can next be lowered to a lowered position, as shown in FIG. 49. In many embodiments, hinge central member 4642 can rotate with respect to hinge side supports 4643, and locking rod 4645 (FIGS. 46-47) can disengage with one or more of notches 4644 (FIGS. 46-47) and reengage with a different one or more of notches 4644 (FIGS. 46-47). In various embodiments when arm 4650 is in a lowered position, expandable bladder 4651 can rest upon overlay applicator 700.

In several embodiments, pull tab 750 can be pulled to remove adhesive release liner 740 (FIG. 7) from the adhesive side of overlay 730 (FIG. 7). In many embodiments, as pull tab 750 is pulled, wiper 757 (FIG. 7) can wipe across the screen of device 4800 (FIG. 48) to remove any dust from the screen of device 4800 (FIG. 48). In many embodiments, after pull tab 750 has been pulled out and adhesive release liner 740 (FIG. 7) has been removed from covering overlay 730 (FIG. 7), overlay 730 (FIG. 7) can be secured such that it remains above and does not adhere to the screen of device 4800 (FIG. 48). In some embodiments, pulling on pull tab 750 to remove adhesive release liner 740 (FIG. 7) from the adhesive side of overlay 730 (FIG. 7) can occur before lowing arm 4650 to a lowered position.

In some embodiments, pumping mechanism 4652 can next be activated to fill expandable bladder 4651. In many embodiments, start/stop button 4653 can be activated to fill expandable bladder 4651 with air. Expandable bladder 4651 can expand as it fills with air. In some embodiments, the expansion of expandable bladder 4651 can provide downward force on protective film 720 (FIG. 7) such that overlay 730 (FIG. 7) can begin to adhere to the screen of device 4800 (FIG. 48). Adhering overlay 730 (FIG. 7) to device 4800 (FIG. 48) by applying pressure with expandable bladder 4651 can advantageously allow the overlay 730 (FIG. 7) to be accurately adhered to the screen of device 4800 (FIG. 48) without wrinkles and/or with minimal or no bubbles. In certain embodiments, expandable bladder 4651 can be configured to begin inflation at the center of expandable bladder 4651 and continue inflating out to the perimeter regions of expandable bladder 4651, which can adhere overlay 730 (FIG. 7) beginning at the center of the screen of device 4800 (FIG. 48), and continue the adhesion out to the perimeter regions of the screen of device 4800 (FIG. 48), which can advantageously cause overlay 730 (FIG. 7) to be adhered to the screen of device 4800 (FIG. 48) with minimal or no air bubbles.

In many embodiments, pumping mechanism 4652 can be deactivated to stop the inflation of expandable bladder 4651 and/or to begin the deflation of expandable bladder 4651. In many embodiments, start/stop button 4653 can be pressed to deactivate pumping mechanism 4652 to deflate expandable bladder 4651. In other embodiments, pumping mechanism 4652 can be pre-programmed to stop the inflation of expandable bladder 4651 and to begin the deflation of expandable bladder 4651 after expandable bladder reaches a predetermined level of inflation.

FIG. 50 illustrates a perspective view of a machine 4600 in an open configuration, with portions of overlay applicator 700 remaining on device 4800. In a number of embodiments, arm 4650 can be raised to a raised position, as shown in FIG. 50. In many embodiments, hinge central member 4642 can rotate with respect to hinge side supports 4643, and locking rod 4645 (FIGS. 46-47) can disengage with one or more of notches 4644 (FIGS. 46-47) and reengage with a different one or more of notches 4644 (FIGS. 46-47). In many embodiments, handle 4654 can help facilitate lifting and/or moving arm 4650. Arm 4650 of machine 4600 can be in a raised position to facilitate removal of cradle 4630 from cradle support 4620, and/or removal of device 4800 from cradle 4630.

In several embodiments, cradle 4630, along with device 4800 and overlay applicator 700, can next be removed from cradle support 4620 of machine 4600. In a number of embodiments, device 4800, along with the protective film 720, alignment frame 710, and overlay 730, can be removed from cradle 4630. In many embodiments, removal of device 4800 can be accomplished by manually reaching through bottom aperture 4735 (FIG. 47) of cradle 4630 to push upward (or away from bottom aperture 4735) on device 4800. In several embodiments, alignment frame 710 and protective film 720, which can be integral, can be peeled away from overlay 730, which is adhered to device 4800. After alignment frame 710 and protective film 720 have been peeled away from overlay 730, application of overlay 730 to the screen of device 4800 can be complete.

Figure 51:
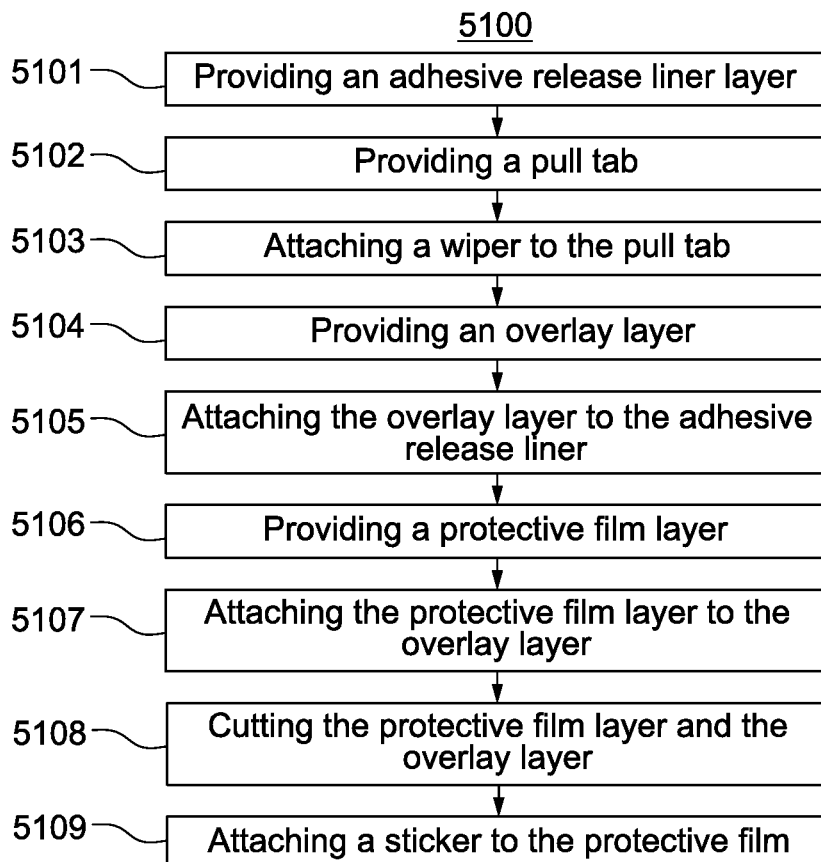
FIG. 51 illustrates a flow chart for a method of providing an overlay applicator, according to another embodiment.

Turning ahead in the drawings, FIG. 51 illustrates a flow chart for an embodiment of a method 5100 of providing an overlay applicator. Method 5100 is merely exemplary and is not limited to the embodiments presented herein. Method 5100 can be employed in many different embodiments or examples not specifically depicted or described herein. In some embodiments, the procedures, the processes, and/or the activities of method 5100 can be performed in the order presented. In other embodiments, the procedures, the processes, and/or the activities of the method 5100 can be performed in any other suitable order. In still other embodiments, one or more of the procedures, the processes, and/or the activities in method 5100 can be combined or skipped. In some embodiments, the overlay applicator can be similar or identical to overlay applicator 3000 (FIG. 30).

Referring to FIG. 51, method 5100 can include a block 5101 of providing an adhesive release liner. In many embodiments, the adhesive release liner layer can be similar or identical to adhesive release liner 140 (FIG. 1), adhesive release liner 440 (FIGS. 4-5), adhesive release liner 640 (FIG. 6), adhesive release liner 740 (FIG. 7); adhesive release liner 1540 (FIG. 15), and/or adhesive release liner 2740 (FIGS. 27-30). In a number of embodiments, the adhesive release liner can include a top side and a bottom side.

In some embodiments, method 5100 can include a block 5102 of providing a pull tab. In various embodiments, the pull tab can be similar or identical to pull tab 150 (FIG. 1), pull tab 450 (FIGS. 4-5), pull tab 650 (FIG. 6), pull tab 750 (FIG. 7), pull tab 1550 (FIG. 15), and/or pull tab 2750 (FIGS. 27-30). In some embodiments, the pull tab can include a top side and a bottom side. In various embodiments, the adhesive release liner can be integral with the pull tab. In a number of embodiments, method 5100 can include adhering the adhesive release liner to the pull tab.

In a number of embodiments, method 5100 can include a block 5103 of attaching a wiper to the top side of the pull tab. In several embodiments, the wiper can be similar or identical to wiper 157 (FIG. 1), wiper 457 (FIG. 4), wiper 657 (FIG. 6), wiper 757 (FIG. 7), and/or wiper 2857 (FIGS. 28-30).

In various embodiments, method 5100 can include a block 5104 of providing an overlay layer. The overlay layer can be similar or identical to the layer of material for overlay 2930 (FIGS. 29-30). In a number of embodiments, the overlay layer can include a top side and a bottom side. In some embodiments, the bottom side can include an adhesive agent configured to adhere to the top side of the adhesive release liner.

In many embodiments, method 5100 can include a block 5105 of attaching the bottom side of the overlay layer to the top side of the adhesive release liner.

In some embodiments, method 5100 can include a block of 5106 of providing a protective film layer. In a number of embodiments, the protective film layer can be similar or identical to the layer of material for protective film layer 2920 (FIGS. 29-30). In various embodiments, the protective film layer can include a top side and a bottom side.

In several embodiments, method 5100 can include a block 5107 of attaching the bottom side of the protective film layer to the top side of the overlay layer.

In various embodiments, method 5100 can include a block 5108 of cutting the protective film layer and the overlay layer to create an interface slit between an alignment tab and a device portion, and to create a tail slit between a tail portion and the device portion. In some embodiments, the interface slit can be similar or identical to interface slit 2960 (FIGS. 29-30). In a number of embodiments, the tail slit can be similar or identical to tail slit 2991 (FIGS. 29-30). In some embodiments, the alignment tab can be similar or identical to alignment tab 110 (FIG. 1), alignment tab 410 (FIGS. 4-5), alignment tab 610 (FIG. 6), and/or alignment tab 2910 (FIGS. 29-30). In many embodiments, the device portion can be similar or identical to device portion 470 (FIGS. 4-5), device portion 670 (FIG. 6), device portion 2970 (FIGS. 29-30), and/or device portion 3560 (FIG. 35). In some embodiments, the tail portion can be similar or identical to tail portion 2990 (FIGS. 29-30). In several embodiments, the alignment tab can be configured to engage with an alignment base to align the overlay with the screen of the device.

In many embodiments, method 5100 can include a block 5109 of attaching a sticker to the top side of the protective film. In several embodiments, the sticker can be similar or identical to joining sticker 680 (FIG. 6), joining sticker 3080 (FIG. 30), and/or joining stickers 3559 (FIG. 35). In some embodiments, the sticker can span the interface slit between the device portion and the alignment tab. In a number of embodiments, the sticker can include a non-stretching material.

Figure 52:
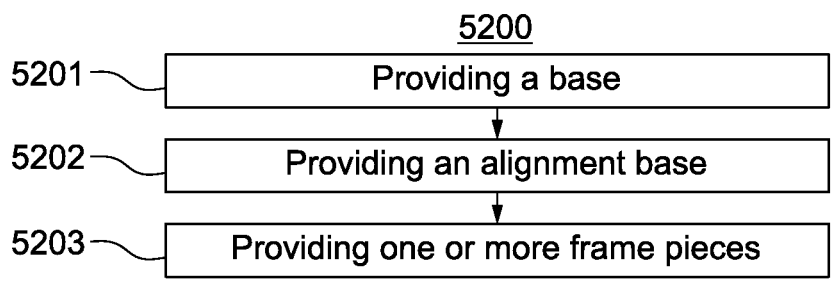
FIG. 52 illustrates a flow chart for a method of providing a cradle, according to another embodiment.

Proceeding to the next drawing, FIG. 52 illustrates a flow chart for an embodiment of a method 5200 of providing a cradle. Method 5200 is merely exemplary and is not limited to the embodiments presented herein. Method 5200 can be employed in many different embodiments or examples not specifically depicted or described herein. In some embodiments, the procedures, the processes, and/or the activities of method 5200 can be performed in the order presented. In other embodiments, the procedures, the processes, and/or the activities of the method 5200 can be performed in any other suitable order. In still other embodiments, one or more of the procedures, the processes, and/or the activities in method 5200 can be combined or skipped. In some embodiments, the cradle can be similar or identical to cradle 3100 (FIGS. 31-34).

Referring to FIG. 52, method 5200 can include a block 5201 of providing a base. In a number of embodiments, the base can be similar or identical to bottom frame 3110 (FIG. 31).

In many embodiments, method 5200 can include a block 5202 of providing an alignment base. In several embodiments, the alignment base can be similar or identical to alignment base, such as alignment base 212 (FIG. 2) or alignment base 312 (FIG. 3), alignment base 835 (FIGS. 8-9, 13-14), alignment base 1632 (FIGS. 16-19), alignment base 2035 (FIG. 20) and/or alignment base 3112 (FIG. 31). In various embodiments, the alignment base can be configured to engage with an alignment mechanism of an overlay applicator. The overlay applicator can be similar or identical to overlay applicator 100 (FIG. 1), overlay applicator 400 (FIGS. 4-5), overlay applicator 600 (FIG. 6), and/or overlay applicator 3000 (FIG. 30). In a number of embodiments, the alignment mechanism can be similar or identical to alignment mechanism 115 (FIG. 1), alignment mechanism 415 (FIGS. 4-5), alignment mechanism 615 (FIG. 6), and/or alignment mechanism 2915 (FIGS. 29-30).

In some embodiments, method 5200 can include a block 5203 of providing one or more frame pieces. In several embodiments, the one or more frame pieces can include two corner frames located at a first end of the base proximate to the alignment base. The corner frames can be similar or identical to corner frames 3130 (FIG. 31). In many embodiments, the one or more frame pieces can include an end frame located at a second end of the base opposite the first end. The end frame can be similar or identical to end frame 3140 (FIG. 31). In several embodiments, the one or more frame pieces can include two side frames located at each side of the base between the first end and the second end. The side frames can be similar or identical to side frames 3120 (FIG. 31).

In some embodiments, the frame pieces can be configured to securely hold an electronic device in a device slot in a fixed position with respect to the alignment base. The device slot can be similar or identical to device slot 3111 (FIG. 31) In various embodiments, the base, the alignment base, and the one or more frame pieces can be configured to hold the overlay applicator between the base and a screen of the electronic device when the screen of the electronic device is facing toward the base. In a number of embodiments, the base, the alignment base, and the one or more frame pieces can be configured to facilitate applying an overlay of the overlay applicator to the screen of the electronic device. The overlay can be similar or identical to overlay 130 (FIG. 1), overlay 430 (FIGS. 4-5), overlay 630 (FIG. 6), overlay 730 (FIG. 7), overlay 1530 (FIG. 15), and/or overlay 2930 (FIGS. 29-30). In many embodiments, the one or more frame pieces can be configured to align the overlay applicator as the overlay of the overlay applicator is applied to the screen of the electronic device.

In several embodiments, the one or more frame pieces can include a pull tab slot configured to allow a pull tab of the overlay applicator to extend beyond the device slot. The pull tab slot can be similar or identical to end slot 3141 (FIG. 31). The pull tab can be similar or identical to pull tab 150 (FIG. 1), pull tab 450 (FIGS. 4-5), pull tab 650 (FIG. 6), and/or pull tab 2750 (FIGS. 27-30). For example, the pull tab can extend beyond the device slot as shown in FIGS. 32-33.

In a number of embodiments, the base can include a support piece extending in a first direction. The support piece can be similar or identical to central support 3150 (FIG. 31). In some embodiments, the support piece can be configured to press an adhesive side of the overlay of the overlay applicator toward the screen of the electronic device when the screen of the electronic device is facing toward the support piece and the pull tab of the overlay applicator is pulled in the first direction to remove an adhesive release liner of the overlay applicator and expose the adhesive side of the overlay to the screen of the electronic device. In a number of embodiments, the support piece can include an elastomeric material. In various embodiments, the support piece can be configured to press the adhesive side of the overlay against the screen of the electronic device when the adhesive release liner of the overlay applicator is removed to expose the adhesive side of the overlay. In various embodiments, the support piece can be configured to press a wiper of the pull tab toward the screen of the electronic device as the wiper moves across the screen of the electronic device in the first direction. The wiper can be similar or identical to wiper 157 (FIG. 1), wiper 457 (FIG. 4), wiper 657 (FIG. 6), wiper 757 (FIG. 7), and/or wiper 2857 (FIGS. 28-30).

Figure 53:
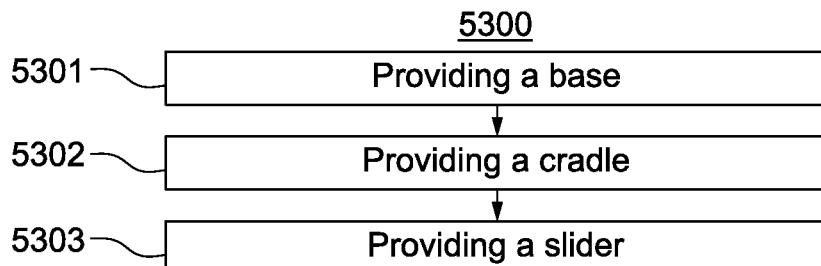
FIG. 53 illustrates a flow chart for a method of providing a machine, according to another embodiment.

Proceeding to the next drawing, FIG. 53 illustrates a flow chart for an embodiment of a method 5300 of providing a machine. Method 5300 is merely exemplary and is not limited to the embodiments presented herein. Method 5300 can be employed in many different embodiments or examples not specifically depicted or described herein. In some embodiments, the procedures, the processes, and/or the activities of method 5300 can be performed in the order presented. In other embodiments, the procedures, the processes, and/or the activities of the method 5300 can be performed in any other suitable order. In still other embodiments, one or more of the procedures, the processes, and/or the activities in method 5300 can be combined or skipped. In some embodiments, the machine can be similar or identical to machine 3500 (FIGS. 35-36).

Referring to FIG. 53, method 5300 can include a block 5301 of providing a base. In a number of embodiments, the base can be similar or identical to base 3510 (FIGS. 35-36). In several embodiments, the base can include a first end. The first end can be similar or identical to first end 3511 (FIGS. 35-36). In many embodiments, the base can include a second end. The second end can be similar or identical to second end 3512 (FIGS. 35-36). In some embodiments, the base can include an alignment base. The alignment base can be similar or identical to alignment base 3514 (FIGS. 35-36). In many embodiments, the alignment base can be configured to engage with an alignment mechanism of an overlay applicator. The alignment mechanism can be similar or identical to alignment mechanism 3557 (FIGS. 35-36). The overlay applicator can be similar or identical to overlay applicator 3550 (FIGS. 35-36).

In a number of embodiments, the overlay applicator can include a first alignment tab and a second alignment tab. The first and second alignment tabs can be similar or identical to alignment tabs 3556 (FIGS. 35-36). In several embodiments, the first alignment tab can include a first portion of the alignment mechanism, and the second alignment tab comprising a second portion of the alignment mechanism. In many embodiments, the alignment base can include a first side proximate the first end of the base. In a number of embodiments, the first side can be configured to engage with the first portion of the alignment mechanism of the overlay applicator. In many embodiments, a second side proximate the second end of the base, the second side can be configured to engage with the second portion of the alignment mechanism of the overlay applicator.

In a number of embodiments, the base can include a pull slot. The pull slot can be similar or identical to pull slot 3515 (FIGS. 35-36). In some embodiments, the pull slot can be located between the cradle and the second side of the alignment base.

In many embodiments, method 5300 can include a block 5302 of providing a cradle. The cradle can be similar or identical to cradle 3520 (FIGS. 35-36). In several embodiments, the cradle can be located between the first side of the alignment base and the second side of the alignment base. In some embodiments, the cradle can be configured to securely hold an electronic device. In various embodiments, the cradle can be integral with the base. In many embodiments, the cradle can be removably coupled to the base.

In some embodiments, method 5300 can include a block 5303 of providing a slider configured to move between the first and second ends of the base. The slider can be similar or identical to slider 3530 (FIGS. 35-36). In a number of embodiments, the slider can include a bar. The bar can be similar or identical to pressure bar 3535 (FIGS. 35-36). In many embodiments, the bar can be configured to press an overlay of the overlay applicator toward a screen of the electronic device when the slider is moved between the first and second ends of the base. The overlay can be similar or identical to overlay 130 (FIG. 1), overlay 430 (FIGS. 4-5), overlay 630 (FIG. 6), overlay 730 (FIG. 7), overlay 1530 (FIG. 15), and/or overlay 2930 (FIGS. 29-30). In several embodiments, the bar can be spring-loaded to press downward toward the base. In a number of embodiments, the base can include one or more tracks configured to engage with the slider and allow the slider to move between the first and second ends of the base. The tracks can be similar or identical to track 3513 (FIGS. 35-36).

In several embodiments, the base can include one or more first cams at the first end of the base and one or more second cams at the second end of the base. In first and second cams can be similar or identical to cams 3516. In many embodiments, the one or more first cams can be configured to prevent the bar from contacting the first side of the alignment base when the slider is moved between the first and second ends of the base. the one or more second cams can be configured to prevent the bar from contacting the second side of the alignment base when the slider is moved between the first end and second ends of the base.

In many embodiments, the machine can be configured such that when the alignment base is engaged with the alignment mechanism of the overlay applicator and the cradle is holding the electronic device, a pull tab of the overlay applicator can be pulled through the pull slot to remove an adhesive release liner of the overlay applicator and expose an adhesive side of the overlay to the screen of the electronic device. The pull tab be similar or identical to pull tab 3555 (FIG. 35). In various embodiments, the machine can be further configured such that when the adhesive release liner of the overlay applicator is removed to expose the adhesive side of the overlay to the screen of the electronic device and the slider is moved between the first and second ends of the base, the bar can be configured to press the adhesive side of the overlay against the screen of the electronic device.

Figure 54:
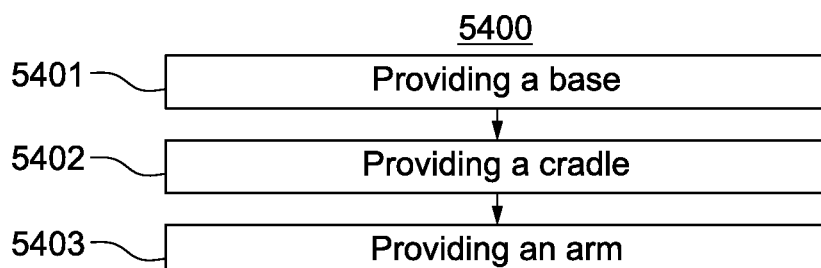
FIG. 54 illustrates a flow chart for a method of providing a machine, according to another embodiment.

Proceeding to the next drawing, FIG. 54 illustrates a flow chart for an embodiment of a method 5400 of providing a machine. Method 5400 is merely exemplary and is not limited to the embodiments presented herein. Method 5400 can be employed in many different embodiments or examples not specifically depicted or described herein. In some embodiments, the procedures, the processes, and/or the activities of method 5400 can be performed in the order presented. In other embodiments, the procedures, the processes, and/or the activities of the method 5400 can be performed in any other suitable order. In still other embodiments, one or more of the procedures, the processes, and/or the activities in method 5400 can be combined or skipped. In some embodiments, the machine can be similar or identical to machine 3700 (FIGS. 37, 41-45) and/or machine 4600 (FIGS. 46-50).

Referring to FIG. 54, method 5400 can include a block 5401 of providing a base. In a number of embodiments, the base can be similar or identical to base 4110 (FIG. 41) and/or base 4610 (FIG. 46).

In many embodiments, method 5400 can include a block 5402 of providing a cradle configured to securely hold an electronic device. The cradle can be similar or identical to cradle 3710 (FIGS. 37-38) and/or cradle 4630 (FIGS. 46-50). The electronic device can be similar or identical to device 3720 (FIG. 37) and/or device 4800 (FIG. 48). in several embodiments, the cradle can include an alignment base configured to engage with an alignment mechanism of an overlay applicator. The alignment base can be similar or identical to alignment base 3814 (FIG. 38) and/or alignment base 4734 (FIG. 47). The alignment mechanism can be similar or identical to alignment mechanism 715 (FIGS. 7, 48). In several embodiments, the alignment base can include six protrusions configured to engage with an alignment frame of the overlay applicator. In some embodiments, the cradle can be integral with the base. In many embodiments, the base can include a cradle support configured to removably hold the cradle. The cradle support can be similar or identical to cradle support cradle support 4120 (FIG. 41) and/or cradle support 4620 (FIG. 46).

In some embodiments, method 5400 can include a block 5403 of providing an arm. The arm can be similar or identical to arm 4150 (FIG. 41) and/or arm 4650 (FIG. 46). In several embodiments, the arm can include an expandable bladder. The expandable bladder can be similar or identical to expandable bladder 4151 (FIG. 41) and/or expandable bladder 4651 (FIG. 46). In a number of embodiments, the arm can include a pumping mechanism configured to inflate the expandable bladder. The pumping mechanism can be similar or identical to pumping mechanism 4152 (FIG. 41) and/or pumping mechanism 4652 (FIG. 46). In some embodiments, the arm can include a handle. The handle can be similar or identical to handle 4154 (FIG. 41) and/or handle 4654 (FIG. 46). In various embodiments, the arm can be configured to be hingedly rotated between an open configuration and a closed configuration. The open configuration can be similar or identical to the configuration shown in FIGS. 41-43 and 45 for machine 4100, and/or the configuration shown in FIGS. 47-48 and 50 for machine 4600. The closed configuration can be similar or identical to the configuration shown in FIG. 44 for machine 4100 and/or the configuration shown in FIGS. 46 and 49 for machine 4600. In some embodiments, the pumping mechanism can include a button configured to control inflation of the expandable bladder. The button can be similar or identical to start/stop button 4153 (FIGS. 41, 44-45) and/or start/stop button 4653 (FIG. 46, 49). In various embodiments, the arm can be hingedly attached to the base, such as in shown in FIGS. 46-50 for machine 4600. In a number of embodiments, method 5400 can include the providing a stand attached to the base and hingedly attached to the arm. The stand can be similar or identical to stand 4130 (FIG. 41).

In various embodiments, the machine can be configured such that when the arm is in the closed configuration and the expandable bladder is inflated, the expandable bladder can press an overlay of the overlay applicator toward a screen of the electronic device to adhere an adhesive side of the overlay to the screen of the electronic device. The overlay can be similar or identical to overlay 730 (FIGS. 7, 45, 50). In some embodiments, the machine can be further configured such that when (a) the arm is in the closed configuration, (b) a pull tab of the overlay applicator is pulled to remove an adhesive release liner and expose the adhesive side of the overlay to the screen of the electronic device, and (c) the expandable bladder is inflated, the expandable bladder can be configured to press the adhesive side of the overlay against the screen of the electronic device. The pull tab can be similar or identical to pull tab 750 (FIGS. 7, 42, 44-45, 48-49).

In some embodiments, method 5400 can include providing a cradle frame configured to engage with the cradle and secure the overlay applicator to the cradle. The cradle frame can be similar or identical to cradle frame 3730 (FIGS. 37, 39-40). In a number of embodiments, the cradle frame can include a bottom plate. The bottom plate can be similar or identical to bottom plate 3912 (FIGS. 39-40). In many embodiments, the bottom plate can include a crease configured to press downward on the overlay applicator to adhere the adhesive side of the overlay to the screen of the electronic device. The crease can be similar or identical to crease 3913 (FIGS. 39-40). In several embodiments, the cradle frame can include a recess. The recess can be similar or identical to recess 3916 (FIG. 39). In various embodiments, the expandable bladder can be configured to be positioned within the recess of the cradle frame when the arm is in the closed configuration. In several embodiments, the cradle frame can include alignment holes configured to engage with alignment base. The alignment holes can be similar or identical to alignment holes 3911 (FIGS. 39-40).

Figure 55:
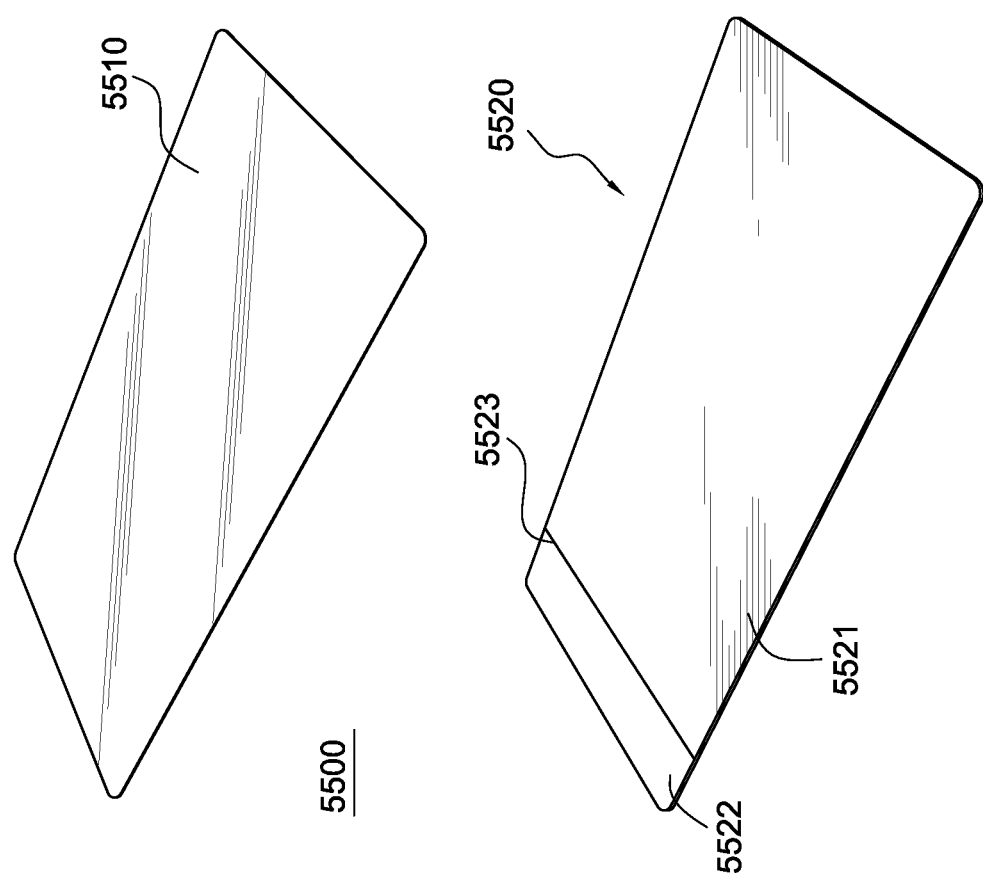
FIG. 55 illustrates an exploded view of a dust sticker assembly, according to another embodiment.

Turning ahead in the drawings, FIG. 55 illustrates an exploded view of a dust sticker assembly 5500. Dust sticker assembly 5500 is merely exemplary and embodiments of the dust sticker assembly are not limited to embodiments presented herein. The dust sticker assembly can be employed in many different embodiments or examples not specifically depicted or described herein. In many embodiments, dust sticker assembly 5500 can include a dust removal sticker 5510 and/or a release liner 5520. In many embodiments, a bottom side of dust removal sticker 5510 can include an adhesive. In many embodiments, release liner 5520 can attached to the bottom side of dust removal sticker 5510 and/or can cover the adhesive on the bottom side of dust removal sticker 5510. In a number of embodiments, release liner 5520 can include a device portion 5521 and an end portion 5522. Device portion 5521 and end portion 5522 can be separated at a fold line 5523. In many embodiments, fold line 5523 can be formed by a cut through release liner 5520 to form device portion 5521 and end portion 5522.

Figure 56:
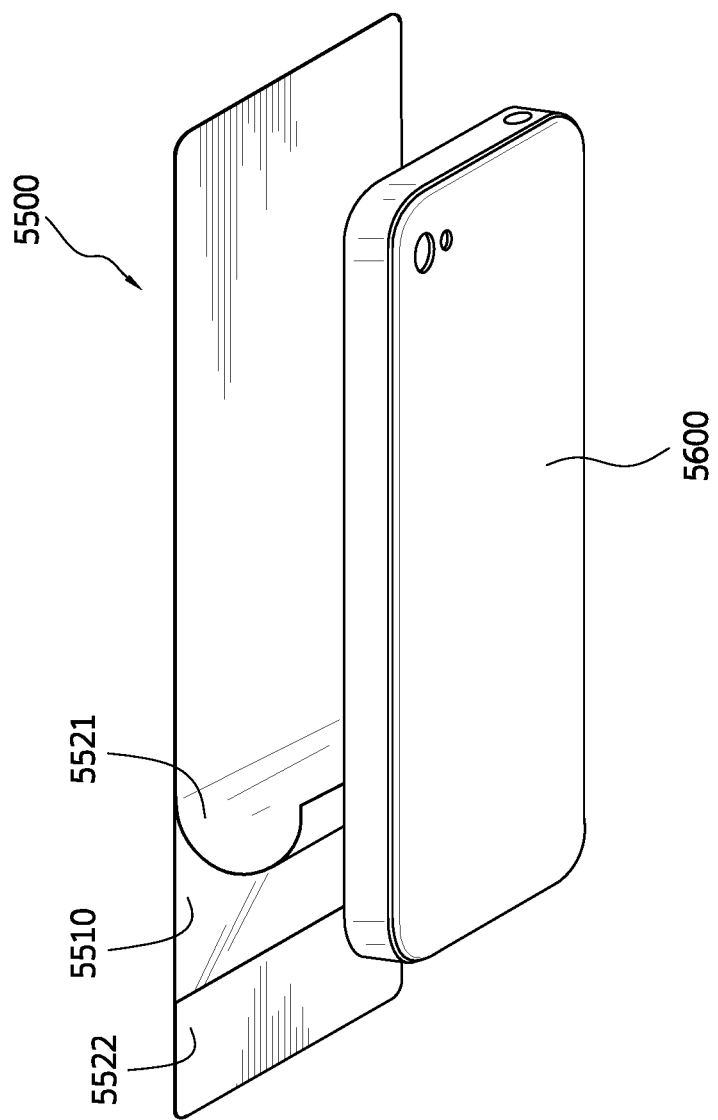
FIG. 56 illustrates a bottom perspective view the dust sticker assembly of FIG. 55 and a device.

Turning ahead in the drawings, FIG. 56 illustrates a bottom perspective view of dust sticker assembly 5500 and a device 5600. In a number of embodiments, dust removal sticker 5510 can be applied to device 5600 by peeling off device portion 5521 from the bottom of dust removal sticker 5510 and adhering dust removal sticker 5510 to cover the screen of device 5600. In a number of embodiments, after dust removal sticker 5510 is adhered to the screen of device 5600, end portion 5522 can extend beyond an end of the screen of device 5600.

Figure 57:
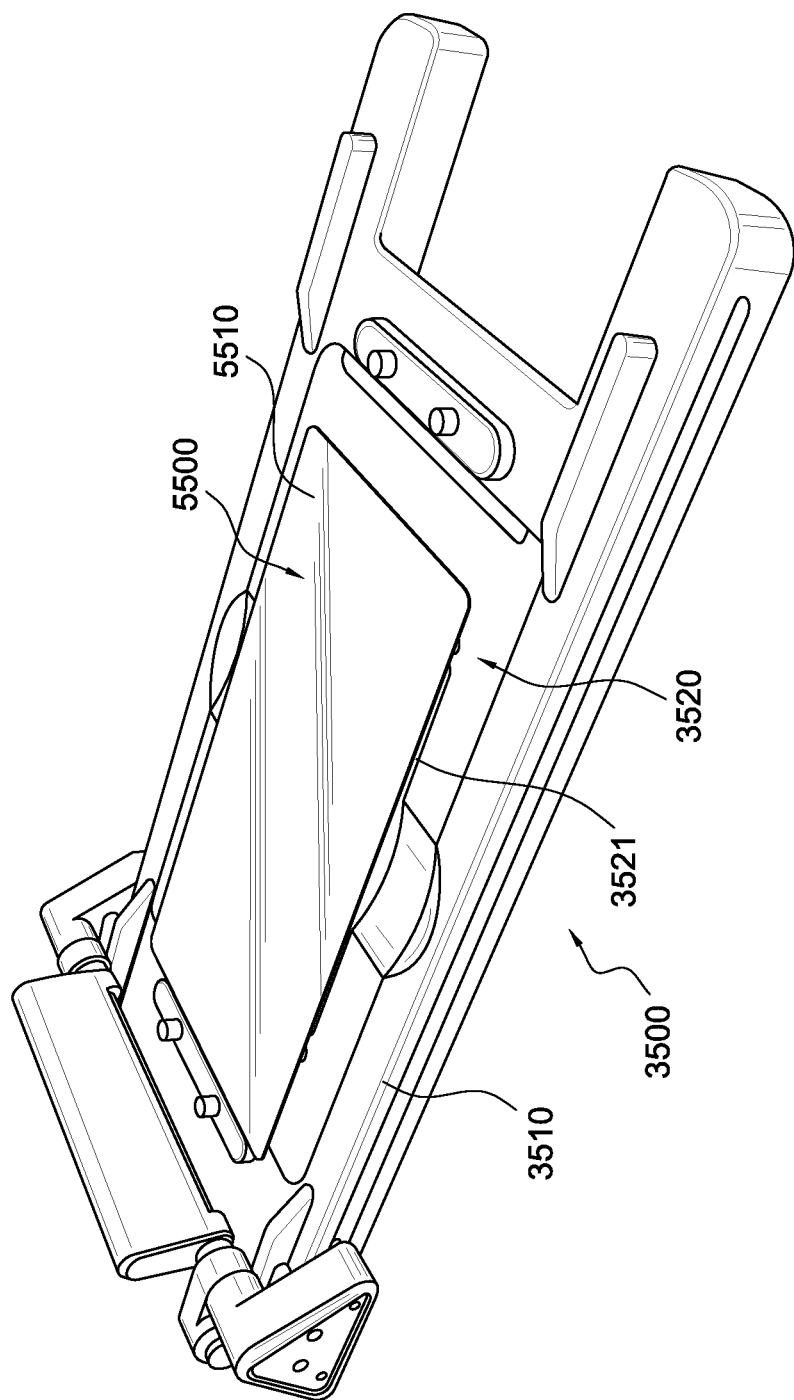
FIG. 57 illustrates a perspective view of the machine of FIG. 35, the dust sticker assembly of FIG. 55, and the device of FIG. 56.

Turning ahead in the drawings, FIG. 57 illustrates a perspective view of machine 3500 (as shown in FIGS. 35-36 and described above) and dust sticker assembly 5500, which can be used together to remove dust from the screen of device 5600 (FIG. 56). Device 5600 (FIG. 56) can be placed in recess 3521 of cradle 3520. In many embodiments, dust removal sticker 5510 can be adhered to the screen of device 5600 (FIG. 56) before placing device 5600 (FIG. 56) in cradle 3520. In other embodiments, dust removal sticker 5510 can be adhered to the screen of device 5600 (FIG. 56) after placing device 5600 (FIG. 56) in cradle 3520.

Figure 58:
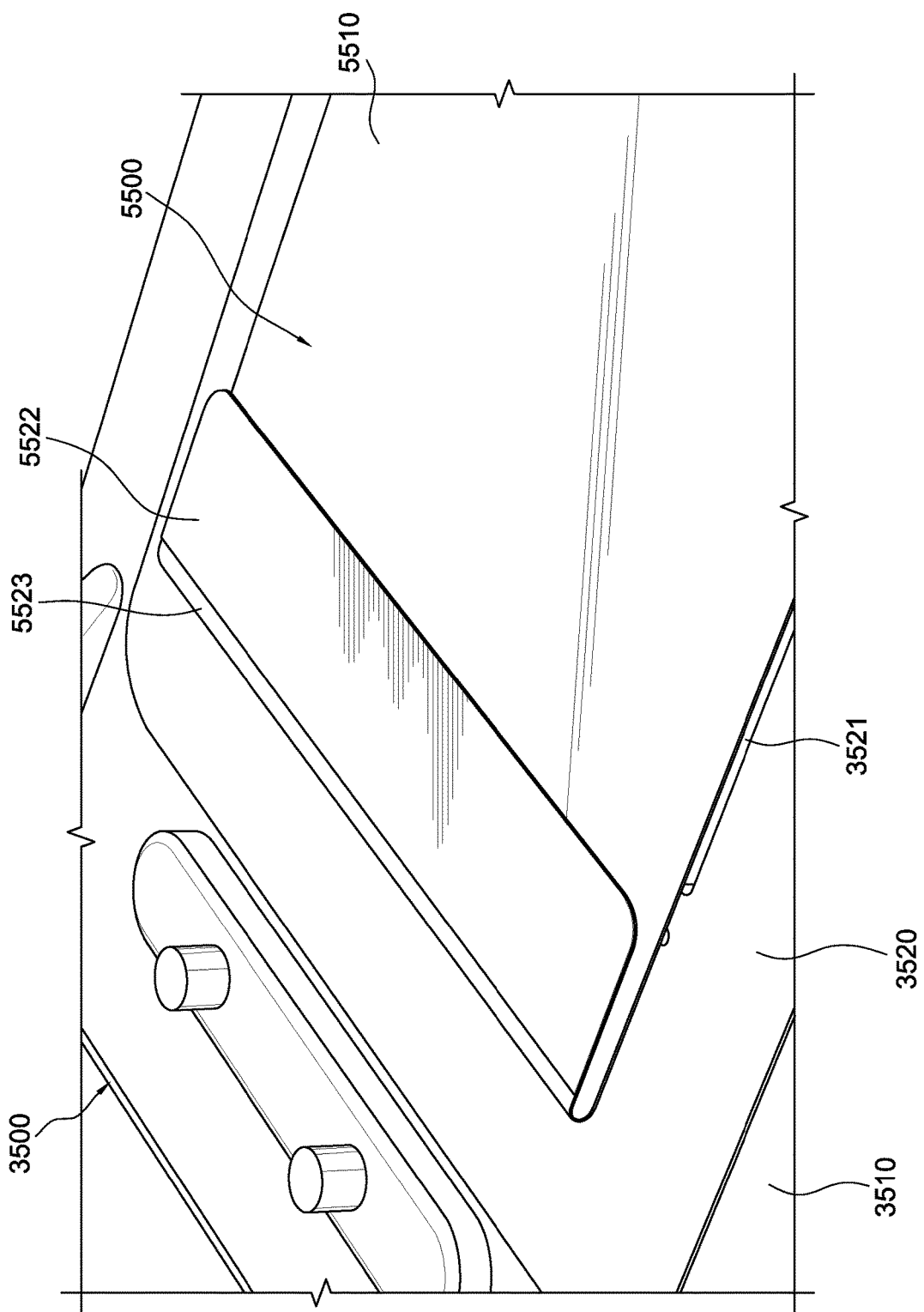
FIG. 58 illustrates a perspective view of a portion of the machine of FIG. 35 and the dust sticker assembly of FIG. 55.
Figure 59:
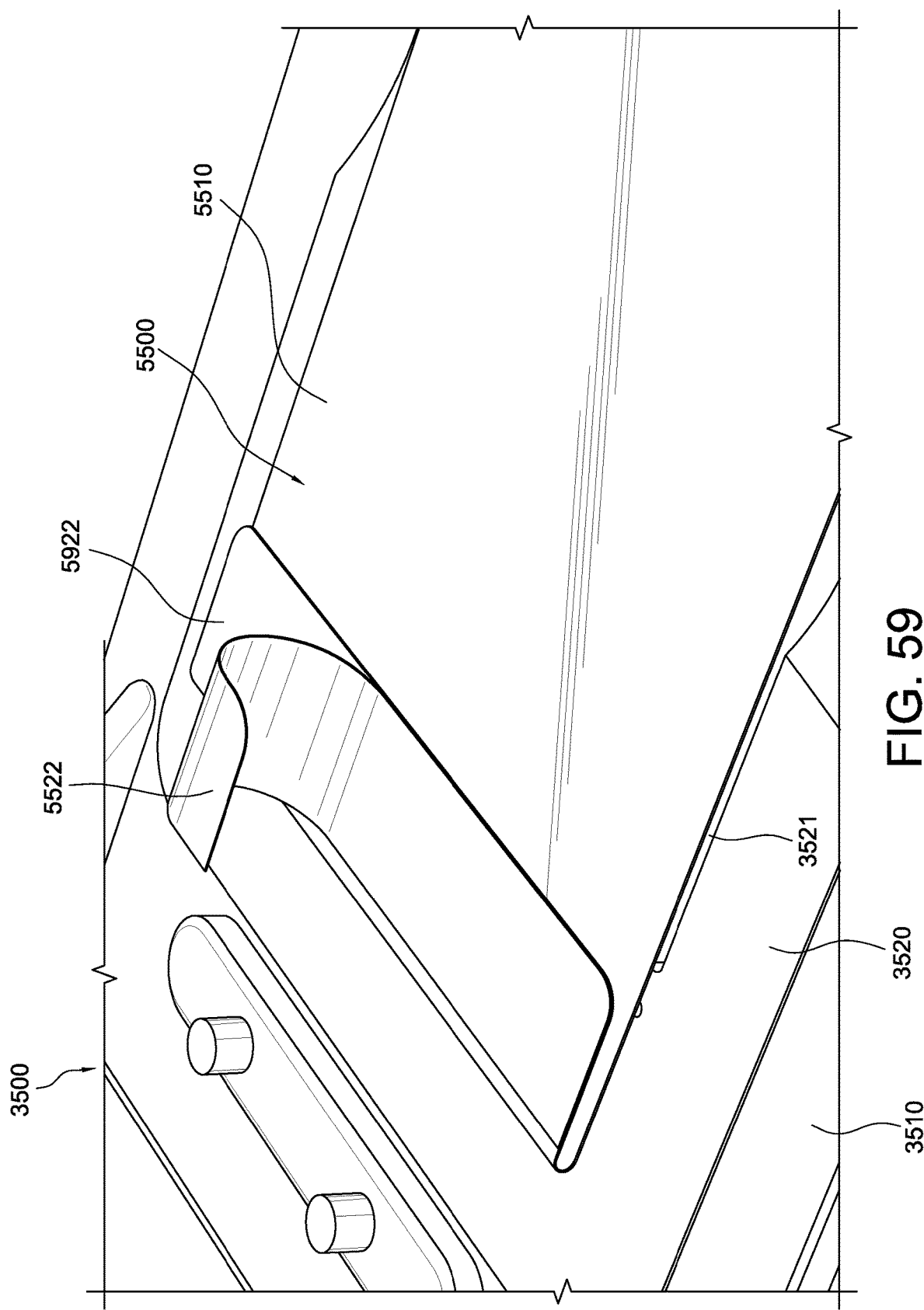
FIG. 59 illustrates a perspective view of a portion of the machine of FIG. 35 and the dust sticker assembly of FIG. 55, with an end portion of a release liner being peeled away from a dust removal sticker of the dust sticker assembly of FIG. 55.

Turning ahead in the drawings, FIG. 58 illustrates a perspective view of a portion of machine 3500 and dust sticker assembly 5500. FIG. 59 illustrates a perspective view of a portion of machine 3500 and dust sticker assembly 5500, with end portion of release liner 5520 being peeled away from dust removal sticker 5510. In a number of embodiments, end portion 5522 and a portion of dust removal sticker 5510 attached to end portion 5522 can be folded back at fold line 5523, as shown in FIG. 58, such that end portion 5522 of release liner 5520 (FIG. 55) can be exposed. With end portion 5522 folded back, end portion 5522 of release liner 5520 (FIG. 55) can be peeled away from dust removal sticker 5510, as shown in FIG. 59, to expose an adhesive end region 5922 of dust removal sticker 5510.

Figure 60:
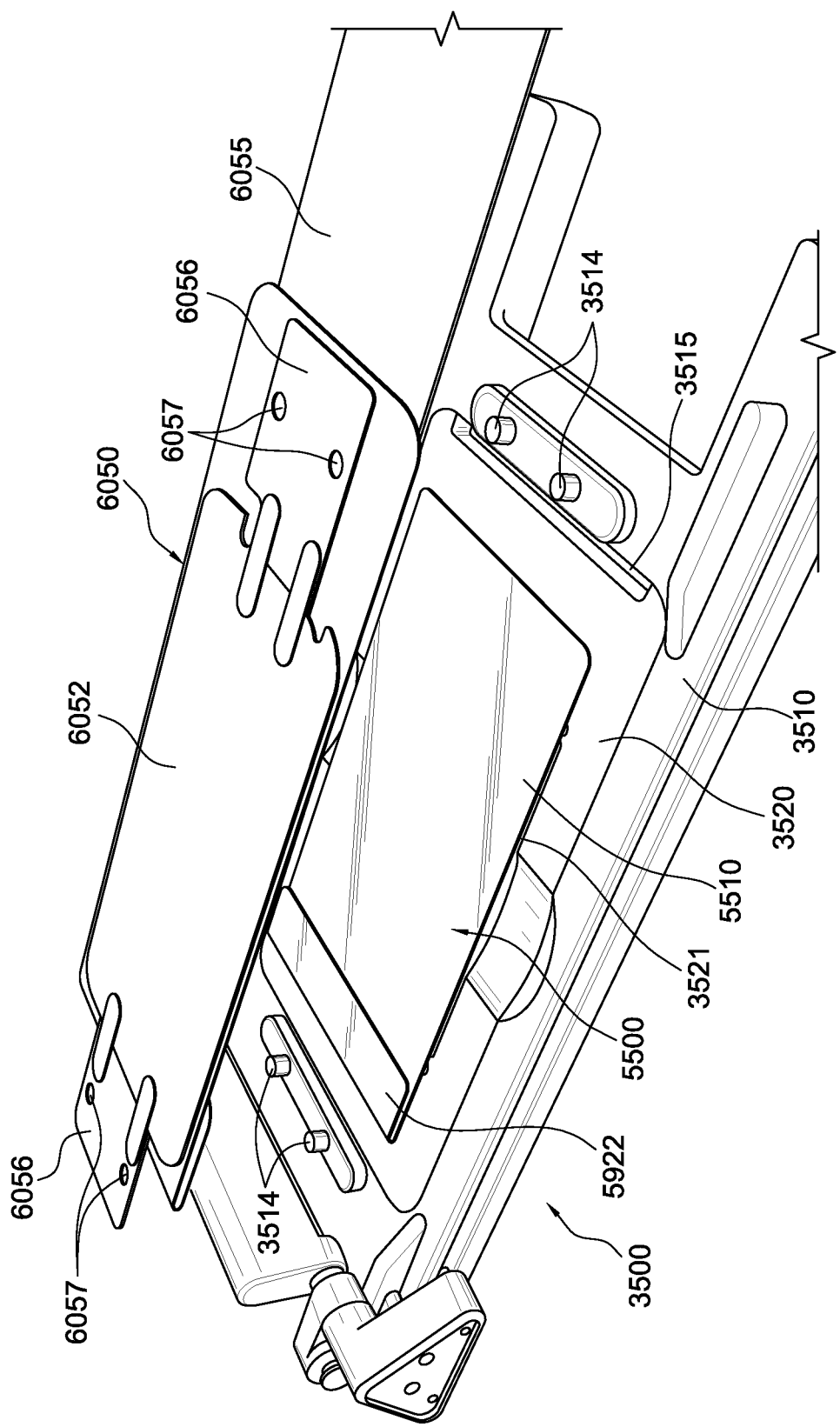
FIG. 60 illustrates a perspective view of the machine of FIG. 35, the dust sticker assembly of FIG. 55, and an overlay applicator.

Turning ahead in the drawings, FIG. 60 illustrates a perspective view of machine 3500, dust sticker assembly 5500, and an overlay applicator 6050. Overlay applicator 6050 can be similar to overlay applicator 100 (FIG. 1), overlay applicator 400 (FIGS. 4-5), overlay applicator 600 (FIG. 6), overlay applicator 700 (FIG. 7), overlay applicator 1500 (FIG. 15), overlay applicator 3000 (FIG. 30) and/or overlay applicator 3550 (FIG. 35), and various components and/or constructions of overlay applicator 6050 can be substantially identical or similar to various components of overlay applicator 100 (FIG. 1), overlay applicator 400 (FIGS. 4-5), overlay applicator 600 (FIG. 6), overlay applicator 700 (FIG. 7), overlay applicator 1500 (FIG. 15), overlay applicator 3000 (FIG. 30), and/or overlay applicator 3550 (FIG. 35). In some embodiments, overlay applicator 6050 can include an adhesive release liner (not shown), a pull tab 6055, an overlay (not shown), a protective film 6052, and/or alignment tabs 6056.

Figure 61:
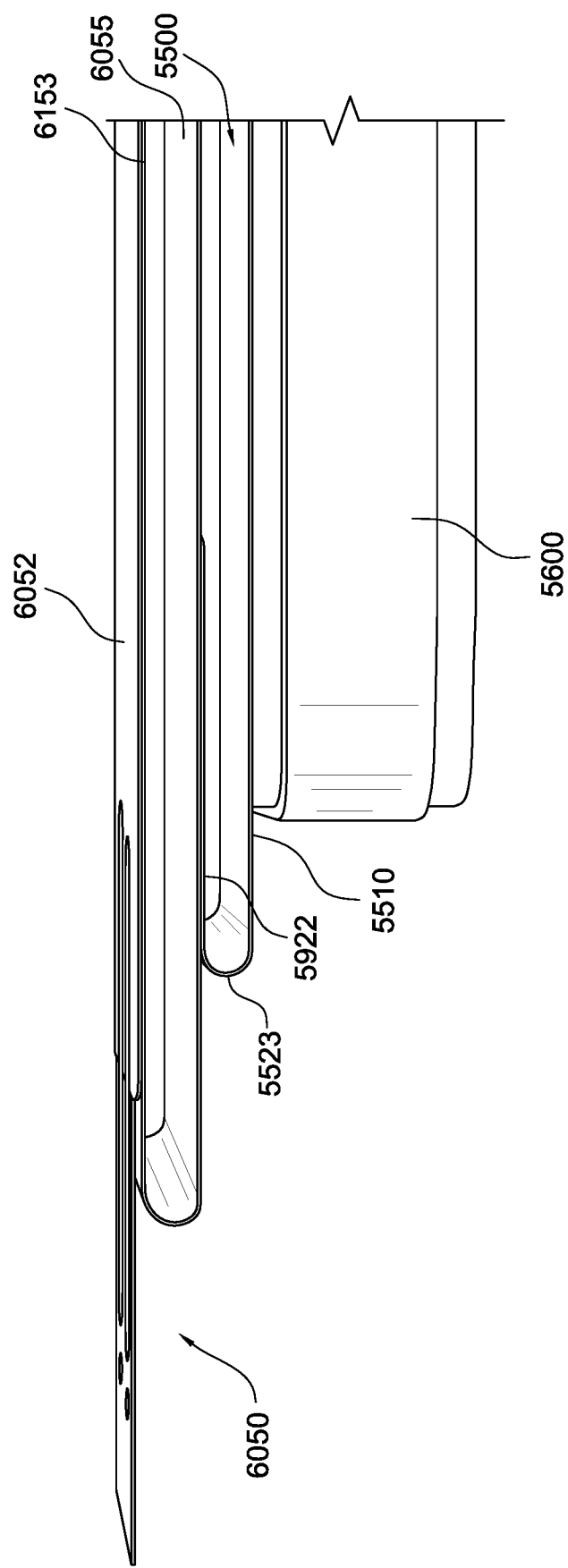
FIG. 61 illustrates a side elevational view of a portion of the dust sticker assembly of FIG. 55 as attached to the device of FIG. 56 and the overlay applicator of FIG. 60.

In some embodiments, alignment tabs 6056 can be similar to alignment tabs 3556 (FIG. 35), and can include an alignment mechanism 6057, which can engage with alignment base 3514 to position overlay applicator 6050 so that the overlay is positioned directly above the screen of device 5600 (FIG. 56). In many embodiments, when overlay applicator 6050 is lowered onto alignment base 3514, adhesive end region 5922 can be attached to pull tab 6055, as shown in FIG. 61, described below. In some embodiments, pull tab 6055 can be integral with the adhesive release liner and can be a single layer of material, such as plastic, paper, or another suitable liner film. In many embodiments, pull tab 6055 can be inserted through pull slot 3515, which can allow pull tab 6055 to be pulled while overlay applicator 6050 is secured to machine 3500 on alignment base 3514. As pull tab 6055 is pulled, such as through pull slot 3515, adhesive end region 5922 can be pulled along with pull tab 6055, which can peel off dust removal sticker 5510 from the screen of device 5600 (FIG. 56). As dust removal sticker 5510 is peel off the screen of device 5600 (FIG. 56), dust, dirt, and/or finger smudges can be removed from the screen of device 5600 (FIG. 56). As dust removal sticker 5510 is peeled off the screen of device 5600 (FIG. 56), the bottom, adhesive side of dust removal sticker 5510 can be folded over to face and/or attach to pull tab 6055 and/or the adhesive release liner.

Turning ahead in the drawings, FIG. 61 illustrates a side elevational view of a portion of dust sticker assembly 5500 as attached to device 5600 and overlay applicator 6050. Dust removal sticker 5510 can be adhered to the screen of device 5600, and adhesive end region 5922 can be folded back at fold line 5523 and exposed such that it can be adhered to pull tab 6055, which is folded back along an adhesive release liner 6153 of overlay applicator 6050. In many embodiments, adhesive end region 5922 can be adhered to pull tab 6055 after end portion 5522 (FIG. 55) of release liner 5520 (FIG. 55) is removed from adhesive end region 5922 of dust removal sticker 5510.

Figure 62:
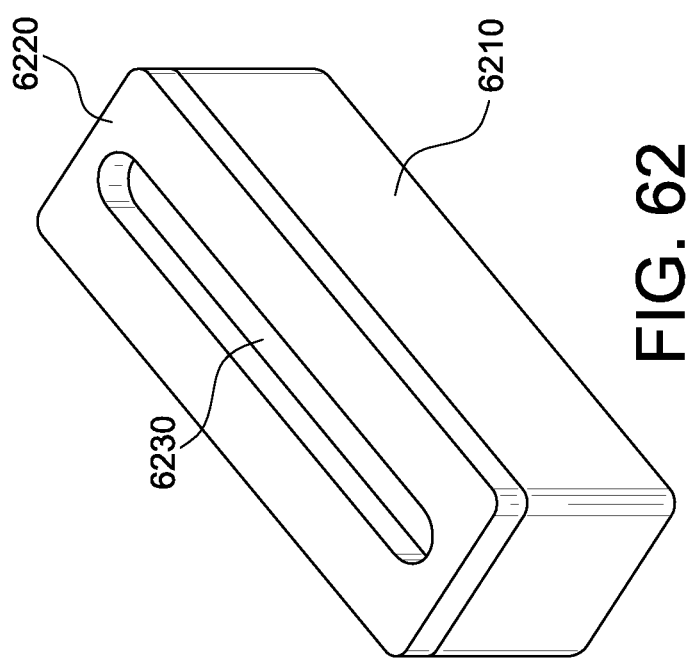
FIG. 62 illustrates a perspective view of a wiper, according to another embodiment.

Turning ahead in the drawings, FIG. 62 illustrates a perspective view of a wiper 6200. Wiper 6200 is merely exemplary and embodiments of the wiper are not limited to embodiments presented herein. The wiper can be employed in many different embodiments or examples not specifically depicted or described herein. Wiper 6200 can be similar to wiper 157 (FIG. 1), wiper 457 (FIGS. 4-5), wiper 657 (FIG. 6), wiper 757 (FIG. 7), and/or wiper 2857 (FIG. 28), and various components and/or constructions of wiper 6200 can be substantially identical or similar to various components of wiper 157 (FIG. 1), wiper 457 (FIGS. 4-5), wiper 657 (FIG. 6), wiper 757 (FIG. 7), and/or wiper 2857 (FIG. 28). In many embodiments, wiper 6200 can be used with an overlay applicator, such as overlay applicator 100 (FIG. 1), overlay applicator 400 (FIGS. 4-5), overlay applicator 600 (FIG. 6), overlay applicator 700 (FIG. 7), and/or overlay applicator 3000 (FIG. 30) to remove dust, dirt, smudges, etc., from the screen of a device prior to adhering an overlay to the screen of the device. In many embodiments, wiper 6200 can be attached to a pull tab, such as pull tab 150 (FIG. 1), pull tab 450 (FIGS. 4-5), pull tab 650 (FIG. 6), pull tab 750 (FIG. 7), and/or pull tab 2750 (FIGS. 27-30).

In a number of embodiments, wiper 6200 can include a wiper support 6210 and a wiper surface 6220 at a top side of wiper support 6210. In various embodiments, an opposite bottom side of wiper support 6210 can be configured to attach to the pull tab. In many embodiments, wiper support 6210 can be made of foam or an elastomeric material. Wiper support 6210 can have sufficient thickness to ensure a close contact and/or pressure between wiper surface 6220 and the screen of the device when wiper surface 6220 is pulled across the screen of the device. In many embodiments, wiper surface 6220 can be made of a fabric (e.g., a microfiber cloth), soft silicone, an extruded rubber, or another suitable material. In a number of embodiments, wiper surface 6220 can include a slot 6230. In some embodiments, slot 6230 can extend partially or fully through the thickness of wiper surface 6220. In some embodiments, slot 6230 can be debossed in wiper surface 6220. In certain embodiments, wiper surface 6220 can be as long as, or slightly longer than, the width of the screen of the device. In some embodiments, slot 6230 can be as long as the width of the screen of the device, and wiper surface 6220 can extend an additional approximately 2 mm on each side of slot 6220. In a number of embodiments, wiper surface 6220 can have a width of approximately 10 mm, slot 6230 can have a width of approximately 2 mm, and wiper surface 6220 can extend 4 mm on each side of slot 6230.

In many embodiments, as wiper 6200 is pulled across the screen of the device, the leading edge and/or the material of wiper surface 6220 can intercept dust particles. Slot 6230 can intercept dust particles that are not intercepted by the leading edge or the material of wiper surface 6220, such as a rounded dirt particle that rolls across wiper surface 6220. In a number of embodiments, including slot 6230 in wiper surface 6220 can advantageously decrease the surface area of wiper surface 6220, which can advantageously increase the pressure of the remaining surface of wiper surface 6220 on the screen of the device during wiping and forestall dust and/or dirt particles from rolling past the leading edge of wiper surface 6220 or slot 6230.

Figure 63:
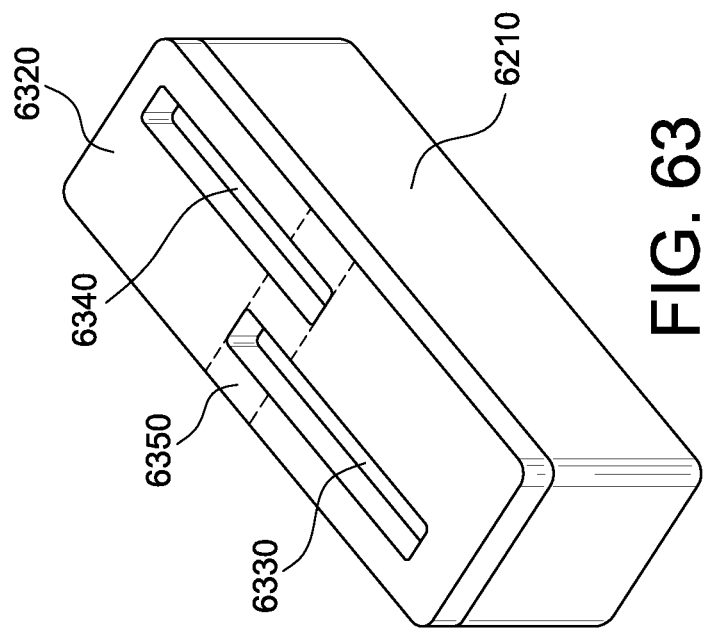
FIG. 63 illustrates a perspective view of a wiper, according to another embodiment.

Other embodiments of wipers, such as wiper 6200, can have additional slots. For example, FIG. 63 illustrates a perspective view of a wiper 6300. Wiper 6300 is merely exemplary and embodiments of the wiper are not limited to embodiments presented herein. The wiper can be employed in many different embodiments or examples not specifically depicted or described herein. Wiper 6300 can be similar to wiper 157 (FIG. 1), wiper 457 (FIGS. 4-5), wiper 657 (FIG. 6), wiper 757 (FIG. 7), wiper 2857 (FIG. 28), and/or wiper 6200 (FIG. 62), and various components and/or constructions of wiper 6200 can be substantially identical or similar to various components of wiper 157 (FIG. 1), wiper 457 (FIGS. 4-5), wiper 657 (FIG. 6), wiper 757 (FIG. 7), wiper 2857 (FIG. 28), and/or wiper 6200 (FIG. 62). In many embodiments, wiper 6300 can include wiper support 6210 and a wiper surface 6320 at the top side of wiper support 6210. The bottom side of wiper support 6210 can be configured to attach to a pull tab, as described above.

In a number of embodiments, wiper surface 6320 can include a slot 6330 and slot 6340. In some embodiments, slots 6330 and 6340 can extend partially across the length of wiper surface 6320. In a number of embodiments, slot 6330 can extend across one half of the length of wiper surface 6320 and slot 6340 can extend across the other half of the length of wiper surface 6320. In certain embodiments, slots 6330 and 6340 can each extend into an overlap region 6350. In some embodiments, overlap region 6350 can extend approximately 4 mm. Overlap region 6350 can advantageously provide sufficient overlap in the wiping paths of slots 6330 and 6340 as slots 6330 and 6340 wipe across the screen of the device to ensure rolling dust particles roll in either slot 6330 or slot 6340. In other embodiments, slots 6330 and 6340 can each extend across the length of wiper surface 6320 and/or the width of the screen of the device, such that rolling dust particles could be intercepted by two slots. In yet additional embodiments, slots 6330 and 6250 can be positioned in another suitable configuration and/or wiper 6300 can include additional slots.

Figure 64:
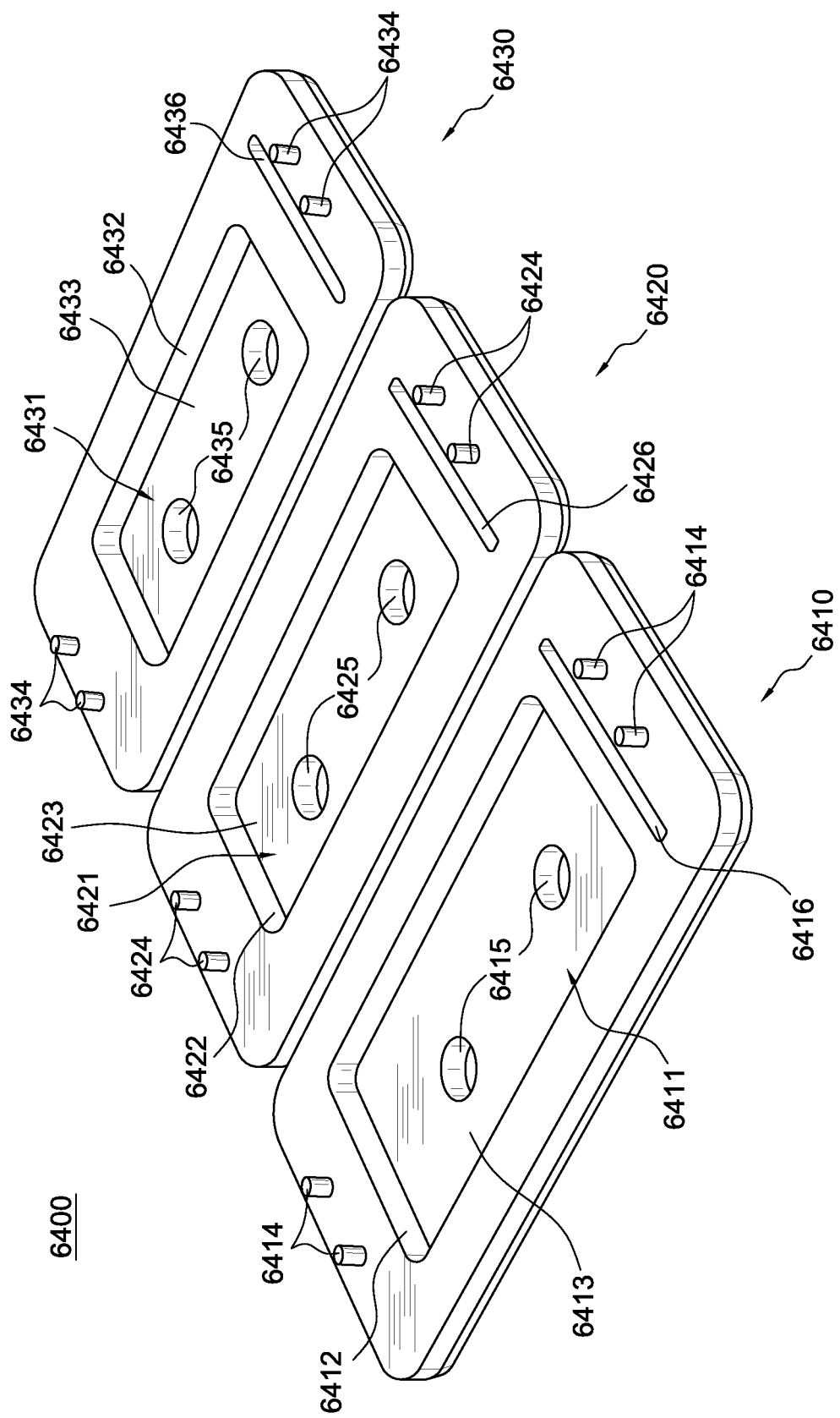
FIG. 64 illustrates a top side view of a set of cradles, according to another embodiment.

Turning ahead in the drawings, FIG. 64 illustrates a top side view of a set of cradles 6400. Set of cradles 6400 can include a cradle 6410 for a first device, a cradle 6420 for a second device, and cradle 6430 for a third device. Cradles 6410, 6420, and 6430 are merely exemplary and embodiments of the cradles are not limited to embodiments presented herein. The cradles can be employed in many different embodiments or examples not specifically depicted or described herein. Cradles 6410, 6420, and/or 6430 can be similar to cradle 310 (FIG. 3), cradle 832 (FIG. 8), cradle 1620 (FIG. 16), cradle 2032 (FIG. 20), cradle 3100 (FIG. 31), cradle 3520 (FIG. 35), cradle 3710 (FIGS. 37-38) and/or cradle 4630 (FIGS. 46-50), and various components and/or constructions of cradles 6410, 6420, and/or 6430 can be substantially identical or similar to various components of cradle 310 (FIG. 3), cradle 832 (FIG. 8), cradle 1620 (FIG. 16), cradle 2032 (FIG. 20), cradle 3100 (FIG. 31), cradle 3520 (FIG. 35), cradle 3710 (FIGS. 37-38) and/or cradle 4630 (FIGS. 46-50). Cradles 6410, 6420, and/or 6430 can be used with an overlay applicator, e.g., overlay applicator 3550 (FIG. 35), to apply an overlay to the screen of the device.

Cradle 6410 can include a device slot 6411 in which a first device can be placed with the screen of the first device facing upwards or away from device slot 6411. In some embodiments, device slot 6411 is conformal with the first device. Device slot 6411 can have sides 6412 and a bottom 6413. Cradle 6410 can have a thickness greater than the thickness of device slot 6411 and/or the first device. Similarly, cradle 6420 can include a device slot 6421, which can include sides 6422 and a bottom 6423, and/or cradle 6430 can include a device slot 6431, which can include sides 6432 and a bottom 6433. Device slot 6421 can be configured to hold a second device with the screen of the second device facing upwards or away from device slot 6421, and/or device slot 6431 can be configured to hold a third device with the screen of the third device facing upwards or away from device slot 6431. Device slot 6421 can be conformal with the second device, and/or device slot 6431 can be conformal with the third device. Cradle 6420 can have a thickness greater than the thickness of device slot 6421 and/or the second device, and cradle 6430 can have a thickness greater than the thickness of device slot 6431 and/or the third device.

In many embodiments, cradle 6410 can include an alignment base 6414, which can engage with an alignment mechanism of the overlay applicator, such as alignment mechanism 3557 (FIG. 35) on overlay applicator 3550 (FIG. 35). In some embodiments, alignment base 6414 can be one or more protrusions that can fit inside the one or more slots of alignment mechanism 3557 (FIG. 35). For example, as shown in FIG. 35, alignment mechanism 3557 can include two holes on each of alignment tabs 3556 at each end of overlay applicator 3550. Alignment base 6414 can include two protrusions at each end of cradle 6410 configured to engage with the two holes at each end of alignment mechanism 3557 (FIG. 35). Alignment base 6414 and alignment mechanism 3557 (FIG. 35) can be configured and positioned such that when alignment mechanism 3557 (FIG. 35) is engaged with alignment base 6414, the overlay can be positioned directly above the screen of the first device in device slot 6411, and aligned such that the overlay will be adhered in an accurate position on the screen when the adhesive release liner is removed. In certain embodiments, cradle 6410 can include one or more bottom apertures 6415, which can facilitate removal of the first device from cradle 6410.

In various embodiments, cradle 6410 can include a pull slot 6416. Pull slot 6416 can be similar to pull slot 3515 (FIG. 35). In many embodiments, pull slot 6416 can be located between device slot 6411 and one side of alignment base 6414 and can extend to the bottom and/or side of cradle 6410. In many embodiments, a pull tab, such as pull tab 3555 (FIG. 35) can be inserted through pull slot 6416, which can allow pull tab 3555 (FIG. 35) to be pulled while overlay applicator 3550 (FIG. 35) is secured at both ends of alignment base 6414.

Cradle 6420 can include an alignment base 6424, and/or cradle 6430 can include an alignment base 6434. Alignment base 6424 and/or alignment base 6434 can be similar or identical to alignment base 6414. Cradle 6420 can include one or more bottom apertures 6425, and/or cradle 6430 can include one or more bottom apertures 6435. Bottom apertures 6425 and/or bottom apertures 6435 can be similar or identical to bottom apertures 6415. Cradle 6420 can include a pull slot 6426, and/or cradle 6430 can include a pull slot 6436. Pull slot 6426 and/or pull slot 6436 can be similar or identical to pull slot 6416.

Set of cradles 6400 can be used with overlay applicators, such as overlay applicator 3550 (FIG. 35), to apply overlays to various different devices. For example, cradle 6410 can be configured to apply an overlay on the first device (e.g., a Samsung Galaxy S®4), cradle 6420 can be configured to apply an overlay on the second device (e.g., an Apple iPhone® 5), and cradle 6430 can be configured to apply an overlay on the third device (e.g., an Apple iPhone® 4). In other embodiments, set of cradles 6400 can include fewer or additional cradles, and/or can include cradles configured to be used with overlay applicator 3550 (FIG. 35) to apply overlays on additional devices.

Figure 65:
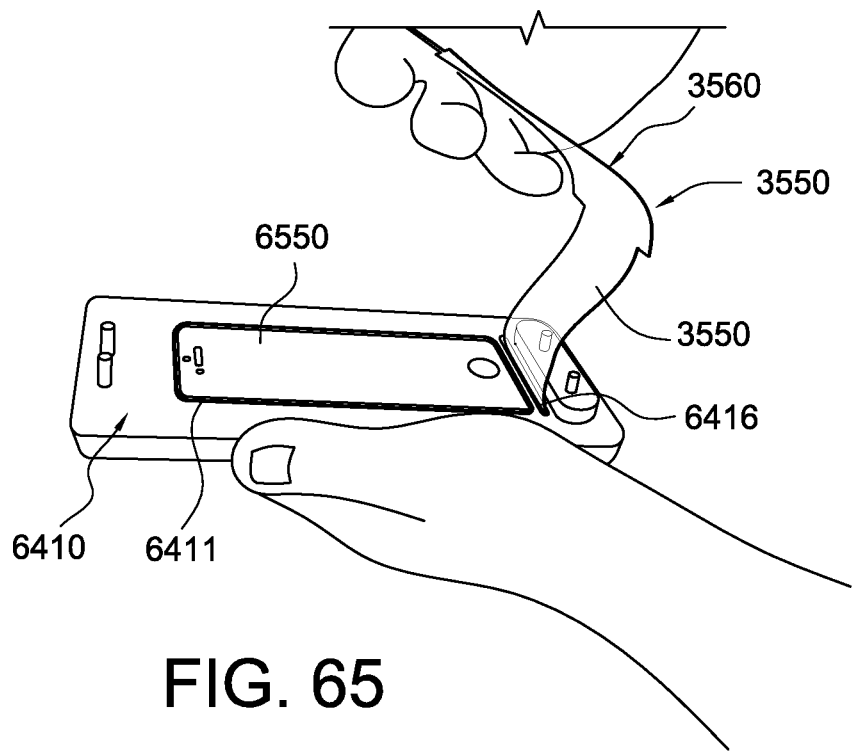
FIG. 65 illustrates a perspective view of the overlay applicator of FIG. 35 being utilized with one of the cradles of the set of cradles of FIG. 64, the cradle holding a device.

Turning ahead in the drawings, FIG. 65 illustrates a perspective view of overlay applicator 3550 being utilized with cradle 6410, which is holding a device 6550. As shown in FIG. 65, device 6550 can be inserted in device slot 6411 with the screen of device 6550 facing upwards or away from device slot 6411. Next, pull tab 3555 can be inserted in and/or lowered through pull slot 6416 until device portion 3560 of overlay applicator 3550 is positioned over the screen of device 6550.

Figure 66:
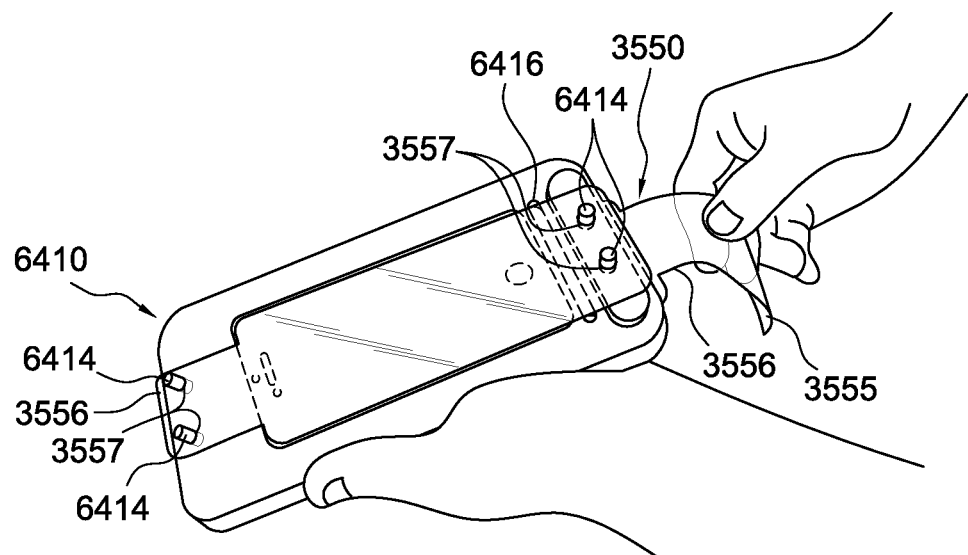
FIG. 66 illustrates a perspective view of the overlay applicator of FIG. 35 being utilized with the cradle of FIG. 65, which is holding the device of FIG. 65.

FIG. 66 illustrates a perspective view of overlay applicator 3550 being utilized with cradle 6410, which is holding a device 6550. As shown in FIG. 66, overlay applicator 3550 can be secured to cradle 6410 by engaging alignment mechanism 3557 on alignment tabs 3556 with alignment base 6414. After overlay applicator 3550 is secured to cradle 6410, pull tab 3555 can be pulled to remove the adhesive release liner from the bottom of the overlay and expose the adhesive on the bottom of the overlay to the screen of device 6550 (FIG. 65). As the adhesive release liner is removed, or alternatively, after the adhesive release liner is partially or fully removed, from the overlay, the overlay can be adhered to the screen of device 6550 (FIG. 65). In some embodiments, the overlay can be secured at the screen of device 6550 (FIG. 65), such that adhesion can begin to occur upon removal of the adhesive release liner. After the overlay is adhered to the screen of device 6550 (FIG. 65), device 6550 (FIG. 65) can be removed from cradle 6410 and protective film 3552 (FIG. 35) can be peeled off of the overlay.

Figure 67:
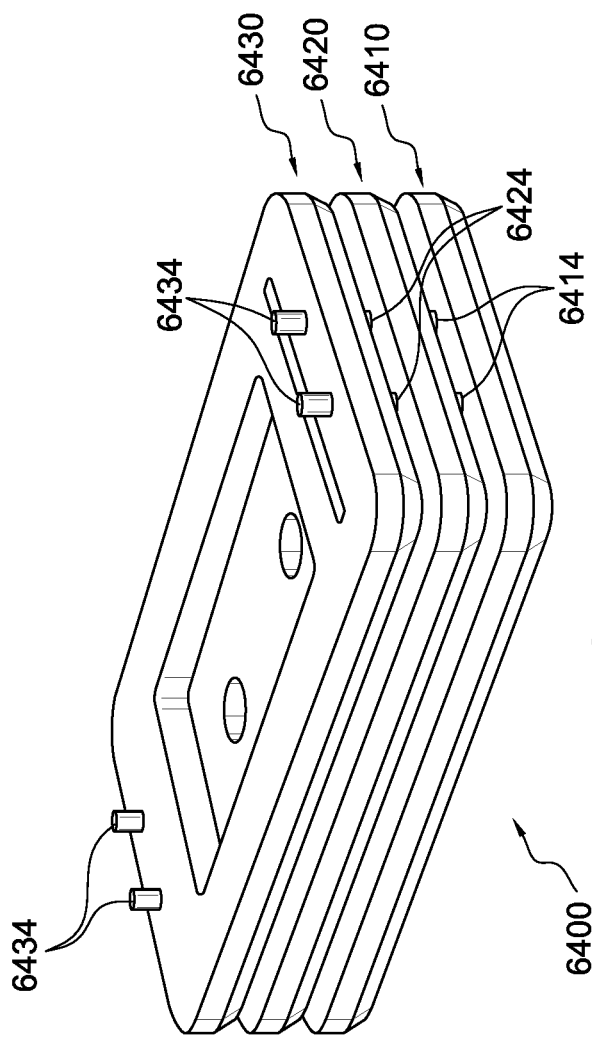
FIG. 67 illustrates a perspective view of the set of cradles of FIG. 64 in a stacked configuration.
Figure 68:
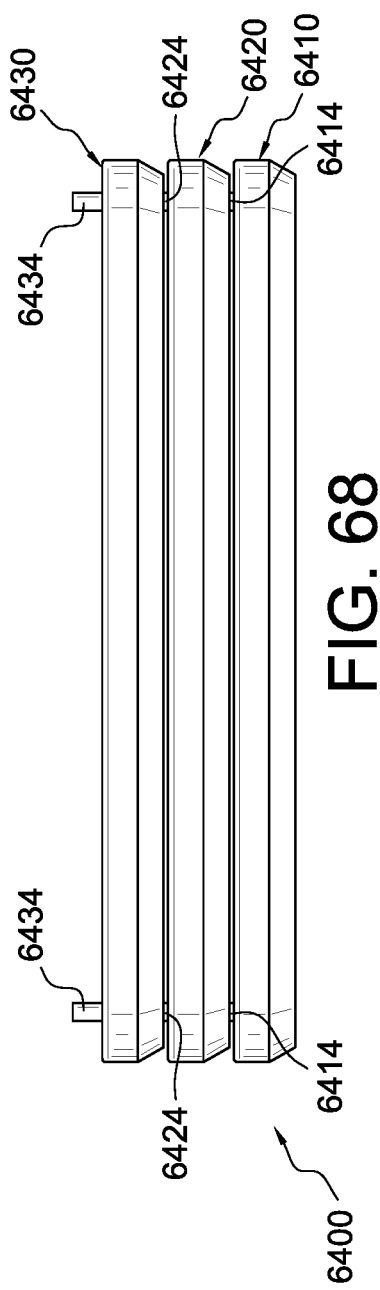
FIG. 68 illustrates a side view of the set of cradles of FIG. 64 in a stacked configuration.

Turning ahead in the drawings, FIG. 67 illustrates a perspective view of set of cradles 6400, with cradles 6410, 6420, and 6430 in a stacked configuration. FIG. 68 illustrates a side view of set of cradles 6400 in a stacked configuration. In a number of embodiments, each cradle in set of cradles 6400 can be stackable with the other cradles in set of cradles 6400. In various embodiments, each cradle of set of cradles 6400 can include stacking slots (not shown) at each end on the bottom side of the cradle (e.g., 6410, 6420, 6430), which can engage with an alignment base (e.g., 6414, 6424, 6434) of the next lower cradle in the stacked set of cradles 6400. For example, as shown in FIGS. 67-68, alignment base 6414 of cradle 6410 can engage with stacking slots (not shown) on cradle 6420 to secure cradle 6420 above cradle 6410, and alignment base 6424 of cradle 6420 can engage with stacking slots (not shown) on cradle 6430 to secure cradle 6430 above cradle 6420, such that cradle 6410, cradle 6420, and cradle 6430 are stacked in a coterminous configuration. Stacking each cradle of set of cradles 6400 can advantageously save table space and allow set of cradles to be kept in a stable compact arrangement.

Figure 69:
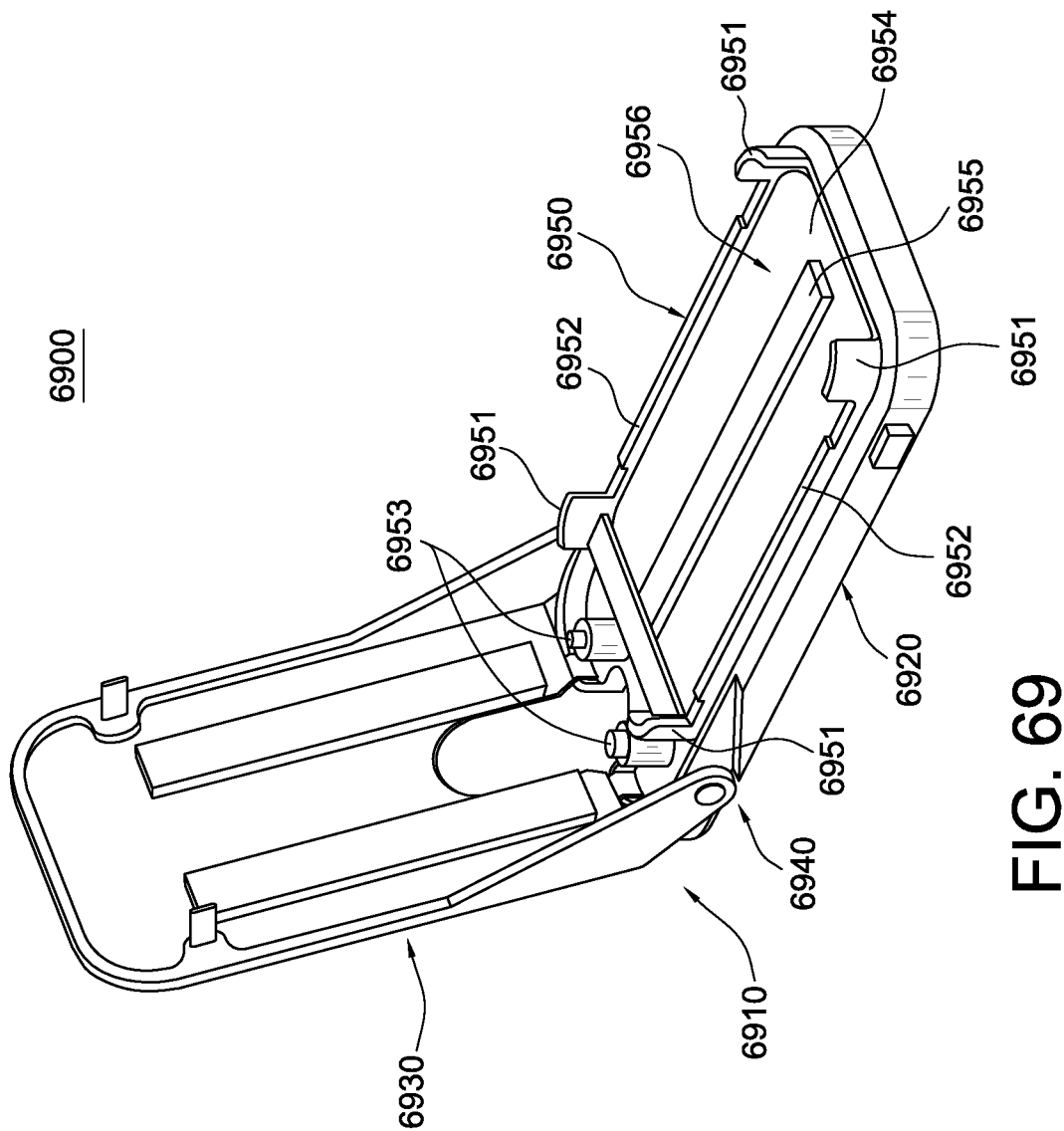
FIG. 69 illustrates a perspective view of a machine, according to another embodiment.

Turning ahead in the drawings, FIG. 69 illustrates a perspective view of a machine 6900, which can be used with an overlay applicator, such as overlay applicator 3000 (FIG. 30), to apply an overlay, such as overlay 2930 (FIGS. 29-30) to the screen of a device. Machine 6900 is merely exemplary and embodiments of the machine are not limited to the embodiments presented herein. The machine can be employed in many different embodiments or examples not specifically depicted or described herein. In various embodiments, machine 6900 can include a clamshell frame 6910 and a cradle 6950. In a number of embodiments, clamshell frame 6910 can include a support base 6920, a lid 6930, and a hinge mechanism 6940. In some embodiments, cradle 6950 can be removably attached to support base 6920.

Cradle 6950 can be similar to cradle 3100 (FIG. 31-34). In some embodiments, cradle 6950 can include a bottom frame 6954, corner frames 6951, and/or side frames 6952, which together can form a device slot 6956, and which can provide support for the device and/or provide a snug fit for the device to prevent movement of the device when held by cradle 6950. In many embodiments, cradle 6950 can include an alignment base 6953, which can engage with alignment mechanism 2915 (FIGS. 29-30) of overlay applicator 3000 (FIG. 30). In some embodiments, alignment base 6953 can be one or more protrusions that can fit inside the one or more slots of alignment mechanism 2915 (FIGS. 29-30). Alignment base 6953 and alignment mechanism 2915 (FIGS. 29-30) can be configured and positioned such that when alignment mechanism 2915 (FIGS. 29-30) is engaged with alignment base 6953, overlay 2930 (FIGS. 29-30) can be positioned directly above the screen of the device held by cradle 6950, and aligned such that overlay 2930 (FIGS. 29-30) can be adhered in an accurate position on the screen of the device when adhesive release liner 2740 (FIGS. 27-30) is removed, as described below.

In many embodiments, cradle 6950 can include central support 6955. Central support 6955 can be similar to central support 3150 (FIG. 31). In many embodiments, central support 6955 can provide support for overlay applicator 3000 (FIG. 30). In a number of embodiments, central support 6955 can press overlay applicator 3000 (FIG. 30) against the screen of the device as adhesive release liner 2740 (FIGS. 27-30) is peeled away from overlay 2930 (FIGS. 29-30), as described below.

Figure 70:
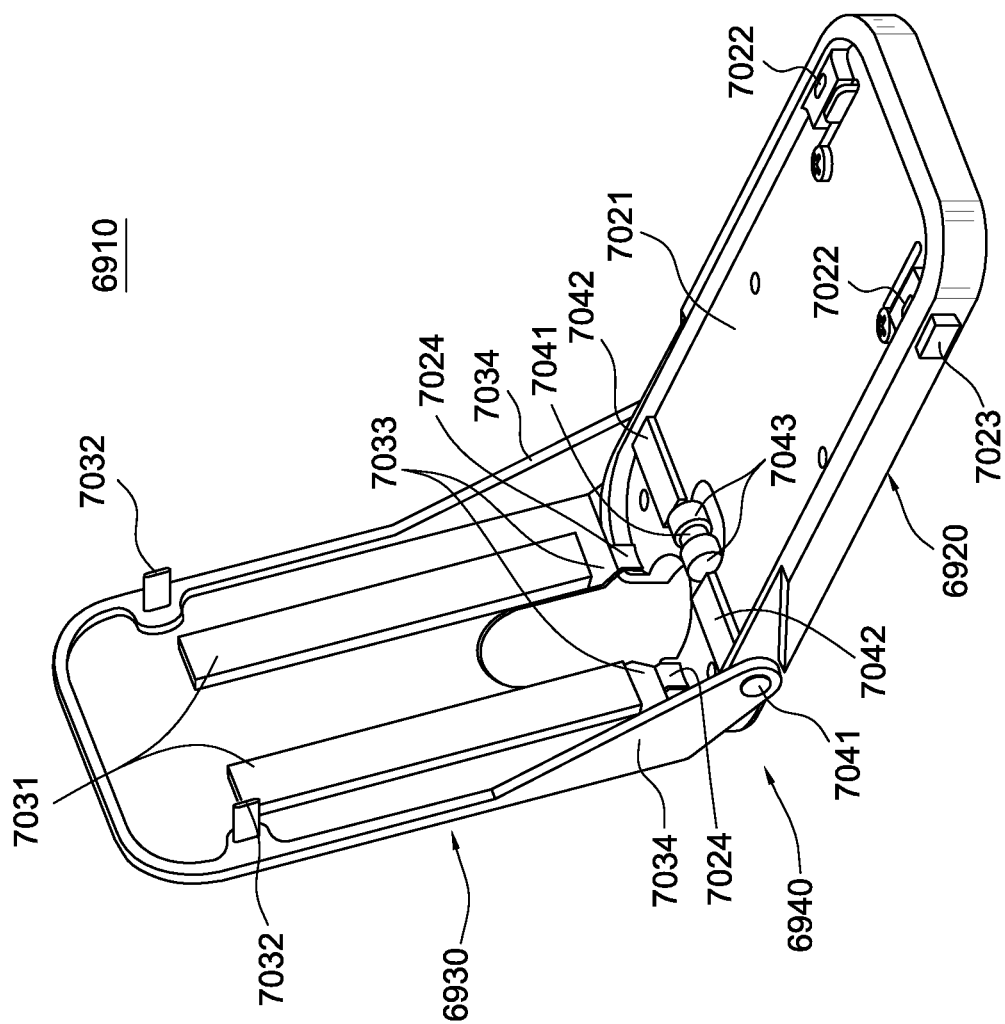
FIG. 70 illustrates a perspective view of a clamshell frame of the machine of FIG. 69.

Turning ahead in the drawings, FIG. 70 illustrates a perspective view of clamshell frame 6910. In several embodiments, support base 6920 can include a cradle support 7021, which can securely hold cradle 6950 (FIG. 69). In a number of embodiments, cradle 6950 (FIG. 69) can be removably inserted in cradle support 7021. In other embodiments, cradle 6950 (FIG. 69) can be fixedly attached to cradle support 7021. In a number of embodiments, cradle support 7021 can hold various different cradles, such as cradles configured for various different devices.

Figure 71:
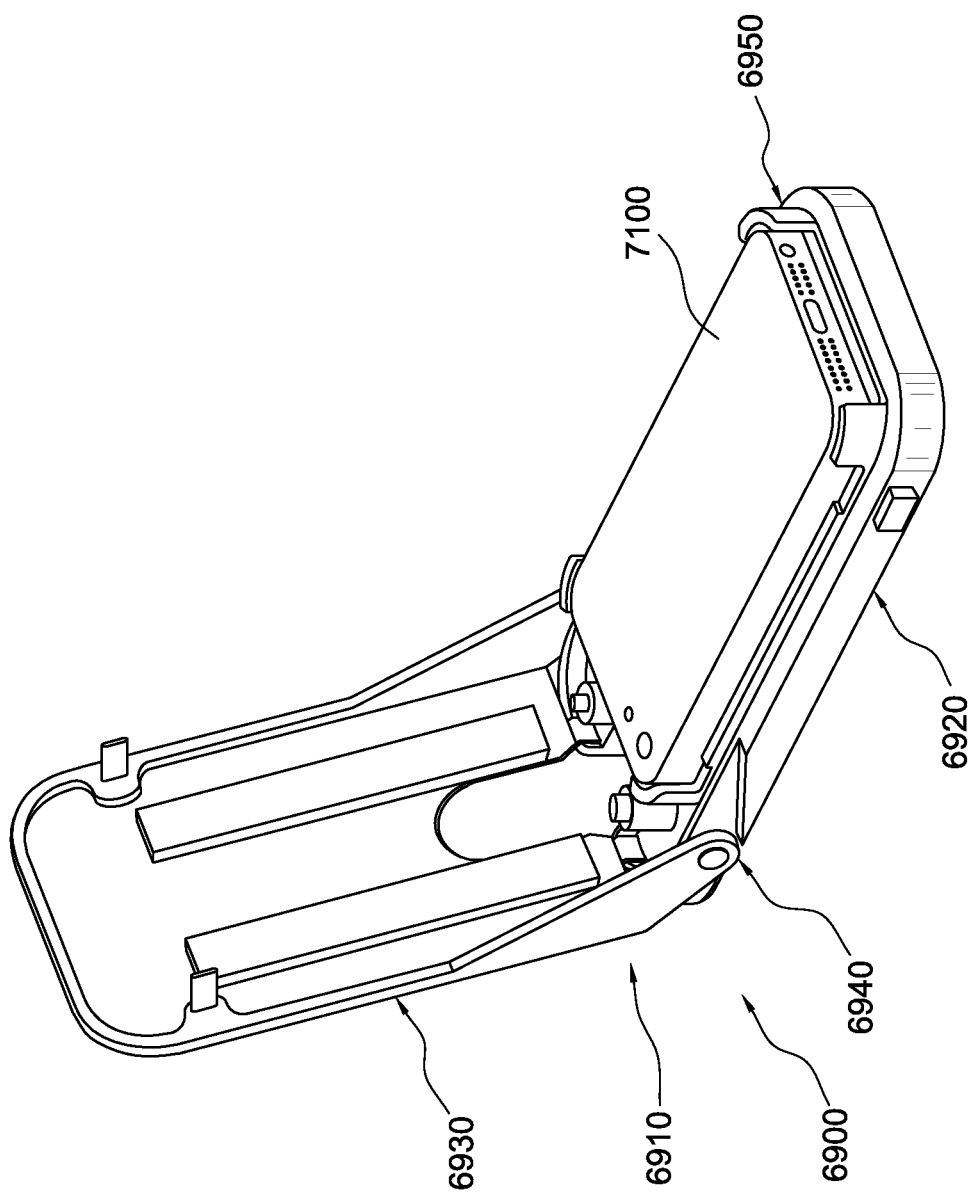
FIG. 71 illustrates a perspective view of the machine of FIG. 69 in an open configuration while holding a device.
Figure 72:
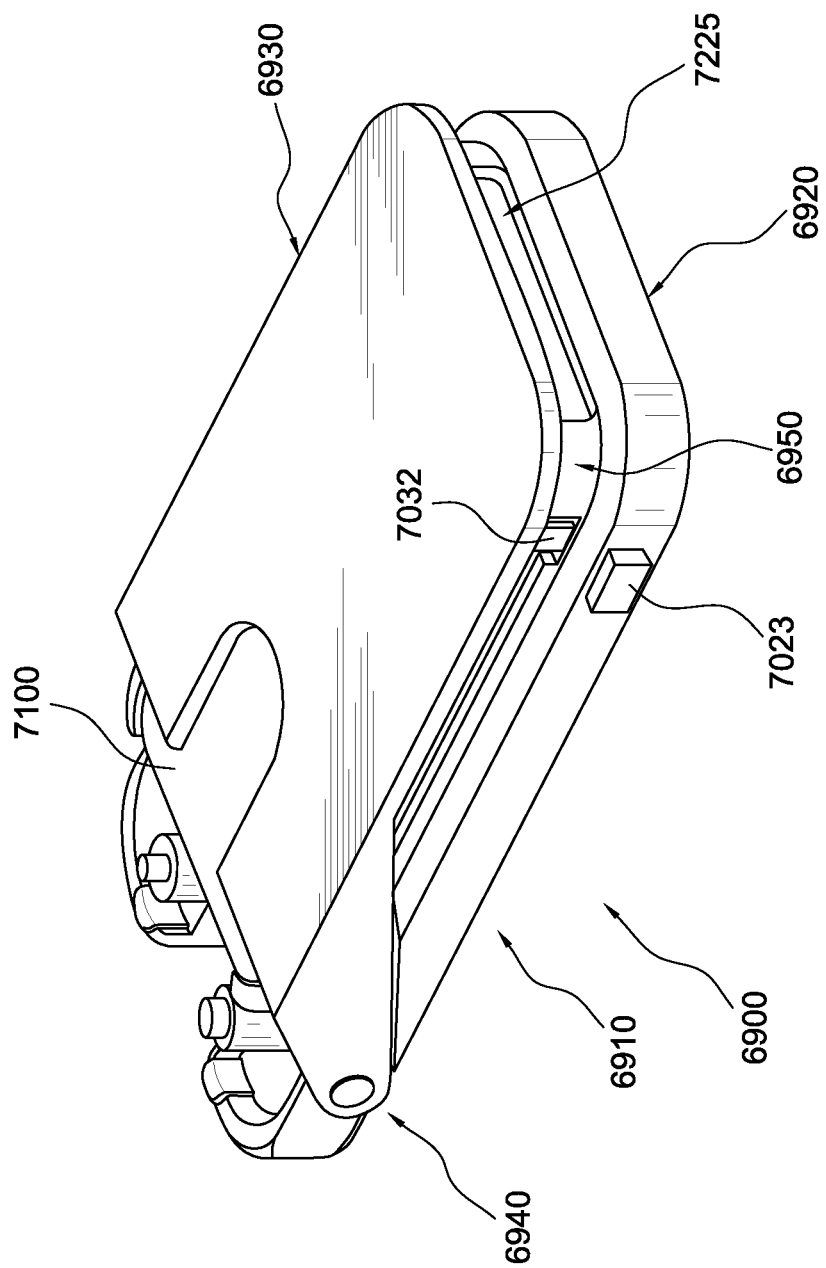
FIG. 72 illustrates a perspective view of the machine of FIG. 69 in a closed configuration while holding the device of FIG. 71.

In various embodiments, hinge mechanism 6940 attach lid 6930 to support base 6920, and/or can allow lid 6930 rotate with respect to support base 6920 between an open configuration, as shown in FIGS. 70-71 (FIG. 71 is described below), and a closed configuration, as shown in FIG. 72, described below. In some embodiments, hinge mechanism 6940 can include one or more axles 7041. In certain embodiments, axles 7041 can be secured in one or more base axle mounts 7042, and/or can be attached to lid 6930 by one or more lid axle supports 7034. In a number of embodiments, lid axle supports 7034 can be fixedly attached to axles 7041. In various embodiments, hinge mechanism 6940 can include one or more springs 7043, which can be attached to axles 7041 and support base 6920, and which can bias lid 6930 to rotate away from support base 6920 in an open configuration, as shown in FIGS. 70-71.

In many embodiments, support base 6920 can include one or more latching slots 7022, one or more release buttons 7023, and/or one or more latches (not shown). Lid 6930 can include one or more catches 7032. In a number of embodiments, when machine 6900 (FIG. 69) is in the closed configuration, as shown in FIG. 72, catches 7032 can be inserted inside latching slots 7022 and can be engaged with the latches to secure lid 6930 proximate to support base 6920 in the closed configuration. In various embodiments, release buttons 7023 can be pressed to release catches 7032 from the latches, which can allow lid 6930 to rotate open away from support base 6920, so as to allow machine 6900 to open to the open configuration, as shown in FIG. 70. As described above, hinge assembly 6940 can be spring-loaded such that, upon pressing release buttons 7023 when machine 6900 is in a closed configuration, as shown in FIG. 72, machine 6900 (FIG. 69) can open to an open configuration, as shown in FIGS. 70-71. In certain embodiments, support base 6920 can include one or more bumpers 7024, which can support one or more rear portions 7033 of lid 6930 when machine 6900 (FIG. 69) is in an open configuration, and can prevent lid 6930 from opening further.

In a number of embodiments, lid 6930 can include one or more pads 7031. Pads 7031 can be made of foam or an elastomeric material. In a number of embodiments, pads 7031 can press the device down upon overlay applicator 2930 (FIGS. 29-30) when machine 6900 (FIG. 69) is in a closed configuration, as shown in FIG. 72.

Turning ahead in the drawings, FIG. 71 illustrates a perspective view of machine 6900 in an open configuration while holding a device 7100. In the open configuration, lid 6930 can be rotated about hinge assembly 6940 away from support base 6920. In many embodiments, cradle 6950 can be inserted and/or removed from clamshell frame 6910 while machine 6900 is in the open configuration. In several embodiments, overlay applicator 3000 (FIG. 30) can be attached to cradle 6950 while machine 6900 is in the open configuration. Overlay applicator 3000 (FIG. 30) can be positioned on cradle 7150 such that protective film 2920 (FIGS. 29-30) is placed against central support 6955, and adhesive release liner 2740 (FIGS. 27-30) and pull tab 2750 (FIGS. 27-30) can be folded back across adhesive release liner 2740 (FIGS. 27-30), such that alignment tab 2910 (FIGS. 29-30) is partially or fully uncovered and wiper 2857 (FIGS. 28-30) is face up. In a number of embodiments, device 7100 can be inserted in device slot 6956 of cradle 6950. Device 7100 can be inserted with the screen of device 7100 facing downward against overlay applicator 3000 (FIG. 30).

Turning ahead in the drawings, FIG. 72 illustrates a perspective view of machine 6900 in a closed configuration while holding device 7100. In a closed configuration, lid 6930 can be rotated about hinge assembly 6940 proximate to support base 6920. As described above, catches 7032 can engage with the latches in support base 6920 to securely hold machine 6900 in a closed configuration. In many embodiments, pads 7031 (FIG. 70) can press down upon the back of device 7100 to press the screen of device 7100 against overlay applicator 3000 (FIG. 30). In many embodiments, machine 6900 can include an end slot 7225 in clamshell frame 6910 and/or cradle 6950 through which pull tab 2750 (FIGS. 27-30) can extend and be pulled to remove adhesive release liner 2740 (FIGS. 27-30) from overlay 2930 (FIGS. 29-30).

Figure 73:
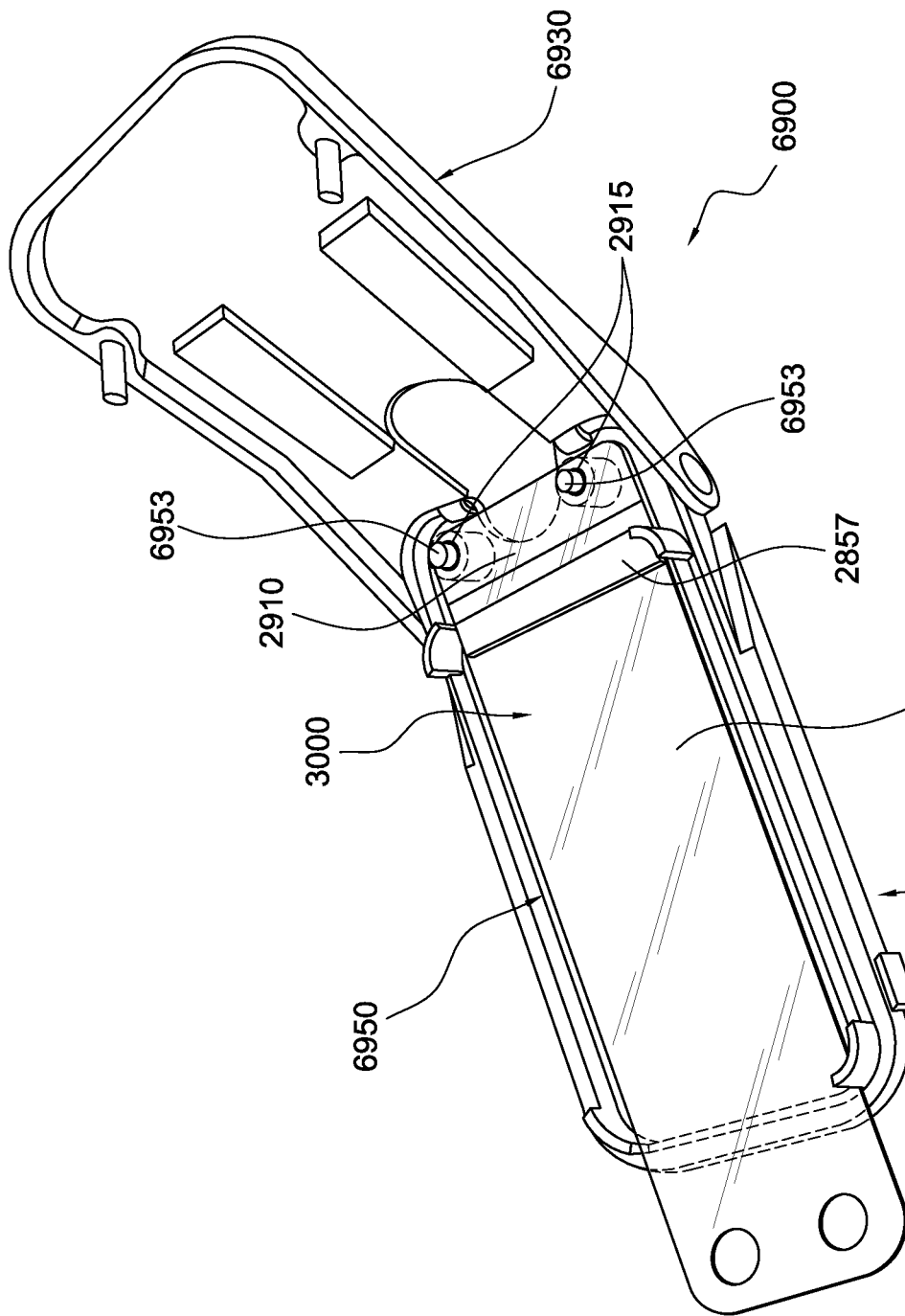
FIG. 73 illustrates a perspective view of the machine of FIG. 69 in an open configuration with the overlay applicator of FIG. 30 placed on a cradle of the machine.
Figure 74:
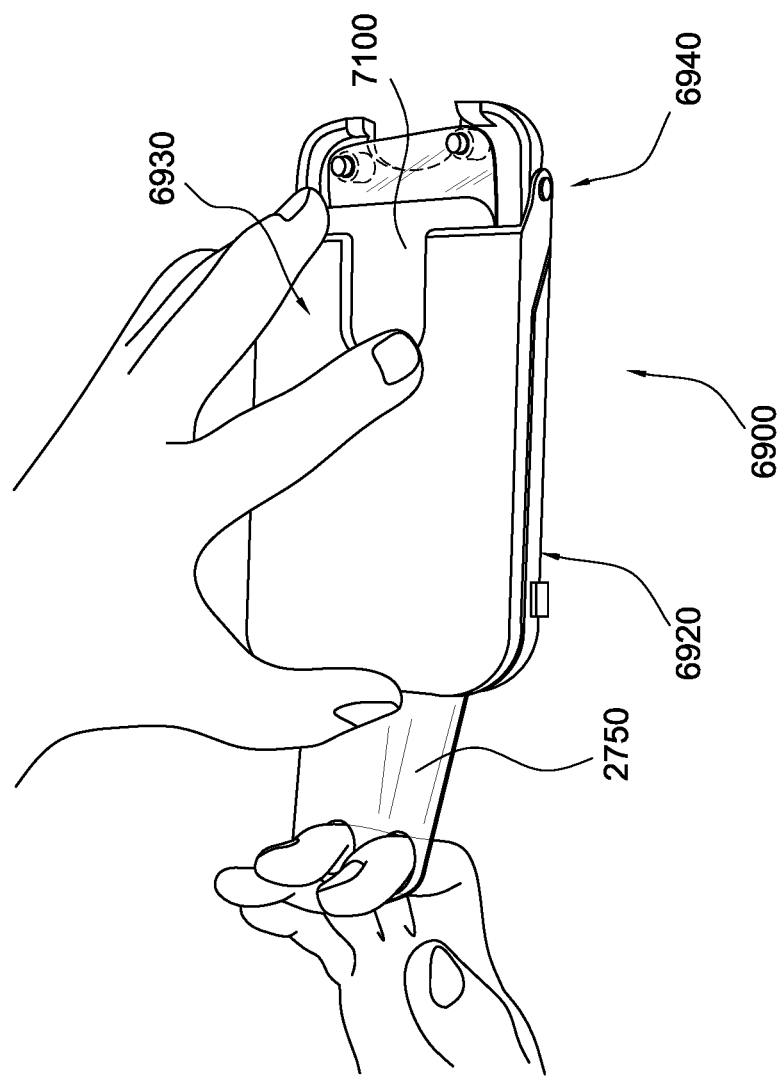
FIG. 74 illustrates a perspective view of the machine of FIG. 69 in a closed configuration holding the overlay applicator of FIG. 30 and the device of FIG. 71, with a pull tab of the overlay applicator being pulled

Turning ahead in the drawings, FIGS. 73-74 illustrate using machine 6900 to apply overlay 2930 (FIGS. 29-30) to the screen of device 7100 (FIG. 71). FIG. 73 illustrates a perspective view of machine 6900 in an open configuration with overlay applicator 3000 placed on cradle 6950. Overlay applicator 3000 can be positioned such that protective film 2920 (FIGS. 29-30) is placed against central support 6955 (FIG. 69), and adhesive release liner 2740 (FIGS. 27-30) and pull tab 2750 are above protective film 2920 (FIGS. 29-30). Pull tab 2750 can be folded back across adhesive release liner 2740 (FIGS. 27-30), such that alignment tab 2910 is partially or fully uncovered and wiper 2857 is face up. In many embodiments, alignment mechanism 2915 of alignment tab 2910 can be inserted on alignment base 6953 of cradle 6950. Machine 6900 can be in an open configuration, with lid 6930 opened away from support base 6920 when overlay applicator 3000 is placed on cradle 6950.

In many embodiments, device 7100 can be placed in device slot 6956 (FIG. 69) of cradle 6950. In many embodiments, device 7100 can be placed in device slot 6956 (FIG. 69) with the screen of device 7100 facing downwards. In various embodiments, the screen of device 7100 can rest against or be proximate to pull tab 2750 and/or wiper 2857.

FIG. 74 illustrates a perspective view of machine 6900 in a closed configuration holding overlay applicator 3000 (FIG. 73) and device 7100, with pull tab 2750 being pulled. In many embodiments, lid 6930 can be lowered until catches 7032 (FIG. 70) engage with the latches in latching slots 7022 (FIG. 70), so as to change machine 6900 to a closed configuration. In many embodiments, lid 6930 can rotate with respect to support base 6920 about hinge mechanism 6940. In a closed configuration, pads 7031 (FIG. 70) can press downward on the back of device 7100 and hold device 7100 securely within machine 6900. In many embodiments, central support 6955 (FIG. 69) and pads 7031 (FIG. 70) can press the screen of device 7100 and overlay applicator 3000 (FIG. 73) closely together.

As shown in FIG. 74, pull tab 2750 can be pulled to remove adhesive release liner 2740 (FIGS. 27-30) from the adhesive side of overlay 2930 (FIGS. 29-30). In many embodiments, as pull tab 2750 is pulled, wiper 2857 (FIG. 73) can wipe across the screen of device 7100 to remove any dust from the screen of device 7100. In a number of embodiments, as pull tab 2750 is pulled and adhesive release liner 2740 (FIGS. 27-30) is removed, central support 6955

(FIG. 69) can be depressed slightly as the fold in adhesive release liner 2740 (FIGS. 27-30) moves from one end to the other end of device 7100, and can rebound to provide pressure against protective film 2920 (FIGS. 29-30) to press the exposed adhesive of overlay 2930 (FIGS. 29-30) against the screen of device 7100 as it is exposed.

In many embodiments, lid 6930 can next be raised so as to change machine 6900 to an open configuration. In a number of embodiments, lid 6930 can be raised by pushing release buttons 7023, so as to release catches 7032 (FIG. 70) from the latches in latching slots 7022 (FIG. 70), such that springs 7043 (FIG. 70) cause axles 7041 (FIG. 70) to rotate and open lid 6930. Lid 6930 can be raised to an open configuration to facilitate removal of device 7100 from cradle 6950.

In a number of embodiments, device 7100 can be removed, along with overlay 2930 (FIGS. 29-30) and protective film 2920 (FIGS. 29-30), from cradle 6950 of machine 6900. Protective film 2920 (FIGS. 29-30) can be removed from overlay 2930 (FIGS. 29-30), which is adhered to device 7100. After protective film 2920 (FIGS. 29-30) has been peeled away from overlay 2930 (FIGS. 29-30), application of overlay 2930 (FIGS. 29-30) to the screen of device 7100 can be complete.

Figure 75:
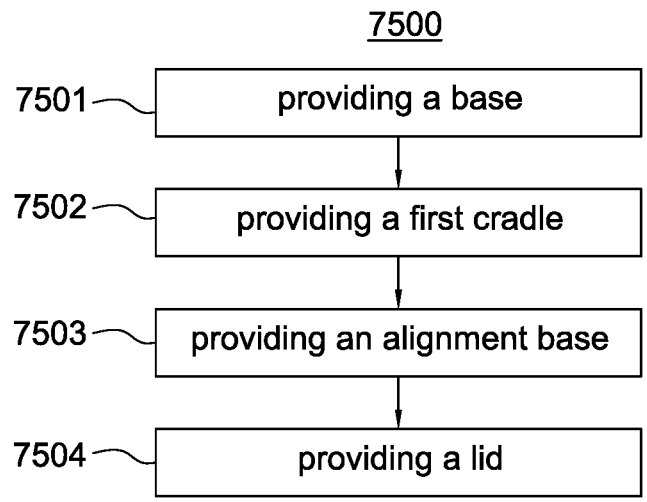
FIG. 75 illustrates a flow chart for a method of providing a machine, according to another embodiment.

Proceeding to the next drawing, FIG. 75 illustrates a flow chart for an embodiment of a method 7500 of providing a machine. Method 7500 is merely exemplary and is not limited to the embodiments presented herein. Method 7500 can be employed in many different embodiments or examples not specifically depicted or described herein. In some embodiments, the procedures, the processes, and/or the activities of method 7500 can be performed in the order presented. In other embodiments, the procedures, the processes, and/or the activities of the method 7500 can be performed in any other suitable order. In still other embodiments, one or more of the procedures, the processes, and/or the activities in method 7500 can be combined or skipped. In some embodiments, the machine can be similar or identical to machine 6900 (FIGS. 69-74).

Referring to FIG. 75, method 7500 can include a block 7501 of providing a base. In a number of embodiments, the base can be similar or identical to support base 6920 (FIGS. 69-74). In some embodiments, the base can include a first attachment mechanism. In various embodiments, the first attachment mechanism can be similar or identical to latching slots 7022 (FIG. 70) and/or release buttons 7023 (FIGS. 70, 72).

In many embodiments, method 7500 next can include a block 7502 of providing a first cradle. The cradle can be similar or identical to cradle 3100 (FIGS. 31-34) and/or 6950 (FIGS. 69, 71-73). In several embodiments, the cradle can be configured to hold a first electronic device. The first electronic device can be similar or identical to device 7100 (FIG. 71-72, 74). In some embodiments, the first cradle can be integral with the base. In other embodiments, the first cradle can be removable from the base. In a number of embodiments, the base can be configured to hold a second cradle different from the first cradle. The second cradle can be similar or identical to cradle 3100 (FIGS. 31-34) and/or cradle 6950 (FIGS. 69, 71-72) The second cradle can be configured to hold a second electronic device having one or more different dimensions than the first electronic device.

In various embodiments, method 7500 next can include a block 7503 of providing an alignment base. The alignment base can be similar or identical to alignment base 212 (FIG. 2), alignment base 312 (FIG. 3), alignment base 835 (FIGS. 8-9, 13-14), alignment base 1632 (FIGS. 16-19), alignment base 2035 (FIG. 20, alignment base 3112 (FIGS. 31-34), alignment base 3514 (FIGS. 35-36), alignment base 3814 (FIG. 38), alignment base 4734 (FIG. 47), alignment base 6414 (FIG. 64), alignment base 6424 (FIG. 64), alignment base 6434 (FIG. 64), and/or alignment base 6953 (FIGS. 69, 73). In some embodiments, the first cradle can include the alignment base. In a number of embodiments, the base can include the alignment base.

In several embodiments, the alignment base can be configured to engage with an alignment mechanism of an overlay applicator. The overlay applicator can be similar or identical to overlay applicator 100 (FIG. 1), overlay applicator 400 (FIGS. 4-5), overlay applicator 600 (FIG. 6), overlay applicator 700 (FIG. 7), overlay applicator 1500 (FIG. 15), overlay applicator 3000 (FIG. 30), overlay applicator 3550 (FIGS. 35-36), and/or overlay applicator 6050 (FIG. 60). In many embodiments, the alignment mechanism can be similar or identical to alignment mechanism 115 (FIG. 1), alignment mechanism 415 (FIG. 4), alignment mechanism 615 (FIG. 6), alignment mechanism 715 (FIG. 7), alignment mechanism 1515 (FIG. 15), alignment mechanism 2915 (FIGS. 29-30), and/or alignment mechanism 3557 (FIGS. 35-36). The overlay applicator can include an overlay configured to be applied to a screen of the first electronic device. The overlay can be similar or identical to overlay 130 (FIG. 1), overlay 430 (FIGS. 4-5), overlay 630 (FIG. 6), overlay 730 (FIG. 7), and/or overlay 1530 (FIG. 15), and/or overlay 2930 (FIGS. 29-30). In several embodiments, the alignment base can be configured to align the overlay applicator as the overlay of the overlay applicator is applied to the screen of the first electronic device.

In some embodiments, the first cradle can include one or more frame pieces configured to securely hold the first electronic device in a device slot in a fixed position with respect to the alignment base. The one or more frame pieces can be similar or identical to bottom frame 6954 (FIG. 69), corner frames 6951 (FIG. 69), and/or side frames 6952 (FIG. 69). The device slot can be similar or identical to device slot 6956 (FIG. 69). In some embodiments, the one or more frame pieces can include four corner frames located at each corner of the first cradle. For example, the four corner frames can be similar or identical to corner frames 6951 (FIG. 69). In a number of embodiments, the machine can be configured to hold the overlay applicator between the first cradle and the screen of the electronic device when the screen of the first electronic device is facing toward the first cradle, such as shown in FIG. 71, for example.

In many embodiments, method 7500 next can include a block 7504 of providing a lid. The lid can be similar or identical to lid 6930 (FIGS. 69-74). In some embodiments, the lid can be hingedly attached to the base. For example, the lid can be hingedly attached to the base at hinge mechanism 6940 (FIGS. 69-72, 74). In several embodiments, the machine can be configured such that the lid can be rotated with respect to the base between an open configuration, as shown in FIGS. 69-71 and 73, and a closed configuration, as shown in FIGS. 72 and 74. In many embodiments, the machine can be configured in the closed configuration to facilitate applying the overlay of the overlay applicator to the screen of the first electronic device.

In many embodiments, the machine can be configured in the open configuration such that the overlay applicator and the first electronic device can be inserted and removed from the machine. In some embodiments, the machine can be configured in the closed configuration to prevent removal of the first electronic device and at least a portion of the overlay applicator from the machine. In various embodiments, the machine can be configured in the closed configuration such that a pull tab of the overlay applicator can be pulled to remove an adhesive release liner of the overlay applicator from the overlay to expose an adhesive agent of the overlay to the screen of the first electronic device. The pull tab can be similar or identical to pull tab 150 (FIG. 1), pull tab 450 (FIGS. 4-5), pull tab 650 (FIG. 6), pull tab 750 (FIGS. 7, 42, 44-45, 48-49), pull tab 1550 (FIG. 15), pull tab 2750 (FIGS. 27-30) and/or pull tab 6055 (FIG. 60). The adhesive release liner can be similar or identical to adhesive release liner 140 (FIG. 1), adhesive release liner 440 (FIGS. 4-5), adhesive release liner 640 (FIG. 6), adhesive release liner 740 (FIG. 7), adhesive release liner 1540 (FIG. 15), and/or adhesive release liner 2740 (FIGS. 27-30).

In some embodiments, the lid can include one or more pads configured to press the first electronic device toward the overlay applicator when (a) the first electronic device is in first cradle, (b) the overlay applicator is engaged with the alignment base, and (c) the machine is in the closed configuration. In various embodiments, the lid can include a second attachment mechanism configured to removably attach to the first attachment mechanism to hold the lid in the closed configuration. The second attachment mechanism can be similar or identical to catches 7032.

In various embodiments, the first cradle can include a support piece extending in a first direction. The support piece can be similar or identical to central support 3150 (FIG. 31) and/or central support 6955. In many embodiments, the support piece can include an elastomeric material. The support piece can be configured to press the adhesive agent of the overlay of the overlay applicator toward the screen of the first electronic device when the screen of the first electronic device is facing toward the support piece and the adhesive release liner of the overlay applicator is removed to expose the adhesive agent of the overlay to the screen of the first electronic device. In a number of embodiments, the support piece can be configured to press a wiper of the pull tab toward the screen of the first electronic device as the wiper moves across the screen of the electronic device in first direction when the pull tab is pulled in the first direction. The wiper can be similar or identical to wiper 157 (FIG. 1), wiper 457 (FIG. 4), wiper 657 (FIG. 6), wiper 757 (FIG. 7), wiper 2857 (FIGS. 28-30), wiper 6200 (FIG. 62), and/or wiper 6300 (FIG. 63).

Figure 76:
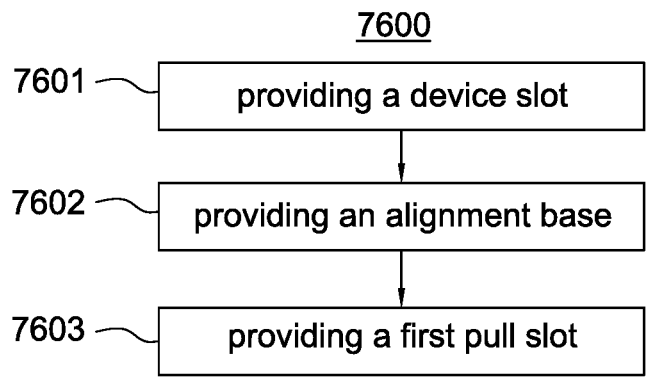
FIG. 76 illustrates a flow chart for a method of providing a cradle, according to another embodiment.

Proceeding to the next drawing, FIG. 76 illustrates a flow chart for an embodiment of a method 7600 of providing a cradle. Method 7600 is merely exemplary and is not limited to the embodiments presented herein. Method 7600 can be employed in many different embodiments or examples not specifically depicted or described herein. In some embodiments, the procedures, the processes, and/or the activities of method 7600 can be performed in the order presented. In other embodiments, the procedures, the processes, and/or the activities of the method 7600 can be performed in any other suitable order. In still other embodiments, one or more of the procedures, the processes, and/or the activities in method 7600 can be combined or skipped. In some embodiments, the cradle can be similar or identical to cradle 6410 (FIGS. 64-68), cradle 6420 (FIGS. 64, 67-68), and/or cradle 6430 (FIGS. 64, 67-68).

Referring to FIG. 76, method 7600 can include a block 7601 of providing a device slot. In a number of embodiments, the device slot can be similar or identical to device slot 6411 (FIG. 64), device slot 6421 (FIG. 64), and/or device slot 6431 (FIG. 64). In many embodiments, the device slot can be configured to securely hold an electronic device. The electronic device can be similar or identical to device 6550.

In many embodiments, method 7600 next can include a block 7602 of providing an alignment base. The alignment base can be similar or identical to alignment base 212 (FIG. 2), alignment base 312 (FIG. 3), alignment base 835 (FIGS. 8-9, 13-14), alignment base 1632 (FIGS. 16-19), alignment base 2035 (FIG. 20, alignment base 3112 (FIGS. 31-34), alignment base 3514 (FIGS. 35-36), alignment base 3814 (FIG. 38), alignment base 4734 (FIG. 47), alignment base 6414 (FIG. 64), alignment base 6424 (FIG. 64), alignment base 6434 (FIG. 64), and/or alignment base 6953 (FIGS. 69, 73). In several embodiments, the alignment base can be configured to engage with an alignment mechanism of an overlay applicator. The overlay applicator can be similar or identical to overlay applicator 100 (FIG. 1), overlay applicator 400 (FIGS. 4-5), overlay applicator 600 (FIG. 6), overlay applicator 700 (FIG. 7), overlay applicator 1500 (FIG. 15), overlay applicator 3000 (FIG. 30), overlay applicator 3550 (FIGS. 35-36), and/or overlay applicator 6050 (FIG. 60). In many embodiments, the alignment mechanism can be similar or identical to alignment mechanism 115 (FIG. 1), alignment mechanism 415 (FIG. 4), alignment mechanism 615 (FIG. 6), alignment mechanism 715 (FIG. 7), alignment mechanism 1515 (FIG. 15), alignment mechanism 2915 (FIGS. 29-30), and/or alignment mechanism 3557 (FIGS. 35-36).

In a number of embodiments, the overlay applicator can include a first alignment tab and a second alignment tab. The first alignment tab can include a first portion of the alignment mechanism. The second alignment tab can include the second portion of the alignment mechanism. In a number of embodiments, the alignment base can include a first side configured to engage with the first portion of the alignment mechanism of the overlay applicator and a second side configured to engage with the second portion of the alignment mechanism of the overlay applicator. The first and second sides of the alignment base can be similar or identical to alignment base 3514.

In many embodiments, method 7600 next can include a block 7603 of providing a first pull slot. The first pull slot can be similar or identical to pull slot 3515 (FIGS. 35-36), pull slot 6416 (FIGS. 64-65), pull slot 6426 (FIG. 64), and/or pull slot 6436 (FIG. 64). In a number of embodiments, the pull slot can be disposed between the device slot and the second side of the alignment base. In various embodiments, the cradle can be configured, when the electronic device is held within the device slot with a screen of the electronic device facing upwards or away from the device slot and/or the cradle, to hold the overlay applicator over the electronic device such that a pull tab of the overlay applicator can be pulled through the pull slot to expose an overlay of the overlay applicator to the screen of the electronic device. The pull tab can be similar or identical to pull tab 150 (FIG. 1), pull tab 450 (FIGS. 4-5), pull tab 650 (FIG. 6), pull tab 750 (FIGS. 7, 42, 44-45, 48-49), pull tab 1550 (FIG. 15), pull tab 2750 (FIGS. 27-30) and/or pull tab 6055 (FIG. 60). The overlay can be similar or identical to overlay 130 (FIG. 1), overlay 430 (FIGS. 4-5), overlay 630 (FIG. 6), overlay 730 (FIG. 7), and/or overlay 1530 (FIG. 15), and/or overlay 2930 (FIGS. 29-30).

Figure 77:
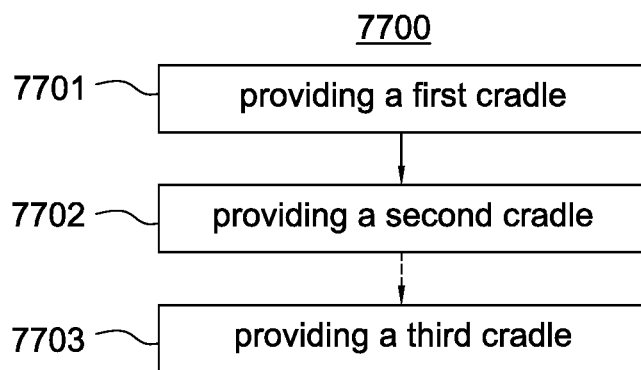
FIG. 77 illustrates a flow chart for a method of providing a set of cradles, according to another embodiment.

Proceeding to the next drawing, FIG. 77 illustrates a flow chart for an embodiment of a method 7700 of providing a set of cradles. Method 7700 is merely exemplary and is not limited to the embodiments presented herein. Method 7700 can be employed in many different embodiments or examples not specifically depicted or described herein. In some embodiments, the procedures, the processes, and/or the activities of method 7700 can be performed in the order presented. In other embodiments, the procedures, the processes, and/or the activities of the method 7700 can be performed in any other suitable order. In still other embodiments, one or more of the procedures, the processes, and/or the activities in method 7700 can be combined or skipped. In some embodiments, the set of cradles can be similar or identical to set of cradles 6400 (FIGS. 64, 67-68).

Referring to FIG. 77, method 7700 can include a block 7701 of providing a first cradle. The first cradle can be similar or identical to cradle 6410 (FIGS. 64-68), cradle 6420 (FIGS. 64, 67-68), and/or cradle 6430 (FIGS. 64, 67-68). In a number of embodiments, the first cradle can include a first device slot having first dimensions. In a number of embodiments, the first device slot can be similar or identical to device slot 6411 (FIG. 64), device slot 6421 (FIG. 64), and/or device slot 6431 (FIG. 64). In many embodiments, the first device slot can be configured to securely hold a first electronic device. The first electronic device can be similar or identical to device 6550.

In various embodiments, the first cradle can include a first alignment base. The first alignment base can be similar or identical to alignment base 212 (FIG. 2), alignment base 312 (FIG. 3), alignment base 835 (FIGS. 8-9, 13-14), alignment base 1632 (FIGS. 16-19), alignment base 2035 (FIG. 20, alignment base 3112 (FIGS. 31-34), alignment base 3514 (FIGS. 35-36), alignment base 3814 (FIG. 38), alignment base 4734 (FIG. 47), alignment base 6414 (FIG. 64), alignment base 6424 (FIG. 64), alignment base 6434 (FIG. 64), and/or alignment base 6953 (FIGS. 69, 73). In several embodiments, the first alignment base can be configured to engage with an alignment mechanism of a first overlay applicator. The first overlay applicator can be similar or identical to overlay applicator 100 (FIG. 1), overlay applicator 400 (FIGS. 4-5), overlay applicator 600 (FIG. 6), overlay applicator 700 (FIG. 7), overlay applicator 1500 (FIG. 15), overlay applicator 3000 (FIG. 30), overlay applicator 3550 (FIGS. 35-36), and/or overlay applicator 6050 (FIG. 60). In many embodiments, the alignment mechanism can be similar or identical to alignment mechanism 115 (FIG. 1), alignment mechanism 415 (FIG. 4), alignment mechanism 615 (FIG. 6), alignment mechanism 715 (FIG. 7), alignment mechanism 1515 (FIG. 15), alignment mechanism 2915 (FIGS. 29-30), and/or alignment mechanism 3557 (FIGS. 35-36). In a number of embodiments, the first overlay applicator can include an overlay configured to be applied to a screen of the first electronic device. The overlay can be similar or identical to overlay 130 (FIG. 1), overlay 430 (FIGS. 4-5), overlay 630 (FIG. 6), overlay 730 (FIG. 7), and/or overlay 1530 (FIG. 15), and/or overlay 2930 (FIGS. 29-30).

In a number of embodiments, the first alignment base can include a first side and a second side. The first and second sides of the first alignment base can be similar or identical to alignment base 3514. The first side of the first alignment base can be configured to engage with a first portion of the alignment mechanism of the first overlay applicator. The second side of the first alignment base can be configured to engage with a second portion of the alignment mechanism of the first overlay applicator. The first and second portions of the alignment mechanism can be similar or identical to alignment tabs 3556 and/or alignment mechanisms 3557. In several embodiments, the first device slot can be disposed between the first side of the first alignment base and the second side of the first alignment base.

In many embodiments, the first cradle can further include a first pull slot. The first pull slot can be similar or identical to pull slot 3515 (FIGS. 35-36), pull slot 6416 (FIGS. 64-65), pull slot 6426 (FIG. 64), and/or pull slot 6436 (FIG. 64). In a number of embodiments, the first pull slot can be disposed between the first device slot and the second side of the first alignment base.

In various embodiments, the first cradle can be configured, when the first electronic device is held within the first device slot with the screen of the first electronic device facing upwards or away from the first device slot and/or the first cradle, to hold the first overlay applicator over the first electronic device such that a pull tab of the first overlay applicator can be pulled through the first pull slot to expose the overlay of the first overlay applicator to the screen of the first electronic device. The pull tab of the first overlay applicator can be similar or identical to pull tab 150 (FIG. 1), pull tab 450 (FIGS. 4-5), pull tab 650 (FIG. 6), pull tab 750 (FIGS. 7, 42, 44-45, 48-49), pull tab 1550 (FIG. 15), pull tab 2750 (FIGS. 27-30) and/or pull tab 6055 (FIG. 60).

In many embodiments, method 7700 next can include a block 7702 of providing a second cradle. The second cradle can be similar or identical to cradle 6410 (FIGS. 64-68), cradle 6420 (FIGS. 64, 67-68), and/or cradle 6430 (FIGS. 64, 67-68). In a number of embodiments, the second cradle can include a second device slot having second dimensions. In many embodiments, the first dimensions of the first device slot of the first cradle can be different from the second dimensions of the second device slot of the second cradle. In a number of embodiments, the second device slot can be similar or identical to device slot 6411 (FIG. 64), device slot 6421 (FIG. 64), and/or device slot 6431 (FIG. 64). In many embodiments, the second device slot can be configured to securely hold a second electronic device. The second electronic device can be similar or identical to device 6550. In many embodiments, the first cradle and the second cradle can be configured to be stacked in a first coterminous configuration, such as shown in FIGS. 67-68, for example.

In various embodiments, the second cradle can include a second alignment base. The second alignment base can be similar or identical to alignment base 212 (FIG. 2), alignment base 312 (FIG. 3), alignment base 835 (FIGS. 8-9, 13-14), alignment base 1632 (FIGS. 16-19), alignment base 2035 (FIG. 20, alignment base 3112 (FIGS. 31-34), alignment base 3514 (FIGS. 35-36), alignment base 3814 (FIG. 38), alignment base 4734 (FIG. 47), alignment base 6414 (FIG. 64), alignment base 6424 (FIG. 64), alignment base 6434 (FIG. 64), and/or alignment base 6953 (FIGS. 69, 73). In several embodiments, the second alignment base can be configured to engage with an alignment mechanism of a second overlay applicator. The second overlay applicator can be similar or identical to overlay applicator 100 (FIG. 1), overlay applicator 400 (FIGS. 4-5), overlay applicator 600 (FIG. 6), overlay applicator 700 (FIG. 7), overlay applicator 1500 (FIG. 15), overlay applicator 3000 (FIG. 30), overlay applicator 3550 (FIGS. 35-36), and/or overlay applicator 6050 (FIG. 60). In many embodiments, the alignment mechanism can be similar or identical to alignment mechanism 115 (FIG. 1), alignment mechanism 415 (FIG. 4), alignment mechanism 615 (FIG. 6), alignment mechanism 715 (FIG. 7), alignment mechanism 1515 (FIG. 15), alignment mechanism 2915 (FIGS. 29-30), and/or alignment mechanism 3557 (FIGS. 35-36). In a number of embodiments, the second overlay applicator can include an overlay configured to be applied to a screen of the second electronic device. The overlay can be similar or identical to overlay 130 (FIG. 1), overlay 430 (FIGS. 4-5), overlay 630 (FIG. 6), overlay 730 (FIG. 7), and/or overlay 1530 (FIG. 15), and/or overlay 2930 (FIGS. 29-30).

In a number of embodiments, the second alignment base can include a first side and a second side. The first and second sides of the second alignment base can be similar or identical to alignment base 3514. The first side of the second alignment base can be configured to engage with a first portion of the alignment mechanism of the second overlay applicator. The second side of the second alignment base can be configured to engage with a second portion of the alignment mechanism of the second overlay applicator. The first and second portions of the alignment mechanism can be similar or identical to alignment tabs 3556 and/or alignment mechanisms 3557. In several embodiments, the second device slot can be disposed between the first side of the second alignment base and the second side of the second alignment base.

In many embodiments, the second cradle can further include a second pull slot. The second pull slot can be similar or identical to pull slot 3515 (FIGS. 35-36), pull slot 6416 (FIGS. 64-65), pull slot 6426 (FIG. 64), and/or pull slot 6436 (FIG. 64). In a number of embodiments, the second pull slot can be disposed between the second device slot and the second side of the second alignment base.

In various embodiments, the second cradle can be configured, when the second electronic device is held within the second device slot with the screen of the second electronic device facing upwards or away from the second device slot and/or the second cradle, to hold the second overlay applicator over the second electronic device such that a pull tab of the second overlay applicator can be pulled through the second pull slot to expose the overlay of the second overlay applicator to the screen of the second electronic device. The pull tab of the second overlay applicator can be similar or identical to pull tab 150 (FIG. 1), pull tab 450 (FIGS. 4-5), pull tab 650 (FIG. 6), pull tab 750 (FIGS. 7, 42, 44-45, 48-49), pull tab 1550 (FIG. 15), pull tab 2750 (FIGS. 27-30) and/or pull tab 6055 (FIG. 60).

In some embodiments, method 7700 optionally can include a block 7703 of providing a third cradle. The third cradle can be similar or identical to cradle 6410 (FIGS. 64-68), cradle 6420 (FIGS. 64, 67-68), and/or cradle 6430 (FIGS. 64, 67-68). In a number of embodiments, the third cradle can include a third device slot having third dimensions. In many embodiments, the third dimensions of the third device slot of the third cradle can be different from the first dimensions of the first device slot of the first cradle and the second dimensions of the second device slot of the second cradle. In a number of embodiments, the third device slot can be similar or identical to device slot 6411 (FIG. 64), device slot 6421 (FIG. 64), and/or device slot 6431 (FIG. 64). In many embodiments, the third device slot can be configured to securely hold a third electronic device. The third electronic device can be similar or identical to device 6550. In many embodiments, the third cradle can be configured to be stacked with the first cradle and the second cradle in a second coterminous configuration, such as shown in FIGS. 67-68, for example.

In various embodiments, the third cradle can include a third alignment base. The third alignment base can be similar or identical to alignment base 212 (FIG. 2), alignment base 312 (FIG. 3), alignment base 835 (FIGS. 8-9, 13-14), alignment base 1632 (FIGS. 16-19), alignment base 2035 (FIG. 20, alignment base 3112 (FIGS. 31-34), alignment base 3514 (FIGS. 35-36), alignment base 3814 (FIG. 38), alignment base 4734 (FIG. 47), alignment base 6414 (FIG. 64), alignment base 6424 (FIG. 64), alignment base 6434 (FIG. 64), and/or alignment base 6953 (FIGS. 69, 73). In several embodiments, the third alignment base can be configured to engage with an alignment mechanism of a third overlay applicator. The third overlay applicator can be similar or identical to overlay applicator 100 (FIG. 1), overlay applicator 400 (FIGS. 4-5), overlay applicator 600 (FIG. 6), overlay applicator 700 (FIG. 7), overlay applicator 1500 (FIG. 15), overlay applicator 3000 (FIG. 30), overlay applicator 3550 (FIGS. 35-36), and/or overlay applicator 6050 (FIG. 60). In many embodiments, the alignment mechanism can be similar or identical to alignment mechanism 115 (FIG. 1), alignment mechanism 415 (FIG. 4), alignment mechanism 615 (FIG. 6), alignment mechanism 715 (FIG. 7), alignment mechanism 1515 (FIG. 15), alignment mechanism 2915 (FIGS. 29-30), and/or alignment mechanism 3557. In a number of embodiments, the third overlay applicator can include an overlay configured to be applied to a screen of the third electronic device. The overlay can be similar or identical to overlay 130 (FIG. 1), overlay 430 (FIGS. 4-5), overlay 630 (FIG. 6), overlay 730 (FIG. 7), and/or overlay 1530 (FIG. 15), and/or overlay 2930 (FIGS. 29-30).

Figure 78:
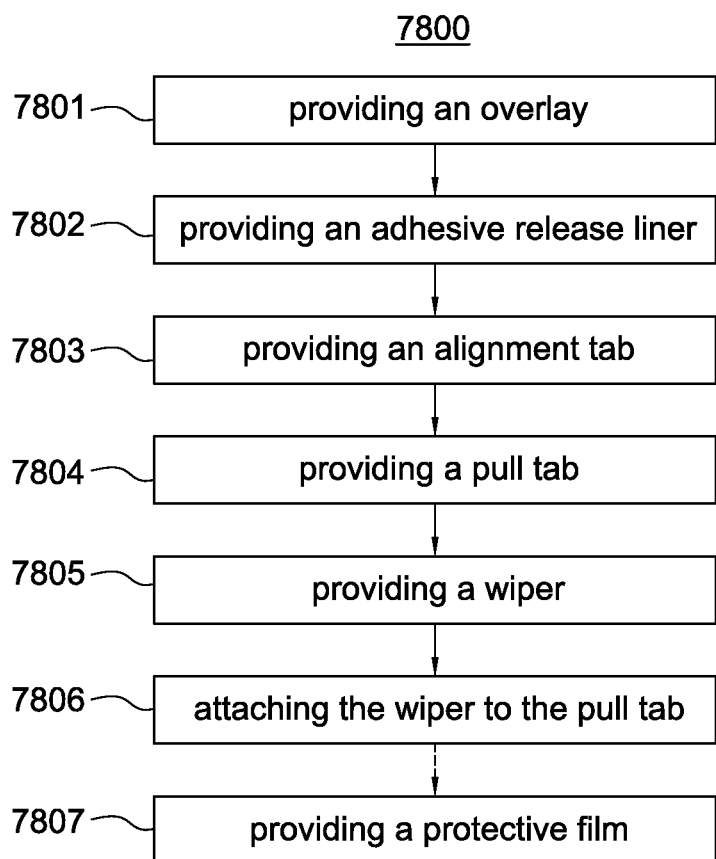
FIG. 78 illustrates a flow chart for a method of providing an overlay applicator, according to another embodiment.

Turning ahead in the drawings, FIG. 78 illustrates a flow chart for an embodiment of a method 7800 of providing an overlay applicator. Method 7800 is merely exemplary and is not limited to the embodiments presented herein. Method 7800 can be employed in many different embodiments or examples not specifically depicted or described herein. In some embodiments, the procedures, the processes, and/or the activities of method 7800 can be performed in the order presented. In other embodiments, the procedures, the processes, and/or the activities of the method 7800 can be performed in any other suitable order. In still other embodiments, one or more of the procedures, the processes, and/or the activities in method 7800 can be combined or skipped. In some embodiments, the overlay applicator can be similar or identical to overlay applicator 100 (FIG. 1), overlay applicator 400 (FIGS. 4-5), overlay applicator 600 (FIG. 6), overlay applicator 700 (FIG. 7), overlay applicator 1500 (FIG. 15), overlay applicator 3000 (FIG. 30), overlay applicator 3550 (FIGS. 35-36), and/or overlay applicator 6050 (FIG. 60).

Referring to FIG. 78, method 7800 can include a block 7801 of providing an overlay. In many embodiments, the overlay can be similar or identical to overlay 130 (FIG. 1), overlay 430 (FIGS. 4-5), overlay 630 (FIG. 6), overlay 730 (FIG. 7), and/or overlay 1530 (FIG. 15), and/or overlay 2930 (FIGS. 29-30). In a number of embodiments, the overlay can have a top side and a bottom side. The top side of the overlay can be similar or identical to top side 131 (FIG. 1) of overlay 130 (FIG. 1). The bottom side of the overlay can be similar or identical to bottom side 132 (FIG. 1) of overlay 130 (FIG. 1). In various embodiments, the bottom side can include an adhesive agent configured to adhere to a screen of an electronic device.

In some embodiments, method 7800 next can include a block 7802 of providing an adhesive release liner. The adhesive release liner can be similar or identical to adhesive release liner 140 (FIG. 1), adhesive release liner 440 (FIGS. 4-5), adhesive release liner 640 (FIG. 6), adhesive release liner 740 (FIG. 7), adhesive release liner 1540 (FIG. 15), and/or adhesive release liner 2740 (FIGS. 27-30). In a number of embodiments, the adhesive release liner can have a top side and a bottom side. The top side of the adhesive release liner can be removably attached to the bottom side of the overlay. In some embodiments, the adhesive release liner can be configured to protect the adhesive agent at the bottom side of the overlay from contaminants.

In many embodiments, method 7800 next can include a block 7803 of providing an alignment tab. In some embodiments, the alignment tab can be similar or identical to alignment tab 110 (FIG. 1), alignment tab 410 (FIGS. 4-5), alignment tab 610 (FIG. 6), alignment frame 710 (FIG. 7), and/or alignment flaps 1510 (FIG. 15), alignment tab 2910 (FIGS. 29-30), and/or alignment tab 3556 (FIGS. 35-36). In many embodiments, the alignment tab can include an alignment mechanism. The alignment mechanism can be similar or identical to alignment mechanism 115 (FIG. 1), alignment mechanism 415 (FIG. 4), alignment mechanism 615 (FIG. 6), alignment mechanism 715 (FIG. 7), alignment mechanism 1515 (FIG. 15), alignment mechanism 2915 (FIGS. 29-30), and/or alignment mechanism 3557 (FIGS. 35-36).

In several embodiments, method 7800 next can include a block 7804 of providing a pull tab. In some embodiments, the pull tab can be similar or identical to pull tab 150 (FIG. 1), pull tab 450 (FIGS. 4-5), pull tab 650 (FIG. 6), pull tab 750 (FIGS. 7, 42, 44-45, 48-49), pull tab 1550 (FIG. 15), pull tab 2750 (FIGS. 27-30) and/or pull tab 6055 (FIG. 60).

In many embodiments, method 7800 next can include a block 7805 of providing a wiper. The wiper can be similar or identical to wiper 157 (FIG. 1), wiper 457 (FIG. 4), wiper 657 (FIG. 6), wiper 757 (FIG. 7), wiper 2857 (FIGS. 28-30), wiper 6200 (FIG. 62), and/or wiper 6300 (FIG. 63). In some embodiments, the wiper can include a surface. The surface can be similar or identical to wiper surface 6220 (FIG. 62) and/or wiper surface 6320 (FIG. 62). In several embodiments, the wiper can include a first slot. The first slot can be similar or identical to slot 6230 (FIG. 62), slot 6330 (FIG. 63), and/or slot 6340 (FIG. 63). In many embodiments, the first slot can extend at least partially through the surface of the wiper. In a number of embodiments, the wiper can include a second slot. The second slot can be similar or identical to slot 6230 (FIG. 62), slot 6330 (FIG. 63), and/or slot 6340 (FIG. 63). In many embodiments, the second slot can extend at least partially through the surface of the wiper. In some embodiments, the wiper can include a support portion disposed between the surface of the wiper and the pull tab. The support portion can be similar or identical to wiper support 6210 (FIGS. 62-63).

In a number of embodiments, method 7800 next can include a block 7806 of attaching the wiper to the pull tab. In several embodiments, the wiper can be attached to the pull tab with an adhesive. In many embodiments, the pull tab, the wiper, and the adhesive release liner can be configured such that the pull tab can be folded across the bottom side of the adhesive release liner and can be pulled to remove the adhesive release liner from the bottom side of the overlay to expose the adhesive agent. In various embodiments, the pull tab, the wiper, and the adhesive release liner can be configured such that, when the pull tab is pulled, the wiper can wipe across and clean the screen of the electronic device In some embodiments, method 7800 optionally can include a block 7807 of providing a protective film. In some embodiments, the protective film can be similar or identical to protective film 120 (FIG. 1), protective film 420 (FIGS. 4-5), protective film 620 (FIG. 6), protective film 720 (FIG. 7), protective film 1520 (FIG. 15), protective film 2920 (FIGS. 29-30), protective film 3552 (FIG. 35), and/or protective film 6052 (FIG. 60). In many embodiments, the protective film can be removably attached to the top side of the overlay.

Figure 79:
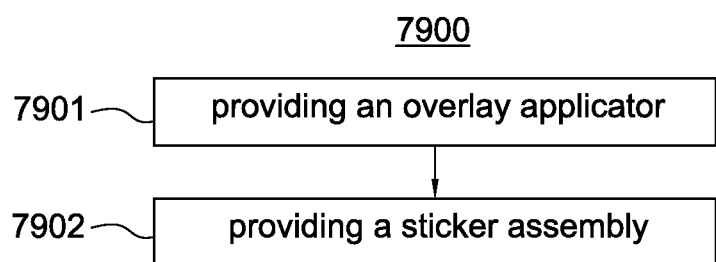
FIG. 79 illustrates a flow chart for a method of providing a system, according to another embodiment.

Proceeding to the next drawing, FIG. 79 illustrates a flow chart for an embodiment of a method 7900 of providing a system. Method 7900 is merely exemplary and is not limited to the embodiments presented herein. Method 7900 can be employed in many different embodiments or examples not specifically depicted or described herein. In some embodiments, the procedures, the processes, and/or the activities of method 7900 can be performed in the order presented. In other embodiments, the procedures, the processes, and/or the activities of the method 7900 can be performed in any other suitable order. In still other embodiments, one or more of the procedures, the processes, and/or the activities in method 7900 can be combined or skipped.

Referring to FIG. 79, method 7900 can include a block 7901 of providing an overlay applicator. In many embodiments, the overlay applicator can be similar or identical to overlay applicator overlay applicator 100 (FIG. 1), overlay applicator 400 (FIGS. 4-5), overlay applicator 600 (FIG. 6), overlay applicator 700 (FIG. 7), overlay applicator 1500 (FIG. 15), overlay applicator 3000 (FIG. 30), overlay applicator 3550 (FIGS. 35-36), and/or overlay applicator 6050 (FIG. 60). In a number of embodiments, the overlay applicator can include an overlay. In many embodiments, the overlay can be similar or identical to overlay 130 (FIG. 1), overlay 430 (FIGS. 4-5), overlay 630 (FIG. 6), overlay 730 (FIG. 7), and/or overlay 1530 (FIG. 15), and/or overlay 2930 (FIGS. 29-30). In a number of embodiments, the overlay can have a top side and a bottom side. The top side of the overlay can be similar or identical to top side 131 (FIG. 1) of overlay 130 (FIG. 1). The bottom side of the overlay can be similar or identical to bottom side 132 (FIG. 1) of overlay 130 (FIG. 1). In various embodiments, the bottom side can include an adhesive agent configured to adhere to a screen of an electronic device.

In several embodiments, the overlay applicator can include an adhesive release liner. The adhesive release liner can be similar or identical to adhesive release liner 140 (FIG. 1), adhesive release liner 440 (FIGS. 4-5), adhesive release liner 640 (FIG. 6), adhesive release liner 740 (FIG. 7), adhesive release liner 1540 (FIG. 15), and/or adhesive release liner 2740 (FIGS. 27-30). In a number of embodiments, the adhesive release liner can have a top side and a bottom side. The top side of the adhesive release liner can be removably attached to the bottom side of the overlay. In some embodiments, the adhesive release liner can be configured to protect the adhesive agent at the bottom side of the overlay from contaminants.

In some embodiments, the overlay applicator can include a protective film. The protective film can be similar or identical to protective film 120 (FIG. 1), protective film 420 (FIGS. 4-5), protective film 620 (FIG. 6), protective film 720 (FIG. 7), protective film 1520 (FIG. 15), protective film 2920 (FIGS. 29-30), protective film 3552 (FIG. 35), and/or protective film 6052 (FIG. 60). In many embodiments, the protective film can be removably attached to the top side of the overlay.

In many embodiments, the overlay applicator can include an alignment tab. In some embodiments, the alignment tab can be similar or identical to alignment tab 110 (FIG. 1), alignment tab 410 (FIGS. 4-5), alignment tab 610 (FIG. 6), alignment frame 710 (FIG. 7), and/or alignment flaps 1510 (FIG. 15), alignment tab 2910 (FIGS. 29-30), and/or alignment tab 3556 (FIGS. 35-36). In many embodiments, the alignment tab can include an alignment mechanism. The alignment mechanism can be similar or identical to alignment mechanism 115 (FIG. 1), alignment mechanism 415 (FIG. 4), alignment mechanism 615 (FIG. 6), alignment mechanism 715 (FIG. 7), alignment mechanism 1515 (FIG. 15), alignment mechanism 2915 (FIGS. 29-30), and/or alignment mechanism 3557 (FIGS. 35-36). In many embodiments, the alignment tab can include a first alignment portion extending at and/or toward a first end of the overlay applicator; and a second alignment portion extending at and/or toward a second end of the overlay applicator. The first alignment portion and the second alignment portion can include the alignment mechanism.

In some embodiments, the alignment tab can be configured to engage with an alignment base. The alignment base can be similar or identical to alignment base 212 (FIG. 2), alignment base 312 (FIG. 3), alignment base 835 (FIGS. 8-9, 13-14), alignment base 1632 (FIGS. 16-19), alignment base 2035 (FIG. 20, alignment base 3112 (FIGS. 31-34), alignment base 3514 (FIGS. 35-36), alignment base 3814 (FIG. 38), alignment base 4734 (FIG. 47), alignment base 6414 (FIG. 64), alignment base 6424 (FIG. 64), alignment base 6434 (FIG. 64), and/or alignment base 6953 (FIGS. 69, 73). The alignment base can include a first portion and a second portion. The first alignment portion can be configured to engage with the first portion of the alignment base. The second alignment portion can be configured to engage with the second portion of the alignment base. The first and second portions of the alignment mechanism can be similar or identical to alignment mechanisms 3557 and/or alignment mechanisms 6057 (FIG. 60)

In various embodiments, the overlay applicator can include a pull tab. In some embodiments, the pull tab can be similar or identical to pull tab 150 (FIG. 1), pull tab 450 (FIGS. 4-5), pull tab 650 (FIG. 6), pull tab 750 (FIGS. 7, 42, 44-45, 48-49), pull tab 1550 (FIG. 15), pull tab 2750 (FIGS. 27-30) and/or pull tab 6055 (FIG. 60).

In many embodiments, method 7900 next can include a block 7902 of providing a sticker assembly. In some embodiments, the sticker assembly can be similar or identical to dust sticker assembly 5500 (FIGS. 55-61). In several embodiments, the sticker assembly can include a sticker. The sticker can be similar or identical to dust removal sticker 5510 (FIGS. 55-61). The sticker can include a top side and a bottom side and an end portion. The end portion of the sticker can be similar or identical to adhesive end region 5922 (FIGS. 59-61). The bottom side can include a second adhesive agent configured to removably adhere to the screen of the electronic device.

In some embodiments, the sticker assembly can include a release liner. The release liner can be similar or identical to release liner 5520 (FIG. 55). In many embodiments, the release liner can be removably attached to the bottom side of the sticker. In some embodiments, the release liner can include a device portion and an end portion. The device portion can be similar or identical to device portion 5521 (FIGS. 55-56). The end portion of the release liner can be similar or identical to 5522 (FIGS. 55-56, 58-59). In several embodiments, the end portion of the release liner can be removably attached to the end portion of the sticker, such as shown in FIGS. 56 and 58-59.

In many embodiments, the sticker assembly can be configured such that, when the device portion of the release liner is removed to expose the second adhesive agent, such as shown in FIG. 56, the second adhesive agent of the bottom side of the sticker can be adhered to the screen of the electronic device, and the end portion of the sticker can be folded back over the top side of the sticker to expose the end portion of the release liner, such as shown in FIG. 58. In a number of embodiments, the pull tab and the adhesive release liner can be configured such that the pull tab can be folded across the bottom side of the adhesive release liner, such as shown in FIGS. 60-61. In some embodiments, the sticker assembly can be configured such that, when the end portion of the sticker is folded back over the top side of the sticker and the end portion of the release liner is removed from the sticker to expose the second adhesive agent, such as shown in FIG. 59, the end portion of the sticker can be adhered to the pull tab while the pull tab is folded across the bottom side of the adhesive release liner, such as shown in FIG. 60-61. In several embodiments, the overlay applicator and sticker assembly can be configured such that, when the end portion of the sticker is adhered to the pull tab, the pull tab can be pulled to remove the sticker from the screen of the electronic device and to remove the adhesive release liner from the bottom side of the overlay to expose the first adhesive agent to the screen of the device. In a number of embodiments, the sticker can be configured to remove dust from the screen of the electronic device when the sticker is removed from the screen of the electronic device.

In certain embodiments, the overlay applicator and the sticker assembly can be configured such that, when the pull tab is pulled to remove the sticker from the screen of the electronic device and to remove the adhesive release liner from the bottom side of the overlay, at least a portion of the sticker is adhered to at least a portion of the adhesive release liner. In many embodiments, the overlay applicator and the sticker assembly can be configured such that, when (a) the first alignment portion is engaged with the first portion of the alignment base, (b) the second alignment portion is engaged with the second portion of the alignment base, and (c) the pull tab is pulled, the pull tab, the sticker, and the adhesive release liner can be pulled through a pull slot. The pull slot can be similar or identical to pull slot 3515 (FIGS. 35-36), pull slot 6416 (FIGS. 64-65), pull slot 6426 (FIG. 64), and/or pull slot 6436 (FIG. 64).

Figure 82:
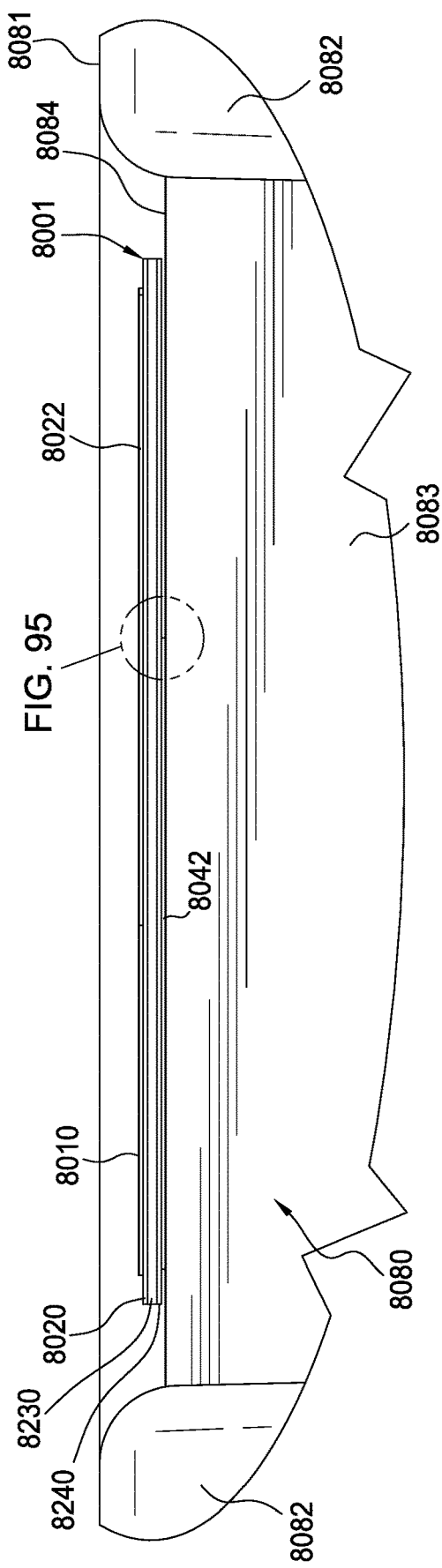
FIG. 82 illustrates an enlarged front side elevational view of a portion of the overlay applicator tray of FIG. 80, as identified in FIG. 81.
Figure 95:
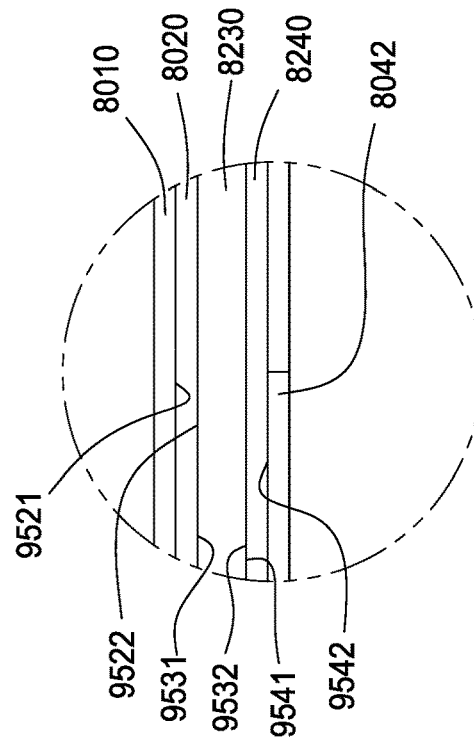
FIG. 95 illustrates an enlarged front side elevational view of a portion of an overlay applicator of the overlay applicator tray of FIG. 80, as identified in FIG. 82.

Turning ahead in the drawings, FIG. 80 illustrates a top, front, right side perspective view of an overlay applicator tray 8000, according to another embodiment. FIG. 81 illustrates a front side elevational view of overlay applicator tray 8000. FIG. 82 illustrates an enlarged front side elevational view of a portion of overlay applicator tray 8000, as identified in FIG. 81. FIG. 95 illustrates an enlarged front side elevational view of a portion of an overlay applicator 8001 of overlay applicator tray 8000, as identified in FIG. 82. Overlay applicator tray 8000 is merely exemplary, and embodiments of the overlay applicator tray are not limited to the embodiments presented herein. The overlay applicator tray can be employed in many different embodiments or examples not specifically depicted or described herein.

In various embodiments, overlay applicator tray 8000 can include overlay applicator 8001, a cradle 8080, and/or an alignment piece 8010. In many embodiments, overlay applicator 8001 can be similar to overlay applicator 100 (FIG. 1), overlay applicator 400 (FIGS. 4-5), overlay applicator 600 (FIG. 6), overlay applicator 700 (FIG. 7), overlay applicator 1500 (FIG. 15), overlay applicator 3000 (FIG. 30), overlay applicator 3550 (FIGS. 35-36), and/or overlay applicator 6050 (FIG. 60), and various components and/or constructions of overlay applicator 8001 can be substantially identical or similar to various components of overlay applicator 100 (FIG. 1), overlay applicator 400 (FIGS. 4-5), overlay applicator 600 (FIG. 6), overlay applicator 700 (FIG. 7), overlay applicator 1500 (FIG. 15), overlay applicator 3000 (FIG. 30), overlay applicator 3550 (FIGS. 35-36), and/or overlay applicator 6050 (FIG. 60).

In a number of embodiments, overlay applicator 8001 can include an overlay 8230 (FIG. 82). In many embodiments, overlay 8230 (FIG. 82) can be similar or identical to overlay 130 (FIG. 1), overlay 430 (FIGS. 4-5), overlay 630 (FIG. 6), overlay 730 (FIG. 7), and/or overlay 1530 (FIG. 15), and/or overlay 2930 (FIGS. 29-30). In a number of embodiments, overlay 8230 (FIG. 82) can have a top side 9531 (FIG. 95) and a bottom side 9532 (FIG. 95). Top side 9531 (FIG. 95) of overlay 8230 (FIG. 82) can be similar or identical to top side 131 (FIG. 1) of overlay 130 (FIG. 1). Bottom side 9532 (FIG. 95) of overlay 8230 (FIG. 82) can be similar or identical to bottom side 132 (FIG. 1) of overlay 130 (FIG. 1). In various embodiments, bottom side 9532 (FIG. 95) of overlay 8230 (FIG. 82) can include an adhesive configured to adhere overlay 8230 (FIG. 82) to a screen of an electronic device.

In several embodiments, overlay applicator 8001 can include an adhesive release liner 8240 (FIG. 82). Adhesive release liner 8240 (FIG. 82) can be similar or identical to adhesive release liner 140 (FIG. 1), adhesive release liner 440 (FIGS. 4-5), adhesive release liner 640 (FIG. 6), adhesive release liner 740 (FIG. 7), adhesive release liner 1540 (FIG. 15), and/or adhesive release liner 2740 (FIGS. 27-30). In a number of embodiments, adhesive release liner 8240 (FIG. 82) can have a top side 9541 (FIG. 95) and a bottom side 9542 (FIG. 95). Top side 9541 (FIG. 95) of adhesive release 8240 (FIG. 82) liner can be removably attached to bottom side 9532 (FIG. 95) of overlay 8230 (FIG. 82) to cover, and be removed to expose, the adhesive at bottom side 9532 (FIG. 95) of overlay 8230 (FIG. 82). In some embodiments, adhesive release liner 8240 (FIG. 82) can be configured to protect the adhesive agent at or on bottom side 9532 (FIG. 95) of overlay 8230 (FIG. 82) from contaminants.

In some embodiments, overlay applicator 8001 can include a protective film 8020. Protective film 8020 can be similar or identical to protective film 120 (FIG. 1), protective film 420 (FIGS. 4-5), protective film 620 (FIG. 6), protective film 720 (FIG. 7), protective film 1520 (FIG. 15), protective film 2920 (FIGS. 29-30), protective film 3552 (FIG. 35), and/or protective film 6052 (FIG. 60). In many embodiments, protective film 8020 can have a top side 9521 (FIG. 95) and a bottom side 9522 (FIG. 95). In a number of embodiments, protective film 8020 can be removably attached to top side 9531 (FIG. 95) of overlay 8230 (FIG. 82). For example, bottom side 9522 (FIG. 95) of protective film 8020 can be removably attached to top side 9531 (FIG. 95) of overlay 8230 (FIG. 82), such as with an adhesive at or on bottom side 9522 (FIG. 95) of protective film 8020.

In several embodiments, overlay applicator 8001 can include a first pull tab 8042 and/or a second pull tab 8022. In a number of embodiments, first pull tab 8042 can be used to remove adhesive release liner 8240 (FIG. 82) from overlay 8230 (FIG. 82). In many embodiments, first pull tab 8042 can advantageously help prevent accidental touching of the adhesive at or on bottom side 9532 (FIG. 95) of overlay 8230 (FIG. 82) when removing adhesive release liner 8240 (FIG. 82) from overlay 8230 (FIG. 82). In several embodiments, first pull tab 8042 can be affixed to bottom side 9542 (FIG. 95) of adhesive release liner 8240 (FIG. 82), such as shown in FIG. 82. In other embodiments, first pull tab 8042 can be integral with adhesive release liner 8240 (FIG. 82). In many embodiments, first pull tab 8042 can be adhered to bottom side 9542 (FIG. 95) of adhesive release liner 8240 (FIG. 82) with an adhesive or another suitable fastener. In a number of embodiments, the adhesive adhering first pull tab 8042 to adhesive release liner 8240 (FIG. 82) can have a greater adhesive strength than the adhesive at or on bottom side 9532 (FIG. 95) of overlay 8230 (FIG. 82) that adheres adhesive release liner 8240 (FIG. 82) to overlay 8230 (FIG. 82), such that first pull tab 8042 can be used to pull and remove adhesive release liner 8240 (FIG. 82) from overlay 8230 (FIG. 82) without first pull tab 8042 being removed from adhesive release liner 8240 (FIG. 82).

In a number of embodiments, second pull tab 8022 can be used to remove protective film 8020 from overlay 8230 (FIG. 82). In many embodiments, second pull tab 8022 can be affixed to top side 9521 (FIG. 95) of protective film 8020, such as shown in FIG. 82. In other embodiments, second pull tab 8022 can be integral with protective film 8020. In many embodiments, second pull tab 8022 can be adhered to top side 9521 (FIG. 95) of protective film 8020 with an adhesive or another suitable fastener. In a number of embodiments, the adhesive adhering second pull tab 8022 to protective film 8020 can have a greater adhesive strength than the adhesive at or on bottom side 9522 (FIG. 95) of protective film 8020 that adheres protective film 8020 to overlay 8230 (FIG. 82), such that second pull tab 8022 can be used to pull and remove protective film 8020 from overlay 8230 (FIG. 82) without second pull tab 8022 being removed from protective film 8020.

In many embodiments, cradle 8080 can be similar to cradle 310 (FIG. 3), cradle 832 (FIG. 8), cradle 1620 (FIG. 16), cradle 2032 (FIG. 20), cradle 3100 (FIG. 31), cradle 3520 (FIG. 35), cradle 3710 (FIGS. 37-38), cradle 3520 (FIGS. 46-50), cradle 6410 (FIG. 64), cradle 6420 (FIG. 64), cradle 6430 (FIG. 64), and/or cradle 6950 (FIG. 69), and various components and/or constructions of cradle 8080 can be substantially identical or similar to various components of cradle 310 (FIG. 3), cradle 832 (FIG. 8), cradle 1620 (FIG. 16), cradle 2032 (FIG. 20), cradle 3100 (FIG. 31), cradle 3520 (FIG. 35), cradle 3710 (FIGS. 37-38), cradle 4630 (FIGS. 46-50), cradle 6410 (FIG. 64), cradle 6420 (FIG. 64), cradle 6430 (FIG. 64), and/or cradle 6950 (FIG. 69).

In several embodiments, cradle 8080 can include a device slot 8090. Device slot can be similar to slot 311 (FIG. 3), slot 1621 (FIG. 16), device slot 3111 (FIG. 31), slot 3811 (FIG. 38), slot 4731 (FIG. 47), device slot 6411 (FIG. 64), device slot 6421 (FIG. 64), device slot 6431 (FIG. 64), and/or device slot 6956 (FIG. 69). In many embodiments, device slot 8090 can be configured to securely hold an electronic device in device slot 8090. In many embodiments, the electronic device can be similar or identical to device 220 (FIG. 2), device 320 (FIG. 3), device 1650 (FIG. 16), device 3401 (FIG. 34), device 3720 (FIG. 37), device 4800 (FIG. 48), device 5600 (FIG. 56), device 6550 (FIG. 65), device 7100, and/or electronic device 8350 (shown in FIG. 83 and described below). For example, the electronic device can be a smart phone, a tablet, a smart watch (such as electronic device 8350, shown in FIG. 83 and described below), or another suitable electronic device. In several embodiments, cradle 8080 can be configured for a specific type of electronic device, such as the 38 mm Apple Watch. The watch band of the Apple Watch can be removed before the Apple Watch is positioned in the device slot 8090. For example, device slot 8090 can be configured to hold an electronic device having the dimensions of the specific type of electronic device.

In many embodiments, the electronic device can be placed within device slot 8090 with a screen of the electronic device facing upwards or away from device slot 8090. In other embodiments, the electronic device can be placed within device slot 8090 with the screen of the electronic device facing downwards or towards device slot 8090. In some embodiments, device slot 8090 can be conformal with the electronic device. In a number of embodiments, device slot 8090 can include one or more side walls, such as side walls 8091, and/or one or more corner walls, such as corner walls 8092. In several embodiments, device slot 8090 can include a bottom wall 8093. In some embodiments, bottom wall 8093 can include a bottom wall recess 8094 to accommodate one or more protrusions on a face of the electronic device.

In a number of embodiments, cradle 8080 can have a thickness greater than a thickness of the electronic device. In some embodiments, cradle 8080 can include a top surface 8081 and one or more side surfaces, such as side surfaces 8082. In many embodiments, top surface 8081 can at least partially surround device slot 8090. In some embodiments, cradle 8080 can include one or more openings or affordances, such as opening 8086, which can accommodate one or more protrusions on one or more sides of the electronic device, such as one or more buttons, crowns, dials, etc., of the electronic device, and/or facilitate removal of the electronic device from device slot 8090. For example, as shown in FIG. 80, opening 8086 can extend through one of side walls 8091 of device slot 8090 and/or through one of side surfaces 8082 of cradle 8080. In many embodiments, an affordance (not shown) can extend through one or more of side walls 8091 of device slot 8090 without extending through one or more of side surfaces 8082 of cradle 8080.

In various embodiments, cradle 8080 can include a tab recess 8083, a tab surface 8084, and/or an attachment surface 8085. In several embodiments, attachment surface 8085 can be a surface of cradle 8080 used to attach overlay applicator 8001 to cradle 8080. In a number of embodiments, tab surface 8084 can be a surface of cradle 8080 upon which first pull tab 8042 and/or second pull tab 8022 can be supported. In several embodiments, tab surface 8084 and/or attachment surface 8085 can be recessed below top surface 8081, such that overlay applicator 8001 can be disposed in overlay applicator tray 8000 in a position that does not extend above top surface 8081, which can beneficially protect overlay applicator 8001 from damage. In many embodiments, tab recess 8083 can provide a structural recess that facilitates ease of access to first pull tab 8042 and/or second pull tab 8022. In several embodiments, tab recess 8083 can allow such ease of access without first pull tab 8042 and/or second pull tab 8022 extending beyond any of side surfaces 8082, which can advantageously protect first pull tab 8042 and/or second pull tab 8022 from damage.

In many embodiments, alignment piece 8010 can couple cradle 8080 to overlay applicator 8001. In some embodiments, alignment piece 8010 can include an overlay attachment portion 8011 and a cradle attachment portion 8012. For example, alignment piece 8010 can include adhesive at cradle attachment portion 8012 to adhere alignment piece 8010 to attachment surface 8085 of cradle 8080, and alignment piece 8010 also can include an adhesive at overlay attachment portion 8011 to adhere alignment piece 8010 to overlay applicator 8001, such as at an attachment region 8021 of protective film 8020. In some embodiments, alignment piece 8010 can be a piece of material separate from the other layers of overlay applicator 8001, such as shown in FIG. 80 and described above. In other embodiments, alignment piece 8010 can be integral with one or more of the layers of overlay applicator 8001, such as protective film 8020 extending beyond the dimensions of overlay 8230 (FIG. 82) to attach to attachment surface 8085 of cradle 8080, for example. In many embodiments, first pull tab 8042 and second pull tab 8022 can extend beyond the other overlay layers (e.g., protective film 8020, overlay 8230 (FIG. 82), adhesive release liner 8240 (FIG. 82)) in a direction opposite from the direction in which alignment piece 8010 extends. In many embodiments, alignment piece 8010 can couple cradle 8080 to overlay applicator 8001 such that overlay 8230 (FIG. 82) of overlay applicator 8001 is aligned with the screen of the electronic device when the electronic device is securely held in device slot 8090. In a number of embodiments, alignment piece 8010 can be made of a flexible material that allows overlay applicator 8001 to be lifted and/or rotated with respect to cradle 8080.

Figure 84:
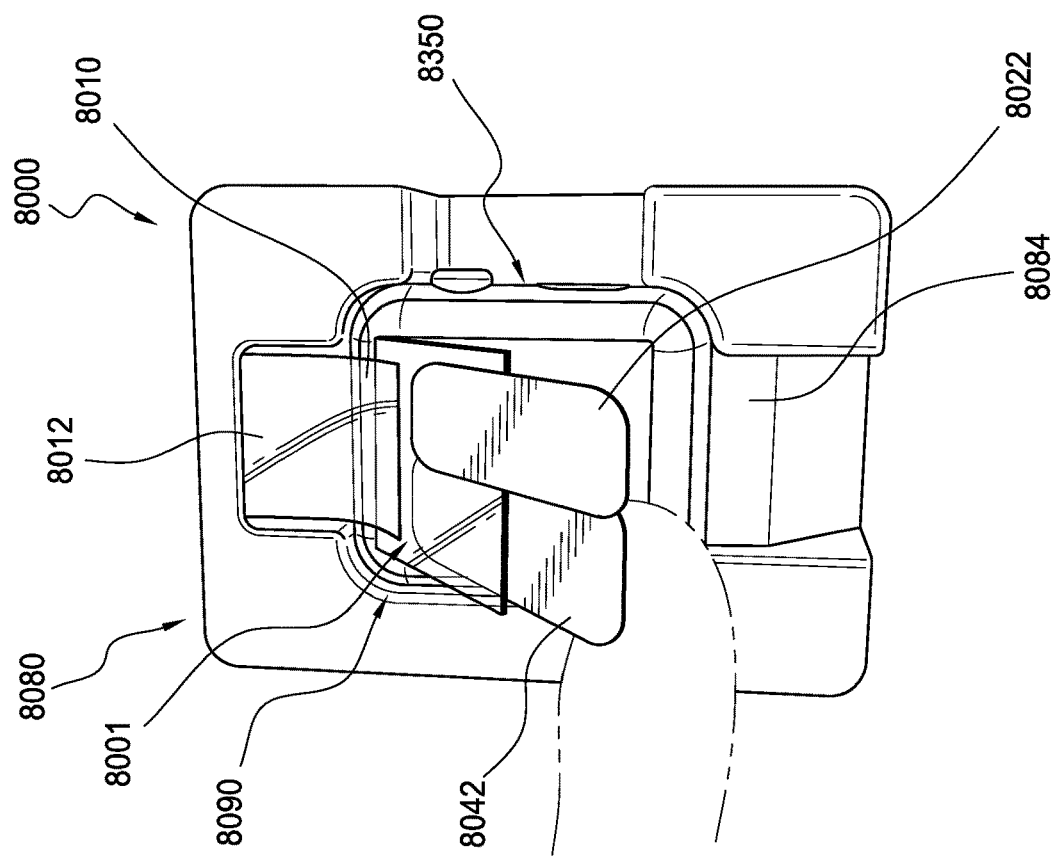
FIG. 84 illustrates a top view of the overlay applicator tray of FIG. 80, with the electronic device of FIG. 83 being held in the device slot of FIG. 80, and with the overlay applicator of FIG. 80 being folded upwards.
Figure 83:
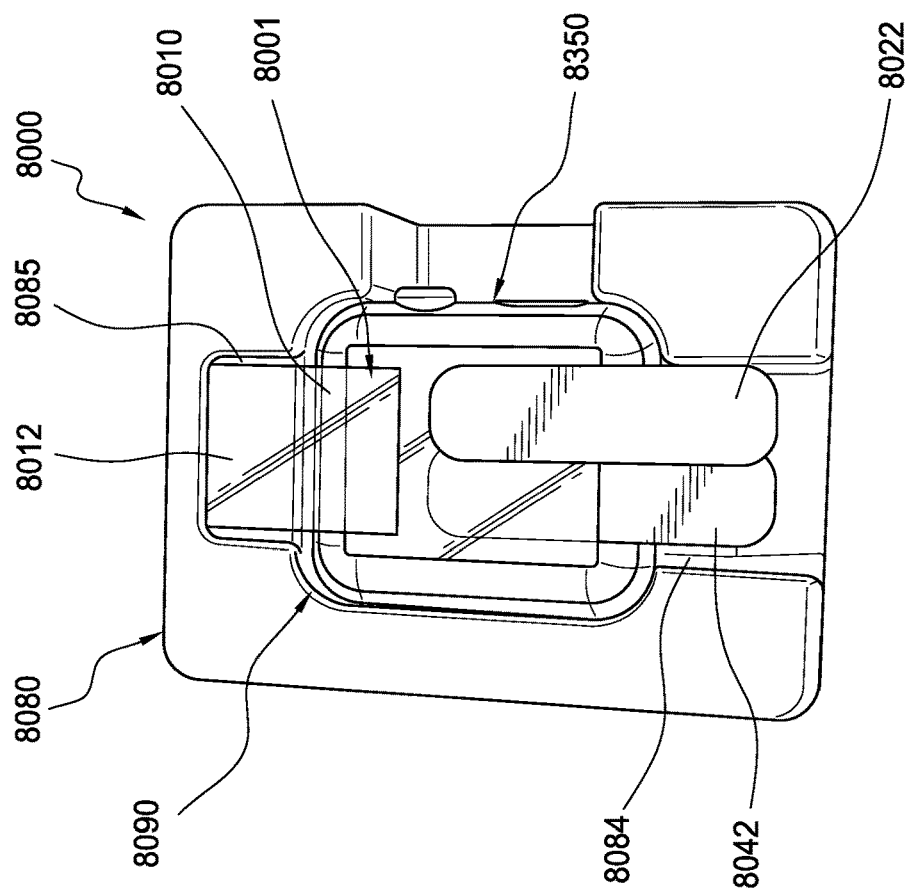
FIG. 83 illustrates a top view of the overlay applicator tray of FIG. 80, with an electronic device being held in a device slot of FIG. 80, and with a overlay applicator of FIG. 80 resting on the electronic device.

Turning ahead in the drawings, FIG. 83 illustrates a top view of overlay applicator tray 8000, with an electronic device 8350 being held in device slot 8090, and with overlay applicator 8001 resting on or at least over electronic device 8350. FIG. 84 illustrates a top view of overlay applicator tray 8000, with electronic device 8350 being held in device slot 8090, and with overlay applicator 8001 being folded upwards. As shown in FIGS. 83-84, electronic device 8350 is a 38 mm Apple Watch without a watch band. In other embodiments, the electronic device can be another type of electronic device, and device slot 8090 can be configured to securely hold the electronic device within device slot 8090.

In many embodiments, overlay applicator tray 8000 can be used to apply overlay 8230 (FIG. 82) to electronic device 8350. For example, overlay applicator 8001 can be turned upwards, as shown in FIG. 84, and electronic device 8350 can be placed into device slot 8090 of cradle 8080 with the screen of electronic device 8350 facing upwards or away from device slot 8090. In many embodiments, alignment piece 8010 can be flexible to allow overlay applicator 8001 to be lifted upwards, and in some embodiments, to be lifted upwards and folded back over cradle attachment portion 8012. When overlay applicator 8001 is released or folded back down, overlay applicator 8001 can rest upon electronic device 8350 and tab surface 8084, as shown in FIG. 83. In many embodiments, tab surface 8084 and/or attachment surface 8085 can be approximately planar with the screen of electronic device 8350, such that overlay applicator 8001 is approximately planar when resting upon electronic device 8350 and tab surface 8084, as shown in FIG. 83.

In several embodiments, the screen of electronic device 8350 can be cleaned before and/or after being inserted in device slot 8090. For example, overlay applicator 8001 can be folded back over cradle attachment portion 8012, and the screen of electronic device 8350 can be cleaned with a cleaning cloth, such as cleaning cloth 8573 shown in FIG. 85 and described above, and/or cleaned with a dust removal sticker, such as dust removal sticker 8574, shown in FIG. 85 and described below, which can advantageously remove dirt or other particulates.

After the screen of electronic device 8350 is cleaned, in several embodiments, when overlay applicator 8001 is lifted off the screen of electronic device 8350, such as shown in FIG. 84, first pull tab 8042 can be used to remove adhesive release liner 8240 (FIG. 82) to expose the adhesive on bottom 9532 (FIG. 95) side of overlay applicator 8230 (FIG. 82).

Next, in a number of embodiments, overlay applicator 8001 can be returned to rest on the screen of electronic device 8350, such that the adhesive on bottom side 9532 (FIG. 95) of overlay applicator 8230 (FIG. 82) adheres to the screen of electronic device 8350. In many embodiments, alignment piece 8010 can align overlay applicator 8001 with respect to cradle 8080 such that when overlay applicator 8001 is returned to rest upon the screen of electronic device 8350, overlay 8230 (FIG. 82) can be aligned automatically or self-aligned with the screen of electronic device 8350.

Next, in many embodiments, air bubbles, if any, between overlay applicator 8230 (FIG. 82) and the screen of electronic device 8350 can be smoothed out, such as by pushing or rubbing a rigid or semi-rigid object along protective film 8020 (FIG. 80). In several embodiments, protective film 8020 (FIG. 80) can protect and prevent damage to overlay 8230 (FIG. 82) from the forceful pushing or rubbing involved with smoothing the bubbles.

Next, in several embodiments, protective film 8020 (FIG. 80) can be removed, such as by using second pull tab 8022 to remove protective film 8020 (FIG. 80) from overlay 8230 (FIG. 82). In many embodiments, alignment piece 8010 can be attached to protective film 8020, but not to overlay 8230 (FIG. 82), such that overlay 8230 (FIG. 82) can be adhered to the screen of electronic device 8350. Electronic device 8350 can then be removed from device slot 8090 with overlay 8230 (FIG. 82) applied to the screen of electronic device 8350.

Figure 85:
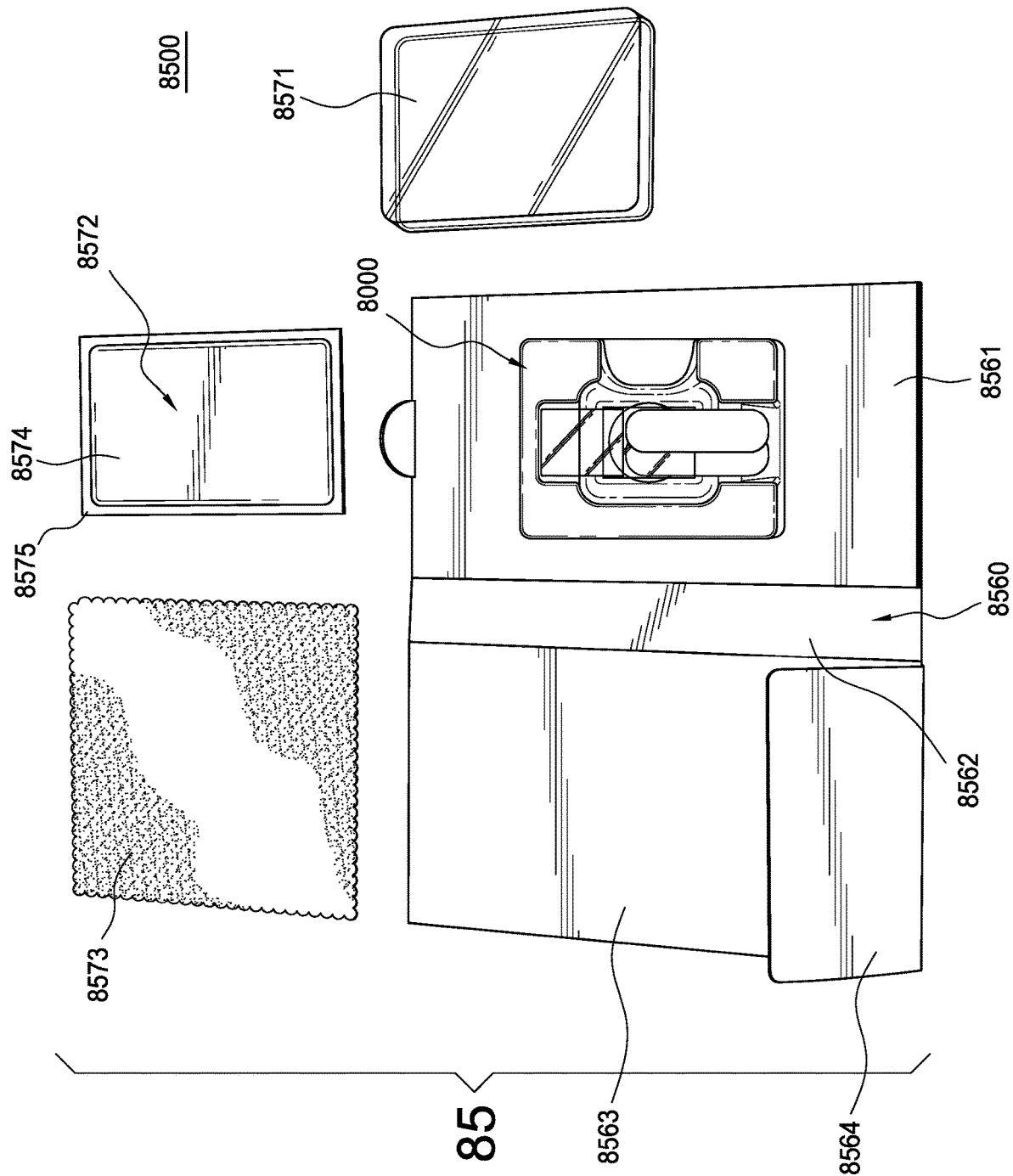
FIG. 85 illustrates a top view of an overlay applicator tray kit with an overlay applicator tray book in an open configuration, according to another embodiment.

Turning ahead in the drawings, FIG. 85 illustrates a top view of an overlay applicator tray kit 8500 with an overlay applicator tray book 8560 in an open configuration, according to another embodiment. Overlay applicator tray kit 8500 is merely exemplary, and embodiments of the overlay applicator tray kit are not limited to the embodiments presented herein. The overlay applicator tray kit can be employed in many different embodiments or examples not specifically depicted or described herein.

Figure 86:
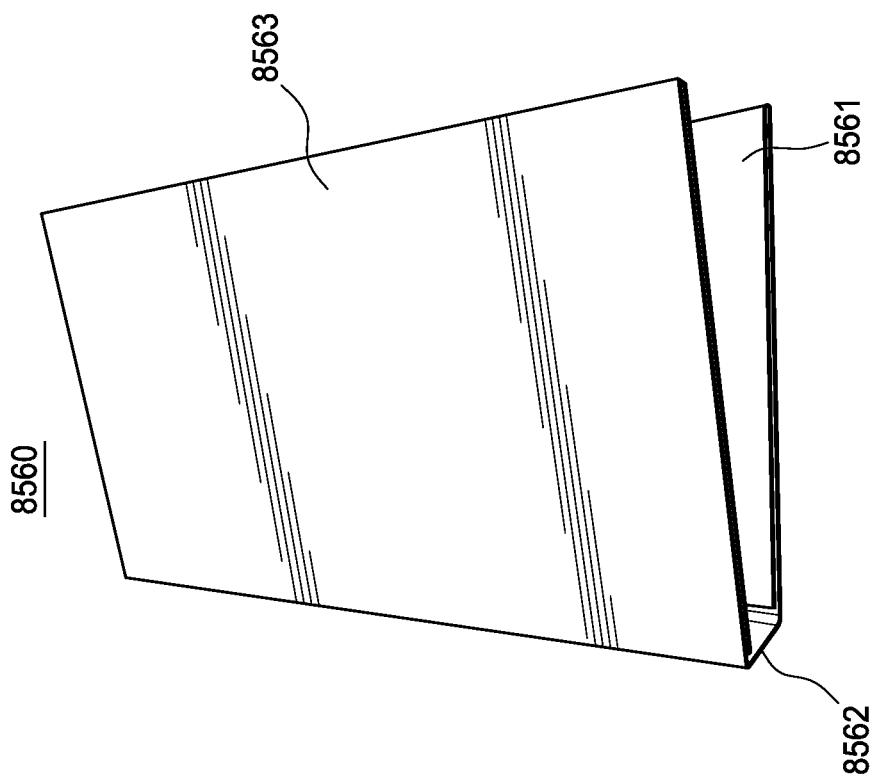
FIG. 86 illustrates a top, front view of the overlay applicator tray book of FIG. 85 in a closed configuration.

In various embodiments, overlay applicator tray kit 8500 can include overlay applicator tray book 8560, a protective cover 8571, a dust sticker assembly 8572, and/or a cleaning cloth 8573. In a number of embodiments, applicator tray book 8560 can include a first cover 8561, a spine 8562, and/or a rear cover 8563, and can be foldable between an open configuration, as shown in FIG. 85, and a closed configuration, as shown in FIG. 86, described below. In many embodiments, first cover 8561 can be coupled to an overlay applicator tray, such as overlay applicator tray 8000. In several embodiments, second cover 8563 can include a flap 8564, which can be used to store dust sticker assembly 8572 and/or cleaning cloth 8573 within overlay applicator tray book 8560. In many embodiments, overlay applicator tray 8000 can be used when overlay applicator tray book 8560 is in the open configuration shown in FIG. 85.

In many embodiments, dust sticker assembly 8572 can be similar to dust sticker assembly 5500 (FIG. 55). For example, dust sticker assembly 8572 can include a dust removal sticker 8574 and/or a release liner 8575. In many embodiments, release liner 8575 can attached to the bottom side of dust removal sticker 8574 and/or can cover the adhesive on the bottom side of dust removal sticker 8574. In many embodiments, release liner 8575 can be removed from the bottom side of dust removal sticker 8574 to expose the adhesive on the bottom side of dust removal sticker 8574, and dust removal sticker 8574 can be adhered to, and then removed from, the screen of electronic device 8350 (FIGS. 83-84) to remove dust and other particulates from the screen of electronic device 8350.

In several embodiments, cleaning cloth 8573 can be a microfiber cloth or another suitable material that can be used to clean the screen of electronic device 8350 (FIGS. 83-84) without leaving dust or other particulates on the screen of electronic device 8350 (FIGS. 83-84).

In several embodiments, protective cover 8571 can be used to cover overlay applicator tray 8000, such as when overlay applicator tray book is closed, to protect overlay applicator tray 8000 and keep dust out from overlay applicator tray 8000.

In many embodiments, overlay applicator tray kit can include the elements to apply an overlay, such as overlay 8230 (FIG. 82), to the screen of an electronic device, such as electronic device 8350 (FIGS. 83-84).

Figure 87:
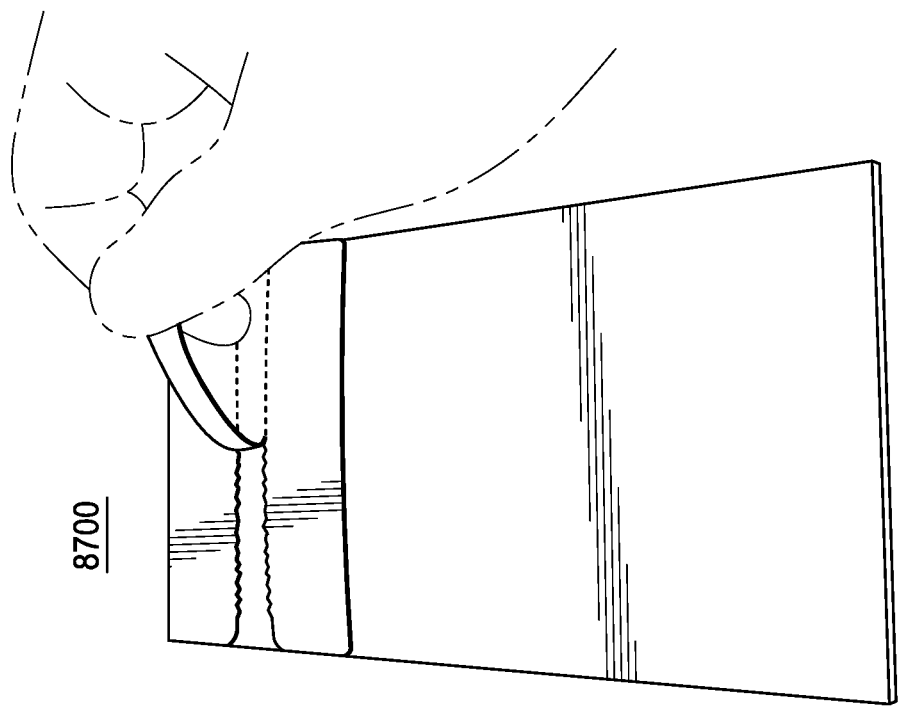
FIG. 87 illustrates a bottom, front view of a package used to enclose the overlay applicator tray kit of FIG. 85, according to another embodiment.

Turning ahead in the drawings, FIG. 86 illustrates a top, front view of overlay applicator tray book 8560 in a closed configuration. FIG. 87 illustrates a bottom, front view of a package 8700 used to enclose overlay applicator tray kit 8500 (FIG. 85), according to another embodiment. In many embodiments, overlay applicator tray kit 8500 (FIG. 85) can be included in overlay applicator tray book 8560 in the closed configuration shown in FIG. 86 and packaged within package 8700. In several embodiments, package 8700 can be a package that can keep dust and other particulates out of overlay applicator tray 8000 (FIGS. 80-85). In a number of embodiments, packages such as package 8700 can be provided to consumers to allow consumers to accurately and easily apply overlays, such as overlay 8230 (FIG. 82) to the screens of electronic devices, such as electronic device 8350 (FIGS. 83-84). In many embodiments, instructions for the consumer can be provided in and/or on package 8700.

Turning ahead in the drawings, FIG. 88 illustrates a top, front, right side perspective view of an overlay applicator tray 8800, according to another embodiment. FIG. 89 illustrates a front side elevational view of overlay applicator tray 8800. FIG. 90 illustrates an enlarged front side elevational view of a portion of overlay applicator tray 8800, as identified in FIG. 89. Overlay applicator tray 8800 is merely exemplary, and embodiments of the overlay applicator tray are not limited to the embodiments presented herein. The overlay applicator tray can be employed in many different embodiments or examples not specifically depicted or described herein. Overlay applicator tray 8800 can be similar to overlay applicator tray 8000 (FIG. 80), and various components or constructions of overlay applicator tray 8800 can be substantially identical or similar to various components of overlay applicator tray 8000 (FIG. 80).

In many embodiments, overlay applicator tray 8800 can include cradle 8080, alignment piece 8010, and an overlay applicator 8801. Overlay applicator 8801 can be similar to overlay applicator 8001 (FIG. 80), and various components or constructions of overlay applicator 8801 can be substantially identical or similar to various components of overlay applicator 8001 (FIG. 80). In many embodiments, overlay applicator 8801 can include overlay 8230 and adhesive release liner 8240, as shown in FIG. 90, but not include protective film 8020 (FIG. 80). In several embodiments, overlay attachment portion 8011 of alignment piece 8010 can be adhered to overlay 8230, as shown in FIG. 90, instead of protective film 8010 (FIG. 80). In many embodiments, overlay applicator 8801 can include first pull tab 8042, but not second pull tab 8022 (FIG. 80). As described above, first pull tab 8042 can be used to remove adhesive release liner 8240 from overlay 8230, such that overlay 8230 can be adhered to the screen of an electronic device, such as electronic device 8350 (FIGS. 83-84), when the electronic device is securely held in device slot 8090.

Figure 91:
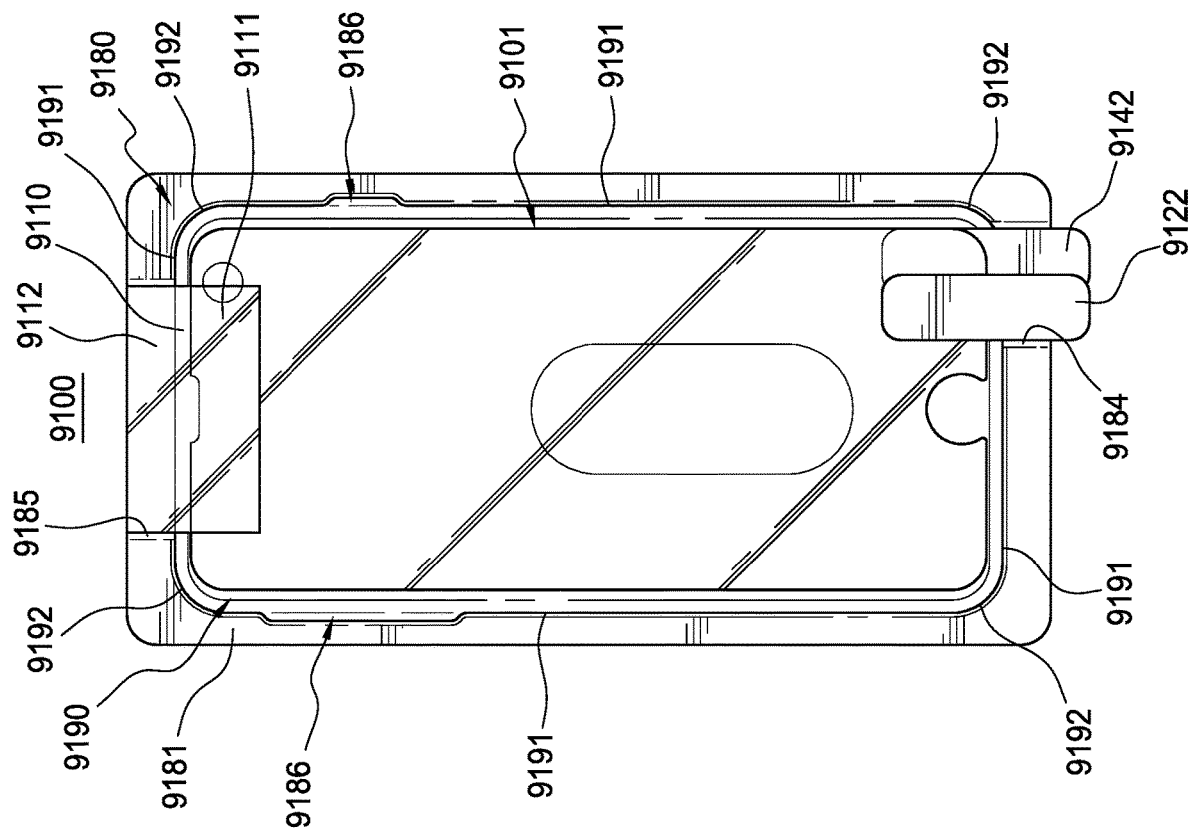
FIG. 91 illustrates a top view of an overlay applicator tray with an overlay applicator in a lowered position, according to another embodiment.
Figure 92:
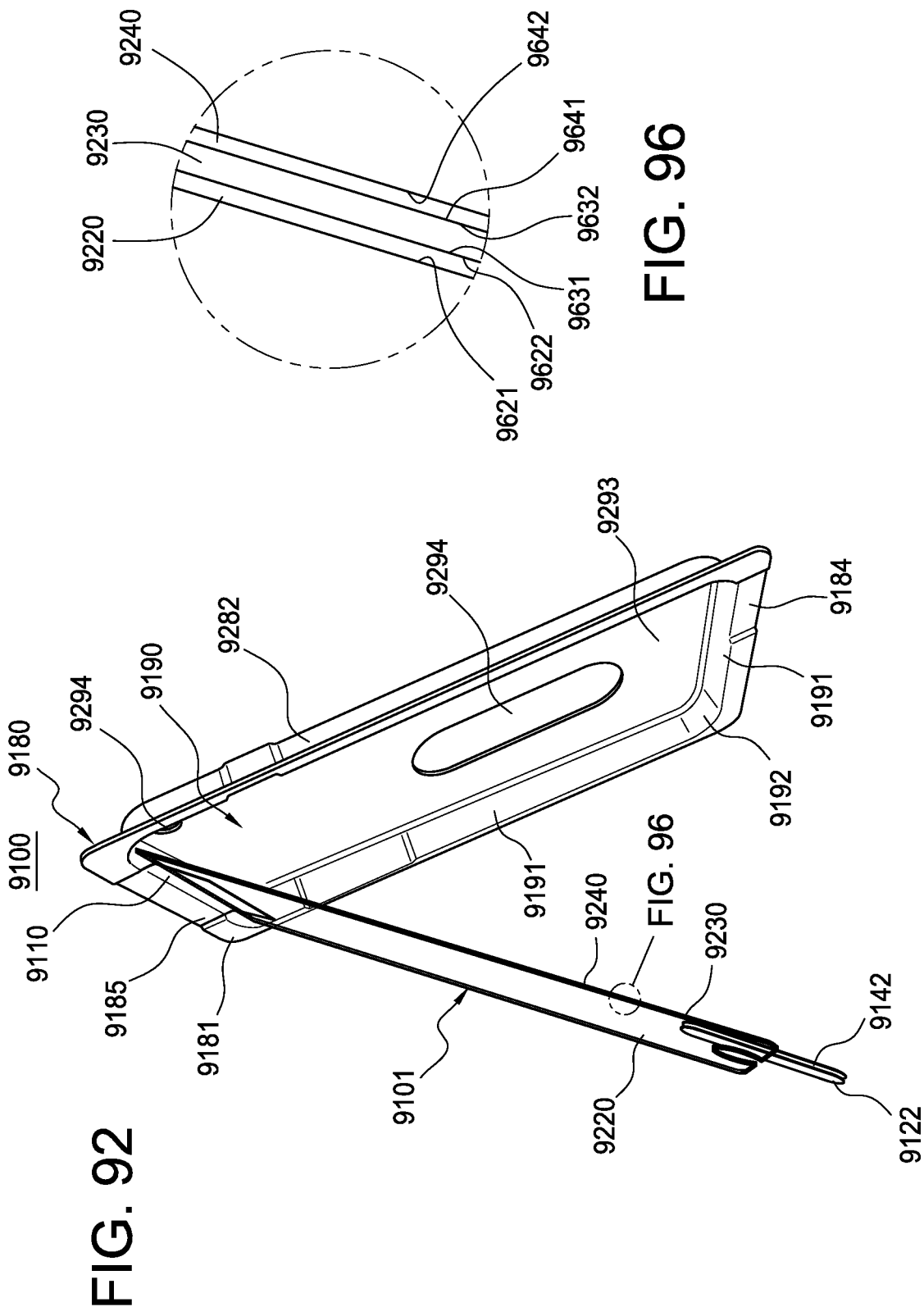
FIG. 92 illustrates a top, right side view of the overlay applicator tray of FIG. 91 with the overlay applicator of FIG. 91 in a raised position.

Turning ahead in the drawings, FIG. 91 illustrates a top view of an overlay applicator tray 9100 with an overlay applicator 9101 in a lowered position, according to another embodiment. FIG. 92 illustrates a top, right side view of overlay applicator tray 9100 with overlay applicator 9101 in a raised position. FIG. 96 illustrates an enlarged top, right side view of a portion of overlay applicator 9101 of overlay applicator tray 9100, as identified in FIG. 92. Overlay applicator tray 9100 is merely exemplary, and embodiments of the overlay applicator tray are not limited to the embodiments presented herein. The overlay applicator tray can be employed in many different embodiments or examples not specifically depicted or described herein. In many embodiments, overlay applicator tray 9100 can be similar to overlay applicator tray 8000 (FIG. 80), and various components or constructions of overlay applicator tray 9100 can be substantially identical or similar to various components of overlay applicator tray 8000 (FIG. 80).

In various embodiments, overlay applicator tray 9100 can include overlay applicator 9101, a cradle 9180, and/or an alignment piece 9110. In many embodiments, overlay applicator 9101 can be similar to overlay applicator 100 (FIG. 1), overlay applicator 400 (FIGS. 4-5), overlay applicator 600 (FIG. 6), overlay applicator 700 (FIG. 7), overlay applicator 1500 (FIG. 15), overlay applicator 3000 (FIG. 30), overlay applicator 3550 (FIGS. 35-36), overlay applicator 6050 (FIG. 60), and/or overlay applicator 8001 (FIG. 80), and various components and/or constructions of overlay applicator 9101 can be substantially identical or similar to various components of overlay applicator 100 (FIG. 1), overlay applicator 400 (FIGS. 4-5), overlay applicator 600 (FIG. 6), overlay applicator 700 (FIG. 7), overlay applicator 1500 (FIG. 15), overlay applicator 3000 (FIG. 30), overlay applicator 3550 (FIGS. 35-36), overlay applicator 6050 (FIG. 60), and/or overlay applicator 8001 (FIG. 80).

In a number of embodiments, overlay applicator 9101 can include an overlay 9230 (FIG. 92). In many embodiments, overlay 9230 (FIG. 92) can be similar or identical to overlay 130 (FIG. 1), overlay 430 (FIGS. 4-5), overlay 630 (FIG. 6), overlay 730 (FIG. 7), and/or overlay 1530 (FIG. 15), overlay 2930 (FIGS. 29-30), and/or overlay 8230 (FIG. 82). In a number of embodiments, overlay 9230 (FIG. 92) can have a top side 9631 (FIG. 96) and a bottom side 9632 (FIG. 96). Top side 9631 (FIG. 96) of overlay 9230 (FIG. 92) can be similar or identical to top side 131 (FIG. 1) of overlay 130 (FIG. 1). Bottom side 9632 (FIG. 96) of overlay 9230 (FIG. 92) can be similar or identical to bottom side 132 (FIG. 1) of overlay 130 (FIG. 1). In various embodiments, bottom side 9632 (FIG. 96) of overlay 9230 (FIG. 92) can include an adhesive configured to adhere overlay 9230 (FIG. 92) to a screen of an electronic device, such as an electronic device held in cradle 9180.

In several embodiments, overlay applicator 9001 can include an adhesive release liner 9240 (FIG. 92). Adhesive release liner 9240 (FIG. 92) can be similar or identical to adhesive release liner 140 (FIG. 1), adhesive release liner 440 (FIGS. 4-5), adhesive release liner 640 (FIG. 6), adhesive release liner 740 (FIG. 7), adhesive release liner 1540 (FIG. 15), adhesive release liner 2740 (FIGS. 27-30), and/or adhesive release liner 8240 (FIG. 82). In a number of embodiments, adhesive release liner 9240 (FIG. 92) can have a top side 9641 (FIG. 96) and a bottom side 9642 (FIG. 96). Top side 9641 (FIG. 96) of adhesive release 9240 (FIG. 92) liner can be removably attached to bottom side 9632 (FIG. 96) of overlay 9230 (FIG. 92) to expose the adhesive at bottom side 9632 (FIG. 96) of overlay 9230 (FIG. 82). In some embodiments, adhesive release liner 9240 (FIG. 92) can be configured to protect the adhesive agent at or on bottom side 9632 (FIG. 96) of overlay 9230 (FIG. 92) from contaminants.

In some embodiments, overlay applicator 9001 can include a protective film 9220 (FIG. 92). Protective film 9220 (FIG. 92) can be similar or identical to protective film 120 (FIG. 1), protective film 420 (FIGS. 4-5), protective film 620 (FIG. 6), protective film 720 (FIG. 7), protective film 1520 (FIG. 15), protective film 2920 (FIGS. 29-30), protective film 3552 (FIG. 35), protective film 6052 (FIG. 60), and/or protective film 8020 (FIG. 80). In many embodiments, protective film 9220 (FIG. 92) can have a top side 9621 (FIG. 96) and a bottom side 9622 (FIG. 96). In a number of embodiments, protective film 9220 (FIG. 92) can be removably attached to the top side 9631 (FIG. 96) of overlay 9230 (FIG. 92). For example, bottom side 9622 (FIG. 96) of protective film 9220 (FIG. 92) can be removably attached to top side 9631 (FIG. 96) of overlay 9230 (FIG. 92), such as with an adhesive at or on bottom side 9622 (FIG. 96) of protective film 9220 (FIG. 92).

In several embodiments, overlay applicator 9101 can include a first pull tab 9142 and/or a second pull tab 9122. First pull tab 9142 can be similar or identical to first pull tab 8042 (FIG. 80), and/or second pull tab 9122 can be similar or identical to second pull tab 8022 (FIG. 80). In a number of embodiments, first pull tab 9142 can be used to remove adhesive release liner 9240 (FIG. 92) from overlay 9230 (FIG. 92). In many embodiments, first pull tab 9142 can advantageously help prevent accidental touching of the adhesive at or on bottom side 9632 (FIG. 96) of overlay 9230 (FIG. 92) when removing adhesive release liner 9240 (FIG. 92) from overlay 9230 (FIG. 92). In several embodiments, first pull tab 9142 can be affixed to bottom side 9642 (FIG. 96) or adhesive release liner 9240 (FIG. 92), such as shown in FIG. 92. In other embodiments, first pull tab 9142 can be integral with adhesive release liner 9240 (FIG. 92). In many embodiments, first pull tab 9142 can be adhered to bottom side 9642 (FIG. 96) of adhesive release liner 9240 (FIG. 92) with an adhesive or another suitable fastener. In a number of embodiments, the adhesive adhering first pull tab 9142 to adhesive release liner 9240 (FIG. 92) can have a greater adhesive strength than the adhesive at or on bottom side 9632 (FIG. 96) of overlay 9230 (FIG. 92) that adheres adhesive release liner 9240 (FIG. 92) to overlay 9230 (FIG. 82), such that first pull tab 9142 can be used to pull and remove adhesive release liner 9240 (FIG. 92) from overlay 9230 (FIG. 92) without first pull tab 9142 being removed from adhesive release liner 9240 (FIG. 92).

In a number of embodiments, second pull tab 9122 can be used to remove protective film 9220 (FIG. 92) from overlay 9230 (FIG. 92). In many embodiments, second pull tab 9122 can be affixed to top side 9621 (FIG. 96) of protective film 9220 (FIG. 92), such as shown in FIG. 92. In other embodiments, second pull tab 9122 can be integral with protective film 9220 (FIG. 92). In many embodiments, second pull tab 9122 can be adhered to top side 9621 (FIG. 96) of protective film 9220 (FIG. 92) with an adhesive or another suitable fastener. In a number of embodiments, the adhesive adhering second pull tab 9122 to protective film 9220 (FIG. 92) can have a greater adhesive strength than the adhesive at or on bottom side 9622 (FIG. 96) of protective film 9220 (FIG. 92) that adheres protective film 9220 (FIG. 92) to overlay 9230 (FIG. 92), such that second pull tab 9122 can be used to pull and remove protective film 9220 (FIG. 92) from overlay 9230 (FIG. 92) without second pull tab 9122 being removed from protective film 9220 (FIG. 92).

In many embodiments, cradle 9180 can be similar to cradle 310 (FIG. 3), cradle 832 (FIG. 8), cradle 1620 (FIG. 16), cradle 2032 (FIG. 20), cradle 3100 (FIG. 31), cradle 3520 (FIG. 35), cradle 3710 (FIGS. 37-38), cradle 4630 (FIGS. 46-50), cradle 6410 (FIG. 64), cradle 6420 (FIG. 64), cradle 6430 (FIG. 64), cradle 6950 (FIG. 69), and/or cradle 8080 (FIG. 80), and various components and/or constructions of cradle 9180 can be substantially identical or similar to various components of cradle 310 (FIG. 3), cradle 832 (FIG. 8), cradle 1620 (FIG. 16), cradle 2032 (FIG. 20), cradle 3100 (FIG. 31), cradle 3520 (FIG. 35), cradle 3710

(FIGS. 37-38), cradle 4630 (FIGS. 46-50), cradle 6410 (FIG. 64), cradle 6420 (FIG. 64), cradle 6430 (FIG. 64), cradle 6950 (FIG. 69), and/or cradle 8080 (FIG. 80).

In several embodiments, cradle 9180 can include a device slot 9190. Device slot can be similar to slot 311 (FIG. 3), slot 1621 (FIG. 16), device slot 3111 (FIG. 31), slot 3811 (FIG. 38), slot 4731 (FIG. 47), device slot 6411 (FIG. 64), device slot 6421 (FIG. 64), device slot 6431 (FIG. 64), device slot 6956 (FIG. 69), and/or device slot 8090 (FIG. 80). In many embodiments, device slot 9190 can be configured to securely hold an electronic device in device slot 9190. In many embodiments, the electronic device can be similar or identical to device 220 (FIG. 2), device 320 (FIG. 3), device 1650 (FIG. 16), device 3401 (FIG. 34), device 3720 (FIG. 37), device 4800 (FIG. 48), device 5600 (FIG. 56), device 6550 (FIG. 65), device 7100, and/or electronic device 8350 (FIG. 83). For example, the electronic device can be a smart phone, a tablet, a smart watch, or another suitable electronic device. In several embodiments, cradle 9180 can be configured for a specific type of electronic device, such as the iPhone 6 Plus or iPhone 6s Plus. For example, device slot 9190 can be configured to hold an electronic device having the dimensions of the specific type of electronic device.

In many embodiments, the electronic device can be placed within device slot 9190 with a screen of the electronic device facing upwards or away from device slot 9190. In other embodiments, the electronic device can be placed within device slot 9190 with the screen of the electronic device facing downwards or towards device slot 9190. In some embodiments, device slot 9190 can be conformal with the electronic device. In a number of embodiments, device slot 9190 can include one or more side walls, such as side walls 9191, and/or one or more corner walls, such as corner walls 9192. In several embodiments, device slot 9190 can include a bottom wall 9293 (FIG. 92). In some embodiments, bottom wall 9293 can include one or more recesses or apertures, such as apertures 9294 (FIG. 92) to accommodate one or more protrusions on a face of the electronic device, such as a camera, or two facilitate removal of the electronic device from device slot 9190.

In a number of embodiments, cradle 9180 can have a thickness greater than a thickness of the electronic device. In some embodiments, cradle 9180 can include a top surface 9181 and one or more side surfaces, such as side surfaces 9282 (FIG. 92). In many embodiments, top surface 9180 can at least partially surround device slot 9190. In some embodiments, cradle 9180 can include one or more openings or affordances, such as affordances 9186, which can accommodate one or more protrusions on one or more sides of the electronic device, such as one or more buttons, crowns, dials, etc., of the electronic device, and/or facilitate removal of the electronic device from device slot 9190. For example, as shown in FIG. 91, affordances 9186 can extend outward from device slot 9190 through one or more of side walls 9191 of device slot 9190 without extending through one or more of side surfaces 9282 (FIG. 92) of cradle 9180. In other embodiments, an opening (not shown) can extend through one of side walls 9191 of device slot 9190 and/or through one of side surfaces 9282 (FIG. 92) or cradle 9180.

In various embodiments, cradle 9180 can include a tab surface 9184 and/or an attachment surface 9185. Tab surface 9184 can be similar or identical to tab surface 8084 (FIG. 80), and/or attachment surface 9185 can be similar or identical to attachment surface 8085 (FIG. 80). In several embodiments, attachment surface 9185 can be a surface of cradle 9180 used to attach overlay applicator 9101 to cradle 9180. In a number of embodiments, tab surface 9184 can be a surface of cradle 9180 upon which first pull tab 9142 and/or second pull tab 9122 can be supported. In several embodiments, tab surface 9184 and/or attachment surface 9185 can be recessed below top surface 9181, such that overlay applicator 9101 can be disposed in overlay applicator tray 9100 in a position that does not extend above top surface 9181, which can beneficially protect overlay applicator 9101 from damage.

In many embodiments, alignment piece 9110 can couple cradle 9180 to overlay applicator 9101. Alignment piece 9110 can be similar or identical to alignment piece 8010 (FIG. 80). In some embodiments, alignment piece 9110 can include an overlay attachment portion 9111 and a cradle attachment portion 9112. For example, alignment piece 9110 can include adhesive at cradle attachment portion 9112 to adhere alignment piece 9110 to attachment surface 9185 of cradle 9180, and alignment piece 9110 also can include an adhesive at overlay attachment portion 9111 to adhere alignment piece 9110 to overlay applicator 9101. In some embodiments, alignment piece 9110 can be a piece of material separate from the other layers of overlay applicator 9101, such as shown in FIGS. 91-92 and described above. In other embodiments, alignment piece 9110 can be integral with one or more of the layers of overlay applicator 9101, such as protective film 9220 (FIG. 92) extending beyond the dimensions of overlay 9230 (FIG. 92) to attach to attachment surface 9185 of cradle 9180, for example. In many embodiments, first pull tab 9142 and second pull tab 9122 can extend beyond the other overlay layers (e.g., protective film 922 (FIG. 92), overlay 9230 (FIG. 92), adhesive release liner 9240 (FIG. 92)) in a direction opposite from the direction in which alignment piece 9010 extends. In many embodiments, alignment piece 9110 can couple cradle 9180 to overlay applicator 9101 such that overlay 9230 (FIG. 92) of overlay applicator 9101 is aligned with the screen of the electronic device when the electronic device is securely held in device slot 9190. In a number of embodiments, alignment piece 9110 can be made of a flexible material that allows overlay applicator 9101 to be lifted and/or rotated with respect to cradle 9180.

In the embodiments of the overlay applicator trays (e.g., 8000 (FIG. 80), 8800 (FIG. 88), 9100 (FIG. 91)) described above, the first pull tab (e.g., 8022 (FIG. 80), 9122 (FIG. 91)) can be configured to peel the adhesive release liner (e.g., 8240 (FIG. 82), 9240 (FIG. 92)) starting at a side of the overlay (e.g., 8230 (FIG. 82), 9230 (FIG. 92)) that is opposite from the side to which the alignment piece (e.g., 8010 (FIG. 80), 9110 (FIG. 91)) is attached. In other embodiments, the first pull tab can be similar or identical to pull tab 150 (FIG. 1), pull tab 450 (FIGS. 4-5), pull tab 650 (FIG. 6), pull tab 750 (FIGS. 7, 42, 44-45, 48-49), pull tab 1550 (FIG. 15), pull tab 2750 (FIGS. 27-30) and/or pull tab 6055 (FIG. 60), such that the first pull tab is folded under the adhesive release liner (e.g., 8240 (FIG. 82), 9240 (FIG. 92)) proximate to the side at which the alignment piece (e.g., 8010 (FIG. 80), 9110 (FIG. 91)) is attached, and pulling the first pull tab results in the adhesive release liner (e.g., 8240 (FIG. 82), 9240 (FIG. 92)) being peeled starting at the side to which the alignment piece (e.g., 8010 (FIG. 80), 9110 (FIG. 91)) is attached. In some such embodiments, the first pull tab can be integral with the adhesive release liner, and in other such embodiments, the first pull tab can be attached to the adhesive release liner. In some embodiments, the first pull tab can include a wiper, such as wiper 157 (FIG. 1), wiper 457 (FIG. 4), wiper 657 (FIG. 6), wiper 757 (FIG. 7), wiper 2857 (FIGS. 28-30), wiper 6200 (FIG. 62), and/or wiper 6300 (FIG. 63), which can be pulled across the screen of the electronic device when the first pull tab is pulled to remove the adhesive release liner (e.g., 8240 (FIG. 82), 9240 (FIG. 92)) from the overlay (e.g., 8230 (FIG. 82), 9230 (FIG. 92)).

In the embodiments of the overlay applicator trays (e.g., 8000 (FIG. 80), 8800 (FIG. 88), 9100 (FIG. 91)) described above, the electronic device is placed in the device slot (e.g., 8090 (FIG. 80, 88), 9190 (FIG. 91)) of the cradle (e.g., 8080 (FIG. 80, 88), 9180 (FIG. 91)) with the screen of the electronic device facing upwards or away from the device slot (e.g., 8090 (FIG. 80, 88), 9190 (FIG. 91)). In other embodiments, the electronic device can be placed in the device slot (e.g., 8090 (FIG. 80, 88), 9190 (FIG. 91)), such that the screen of the electronic device is downwards or facing towards the device slot (e.g., 8090 (FIG. 80, 88), 9190 (FIG. 91)). For example, the tab surface (e.g., 8084 (FIG. 80), 9184 (FIG. 91)) and/or the attachment surface (e.g., 8085 (FIG. 80), 9185 (FIG. 91)) can be lower so that the overlay applicator can be attached upside-down to accommodate applying the overlay (e.g., 8230 (FIG. 82), 9230 (FIG. 92)) to the screen of the device when the electronic device is facing the opposite direction.

In several embodiments, the alignment piece (e.g., 8010 (FIG. 80), 9110 (FIG. 91)) can be a permanent part of the overlay applicator tray (e.g., 8000 (FIG. 80), 8800 (FIG. 88), 9100 (FIG. 91)) that is integrated during manufacturing. For example, the overlay applicator can be manufacturing with the alignment piece such that the overlay applicator (e.g., 8001 (FIG. 80), 8801 (FIG. 88), 9101 (FIG. 91)) and the cradle (e.g., 8080 (FIG. 80, 88), 9180 (FIG. 91)) are attached and pre-aligned using the alignment piece during the manufacturing process of the overlay applicator tray. When the overlay applicator tray is used by a consumer, the overlay applicator tray can be a single apparatus, due to the attachment and pre-alignment of the alignment piece to the overlay applicator and the cradle, such that the consumer does not need to align the overlay applicator with the cradle using pins, fasteners, adhesive, or any other attachment and/or alignment method. Instead, the consumer need only place the electronic device within the device slot (e.g., 8090 (FIG. 80, 88), 9190 (FIG. 91)) of the cradle (e.g., 8080 (FIG. 80, 88), 9180 (FIG. 91)), and the overlay applicator will be aligned automatically or self-aligned with the electronic device such that the overlay (e.g., 8230 (FIG. 82)) will be aligned with the screen of the electronic device when adhered to the screen of the electronic device.

In a number of embodiments, the overlay applicator trays (e.g., 8000 (FIG. 80), 8800 (FIG. 88), 9100 (FIG. 91)) can be disposable for one-time use. In several embodiments, the disposable nature of the overlay applicator trays can allow the overlay applicator trays to be procured by individual consumers that prefer to apply an overlay (e.g., 8230 (FIG. 82), 9230 (FIG. 92)) to an electronic device (e.g., 8350 (FIG. 83)) by themselves, and not relinquish full control of their electronic device to another, such as a sales associate.

In many embodiments, the cradles (e.g., 8080 (FIG. 80, 88), 9180 (FIG. 91)) can made using vacuum forming with a thermoplastic or other suitable material. In various embodiments, the vacuum formed manufacturing of the cradle can faster and less expensive to manufacture than a cradle formed with injection molding.

Figure 93:
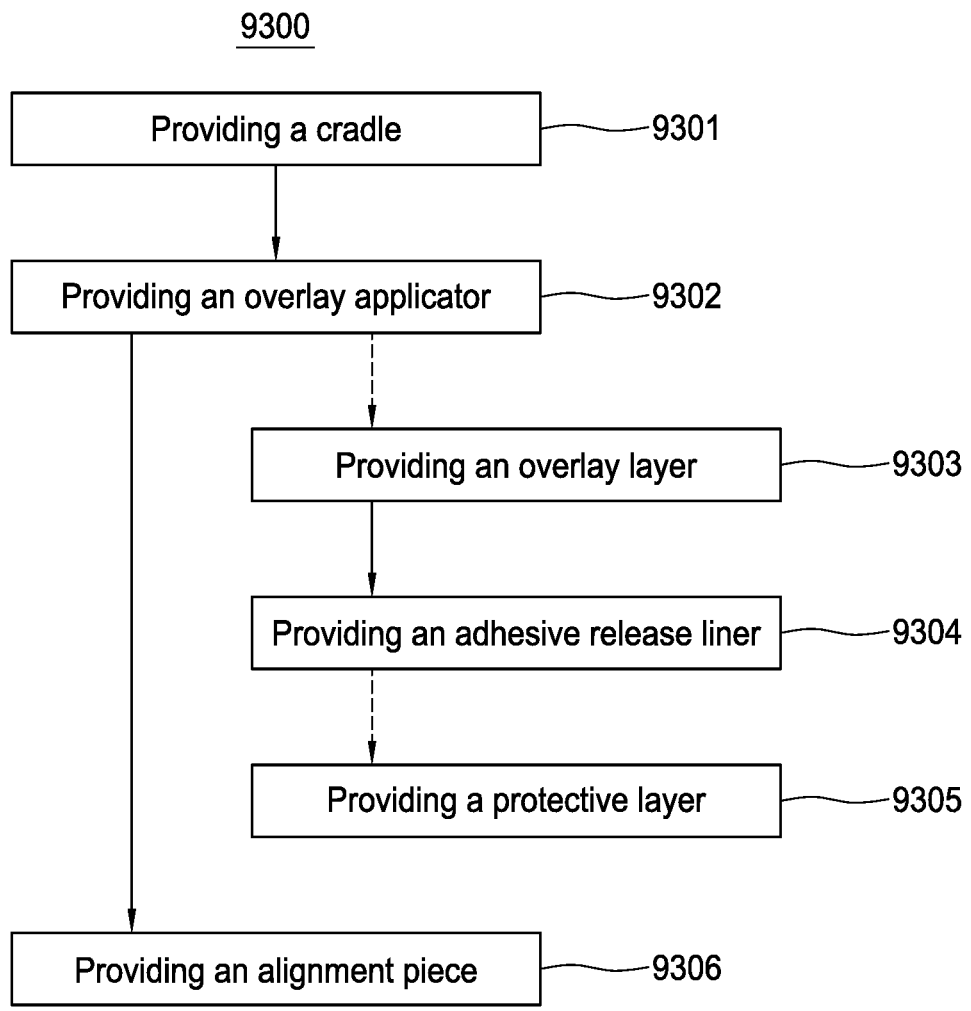
FIG. 93 illustrates a flow chart for a method, according to another embodiment.

Turning ahead in the drawings, FIG. 93 illustrates a flow chart for an embodiment of a method 9300, according to another embodiment. Method 9300 is merely exemplary and is not limited to the embodiments presented herein. Method 9300 can be employed in many different embodiments or examples not specifically depicted or described herein. In some embodiments, the procedures, the processes, and/or the activities of method 9300 can be performed in the order presented. In other embodiments, the procedures, the processes, and/or the activities of the method 9300 can be performed in any other suitable order. In still other embodiments, one or more of the procedures, the processes, and/or the activities in method 9300 can be combined or skipped. In many embodiments, method 9300 can be a method of providing an overlay applicator tray. In some embodiments, the overlay applicator tray can be similar or identical to overlay applicator tray 8000 (FIG. 80), overlay applicator tray 8800 (FIG. 88), and/or overlay applicator tray 9100 (FIG. 91).

Referring to FIG. 93, method 9300 can include a block 9301 of providing a cradle. In many embodiments, the cradle can be similar or identical to cradle 310 (FIG. 3), cradle 832 (FIG. 8), cradle 1620 (FIG. 16), cradle 2032 (FIG. 20), cradle 3100 (FIG. 31), cradle 3520 (FIG. 35), cradle 3710 (FIGS. 37-38), cradle 4630 (FIGS. 46-50), cradle 6410 (FIG. 64), cradle 6420 (FIG. 64), cradle 6430 (FIG. 64), cradle 6950 (FIG. 69), cradle 8080 (FIG. 80), and/or cradle 9180 (FIG. 91). In many embodiments, the cradle can include a device slot. The device slot can be similar or identical to slot 311 (FIG. 3), slot 1621 (FIG. 16), device slot 3111 (FIG. 31), slot 3811 (FIG. 38), slot 4731 (FIG. 47), device slot 6411 (FIG. 64), device slot 6421 (FIG. 64), device slot 6431 (FIG. 64), device slot 6956 (FIG. 69), device slot 8090 (FIG. 80), and/or device slot 9190 (FIG. 91). In many embodiments, the device slot can be configured to securely hold an electronic device in the device slot. The electronic device can be to device 220 (FIG. 2), device 320 (FIG. 3), device 1650 (FIG. 16), device 3401 (FIG. 34), device 3720 (FIG. 37), device 4800 (FIG. 48), device 5600 (FIG. 56), device 6550 (FIG. 65), device 7100, and/or electronic device 8350 (FIG. 83). In many embodiments, the cradle can be provided by being vacuum formed.

In some embodiments, method 9300 next can include a block 9302 of providing an overlay applicator. The overlay applicator can be similar or identical to overlay applicator 100 (FIG. 1), overlay applicator 400 (FIGS. 4-5), overlay applicator 600 (FIG. 6), overlay applicator 700 (FIG. 7), overlay applicator 1500 (FIG. 15), overlay applicator 3000 (FIG. 30), overlay applicator 3550 (FIGS. 35-36), overlay applicator 6050 (FIG. 60), overlay applicator 8001 (FIG. 80), and/or overlay applicator 9101 (FIG. 91).

In many embodiments, block 9302 optionally can include a block 9303 of providing an overlay layer. The overlay layer can be similar or identical to overlay 130 (FIG. 1), overlay 430 (FIGS. 4-5), overlay 630 (FIG. 6), overlay 730 (FIG. 7), and/or overlay 1530 (FIG. 15), overlay 2930 (FIGS. 29-30), overlay 8230 (FIG. 82), and/or overlay 9230 (FIG. 92). In a number of embodiments, the overlay layer can include a first side and a second side. The first side can be similar or identical to top side 9531 (FIG. 95) and/or top side 9631 (FIG. 96). The second side can be similar or identical to bottom side 9532 (FIG. 95) and/or bottom side 9632 (FIG. 96). In several embodiments, the second side is configured to be adhered to a screen of the electronic device.

In several embodiments, block 9302 next can include a block 9304 of providing a release liner. The release liner can be similar or identical to adhesive release liner 140 (FIG. 1), adhesive release liner 440 (FIGS. 4-5), adhesive release liner 640 (FIG. 6), adhesive release liner 740 (FIG. 7), adhesive release liner 1540 (FIG. 15), adhesive release liner 2740 (FIGS. 27-30), adhesive release liner 8240 (FIG. 82), and/or adhesive release liner 9240 (FIG. 92). In many embodiments, the release liner can be configured to be removed from the second side of the overlay layer to permit the second side of the overlay layer to be adhered to the screen of the electronic device.

In many embodiments, block 9302 optionally can include a block 9305 of providing a protective layer. The protective layer can be similar or identical to protective film 120 (FIG. 1), protective film 420 (FIGS. 4-5), protective film 620 (FIG. 6), protective film 720 (FIG. 7), protective film 1520 (FIG. 15), protective film 2920 (FIGS. 29-30), protective film 3552 (FIG. 35), protective film 6052 (FIG. 60), protective film 8020 (FIG. 80), and/or protective film 9220 (FIG. 92). In several embodiments, a side of the protective layer can be removably attached to the first side of the overlay layer. The side of the protective layer can be similar or identical to second side 9522 (FIG. 95) or second side 9622 (FIG. 96).

In a number of embodiments, method 9300 next can include a block 9306 of providing an alignment piece. The alignment piece can be similar or identical to alignment piece 8010 (FIG. 80) and/or alignment piece 9110 (FIG. 91). In a number of embodiments, the alignment piece can couple the cradle to the overlay applicator such that the overlay layer is aligned with the screen of the electronic device when the electronic device is securely held in the device slot as the overlay applicator is applied to the screen of the electronic device.

Figure 94:
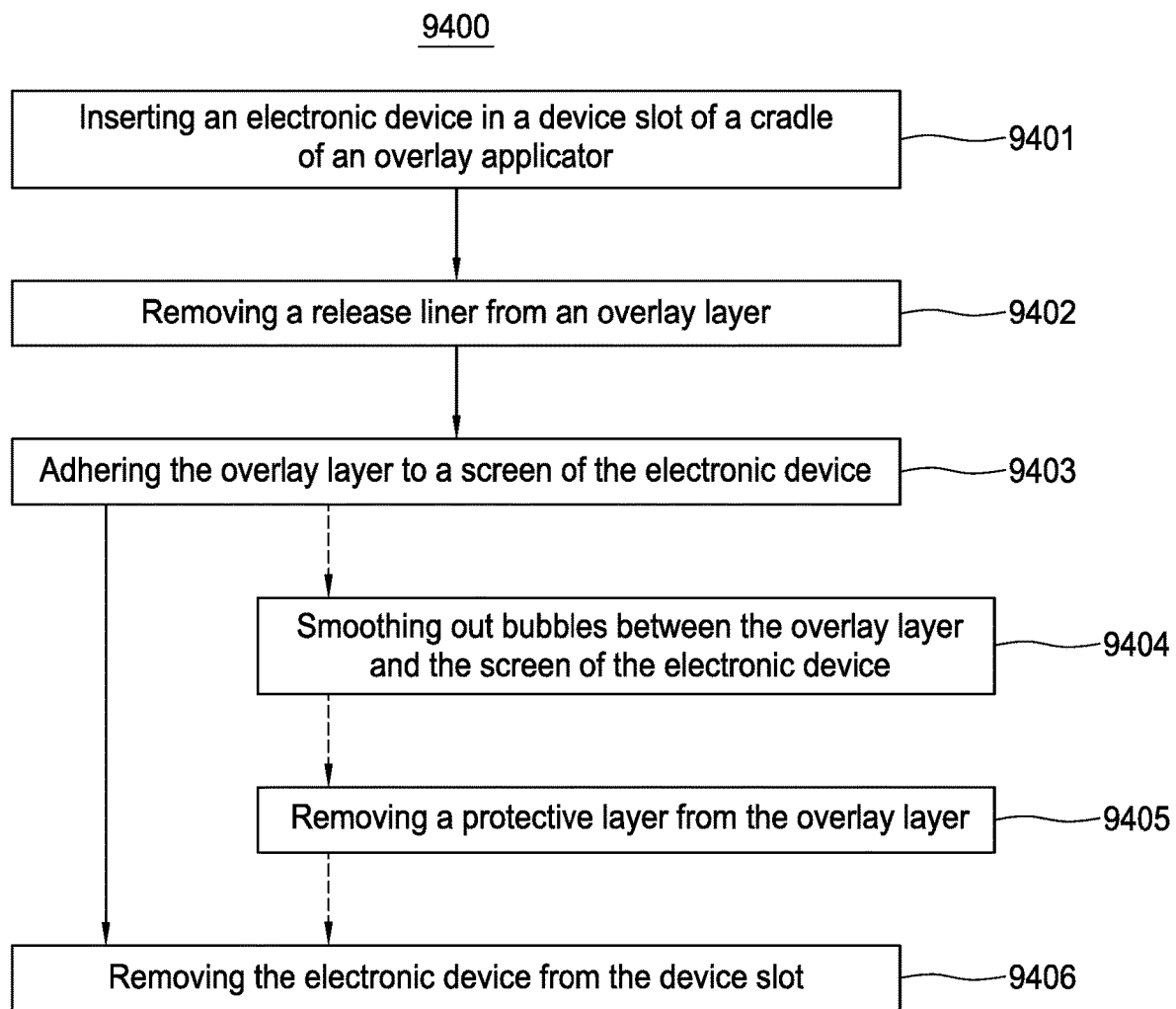
FIG. 94 illustrates a flow chart for a method, according to another embodiment.

Turning ahead in the drawings, FIG. 94 illustrates a flow chart for an embodiment of a method 9400, according to another embodiment. Method 9400 is merely exemplary and is not limited to the embodiments presented herein. Method 9400 can be employed in many different embodiments or examples not specifically depicted or described herein. In some embodiments, the procedures, the processes, and/or the activities of method 9400 can be performed in the order presented. In other embodiments, the procedures, the processes, and/or the activities of the method 9400 can be performed in any other suitable order. In still other embodiments, one or more of the procedures, the processes, and/or the activities in method 9400 can be combined or skipped. In many embodiments, method 9400 can be a method of using an overlay applicator tray, such as using an overlay applicator tray to apply an overlay to a screen of an electronic device.

Referring to FIG. 94, method 9400 can include a block 9401 of inserting an electronic device in a device slot of a cradle of an overlay applicator tray. The overlay applicator tray can be similar or identical to overlay applicator tray 8000 (FIG. 80), overlay applicator tray 8800 (FIG. 88), and/or overlay applicator tray 9100 (FIG. 91). The cradle can be similar or identical to cradle 310 (FIG. 3), cradle 832 (FIG. 8), cradle 1620 (FIG. 16), cradle 2032 (FIG. 20), cradle 3100 (FIG. 31), cradle 3520 (FIG. 35), cradle 3710 (FIGS. 37-38), cradle 4630 (FIGS. 46-50), cradle 6410 (FIG. 64), cradle 6420 (FIG. 64), cradle 6430 (FIG. 64), cradle 6950 (FIG. 69), cradle 8080 (FIG. 80), and/or cradle 9180 (FIG. 91). The device slot can be similar or identical to slot 311 (FIG. 3), slot 1621 (FIG. 16), device slot 3111 (FIG. 31), slot 3811 (FIG. 38), slot 4731 (FIG. 47), device slot 6411 (FIG. 64), device slot 6421 (FIG. 64), device slot 6431 (FIG. 64), device slot 6956 (FIG. 69), device slot 8090 (FIG. 80), and/or device slot 9190 (FIG. 91). The electronic device can be to device 220 (FIG. 2), device 320 (FIG. 3), device 1650 (FIG. 16), device 3401 (FIG. 34), device 3720 (FIG. 37), device 4800 (FIG. 48), device 5600 (FIG. 56), device 6550 (FIG. 65), device 7100, and/or electronic device 8350 (FIG. 83). In many embodiments, the device slot can be configured to securely hold the electronic device in the device slot when the electronic device is inserted in the device slot.

In some embodiments, method 9400 next can include a block 9402 of removing a release liner from an overlay layer. In many embodiments, the release liner and the overlay layer can be part of an overlay applicator attached to the cradle using an alignment piece. The overlay applicator can be similar or identical to overlay applicator 100 (FIG. 1), overlay applicator 400 (FIGS. 4-5), overlay applicator 600 (FIG. 6), overlay applicator 700 (FIG. 7), overlay applicator 1500 (FIG. 15), overlay applicator 3000 (FIG. 30), overlay applicator 3550 (FIGS. 35-36), overlay applicator 6050 (FIG. 60), overlay applicator 8001 (FIG. 80), and/or overlay applicator 9101 (FIG. 91). The alignment piece can be similar or identical to alignment piece 8010 (FIG. 80) and/or alignment piece 9110 (FIG. 91).

The release liner can be similar or identical to adhesive release liner 140 (FIG. 1), adhesive release liner 440 (FIGS. 4-5), adhesive release liner 640 (FIG. 6), adhesive release liner 740 (FIG. 7), adhesive release liner 1540 (FIG. 15), adhesive release liner 2740 (FIGS. 27-30), adhesive release liner 8240 (FIG. 82), and/or adhesive release liner 9240 (FIG. 92). The overlay layer can be similar or identical to overlay 130 (FIG. 1), overlay 430 (FIGS. 4-5), overlay 630 (FIG. 6), overlay 730 (FIG. 7), and/or overlay 1530 (FIG. 15), overlay 2930 (FIGS. 29-30), overlay 8230 (FIG. 82), and/or overlay 9230 (FIG. 92). In a number of embodiments, the alignment piece can couple the cradle to the overlay applicator such that the overlay layer is aligned with the screen of the electronic device when the electronic device is securely held in the device slot as the overlay applicator is applied to the screen of the electronic device.

In several embodiments, block 9402 of removing a release liner from an overlay layer can include lifting (or rotating) the overlay applicator to peel back the release liner from the overlay layer, such as by using a first pull tab of the overlay applicator. The first pull tab can be similar or identical to first pull tab 8042 (FIG. 80) and/or 9122 (FIG. 91). In other embodiments, block 9402 of removing the release liner from the overlay layer can include pulling a pull tab of the overlay applicator when the overlay applicator is disposed proximate to the screen of the electronic device. For example, the overlay applicator can be disposed proximate to the screen of the electronic device by resting on or being held against the screen of the electronic device, such as when the electronic device is inserted in the device slot with the screen up, or disposed between the device slot at the screen of the electronic device, such as when the electronic device is inserted in the device slot with the screen down.

In many embodiments, method 9400 next can include a block 9403 of adhering the overlay layer to a screen of the electronic device. In some embodiments, such as when block 9402 of removing the release liner from the overlay applicator includes lifting (or rotating) the overlay applicator to peel back the release liner from the overlay layer, block 9403 of adhering the overlay layer to the screen of the electronic device can include lowering the overlay applicator to the screen of the electronic device to adhere the overlay layer to the screen of the electronic device. In other embodiments, such as when block 9402 of removing the release liner from the overlay applicator involves pulling a pull tab of the overlay applicator when the overlay applicator is disposed proximate to the screen of the electronic device, block 9403 of adhering the overlay layer to the screen of the electronic device can be perform simultaneously when block 9402 of removing the release liner from the overlay applicator.

In several embodiments, method 9400 optionally can include a block 9404 of smoothing out bubbles between the overlay layer and the screen of the electronic device. In many embodiments, a rigid or semi-rigid object can be used to rub the overlay layer or a protective layer on the overlay layer to work out any bubbles between the overlay layer and the screen of the electronic device.

In many embodiments, method 9400 optionally can include a block 9405 of removing a protective layer from the overlay layer. The protective layer can be similar or identical to protective film 120 (FIG. 1), protective film 420 (FIGS. 4-5), protective film 620 (FIG. 6), protective film 720 (FIG. 7), protective film 1520 (FIG. 15), protective film 2920 (FIGS. 29-30), protective film 3552 (FIG. 35), protective film 6052 (FIG. 60), protective film 8020 (FIG. 80), and/or protective film 9220 (FIG. 92). The protective layer can be part of the overlay applicator. In other embodiments, the overlay applicator does not include a protective layer. In some embodiments in which the protective layer is part of the overlay applicator, a second pull tab can be used to peel back the protective layer from the overlay layer. The second pull tab can be similar or identical to second pull tab 8022 (FIG. 80) and/or second pull tab 9122 (FIG. 91).

In a number of embodiments, method 9400 next can include a block 9406 of removing the electronic device from the device slot. In some embodiments, such as when the protective layer has been removed from the overlay layer, the electronic device can be removed from the device slot with the overlay layer adhered to the screen of the electronic device. In other embodiments, such as when a screen of the electronic device is facing downwards towards the device slot, the removal of the electronic device from the device slot can cause the protective layer to be removed from the overlay layer (thus performing block 9405 of removing the protective layer from the overlay layer), or can cause the electronic device to be removed with the protective layer still attached to the overlay layer, such that block 9404 of smoothing out bubbles between the overlay layer and the screen of the electronic device can be performed after performing block 9406 of removing the electronic device from the device slot.

Figure 97:
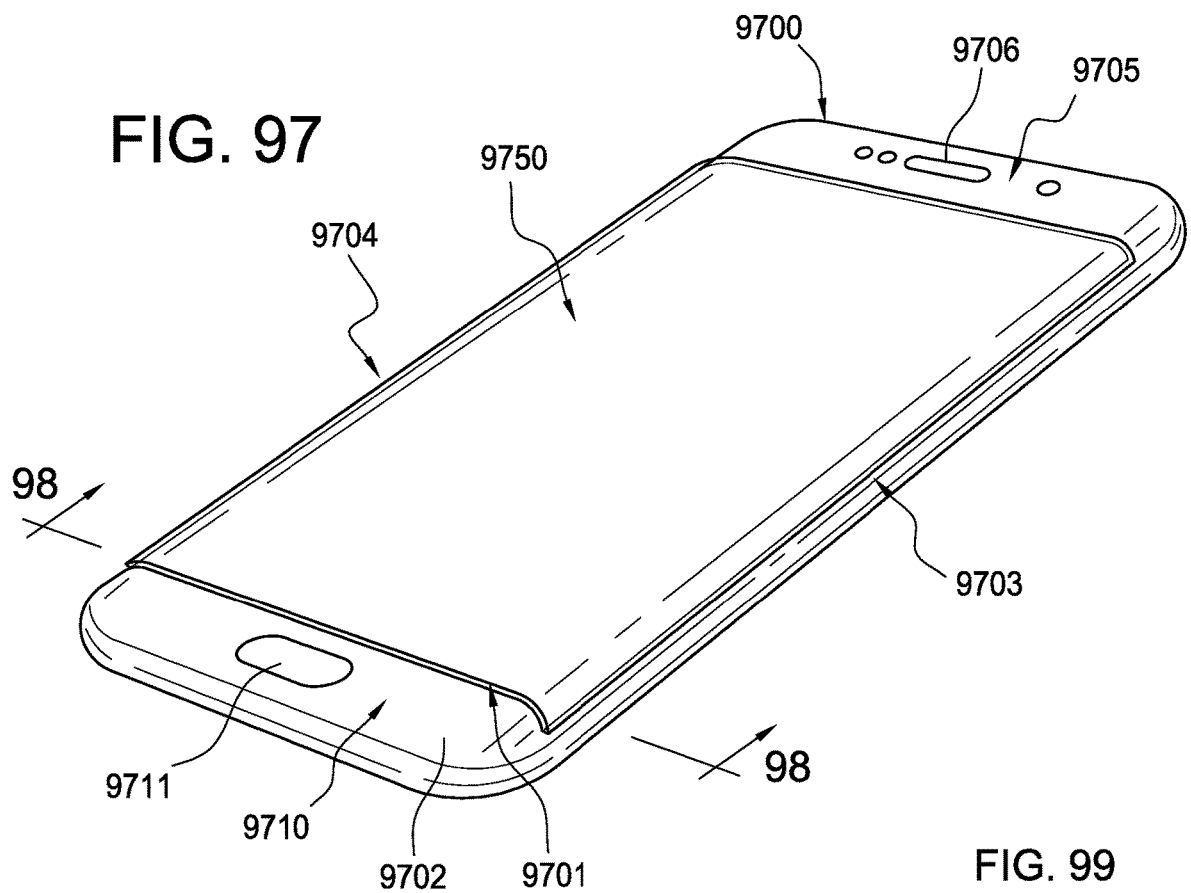
FIG. 97 illustrates a perspective view of an exemplary overlay attached to an electronic device, according to another embodiment.

Turning ahead in the drawings, FIG. 97 illustrates a perspective view of an exemplary overlay 9750 attached to an electronic device 9700, according to an embodiment. As an example, overlay 9750 can be made of glass, PET, or another suitable material. However, overlay 9750 is merely exemplary, and embodiments of the overlay are not limited to the embodiments presented herein. The overlay can be employed in many different embodiments or examples not specifically depicted or described herein. In several embodiments, overlay 9750 can be similar to overlay 130 (FIG. 1), overlay 430 (FIGS. 4-5), overlay 630 (FIG. 6), overlay 730 (FIG. 7), and/or overlay 1530 (FIG. 15), overlay 2930 (FIGS. 29-30), overlay 8230 (FIG. 82), and/or overlay 9230 (FIG. 92). In many embodiments, overlay 9750 can be applied to electronic device 9700 (e.g., to a touchscreen 9701 (FIG. 97) or electronic device 9700) using an overlay applicator. For example, the overlay applicator can be similar to overlay applicator 100 (FIG. 1), overlay applicator 400 (FIGS. 4-5), overlay applicator 600 (FIG. 6), overlay applicator 700 (FIG. 7), overlay applicator 1500 (FIG. 15), overlay applicator 3000 (FIG. 30), overlay applicator 3550 (FIGS. 35-36), overlay applicator 6050 (FIG. 60), overlay applicator 8001 (FIG. 80), and/or overlay applicator 9101 (FIG. 91). In some embodiments, overlay 9750 can be applied to electronic device 9700 using an overlay applicator tray. For example, the overlay applicator tray can be similar to overlay applicator tray 8000 (FIG. 80) and/or overlay applicator tray 9100 (FIG. 91).

Figure 98:
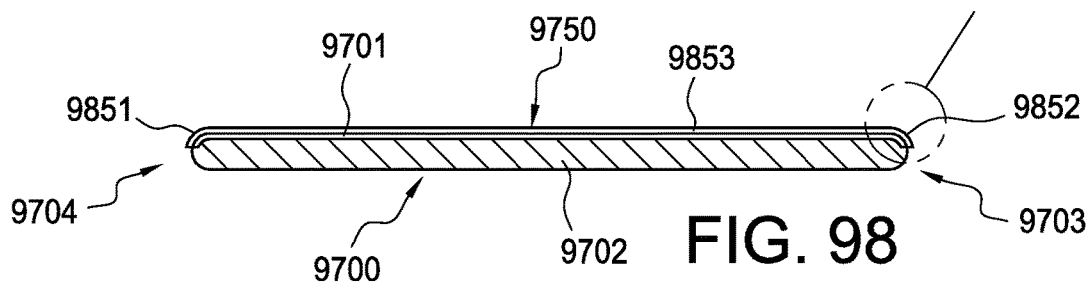
FIG. 98 illustrates a cross-sectional view of the electronic device of FIG. 98 along cross-section line 98-98 in FIG. 97, and the bottom edge of the touchscreen of FIG. 97 and the overlay of FIG. 97.
Figure 99:
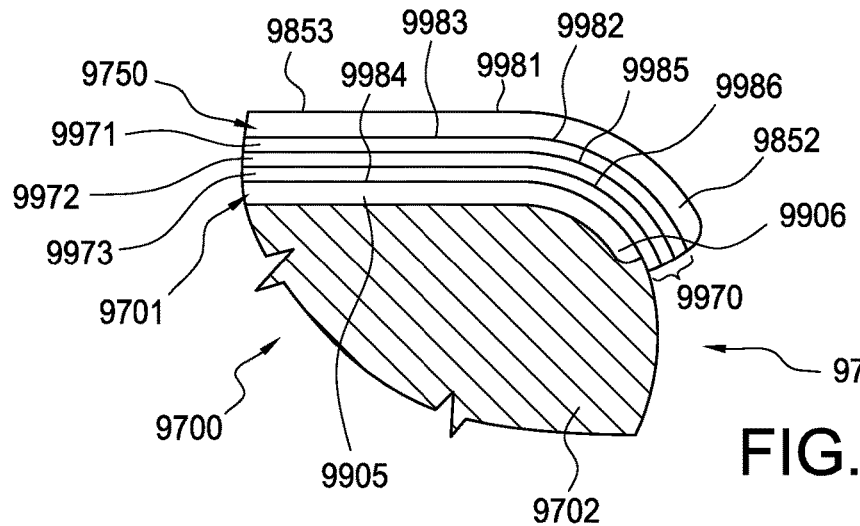
FIG. 99 illustrates an enlarged cross-sectional view of a portion of the electronic device of FIG. 97 along cross-section line 98-98 in FIG. 97, and a portion of the bottom edge of the touchscreen of FIG. 97 and the overlay of FIG. 97, as identified in FIG. 98.

In many embodiments, electronic device 9700 can be a portable and/or handheld electronic device, such as the Galaxy S6 Edge, Galaxy S7 Edge, and/or Galaxy S8 smartphones developed by Samsung of Seoul, South Korea. In other embodiments, the electronic device can be another suitable portable and/or handheld electronic device. In many embodiments, electronic device 9700 can include a touchscreen 9701 and a non-touchscreen portion 9702. Touchscreen 9701 can be a capacitive touchscreen or another suitable type of touchscreen. In several embodiments, non-touchscreen portion 9702 can surround touchscreen 9701 on one or more sides, such as on a top end 9705 and a bottom end 9710, and/or can be beneath touchscreen 9701, as shown in FIGS. 98-99 and described below. In many embodiments, the non-touchscreen portion 9702 can include buttons, such as button 9711, speakers, such as speaker 9706, and/or other elements, such as cameras, light sensors, etc. In many embodiments, overlay 9750 can cover both touchscreen 9701 and all or portions of non-touchscreen portion 9702, or overlay 9750 can cover only touchscreen 9701 and not cover non-touchscreen portion 9702.

In a number of embodiments, electronic device 9700 can include curved edges at a right side 9703 and/or left side 9704. In some embodiments, the curved edges can curve downward from, and/or decline below, the top plane of the face of electronic device 9700 at the sides (e.g., 9703, 9704) of electronic device 9700. In some embodiments, touchscreen 9701 can extend at least partially into the curved edges at right side 9703 and/or left side 9704. In several embodiments, overlay 9750 can include curves that correspond to the curved edges at right side 9703 and/or left side 9704 of electronic device 9700, as described below in further detail.

Proceeding to the next drawings, FIG. 98 illustrates a cross-sectional view of electronic device 9700 along cross-section line 98-98 in FIG. 97, and the bottom edge of touchscreen 9701 and overlay 9750. FIG. 99 illustrates an enlarged cross-sectional view of a portion of electronic device 9700 along cross-section line 98-98 in FIG. 97, and a portion of the bottom edge of touchscreen 9701 and overlay 9750, as identified in FIG. 98. In many embodiments, touchscreen 9701 can extend over non-touchscreen portion 9702 from right side 9703 to left side 9704 of electronic device 9700. In some embodiments, as shown in FIG. 99, touchscreen 9701 can include a flat portion 9905 and one or more curved portions, such as curved portion 9906 at right side 9703. In a number of embodiments, the curved portions (e.g. 9906) can curve downward from, and/or decline below, the plane of flat portion 9905 as touchscreen 9701 extends from flat portion 9905 to the side of the device (e.g., right side 9703).

In many embodiments, as shown in FIG. 98, overlay 9750 can include a flat overlay portion 9853 and/or curved overlay portions, such as curved overlay portions 9851 and 9852, which can correspond to the curved edges at left side 9704 and right side 9703, respectively, of electronic device 9700. In many embodiments, curved overlay portions 9851 and 9852 can curve downward from and/or decline below, the plane of flat overlay portion 9853 as overlay 9750 extends towards the sides (e.g., 9703, 9704) of electronic device 9700. In a number of embodiments, overlay 9750 can have an approximately uniform thickness, such that the thickness of overlay 9750 at flat overlay portion 9853 is approximately the same as the thickness of curved overlay portions 9851 and 9852. In several embodiments, overlay 9750 can have a top side 9981 and a bottom side 9982.

In a number of embodiments, overlay 9750 can be made of be glass, tempered glass, silica-infused plastic, polyethylene terephthalate (PET), or another suitable material, which can be optically clear and transmit through light from touchscreen 9701. In some embodiments, overlay 9750 can be rigid or semi-rigid, such that overlay 9750 can maintain the formed planar shape of flat overlay portion 9853 and maintains the formed curved shape of curved overlay portions 9851 and 9852. In other embodiments, overlay 9750 can be flexible, such that curved overlay portions 9851 and/or 9852 can be curved manually by the user and/or automatically by gravity to form their curved shape, such as when overlay 9750 is adhered to electronic device 9750.

In many embodiments, overlay 9750 can be attached and/or adhered to electronic device 9700 with one or more layers of adhesive and/or adhesive carrier. For example, such as shown in FIG. 99, overlay 9750 can be attached and/or adhered to electronic device 9700 using an adhesive component 9970. In a number of embodiments, adhesive component 9970 can include a top side 9983 and a bottom side 9984. In several embodiments, adhesive component 9970 can include an adhesive carrier 9972, a first adhesive layer 9971, and/or a second adhesive layer 9973. In many embodiments, adhesive carrier can have a top side 9985 and a bottom side 9986. In some embodiments, first adhesive layer 9971 can be at top side 9985 of adhesive carrier 9972, and/or second adhesive layer 9973 can be at bottom side 9986 of adhesive carrier 9972. FIGS. 98 and 99 do not necessarily show the proportional thicknesses of overlay 9750, device 9700, and/or adhesive component 9970. For example, in some embodiments, adhesive component 9970 can be the thinnest component of overlay 9750, device 9700, and adhesive component 9970. In these embodiments, overlay 9750 can have a thickness of approximately 0.1 mm to approximately 1.0 mm, and adhesive component 9970 can have a thickness of approximately 0.02 mm to approximately 0.3 mm.

In many embodiments, first adhesive layer 9971 can be configured to attach and/or adhere top side 9985 of adhesive carrier 9972 to bottom side 9981 of overlay 9750. In several embodiments, second adhesive layer 9973 can be configured to attach and/or adhere bottom side 9986 of adhesive carrier 9972 to touchscreen 9701 of electronic device 9700. In a number of embodiments, adhesive carrier 9972 can be an optically clear carrier layer, and can be a thin sheet of PET (polyethylene terephthalate) or other suitable material. For example, in some embodiments, adhesive carrier 9972 can have a thickness of approximately 0.02 millimeters (mm) to approximately 0.2 mm.

In many embodiments, first adhesive layer 9971 and/or second adhesive layer 9973 can be an optically clear adhesive, an adhesive silicone, or another suitable adhesive. In several embodiments, layers 9971-9973 can provide a single-use adhesive of the overlay. For example, in some embodiments, an adhesive strength of second adhesive layer 9973 can be greater than an adhesive strength of first adhesive layer 9971, such that once overlay 9750 is applied to electronic device 9700, layers 9971-9973 can remain on electronic device 9700 if overlay 9750 is removed and/or peeled away from electronic device 9700. In a number of embodiments, after overlay 9750 is removed from electronic device 9700 and layers 9971-9973 are left on electronic device, layers 9971-9973 can be peeled away from electronic device 9900. In several embodiments, removing layers 9971-9973 from electronic device 9700 when peeling away overlay 9750 can beneficially allow for a single-use application of overlay 9750 and layers 9971-9973 without permitting reattachment of the same one of overlay 9750 to electronic device 9700.

In other embodiments, the adhesive strength of first adhesive layer 9971 can be greater than the adhesive strength of second adhesive layer 9973, such that when overlay 9750 is peeled away from electronic device 9700, layers 9971-9973 are removed with overlay 9750, which can allow reattachment of overlay 9750 to electronic device 9700. In each of the embodiments presented in this paragraph, all of layers 9971-9973 can remain on electronic device 9700 or can be removed from electronic device 9700 when removing overlay 9750 from electronic device 9700, or only portions of one or more of layers 9971-9973 can remain on electronic device 9700 or can be removed from electronic device 9700 when removing overlay 9750 from electronic device. In these embodiments, layers 9971-9973 can be designed to make overlay 9750 and layers 9971-9973 a single-use component.

In several embodiments, overlay 9750 can be provided as part of an overlay applicator, as described above, which can facilitate applying overlay 9750 to electronic device 9700. For example, in many embodiments, the overlay applicator can include overlay 9750, layers 9971-9973, an adhesive release liner, and/or other elements or constructions, such as described above. In several embodiments, the adhesive release liner can be similar to adhesive release liner 140 (FIG. 1), adhesive release liner 440 (FIGS. 4-5), adhesive release liner 640 (FIG. 6), adhesive release liner 740 (FIG. 7), adhesive release liner 1540 (FIG. 15), adhesive release liner 2740 (FIGS. 27-30), adhesive release liner 8240 (FIG. 82), and/or adhesive release liner 9240 (FIG. 92). In many embodiments, the adhesive release liner can cover the adhesive and protect it from contaminants until it is ready to be exposed and applied to electronic device 9700. For example, the adhesive release liner can be adhered to second adhesive layer 9973 to cover layers 9971-9973. For embodiments in which the adhesive strength of second adhesive layer 9973 is stronger than the adhesive strength of first adhesive layer 9971, the adhesive release liner can be made of a suitable non-stick material, or treated with a suitable non-stick coating, such that the adhesive release liner can be peeled off from second adhesive layer 9973 without removing first adhesive layer 9971 from overlay 9750. By removing the adhesive release liner and exposing second adhesive layer 9973 in a manner in which layers 9971-9973 remain adhered to overlay 9750, overlay 9750 can be adhered to electronic device 9700 using layers 9971-9973, as shown in FIG. 99.

In many embodiments, overlay 9750 can have dimensions coterminous with touchscreen 9701. In other embodiments, overlay 9750 can extend beyond one or more of the curved sides (e.g., curved portion 9906) of touchscreen 9701 to adhere in part to non-touchscreen portion 9702, as shown in FIG. 99. In many embodiments, adhesive component 9970 can have dimensions coterminous with overlay 9750, such that layers adhesive component 9970 attach overlay 9750 to electronic device 9700 both at flat overlay portion 9853 and at curved overlay portions 9851 and 9852. In a number of embodiments, adhesive carrier 9972 can be flexible to conform to the shape of overlay 9750, such as at flat overlay portion 9853 and at curved overlay portions 9851 and 9852. In certain other embodiments, adhesive component 9970 can have dimensions that extend only to the sides of flat overlay portion 9853, and not extend along the curved overlay portions (e.g., 9851, 9852). In each of the embodiments presented in this paragraph, first adhesive layer 9971 and second adhesive layer 9973 can be configured to avoid having any air pockets between overlay 9750 and touchscreen 9701 across all of flat overlay portion 9853 and/or along the curved overlay portions (e.g., 9851, 9852). In the "certain other embodiments" presented in this paragraph, one or more air gaps or other material can be located between overlay 9750 and electronic device 9700 at curved overlay portions 9851 and/or 9852.

In a different embodiment, second adhesive layer 9973 is eliminated such that adhesive carrier 9972 directly contacts electronic device 9700. In this embodiment, particularly when overlay 9750 is made of glass and touchscreen 9701 also is made of glass, overlay 9750, first adhesive layer 9971, and second adhesive layer 9973 can be part of a protective case for electronic device 9700 such that the case keeps adhesive carrier 9972 (which is not adhesive on bottom side 9986 in this embodiment) in physical contact against touchscreen 9701.

Returning to FIG. 97, although overlay 9750 is shown in FIG. 97 as not extending onto top end 9705 or bottom end 9710, various embodiments of the overlay (e.g., 9750) and/or the adhesive component (e.g., 9970 (FIG. 99)) can be shaped to cover all or portions of top end 9705 or bottom end 9710. In some embodiments, the overlay (e.g., 9750) and/or the adhesive component (e.g., 9970 (FIG. 99)) can include cut-outs for the buttons, such as button 9711, speakers, such as speaker 9706, and/or other elements, such as cameras, light sensors, etc.

Figure 100:
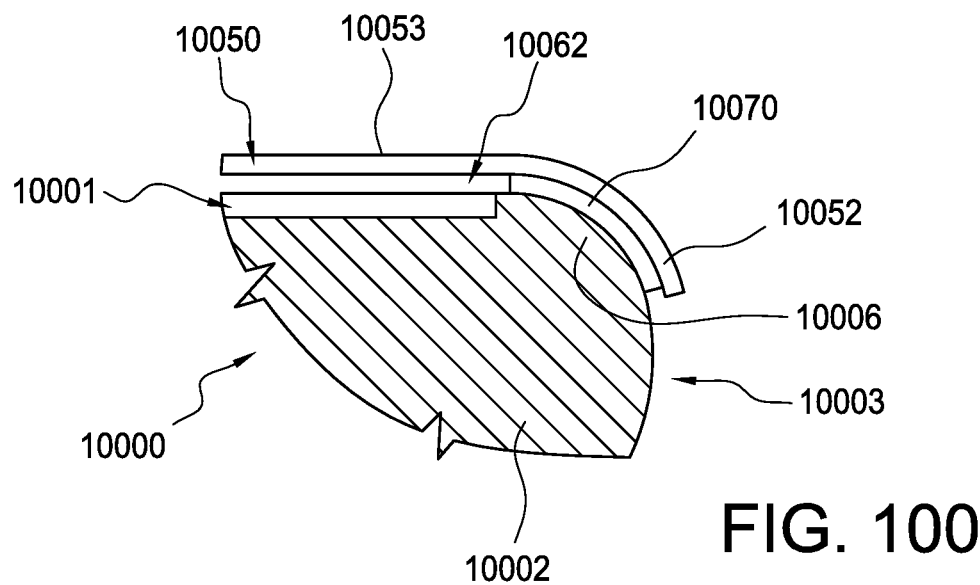
FIG. 100 illustrates an enlarged cross-sectional view of an electronic device, and the bottom edge of a touchscreen of the electronic device, and an overlay, according to another embodiment.

Turning ahead in the drawings, FIG. 100 illustrates an enlarged cross-sectional view of an electronic device 10000, and the bottom edge of a touchscreen 10001 of electronic device 10000, and an overlay 10050. The cross-sectional view can be similar to the cross-sectional view in FIG. 99, and can correspond to a cross-section line similar to cross-section line 98-98 in FIG. 97, and the enlarged portion of electronic device 10000 can be similar to the enlarged portion of electronic device 9700 identified in FIG. 98. Overlay 10050 is merely exemplary, and embodiments of the overlay are not limited to the embodiments presented herein. The overlay can be employed in many different embodiments or examples not specifically depicted or described herein. Electronic device 10000 can be similar to electronic device 9700 (FIGS. 97-99), and touchscreen 10001 can be similar to touchscreen 9701 (FIGS. 97-99), but touchscreen 10001 of electronic device 10000 can be flat (e.g., similar to flat portion 9905 of touchscreen 9701) without curved portions (e.g., without curved portions such as curved portions 9906).

In many embodiments, electronic device 10000 can include a non-touchscreen portion 10002, which can be similar to non-touchscreen portion 9702 (FIGS. 97-99), but which can surround touchscreen 10001 on four sides. In several embodiments, non-touchscreen portion 10002 of electronic device 10000 can include declining portions, such as a declining portion 10006 at a curved edge at a right side 10003 of electronic device 10000, at one or more sides of electronic device 10000. In some embodiments, the declining portions (e.g., 10006) can curve downward from, and/or decline below, the plane of the face (e.g., the plane of touchscreen 10001) of electronic device 10000 at the sides (e.g., 10003) of electronic device 10000.

Overlay 10050 can be similar to overlay 9750 (FIGS. 97-99), and elements or constructions of overlay 10050 can be similar or identical to various elements or constructions of overlay 9750 (FIGS. 97-99). For example, overlay 10050 can include a flat overlay portion 10053 and/or curved overlay portions, such as curved overlay portion 10052. In many embodiments, the curved overlay portions (e.g., 10052) can curve downward from and/or decline below, the plane of flat overlay portion 10053 as overlay 10050 extends towards the sides (e.g., 10003) of electronic device 10000.

In many embodiments, overlay 10050 can be adhered to electronic device 10000 using an adhesive component 10070. In some embodiments, adhesive component 10070 can be a single adhesive layer. In other embodiments, adhesive component 10070 can include an adhesive carrier, such as adhesive carrier 9972 (FIG. 97), with adhesive layers on each side, such as first adhesive layer 9971 (FIG. 97) and second adhesive layer 9973 (FIG. 97). In yet other embodiments, the adhesive carrier can be a spacer that spaces overlay 10050 at a predetermined distance away from electronic device 10000, creating an air gap 10062. In some embodiments, the spacer of adhesive component 10070 can space overlay 10050 at a distance near but, not in contact with, touchscreen 10001, which can be a distance of approximately 0.05 mm to approximately 0.5 mm, as examples. In a number of embodiments, the distance can be sufficiently small to transfer a capacitive value to touchscreen 10001 through overlay 10050 and across air gap 10062 when overlay 10050 is touched.

In several embodiments, adhesive component 10070 can be attached to electronic device 10000 on curved portions and/or declining portions (e.g., 10006) of electronic device 10000. In many embodiments, adhesive component 10070 can be curved to conform to declining portion 10006 and/or curved overlay portion 10052, as shown in FIG. 100. In a number of embodiments, adhesive component 10070 can be attached to electronic device 10000 at non-touchscreen portion 10002, such as on two or more sides surrounding touchscreen 10001. In many embodiments, adhesive component 10070 is not attached to touchscreen 10001. In other embodiments, an adhesive component, such as adhesive component 10070, can be attached on a curved portion of a touchscreen, such as curved portion 9906 (FIG. 99) of touchscreen 9701 (FIGS. 97-99). In many embodiments, adhesive component 10070 can be transparent. For example, the adhesive, adhesive carrier, and/or spacer in the adhesive component (e.g., 10070) can be optically clear and transmit through the light and/or display from the touchscreen (e.g., 10001). In other embodiments, adhesive component 10070 can be non-transparent.

In a different embodiment, air gap 10062 can be filled with a non-adhesive material. For example, air gap 10062 can be replaced with a transparent PET layer that is not adhesive. In the same or different embodiment, adhesive component 10070 can be similar or identical to adhesive component 9970 (FIG. 99), first adhesive layer 9971 (FIG. 99), and/or second adhesive layer 9973 (FIG. 99) while still maintaining air gap 10062.

Figure 101:
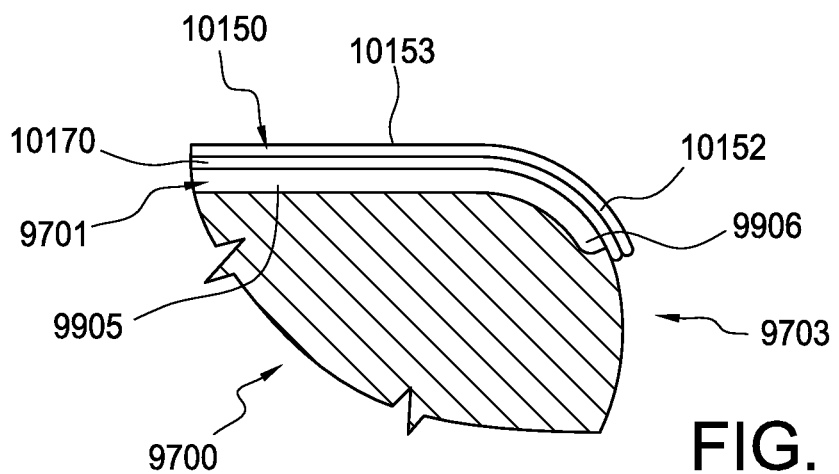
FIG. 101 illustrates a cross-sectional view of the electronic device of FIG. 97 along cross-section line 98-98 in FIG. 97, and a portion of the bottom edge of the touchscreen of FIG. 97, as identified in FIG. 98, and an overlay, according to another embodiment.

Proceeding to the next drawing, FIG. 101 illustrates a cross-sectional view of electronic device 9700 along cross-section line 98-98 in FIG. 97, and a portion of the bottom edge of touchscreen 9701, as identified in FIG. 98, and an overlay 10150. Overlay 10150 is merely exemplary, and embodiments of the overlay are not limited to the embodiments presented herein. The overlay can be employed in many different embodiments or examples not specifically depicted or described herein. Overlay 10150 can be similar to overlay 9750 (FIGS. 97-99) and/or overlay 10050 (FIG. 100), and elements or constructions of overlay 10150 can be similar or identical to various elements or constructions of overlay 9750 (FIGS. 97-99) and/or overlay 10050 (FIG.

100). For example, overlay 10150 can include a flat overlay portion 10153 and/or curved overlay portions, such as curved overlay portion 10152. In many embodiments, the curved overlay portions (e.g., 10152) can curve downward from and/or decline below, the plane of flat overlay portion 10153 as overlay 10150 extends towards the sides (e.g., 9703) of electronic device 9700.

In many embodiments, overlay 10150 can be attached to electronic device 9700 using an adhesive component 10170. Adhesive component 10170 can be similar or identical to adhesive component 9970 (FIG. 99), first adhesive layer 9971 (FIG. 99), and/or second adhesive layer 9973 (FIG. 99). In several embodiments, adhesive component 10170 can be a single layer of adhesive that can attach overlay 10150 to electronic device 9700, such that overlay 10150 is adhered to electronic device 9700 (i.e., touchscreen 9701 only, or both touchscreen 9701 and one or more other portions (e.g., non-touchscreen portion 9702 (FIGS. 97-99) of electronic device 9700)) with a single layer of adhesive without an adhesive carrier, such as adhesive carrier 9972 (FIG. 99). In many embodiments, adhesive component 10170 on overlay 10150 can be covered by an adhesive release liner, as described above, which can be peeled off to expose adhesive component 10170 and allow overlay 10150 to be attached to electronic device 9700.

Figure 104:
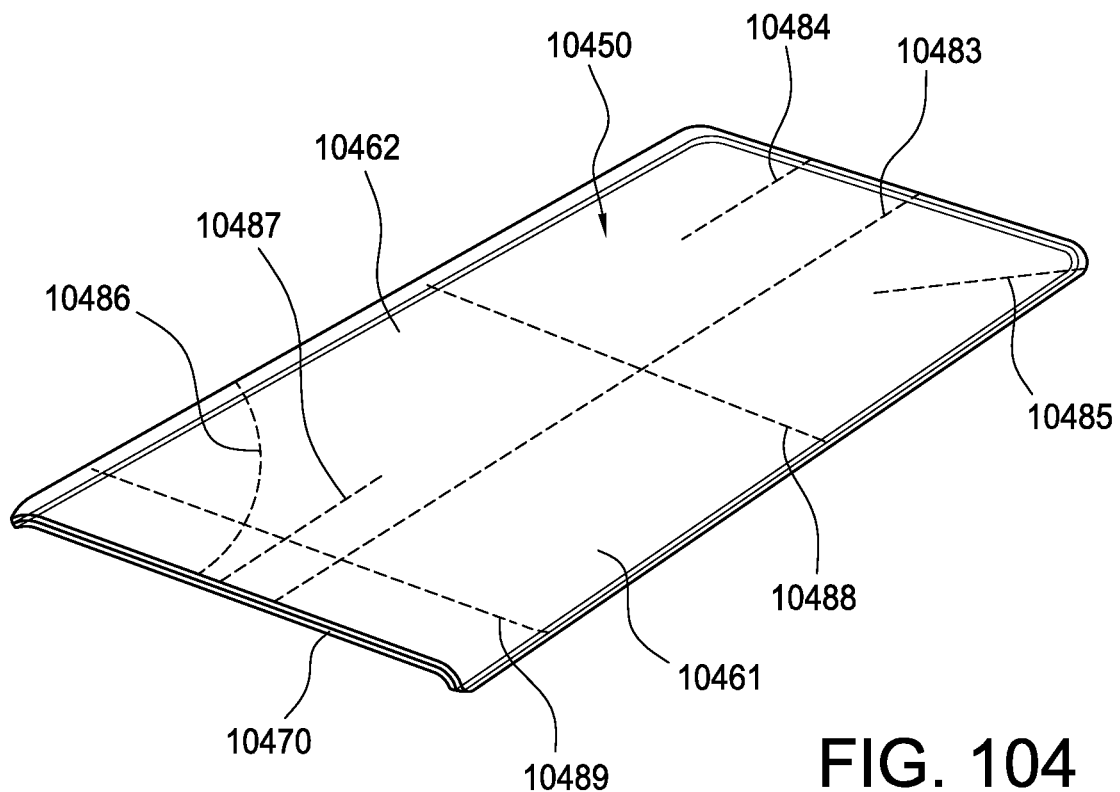
FIG. 104 illustrates a perspective view of an overlay and an adhesive component, according to another embodiment.

In some embodiments, overlay 10150 the adhesive strength of adhesive component 10170 can be sufficiently strong such that the overlay breaks, fractures, and/or tears when the overlay is removed from electronic device 9750, although overlay 10150 is devoid of being manufactured to create vulnerabilities, such as vulnerabilities 10483-10489 (FIG. 104, described below). In other embodiments, overlay 10150 and/or adhesive component 10170 can be removed from electronic device 9750 without damaging overlay 10150.

Figure 102:
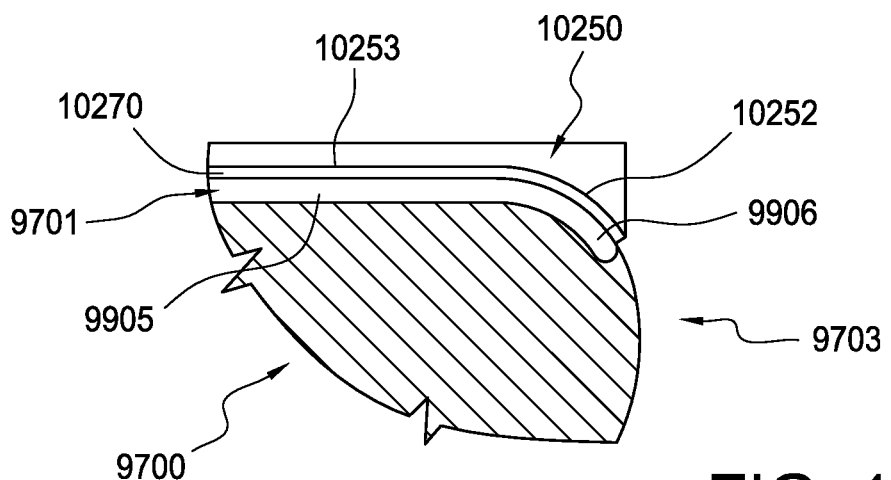
FIG. 102 illustrates a cross-sectional view of the electronic device of FIG. 97 along cross-section line 98-98 in FIG. 97, and a portion of the bottom edge of the touchscreen of FIG. 97, as identified in FIG. 98, and an overlay, according to another embodiment.

Proceeding to the next drawing, FIG. 102 illustrates a cross-sectional view of electronic device 9700 along cross-section line 98-98 in FIG. 97, and a portion of the bottom edge of touchscreen 9701, as identified in FIG. 98, and an overlay 10250. Overlay 10250 is merely exemplary, and embodiments of the overlay are not limited to the embodiments presented herein. The overlay can be employed in many different embodiments or examples not specifically depicted or described herein. Overlay 10250 can be similar to overlay 9750 (FIGS. 97-99), overlay 10050 (FIG. 100), and/or overlay 10150 (FIG. 101), and elements or constructions of overlay 10250 can be similar or identical to various elements or constructions of overlay 9750 (FIGS. 97-99), overlay 10050 (FIG. 100), and/or overlay 10150 (FIG. 101). In many embodiments, overlay 10250 can be flat across the top of overlay 10250 from side to side, and the bottom of overlay 10250 can include a flat overlay bottom portion 10253 and one or more curved overlay bottom portions, such as curved overlay bottom portion 10252. As shown in FIG. 102, a thickness of overlay 10250 can be greater at the sides around curved overlay bottom portion 10252 than in the middle portion of overlay 10250 around flat overlay bottom portion 10253.

In many embodiments, overlay 10250 can be attached to electronic device 9700 using an adhesive component 10270. Adhesive component 10270 can be similar or identical to adhesive component 9970 (FIG. 99), first adhesive layer 351 (FIG. 3), second adhesive layer 353 (FIG. 3), and/or adhesive component 10170 (FIG. 101). In several embodiments, adhesive component 10270 can be a single layer of adhesive that can attach overlay 10250 to electronic device 9700, such that overlay 10250 is adhered to electronic device 9700 (i.e., touchscreen 9701 only, or both touchscreen 9701 and one or more other portions (e.g., non-touchscreen portion 9702 (FIGS. 97-99) of electronic device 9700)) with a single layer of adhesive without an adhesive carrier, such as adhesive carrier 9972 (FIG. 99). In other embodiments, adhesive component 10270 can optionally include an adhesive carrier, such as adhesive carrier 9972 (FIG. 99), as well as adhesive layers on each side, such as first adhesive layer 9971 (FIG. 99) and second adhesive layer 9973 (FIG. 99). In many embodiments, adhesive component 10270 on overlay 10250 can be covered by an adhesive release liner, as described above, which can be peeled off to expose adhesive component 10270 and allow overlay 10250 to be attached to electronic device 9700.

Figure 103:
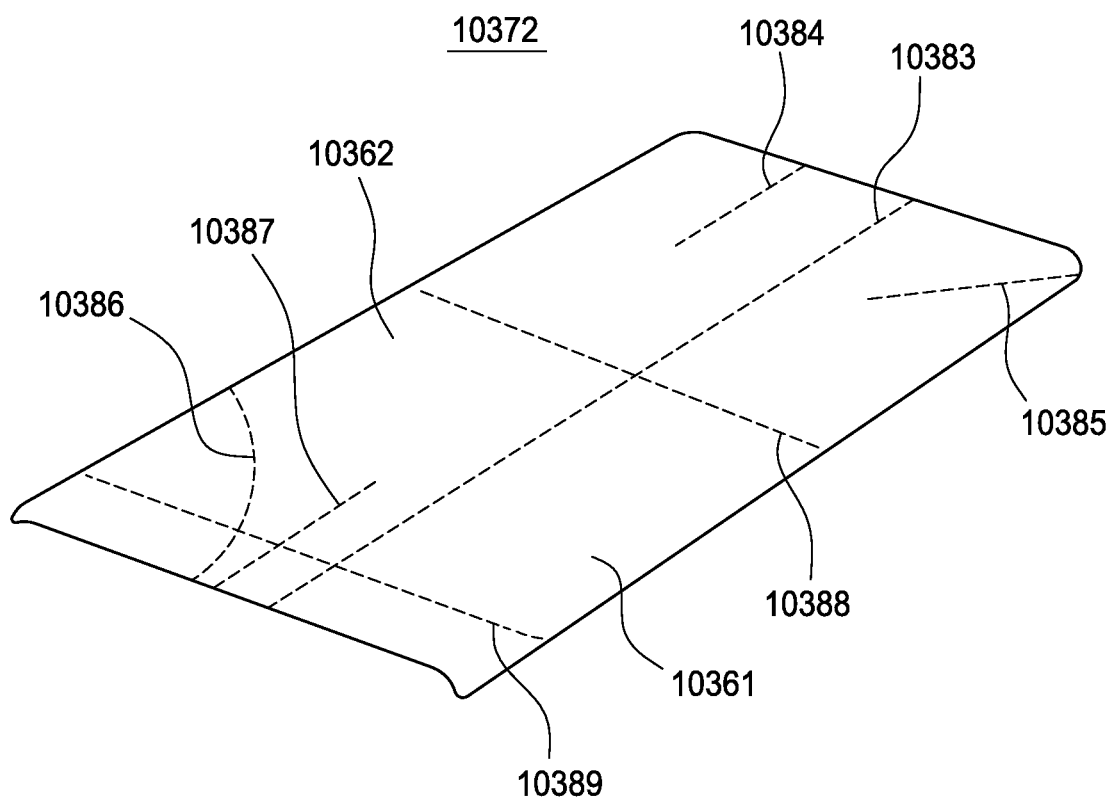
FIG. 103 illustrates a perspective view of an adhesive carrier, according to another embodiment.

Turning ahead in the drawings, FIG. 103 illustrates a perspective view of an adhesive carrier 10372. Adhesive carrier 10372 is merely exemplary, and embodiments of the adhesive carrier are not limited to the embodiments presented herein. The adhesive carrier can be employed in many different embodiments or examples not specifically depicted or described herein. Adhesive carrier 10372 can be similar to adhesive carrier 9972 (FIG. 99), and elements or constructions or adhesive carrier 10372 can be similar or identical to various elements or constructions of adhesive carrier 9972 (FIG. 99). In many embodiments, adhesive carrier 10372 can be a transparent PET layer or other suitable material. In several embodiments, adhesive carrier 10372 can include one or more perforations, such as perforations 10383-10389.

In a number of embodiments, the perforations (e.g., 10383-10389) can include a series of microscopic holes along a line or other path that generally are not visible to the unaided eye. In a number of embodiments, the holes can be sufficiently small to not distort a noticeable amount of the light optically transmitted through adhesive carrier 10372. For example, the holes can each be less than approximately 0.1 mm in diameter. In some embodiments, for example, the holes can be approximately 0.001 mm to 0.09 mm in diameter. In a number of embodiments, the holes can each extend through the thickness of adhesive carrier 10372. In other embodiments, the holes can extend partially through the thickness of adhesive carrier 10372, such as in a top portion and/or a bottom portion of adhesive carrier 10372, but not extend fully through the thickness of adhesive carrier 10372.

In many embodiments, adhesive carrier 10372 can be used with adhesive layers on each side, similarly to layers 9971-9973 in FIG. 99, to attach an overlay (e.g., 9750 (FIGS. 97-99), 10050 (FIG. 100), 10150 (FIG. 101), 10250 (FIG. 102)) to an electronic device (e.g., 9700 (FIGS. 97-99), 10000 (FIG. 100)). The one or more of the perforations (e.g., 10383-10389) can provide structural vulnerabilities in adhesive carrier 10372, such that adhesive carrier 10372 can tear at one or more of the perforations (e.g., 10383-10389) when the overlay is removed from the electronic device. In many embodiments, one or more of the adhesive layers can have a sufficient adhesive strength in certain portions of the adhesive layers such that lifting and/or peeling off the overlay from the electronic device can result in a tear in adhesive carrier 10372 along a perforation (e.g., 10383-10389). The perforation(s) can assist in making adhesive carrier 10372 a single-use item.

In several embodiments, the perforations (e.g., 10383-10389) can extend partially or fully across a portion of adhesive carrier 10372. For example, perforation 10383 can extend fully across adhesive carrier 10372 from one end to the other end. As other examples, perforations 10388 and 10389 can extend fully across adhesive carrier 10372 from one side to the other side. When the overlay is peeled away from the electronic device, adhesive carrier 10372 can tear along the perforations fully across adhesive carrier 10372. For example, adhesive carrier 10372 includes perforation 10383, which invisibly divides adhesive carrier 10372 into a first side 10361 and a second side 10362. In many embodiments, first side 10361 can include a stronger adhesive on the top adhesive layer than on the bottom adhesive layer, and second side 10362 can include a stronger adhesive on the bottom adhesive layer than the top adhesive layer. When the overlay is peeled away from the electronic device, adhesive carrier 10372 can be more strongly adhered to the overlay on first side 10361 and more strongly adhered to the electronic device on second side 10362, such that peeling across perforation 10383 results in a tear along perforation 10383.

As further examples, perforations 10384, 10385, and 10387 can extend partially across adhesive carrier 10372. When the overlay is peeled away from the electronic device, adhesive carrier 10372 can start tearing along the partial perforations (e.g., 10384, 10385, 10387) and, in many embodiments, can continue tearing beyond the end of the perforation as the overlay is peeled away from the electronic device.

As yet another example, perforation 10386 can have a non-linear shape, such as a curved shape shown in FIG. 103, and can extend from a first side to an adjacent side. When the overlay is peeled away from the electronic device, adhesive carrier 10372 can tear along the curved perforation (e.g., 10386).

In a number of embodiments, each hole in the series of holes can be spaced apart sufficiently close to facilitate tearing adhesive carrier 10372 when the overlay is peeled away from the electronic device. For example, adjacent holes can be spaced approximately 0.005 mm to approximately 0.2 mm apart from each other, depending on the size of the holes and the strength of the adhesive layers.

Turning ahead in the drawings, FIG. 104 illustrates a perspective view of an overlay 10450 and an adhesive component 10470. Overlay 10450 and adhesive component 10470 are merely exemplary, and embodiments of the overlay and adhesive component are not limited to the embodiments presented herein. The overlay and adhesive component can be employed in many different embodiments or examples not specifically depicted or described herein. Overlay 10450 can be similar to overlay (e.g., 9750 (FIGS. 97-99), 10050 (FIG. 100), 10150 (FIG. 101), 10250 (FIG. 102)), and elements or constructions of overlay 10450 can be similar or identical to various elements or constructions of overlay (e.g., 9750 (FIGS. 97-99), 10050 (FIG. 100), 10150 (FIG. 101), 10250 (FIG. 102)). Adhesive component 10470 can be similar to adhesive component 9970 (FIG. 99), adhesive component 10170 (FIG. 101), adhesive component 10270 (FIG. 102), and/or adhesive carrier 10372 (FIG. 103), and elements or constructions or adhesive component 10270 can be similar or identical to various elements or constructions of adhesive component 9970 (FIG. 99), adhesive component 10170 (FIG. 101), adhesive component 10270 (FIG. 102), and/or adhesive carrier 10372 (FIG. 103).

In many embodiments, overlay 10450 can include one or more vulnerabilities, such as vulnerabilities 10483-10489. Vulnerabilities 10483-10489 can be similar or identical to perforations 10383-10389 (FIG. 103). In several embodiments, vulnerabilities 10483-10839 can be configured such that overlay 10450 breaks when peeled away or removed from the electronic device (e.g., 9700 (FIGS. 97-99), 10000 (FIG. 100)). In some overlay embodiments, such as glass overlays, vulnerabilities 10483-10489 can be nicks, perforations, or other vulnerabilities to fracture. In many embodiments, the overlay can be used with a single adhesive layer (e.g., adhesive component 10170 (FIG. 101), adhesive component 10270 (FIG. 102)). In other embodiments, the overlay can be used with an adhesive carrier (e.g., 9972 (FIG. 99), 10372).

In a number of embodiments, the perforations (e.g., 10383-10389), nicks, or vulnerabilities in the adhesive carrier (e.g., 10372) and/or overlay can advantageously allow for single use of the overlay, and destruction of adhesive component e.g., 10470 and/or overlay 10350 upon removal to prevent reattachment of the overlay and adhesive component 10470 to the electronic device. Although adhesive carrier 10372 (FIG. 103), adhesive component 10470, and overlay 10750 are shown as rounded at the sides, similar to adhesive carrier 9972 (FIG. 99), adhesive component 9970 (FIG. 99), and overlay 9750 (FIGS. 97-99) respectively, various embodiments of adhesive carrier 10372 (FIG. 103), adhesive component 10470, and overlay 10750 can be flat. For example, adhesive carrier 10372 (FIG. 103), adhesive component 10470, and overlay 10750 can be flat and can be attached to a flat touchscreen without curved portions, such as touchscreen 10001 (FIG. 100) of electronic device 10000 (FIG. 100).

In several embodiments, the vulnerabilities (e.g., 10483-10489) can extend partially or fully across a portion of overlay 10450. For example, when overlay 10450 is peeled away and/or removed from the electronic device, overlay 10450 can tear along the vulnerabilities. For example, overlay 10450 includes vulnerability 10483, which invisibly divides overlay 10450 into a first side 10461 and a second side 10462. When overlay 10450 is peeled away from the electronic device, overlay 10450 can break along vulnerability 10483.

In many embodiments, the overlay (e.g., overlay (e.g., 9750 (FIGS. 97-99), 10050 (FIG. 100), 10150 (FIG. 101), 10250 (FIG. 102), and/or overlay 10450 (FIG. 104)), and/or the adhesive component (e.g., adhesive component 9970 (FIG. 99), adhesive component 10170 (FIG. 101), adhesive component 10270 (FIG. 102), adhesive carrier 10372 (FIG. 103), and/or adhesive component 10470) can be configured for single-use application of the overlay, such that when the overlay is removed from the electronic device, at least a portion of the adhesive component is detached from at least a portion of the overlay. For example, if overlay 9750 (FIGS. 97-99) is removed from electronic device 9700 (FIGS. 97-99), at least a portion of adhesive component 9970 (FIG. 99) remain adhered to electronic device 9700 (FIGS. 97-99) and become separated from overlay 9750 (FIGS. 97-99), such as when the adhesive strength of second adhesive layer 9973 (FIG. 99) is stronger than the adhesive strength of first adhesive layer 9971 (FIG. 99). As another example, if overlay 10150 (FIG. 101) is removed from electronic device 9700 (FIG. 101), overlay 10150 (FIG. 101) can break, resulting in at least a portion of adhesive component 10170 (FIG. 101) becoming separated from overlay 10150 (FIG. 101). As yet another example, if an overlay (e.g., overlay (e.g., 9750 (FIGS. 97-99), 10050 (FIG. 100), 10150 (FIG. 101), 10250 (FIG. 102), and/or 10450 (FIG. 104)) is used with adhesive carrier 10372 (FIG. 103), adhesive carrier 10372 can tear, such as along one or more of perforations 10383-10389 (FIG. 103), when the overlay is removed from the electronic device, which can result in at least a portion of adhesive carrier 10372 being detached from the overlay. As a further example, if overlay 10450 (FIG. 104) and adhesive component 10470 (FIG. 104) are attached to an electronic device, then removed, overlay 10450 (FIG. 104) can break, such as along one or more of vulnerabilities 10483-10489 (FIG. 104), when overlay 10450 (FIG. 104) is removed from the electronic device, which can result in at least a portion of adhesive component 10470 (FIG. 104) being detached from overlay 10450 (FIG. 104).

In many embodiments, the overlay (e.g., overlay (e.g., 9750 (FIGS. 97-99), 10050 (FIG. 100), 10150 (FIG. 101), 10250 (FIG. 102), and/or 10450 (FIG. 104)), and/or the adhesive component (e.g., adhesive component 9970 (FIG. 99), adhesive component 10170 (FIG. 101), adhesive component 10270 (FIG. 102), adhesive carrier 10372 (FIG. 103), and/or adhesive component 10470) can be configured such that the overlay and/or the adhesive component cannot be re-adhered to the electronic device using the adhesive component after the single-use application of the overlay and after removal of the overlay from the screen of the device. For example, the overlay and/or the adhesive component can be damaged and/or destroyed, such that the overlay and/or the adhesive component cannot be re-adhered in the same way as the initial adhesion of the overlay to the electronic device in the single-use application of the overlay. In several embodiments, the overlay and/or the adhesive component can be configured such that re-adhesion of the overlay to the electronic device using the adhesive component after the single-use application of the overlay and after removal of the overlay from the electronic device can produce a distortion of at least a portion of a display of the screen (e.g., touchscreen 9701 (FIG. 97)) of the electronic device (e.g., 9700 (FIG. 97)) that is seen through the overlay and the adhesive component.

Figure 105:
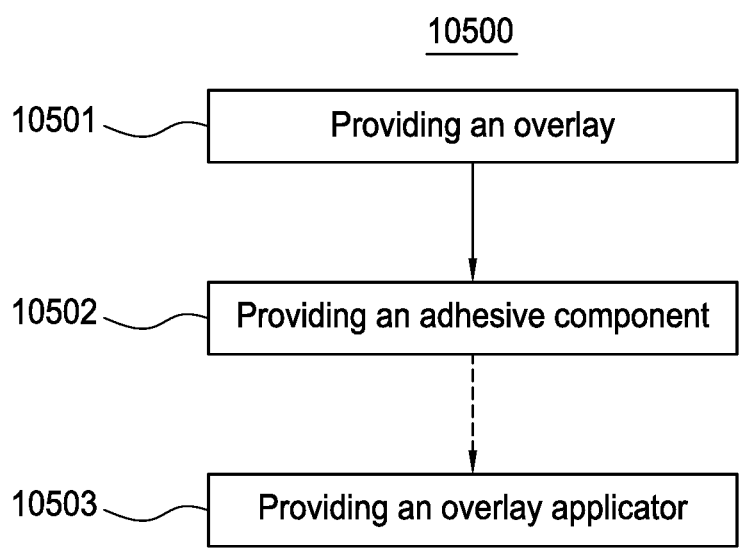
FIG. 105 illustrates a flow chart for an embodiment of a method, according to another embodiment.

Turning ahead in the drawings, FIG. 105 illustrates a flow chart for an embodiment of a method 10500, according to another embodiment. Method 10500 is merely exemplary and is not limited to the embodiments presented herein. Method 10500 can be employed in many different embodiments or examples not specifically depicted or described herein. In some embodiments, the procedures, the processes, and/or the activities of method 10500 can be performed in the order presented. In other embodiments, the procedures, the processes, and/or the activities of the method 10500 can be performed in any other suitable order. In still other embodiments, one or more of the procedures, the processes, and/or the activities in method 10500 can be combined or skipped.

Referring to FIG. 105, method 10500 can include a block 10501 of providing an overlay. The overlay can be similar or identical to overlay 130 (FIG. 1), overlay 430 (FIGS. 4-5), overlay 630 (FIG. 6), overlay 730 (FIG. 7), and/or overlay 1530 (FIG. 15), overlay 2930 (FIGS. 29-30), overlay 8230 (FIG. 82), overlay 9230 (FIG. 92), overlay 9750 (FIGS. 97-99), overlay 10050 (FIG. 100), overlay 10150 (FIG. 101), overlay 10250 (FIG. 102), and/or overlay 10450 (FIG. 104). In many embodiments, the overlay can include a top side and a bottom side. The top side can be similar or identical to top side 9981 (FIG. 99). The bottom side can be similar or identical to bottom side 9982 (FIG. 99).

In a number of embodiments, block 10501 of providing an overlay can include providing the overlay such that the overlay can include one or more curved portions configured to correspond to one or more curved areas of a screen of an electronic device. The curved portions can be similar to curved overlay portions 9851 (FIG. 98) and/or 9852 (FIGS. 98-99).

In some embodiments, method 10500 next can include a block 10502 of providing an adhesive component. In the same or different embodiments, block 10502 can include coupling together the overly and the adhesive component. The adhesive component can be similar or identical to adhesive component 9970 (FIG. 99), adhesive component 10170 (FIG. 101), adhesive component 10270 (FIG. 102), adhesive carrier 10372 (FIG. 103), and/or adhesive component 10470). In several embodiments, the adhesive component can include a top side and a bottom side. The top side can be similar or identical to top side 9983 (FIG. 99). The bottom side can be similar or identical to bottom side 9984 (FIG. 99). In many embodiments, the top side of the adhesive component can be adhered to the bottom side of the overlay. In a number of embodiments the adhesive component can be configured to adhere the bottom side of the overlay to a screen of an electronic device in a single-use application of the overlay by adhering the bottom side of the adhesive component to the screen of the electronic device. The electronic device can be similar or identical to electronic device 9700 (FIGS. 97-99) and/or electronic device 10000 (FIG. 100). The screen can be similar or identical to touchscreen 9701 (FIGS. 97-99) and/or touchscreen 10001 (FIG. 100).

In several embodiments, the overlay and the adhesive component can be configured such that, when the overlay is removed from being adhered to the screen of the electronic device after the single-use application of the overlay, at least a portion of the adhesive component can be detached from at least a portion of the overlay.

In various embodiments, the overlay and the adhesive component can be configured such that the overlay cannot be re-adhered to the screen of the electronic device using the adhesive component after the single-use application of the overlay and after removal of the overlay from the screen of the electronic device.

In many embodiments, the overlay and the adhesive component are configured such that re-adhesion of the overlay to the screen of the electronic device using the adhesive component after the single-use application of the overlay and after removal of the overlay from the screen of the electronic device produces a distortion of at least a portion of a display of the screen of the electronic device that is seen through the overlay and the adhesive component.

In several embodiments, the adhesive component can include an adhesive carrier comprising a top side and a bottom side. The adhesive carrier can be similar or identical to adhesive carrier 9972 (FIG. 99) and/or adhesive carrier 10372 (FIG. 103). The top side can be similar or identical to top side 9985 (FIG. 99). The bottom side can be similar or identical to bottom side 9986 (FIG. 99). In many embodiments, the adhesive component also can include a first adhesive layer at the top side of the adhesive carrier. The first adhesive layer can be similar or identical to first adhesive layer 9971 (FIG. 99). In several embodiments, the first adhesive layer can adhere the top side of the adhesive carrier to the bottom side of the overlay. In some embodiments, the adhesive component additionally can include a second adhesive layer at the bottom side of the adhesive carrier. The second adhesive layer can be similar or identical to second adhesive layer 9973 (FIG. 99). In many embodiments, the second adhesive layer can be configured to adhere the bottom side of the adhesive carrier to the screen of the electronic device in the single-use application of the overlay.

In various embodiments, an adhesive strength of the second adhesive layer is stronger than an adhesive strength of the first adhesive layer. In other embodiments, the adhesive strength of the second adhesive layer can be weaker than or the same as the adhesive strength of the first adhesive layer.

In many embodiments, the adhesive carrier can include one or more perforations. The perforations can be similar or identical to perforations 10383-10389 (FIG. 103). In several embodiments, the one or more perforations each can include a series of holes extending at least partially through the adhesive carrier. In various embodiments, each hole of the series of holes can have a diameter between approximately 0.001 mm and approximately 0.1 mm.

In several embodiments, the adhesive component can be configured such that the adhesive component includes a single layer of adhesive and is devoid of an adhesive carrier. For example, the adhesive component can be similar or identical to adhesive component 10070 (FIG. 100), adhesive component 10170 (FIG. 102), and/or adhesive component 10270 (FIG. 103). In several embodiments, the overlay can include one or more vulnerabilities to fracture. For example, the vulnerabilities to fracture can be similar or identical to vulnerabilities 10483-10489 (FIG. 104). In a number of embodiments, the single layer of adhesive can have an adhesive strength such that the overlay fractures at the one or more vulnerabilities to fracture when the overlay is removed from being adhered to the screen of the electronic device after the single-use application of the overlay.

In many embodiments, method 10500 optionally can include a block 10503 of providing an overlay applicator. In the same or different embodiments, block 10503 can include coupling together the overlay applicator and the adhesive component. The overlay applicator can be similar to overlay applicator 100 (FIG. 1), overlay applicator 400 (FIGS. 4-5), overlay applicator 600 (FIG. 6), overlay applicator 700 (FIG. 7), overlay applicator 1500 (FIG. 15), overlay applicator 3000 (FIG. 30), overlay applicator 3550 (FIGS. 35-36), overlay applicator 6050 (FIG. 60), overlay applicator 8001 (FIG. 80), overlay applicator 9101 (FIG. 91), overlay applicator tray 8000 (FIG. 80), and/or overlay applicator tray 9100 (FIG. 91). In many embodiments, the overlay applicator can include the overlay and the adhesive component.

In several embodiments, the overlay applicator can include an adhesive release liner that includes a top side and a bottom side. The adhesive release liner can be similar or identical to adhesive release liner 140 (FIG. 1), adhesive release liner 440 (FIGS. 4-5), adhesive release liner 640 (FIG. 6), adhesive release liner 740 (FIG. 7), adhesive release liner 1540 (FIG. 15), adhesive release liner 2740 (FIGS. 27-30), adhesive release liner 8240 (FIG. 82), and/or adhesive release liner 9240 (FIG. 92). In many embodiments, the top side of the adhesive release liner can be removably attached to the bottom side of the overlay using the adhesive component. In several embodiments, the adhesive release liner can be configured to protect the adhesive component at the bottom side of the overlay from contaminants.

In a number of embodiments, the overlay applicator can include an alignment mechanism. The alignment mechanism can be similar or identical to alignment mechanism 115 (FIG. 1), alignment mechanism 415 (FIG. 4), alignment mechanism 615 (FIG. 6), alignment mechanism 715 (FIG. 7), alignment mechanism 1515 (FIG. 15), alignment mechanism 2915 (FIGS. 29-30), alignment mechanism 3557 (FIGS. 35-36), alignment piece 8010 (FIG. 80), and/or alignment piece 9110 (FIG. 91). In various embodiments, the alignment mechanism can be configured to align the overlay with the screen of the electronic device as the overlay is adhered to the screen of the electronic device.

In several embodiments, the overlay applicator can include a pull tab. The pull tab can be similar or identical to pull tab 150 (FIG. 1), pull tab 450 (FIGS. 4-5), pull tab 650 (FIG. 6), pull tab 750 (FIGS. 7, 42, 44-45, 48-49), pull tab 1550 (FIG. 15), pull tab 2750 (FIGS. 27-30), pull tab 6055 (FIG. 60), first pull tab 8042 (FIG. 80), second pull tab 8022 (FIG. 80), first pull tab 9142 (FIG. 91), and/or second pull tab 9122 (FIG. 91). In a number of embodiments, the pull tab can be configured to facilitate removal of the adhesive release liner from the bottom side of the overlay to expose the adhesive component to the screen of the electronic device.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that various elements of FIGS. 1-105 may be modified, combined, and/or interchanged, and that the foregoing discussion of certain of these embodiments does not necessarily represent a complete description of all possible embodiments. As another example, one or more of the procedures, processes, or activities of FIGS. 23-26, 51-54, 75-79, 93-94, and 105 may include different procedures, processes, and/or activities and be performed in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An apparatus comprising:
    an overlay comprising a top side and a bottom side, the overlay comprising dimensions coterminous with a screen of an electronic device, and the overlay comprising at least one of glass, tempered glass, silica-infused plastic, or polyethylene terephthalate; and
    an adhesive component comprising a top side and a bottom side, the top side of the adhesive component being adhered to the bottom side of the overlay, the adhesive component being optically clear, the adhesive component being configured to adhere the bottom side of the overlay to the screen of the electronic device in a single-use application of the overlay by adhering the bottom side of the adhesive component to the screen of the electronic device, and the apparatus being configured such that a display of the screen of the electronic device is viewable through the overlay and the adhesive component without noticeable distortion when the bottom side of the adhesive component is adhered to the screen of the electronic device, wherein:

the apparatus is configured such that, while the overlay is being removed from being adhered to the screen of the electronic device after the single-use application of the overlay, at least a portion of the adhesive component is automatically being detached from at least a portion of the overlay.

2. The apparatus of claim 1, wherein:

the apparatus is configured such that the overlay cannot be re-adhered to the screen of the electronic device using the adhesive component after the single-use application of the overlay and after removal of the overlay from the screen of the electronic device.

3. The apparatus of claim 1, wherein:

the apparatus is configured such that re-adhesion of the overlay to the screen of the electronic device using the adhesive component after the single-use application of the overlay and after removal of the overlay from the screen of the electronic device produces a distortion of at least a portion of the display of the screen of the electronic device that is seen through the overlay and the adhesive component.

4. The apparatus of claim 1, wherein:

the overlay comprises one or more curved portions that curve downward from a top plane of the screen of the electronic device to correspond to one or more curved areas of the screen of the electronic device.

5. The apparatus of claim 1, wherein the adhesive component comprises:

an adhesive carrier comprising a top side and a bottom side;

a first adhesive layer at the top side of the adhesive carrier and adhering the top side of the adhesive carrier to the bottom side of the overlay; and a second adhesive layer at the bottom side of the adhesive carrier, the second adhesive layer being configured to adhere the bottom side of the adhesive carrier to the screen of the electronic device in the single-use application of the overlay.

6. The apparatus of claim 5, wherein:

an adhesive strength of the second adhesive layer is stronger than an adhesive strength of the first adhesive layer.

7. The apparatus of claim 5, wherein:

the adhesive carrier comprises one or more perforations.

8. The apparatus of claim 7, wherein:

the one or more perforations each comprise a series of holes extending at least partially through the adhesive carrier; and each hole of the series of holes has a diameter between approximately 0.001 mm and approximately 0.1 mm.

9. The apparatus of claim 1, wherein:

the adhesive component comprises a single layer of adhesive and is devoid of an adhesive carrier;

the overlay comprises one or more vulnerabilities to fracture; and the single layer of adhesive has an adhesive strength such that the overlay fractures at the one or more vulnerabilities to fracture when the overlay is removed from being adhered to the screen of the electronic device after the single-use application of the overlay.

10. The apparatus of claim 1, further comprising:

an overlay applicator comprising:

the overlay;

the adhesive component;

an adhesive release liner comprising a top side and a bottom side, the top side of the adhesive release liner being removably attached to the bottom side of the overlay using the adhesive component, the adhesive release liner being configured to protect the adhesive component at the bottom side of the overlay from contaminants;

an alignment mechanism configured to align the overlay with the screen of the electronic device as the overlay is adhered to the screen of the electronic device; and a pull tab configured to facilitate removal of the adhesive release liner from the bottom side of the overlay to expose the adhesive component to the screen of the electronic device.

11. A method comprising:

providing an overlay, the overlay comprising a top side and a bottom side, the overlay comprising dimensions coterminous with a screen of an electronic device, and the overlay comprising at least one of glass, tempered glass, silica-infused plastic, or polyethylene terephthalate; and providing an adhesive component, the adhesive component comprising a top side and a bottom side, the top side of the adhesive component being adhered to the bottom side of the overlay, the adhesive component being optically clear, the adhesive component being configured to adhere the bottom side of the overlay to the screen of the electronic device in a single-use application of the overlay by adhering the bottom side of the adhesive component to the screen of the electronic device, and the apparatus being configured such that a display of the screen of the electronic device is viewable through the overlay and the adhesive component without noticeable distortion when the bottom side of the adhesive component is adhered to the screen of the electronic device, wherein:

the overlay and the adhesive component are configured such that, while the overlay is being removed from being adhered to the screen of the electronic device after the single-use application of the overlay, at least a portion of the adhesive component is automatically being detached from at least a portion of the overlay.

12. The method of claim 11, wherein:

the overlay and the adhesive component are configured such that the overlay cannot be re-adhered to the screen of the electronic device using the adhesive component after the single-use application of the overlay and after removal of the overlay from the screen of the electronic device.

13. The method of claim 11, wherein:

the overlay and the adhesive component are configured such that re-adhesion of the overlay to the screen of the electronic device using the adhesive component after the single-use application of the overlay and after removal of the overlay from the screen of the electronic device produces a distortion of at least a portion of the display of the screen of the electronic device that is seen through the overlay and the adhesive component.

14. The method of claim 11, wherein providing the overlay comprises:

providing the overlay such that the overlay comprises one or more curved portions that curve downward from a top plane of the screen of the electronic device to correspond to one or more curved areas of the screen of the electronic device.

15. The method of claim 11, wherein providing the adhesive component comprises:
  providing the adhesive component such that the adhesive component comprises:
    an adhesive carrier comprising a top side and a bottom side;
    a first adhesive layer at the top side of the adhesive carrier and adhering the top side of the adhesive carrier to the bottom side of the overlay; and
    a second adhesive layer at the bottom side of the adhesive carrier, the second adhesive layer being configured to adhere the bottom side of the adhesive carrier to the screen of the electronic device in the single-use application of the overlay.

16. The method of claim 15, wherein:
  an adhesive strength of the second adhesive layer is stronger than an adhesive strength of the first adhesive layer.

17. The method of claim 15, wherein:
  the adhesive carrier comprises one or more perforations.

18. The method of claim 17, wherein:
  the one or more perforations each comprise a series of holes extending at least partially through the adhesive carrier; and
  each hole of the series of holes has a diameter between approximately 0.001 mm and approximately 0.1 mm.

19. The method of claim 11, wherein:
  providing the adhesive component such that the adhesive component comprises providing the adhesive component such that the adhesive component comprises a single layer of adhesive and is devoid of an adhesive carrier;
  providing the overlay comprises providing the overlay such that the overlay comprises one or more vulnerabilities to fracture; and
  the single layer of adhesive has an adhesive strength such that the overlay fractures at the one or more vulnerabilities to fracture when the overlay is removed from being adhered to the screen of the electronic device after the single-use application of the overlay.

20. The method of claim 11, further comprising:
providing an overlay applicator, the overlay applicator comprising:
  the overlay;
  the adhesive component;
  an adhesive release liner comprising a top side and a bottom side, the top side of the adhesive release liner being removably attached to the bottom side of the overlay using the adhesive component, the adhesive release liner being configured to protect the adhesive component at the bottom side of the overlay from contaminants;
  an alignment mechanism configured to align the overlay with the screen of the electronic device as the overlay is adhered to the screen of the electronic device; and
  a pull tab configured to facilitate removal of the adhesive release liner from the bottom side of the overlay to expose the adhesive component to the screen of the electronic device.

* * * * *